US 6,728,404 B1

(12) United States Patent  
Ono et al.

(10) Patent No.: US 6,728,404 B1  
(45) Date of Patent: Apr. 27, 2004

(54) METHOD FOR RECOGNIZING OBJECT IMAGES AND LEARNING METHOD FOR NEURAL NETWORKS

(75) Inventors: Shuji Ono, Kanagawa-ken (JP); Akira Osawa, Kanagawa-ken (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 0 days.

(21) Appl. No.: 09/438,145

(22) Filed: Nov. 10, 1999

Related U.S. Application Data

(60) Division of application No. 08/947,633, filed on Oct. 9, 1997, now abandoned, which is a division of application No. 08/294,865, filed on Aug. 29, 1994, now Pat. No. 5,740,274, which is a continuation-in-part of application No. 07/944,768, filed on Sep. 14, 1992, now abandoned.

(30) Foreign Application Priority Data

Sep. 12, 1991 (JP) ............................................. 3-233213  
Sep. 26, 1991 (JP) ............................................. 3-247478  
Dec. 5, 1991 (JP) ............................................. 3-321727  
Dec. 6, 1991 (JP) ............................................. 3-323342  
Dec. 6, 1991 (JP) ............................................. 3-323343  
Dec. 6, 1991 (JP) ............................................. 3-323344  
Jul. 14, 1992 (JP) ............................................. 4-186717

(51) Int. Cl.⁷ .............................. G06K 9/46; G06K 9/66  
(52) U.S. Cl. ....................... 382/190; 382/118; 382/156; 382/203; 382/282; 382/291  
(58) Field of Search ................................. 382/115, 117, 382/118, 153, 156, 157–159, 190, 199, 203, 103, 282; 235/411; 342/64

(56) References Cited

U.S. PATENT DOCUMENTS 4,476,494 A 10/1984 Tugaye  
4,581,762 A 4/1986 Lapidus et al.

(List continued on next page.)

FOREIGN PATENT DOCUMENTS

| JP | 2138677 | 5/1990 |
| JP | 233213 | 9/1991 |
| JP | 247478 | 9/1991 |
| JP | 321727 | 12/1991 |
| JP | 323342 | 12/1991 |
| JP | 323343 | 12/1991 |
| JP | 323344 | 12/1991 |
| JP | 186717 | 7/1992 |

OTHER PUBLICATIONS

Himes, et al., SPIE, vol. 1469, No. 2, VLSI implementable neural networks for target tracking, (1991), pp. 671–682.

(List continued on next page.)

Primary Examiner—Bhavesh M. Mehta  
Assistant Examiner—Gregory Desire  
(74) Attorney, Agent, or Firm—Sughrue Mion, PLLC

(57) ABSTRACT

A method for recognizing an object image comprises the steps of extracting a candidate for a predetermined object image from an overall image, and making a judgment as to whether the extracted candidate for the predetermined object image is or is not the predetermined object image. The candidate for the predetermined object image is extracted by causing the center point of a view window, which has a predetermined size, to travel to the position of the candidate for the predetermined object image, and determining an extraction area in accordance with the size and/or the shape of the candidate for the predetermined object image, the center point of the view window being taken as a reference during the determination of the extraction area. A learning method for a neural network comprises the steps of extracting a target object image, for which learning operations are to be carried out, from an image, feeding a signal, which represents the extracted target object image, into a neural network, and carrying out the learning operations of the neural network in accordance with the input target object image.

95 Claims, 66 Drawing Sheets

U.S. PATENT DOCUMENTS

| | | | |
|---|---|---|---|
| 4,652,803 A | | 3/1987 | Kamejima et al. |
| 4,689,671 A | | 8/1987 | Ohki et al. |
| 4,754,489 A | | 6/1988 | Bokser |
| 4,782,384 A | | 11/1988 | Tucker et al. |
| 4,833,790 A | | 5/1989 | Spencer et al. |
| 4,847,688 A | | 7/1989 | Nishimura et al. |
| 5,016,282 A | * | 5/1991 | Tomono et al. ............. 382/117 |
| 5,058,184 A | | 10/1991 | Fukushima |
| 5,062,056 A | | 10/1991 | Lo et al. |
| 5,085,325 A | | 2/1992 | Jones et al. |
| 5,103,488 A | | 4/1992 | Gemello et al. |
| 5,111,516 A | | 5/1992 | Nakano et al. |
| 5,142,592 A | * | 8/1992 | Moler ........................ 382/200 |
| 5,216,724 A | * | 6/1993 | Suzuki et al. ............... 382/135 |
| 5,220,619 A | | 6/1993 | Keokoek |
| 5,239,594 A | | 8/1993 | Yoda |
| 5,341,142 A | | 8/1994 | Reis et al. |
| 5,440,651 A | | 8/1995 | Martin |
| 5,465,308 A | | 11/1995 | Hutcheson et al. |
| 5,535,286 A | * | 7/1996 | Ibbotson et al. ............ 382/109 |
| 5,604,820 A | | 2/1997 | Ono |
| 5,619,593 A | | 4/1997 | Ono |
| 5,740,274 A | * | 4/1998 | Ono et al. ................... 382/190 |
| 6,466,685 B1 | * | 10/2002 | Fukui et al. ................. 382/115 |

OTHER PUBLICATIONS

Mehanian, et al., SPIE, Vol 1471, Bi–directional Log–polar Mapping for Invariant Object Recognition, (1991), pp. 2000–209.

Gawronski, et al., SPIE, vol. 1293, No. 2, Experimental optimization of the Neuronlike Network applied for the processing of moving images, (1990), pp. 838–849.

Grattoni, et al., Computer Vision . . . , vol. 43, No. 1, A Contour Detection Algorithm Based on the Minimum Radial Inertia (MRI) Criterion, (1988), pp. 22–36.

Kageyu et al., "Augmented Multi–Layer Perception for Rotation and Scale–Invariant Hand–Written Numeral Recognition", 1991 Joint Conference on Neural Networks, IEEE Cat #91CH3065–0, p. 54–9, vol. 1, Nov. 1991.

"Neocognitron" A Neural Network Model for a Mechanism of Pattern Recognition Unaffected by Shift in Position, Collected Papers of the Institute of Electronics and Communication Engineers of Japan, J62–A(10), p. 658–665, Oct. 1997.

Lee, et al., SPIE, vol. 937, Application of Artificial Intelligence VI (1988), pp. 328–335.

Zhou, et al., IEEE Int'l Conference on Neural Networks, Computation of Optical Flow Using a Neural Network (1988) pp 71–78.

Weller, et al., A Gradient Comparison Method for Tracking and Focusing Purposes, Time–Varying Image Processing . . .(1990), pp. 316–322.

"Neural Net for Extracting Size Invariant Features", Computrol, No. 29, p. 26–31.

"Visual and Auditory Information Processing in Living Body System", Information Processing, vol., 23, No. 5, pp. 451–459, 1982.

"Structure and Function of Visual System", Information Processing, vol. 25, No. 2, pp. 108–116, 1985.

"Pattern Recognition Learning System", Image Information (1), pp. 31–37.

"Stimulation of Saccadic Movement by Pseudo–Retina Mask", Television Engineering reports, ITEJ Tec. Rep., vol. 14, No. 36, pp. 25–30, ICS' 90–94, AIPS' 90–46, Jun. 1990.

Neural Net for Specifying a Viewpoint, Television Engineering Report, ITEJ Tec. Rep. vol. 14, No. 33, pp. 25–30, VAL' 90–28, Jun. 1990.

* cited by examiner

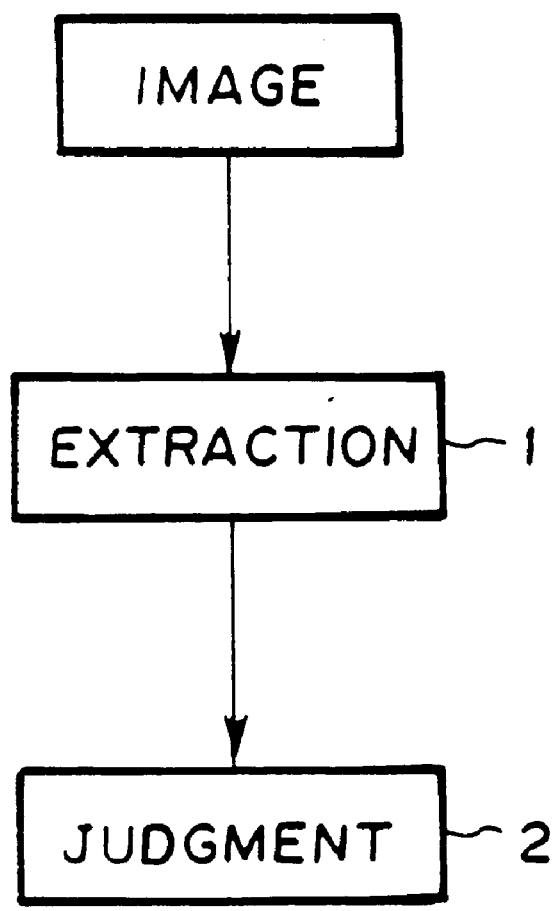

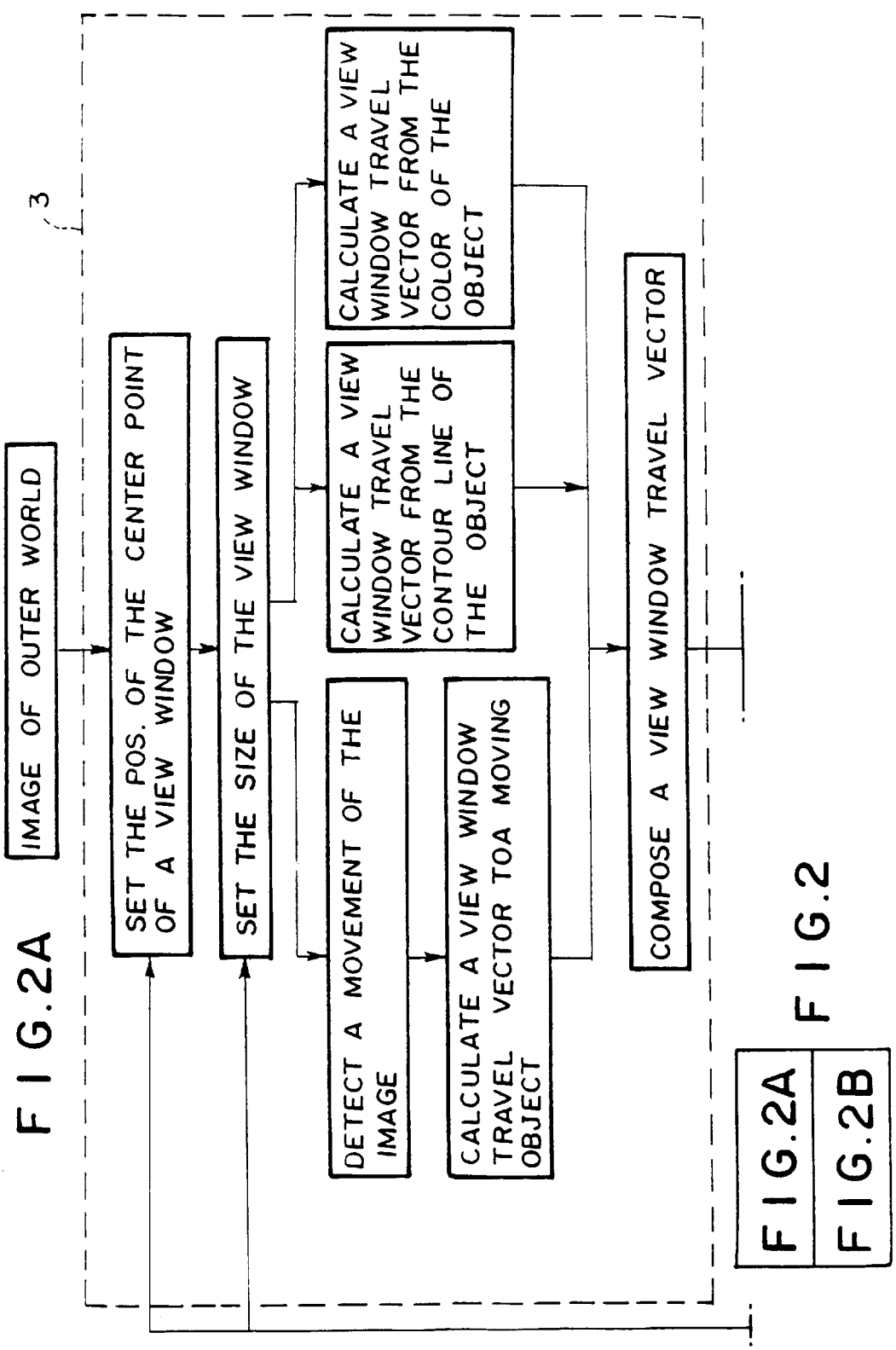

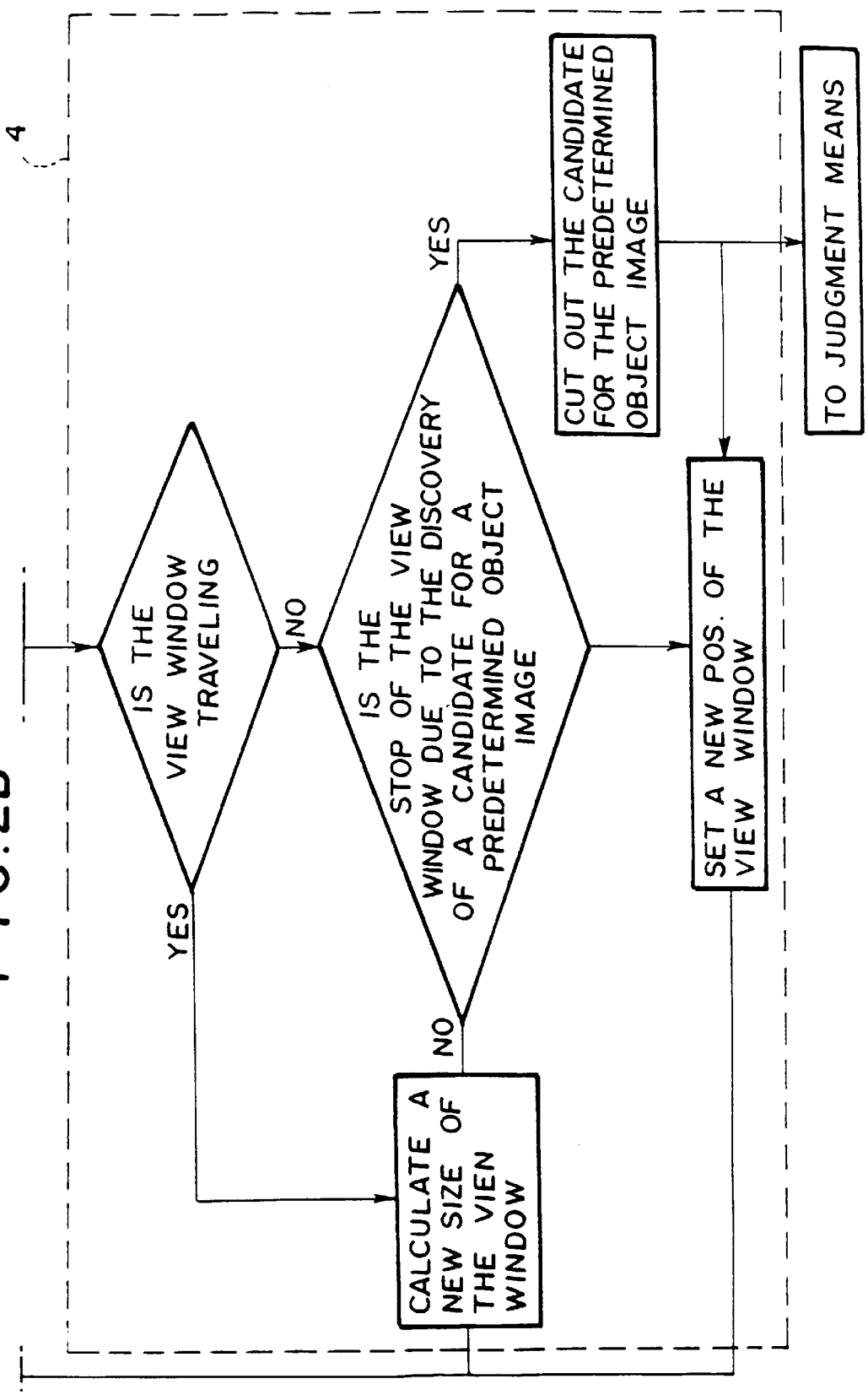

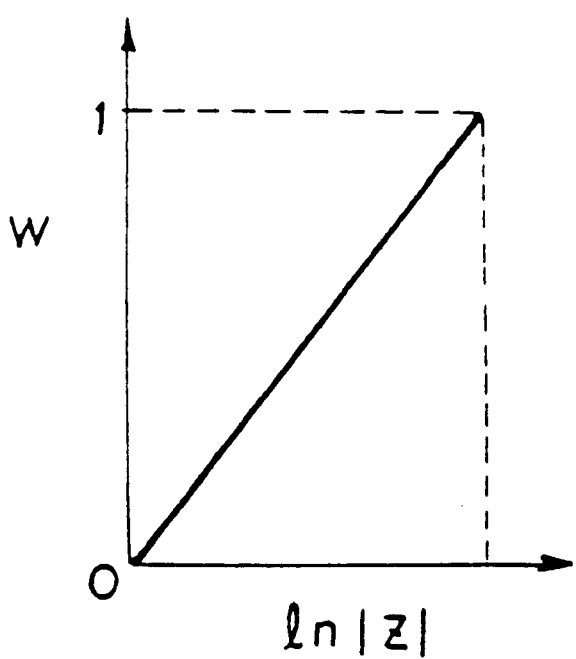

F I G. 12
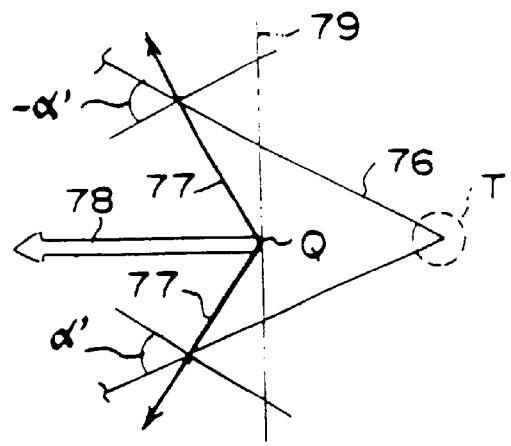
F I G. 13
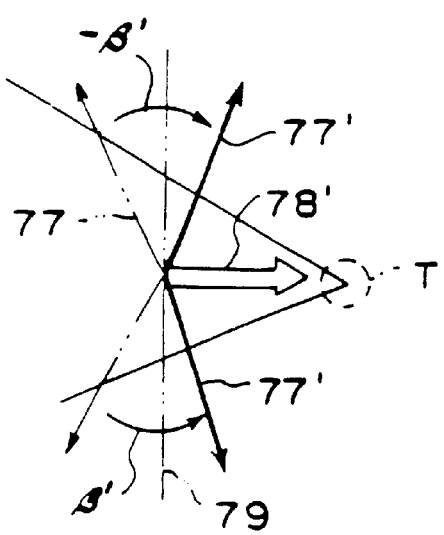

F I G. 19
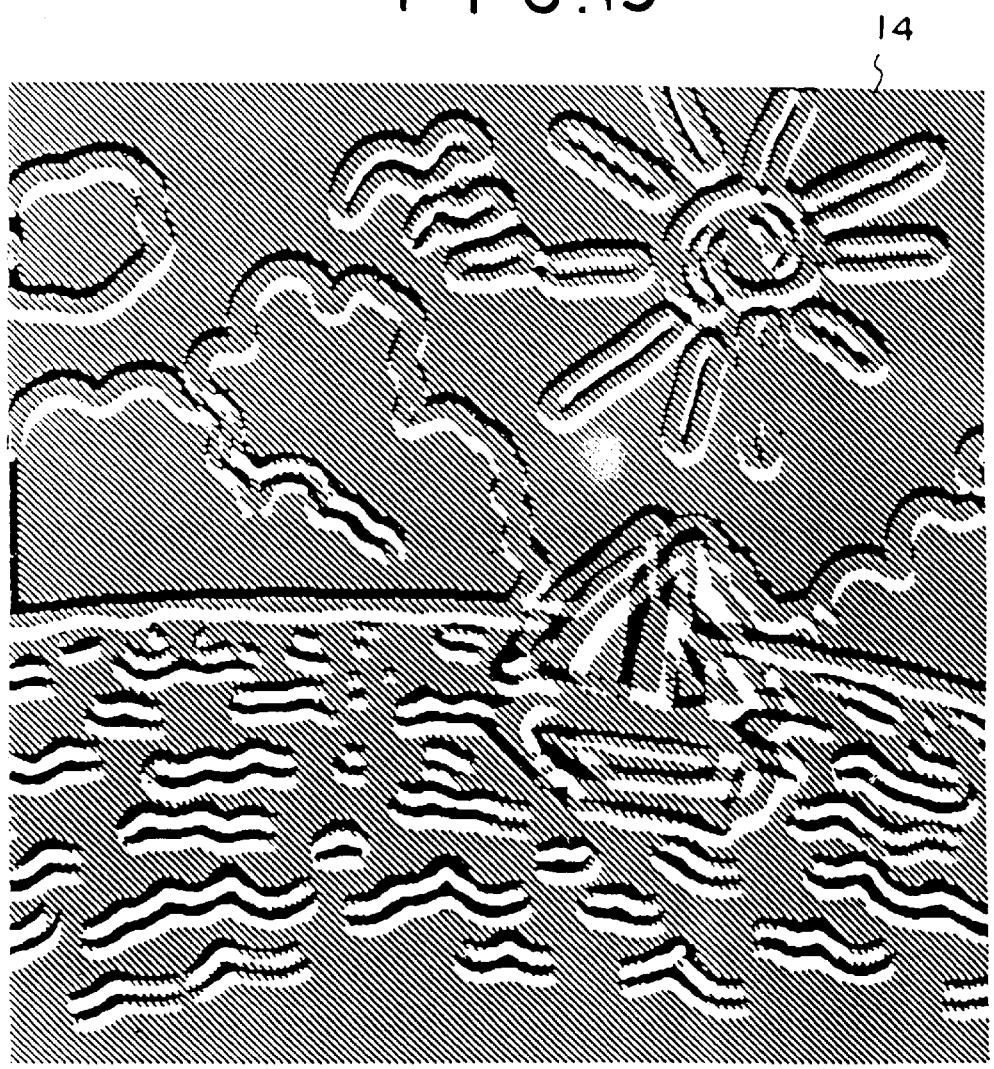

F I G. 22A 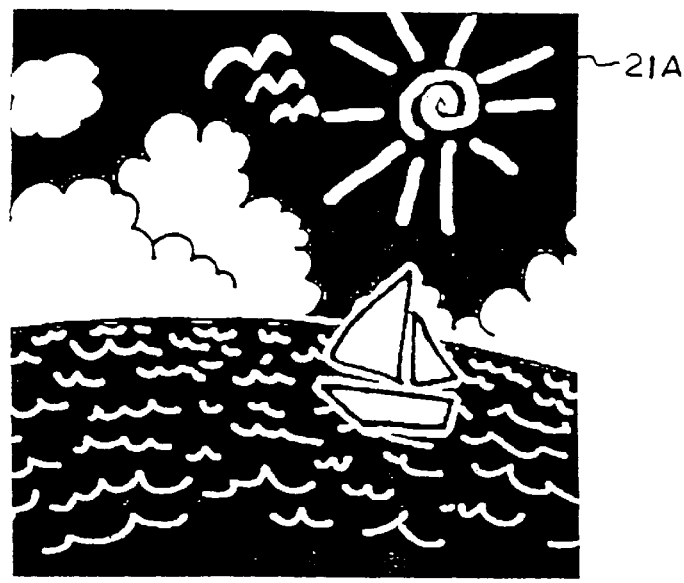
F I G. 22B 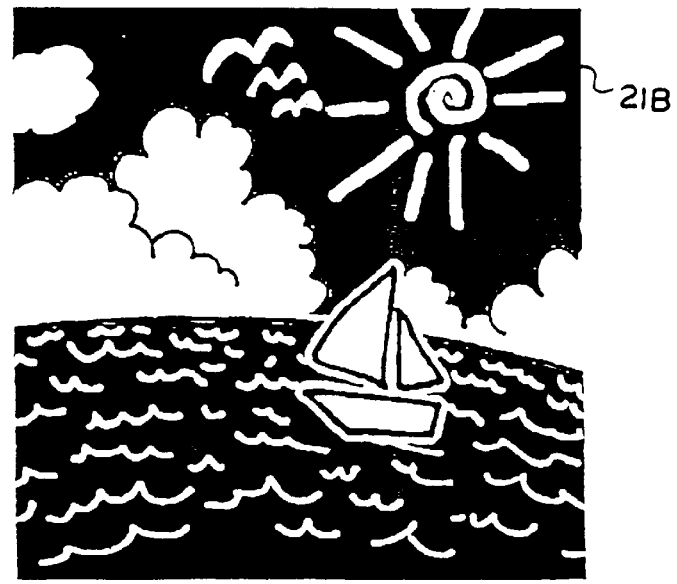

F I G.25

F I G. 28A
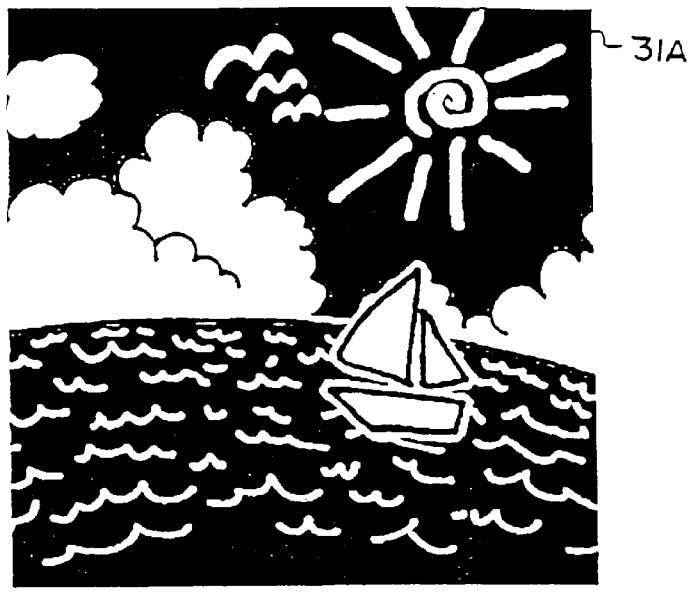
F I G. 28B
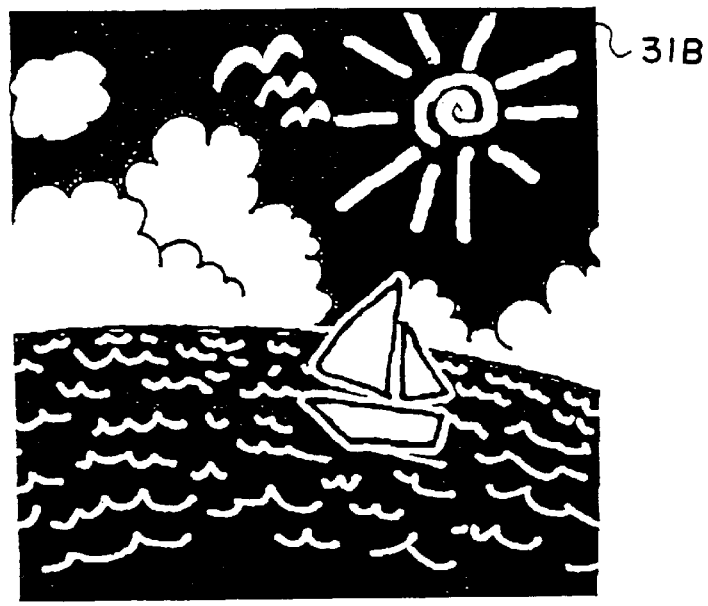

F I G. 33A
F I G. 33B

F I G.36
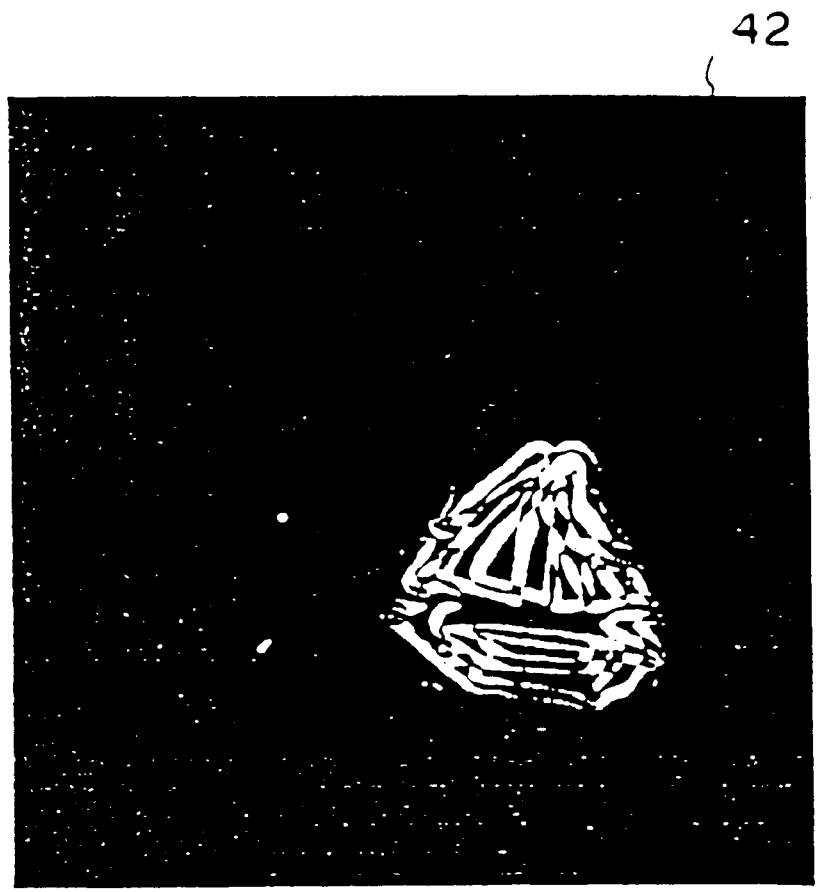

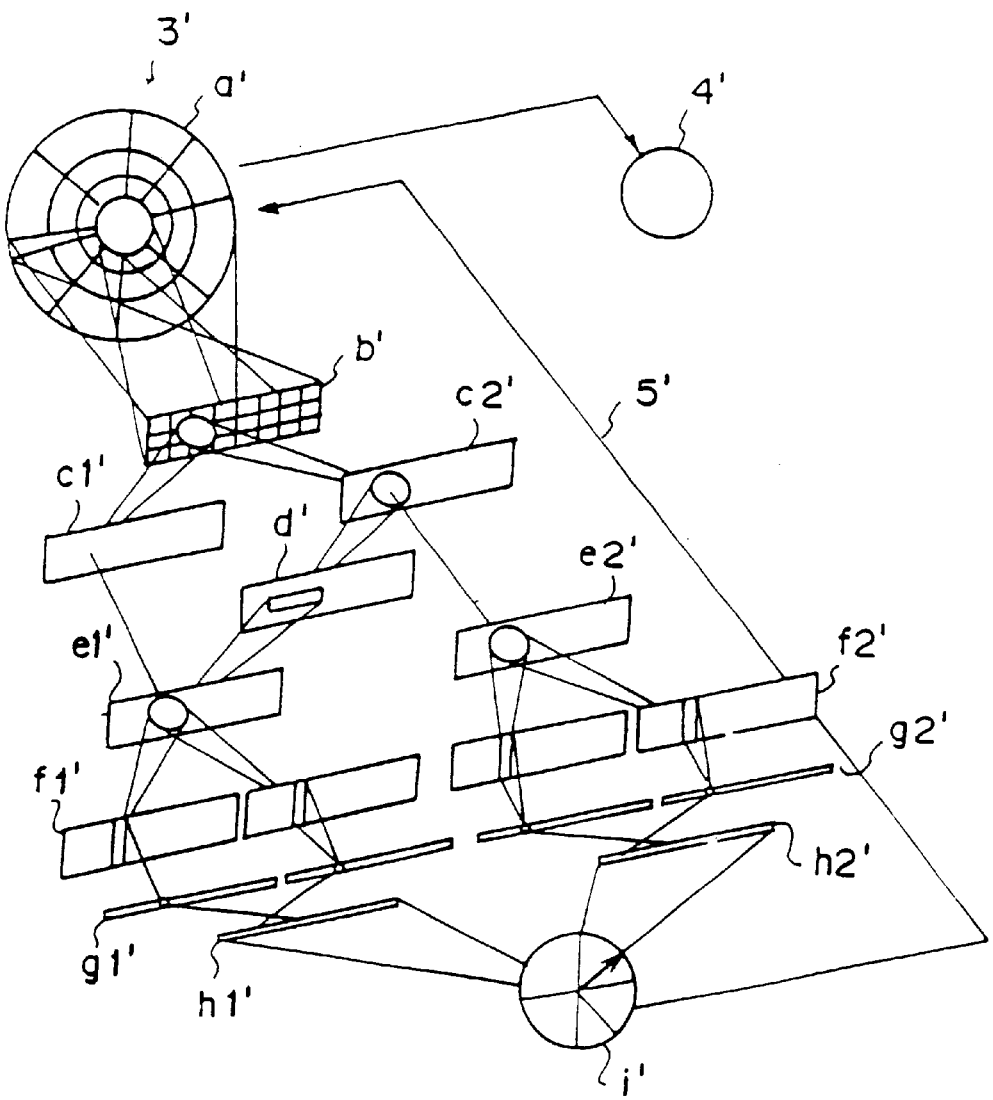
F I G. 38

F I G. 40
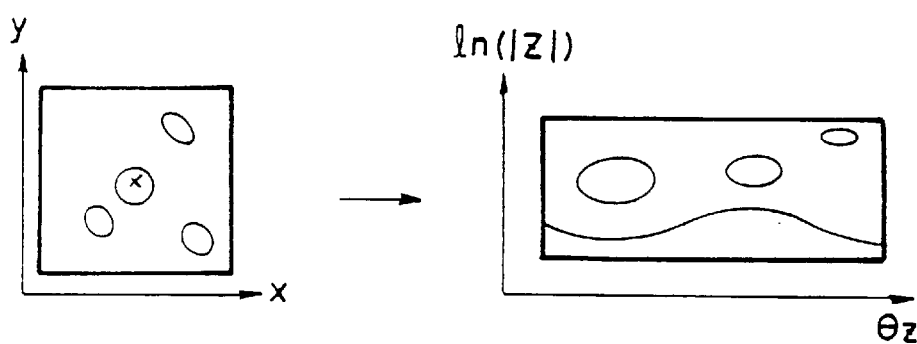

F I G. 49A
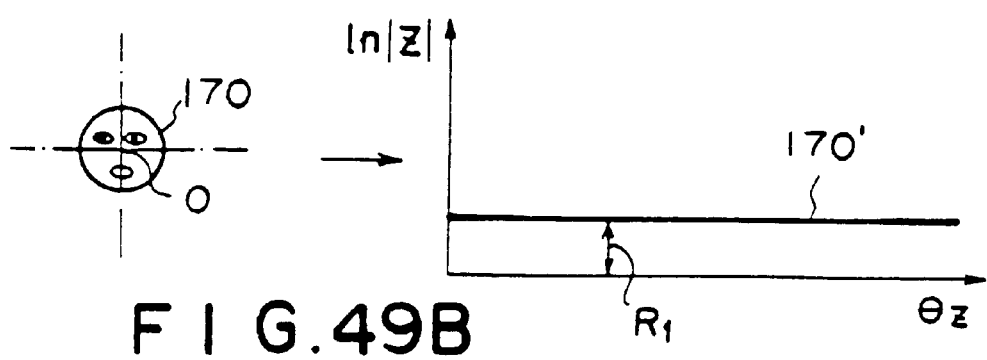
F I G. 49B
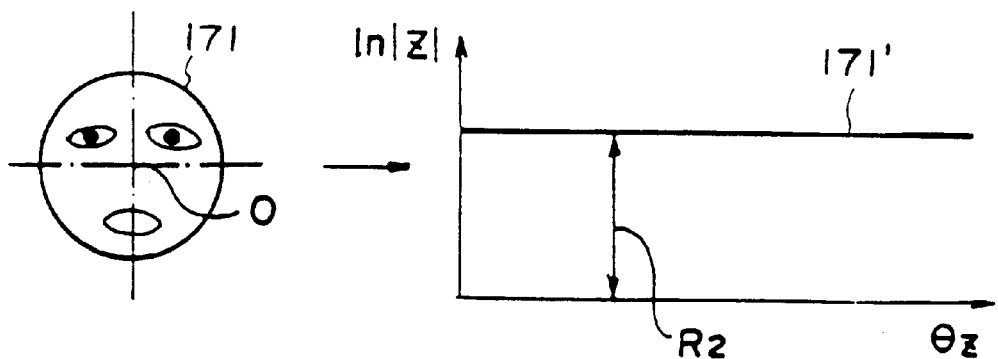

F I G. 52A
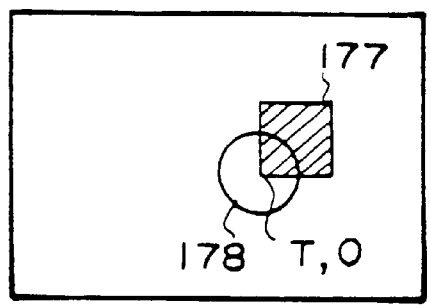 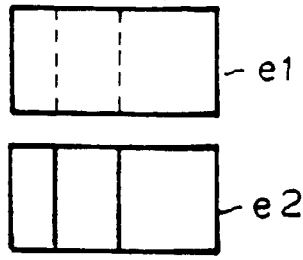
F I G. 52B
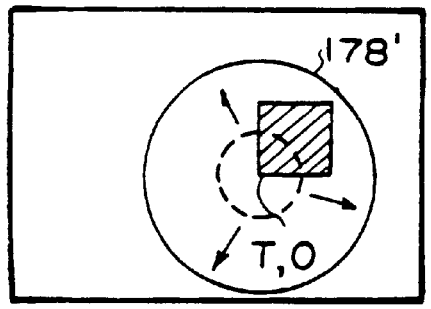 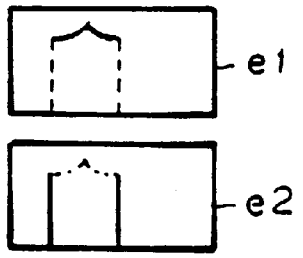
F I G. 52C
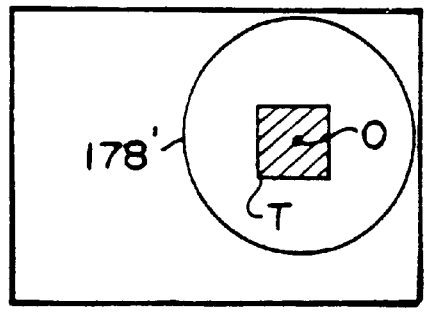 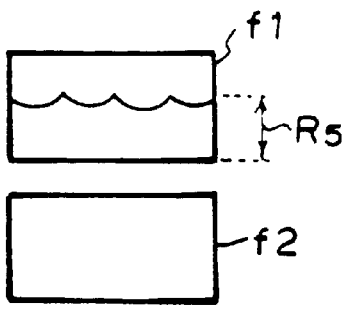
F I G. 52D
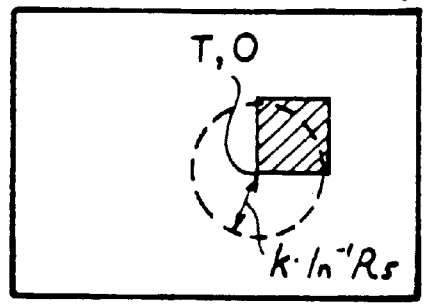

F I G. 54
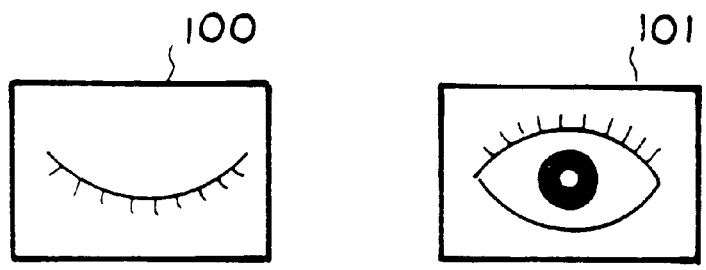
F I G. 55
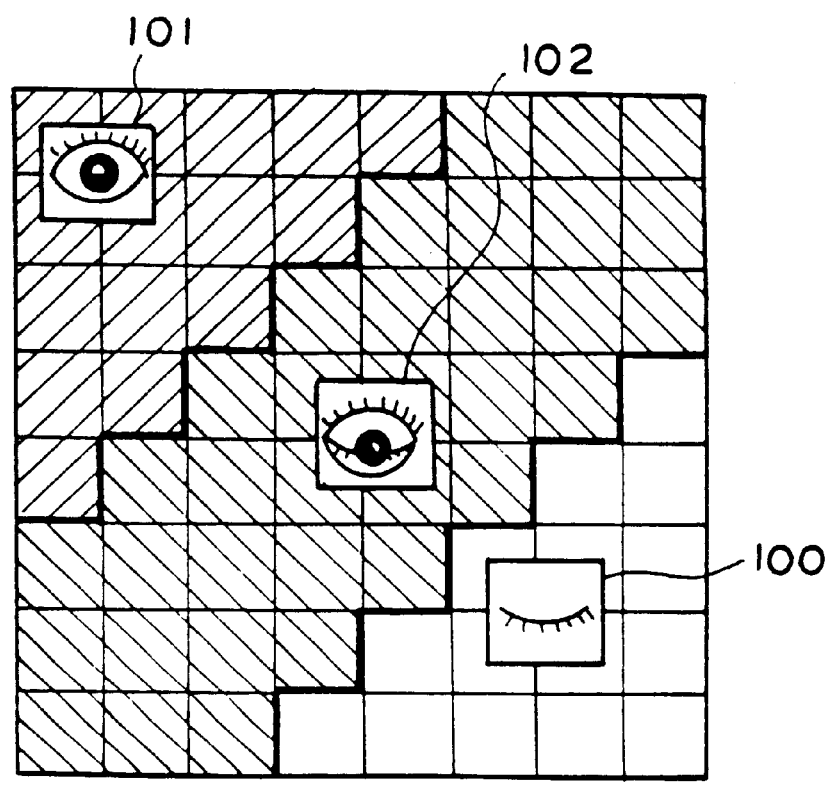

F I G. 56
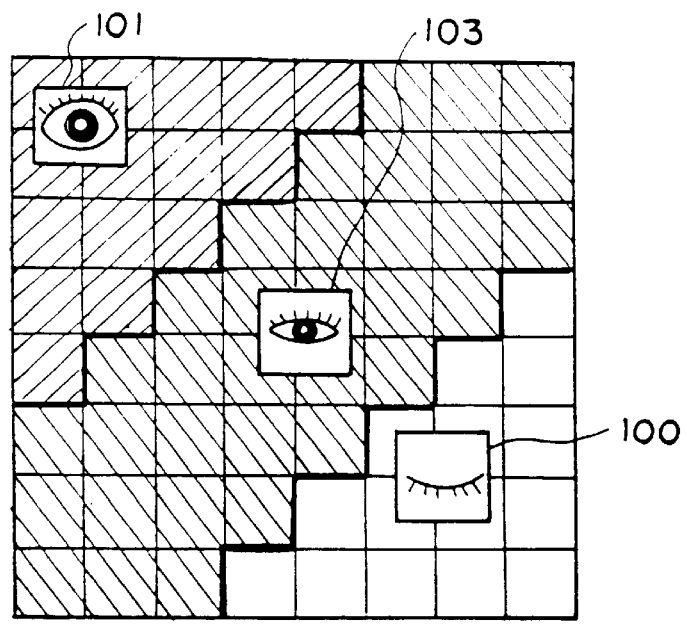
F I G. 57
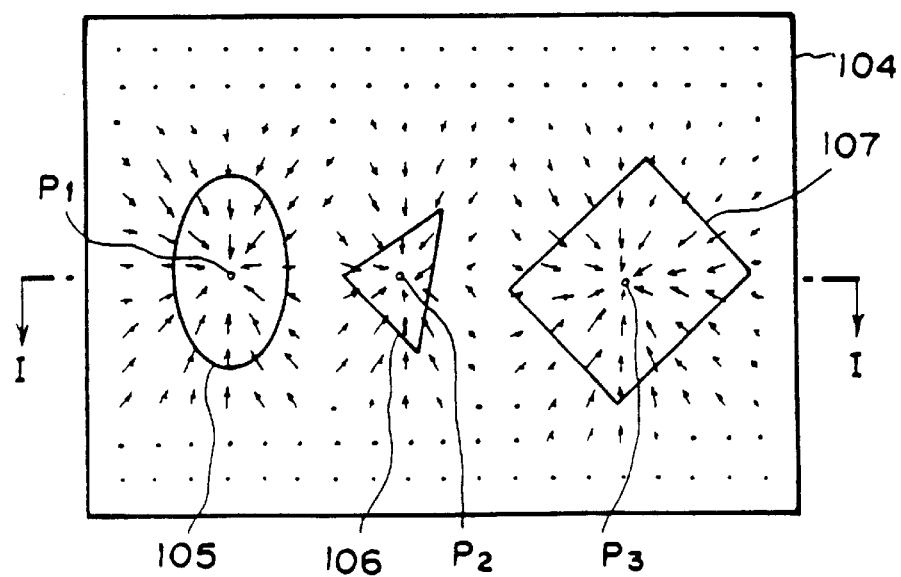

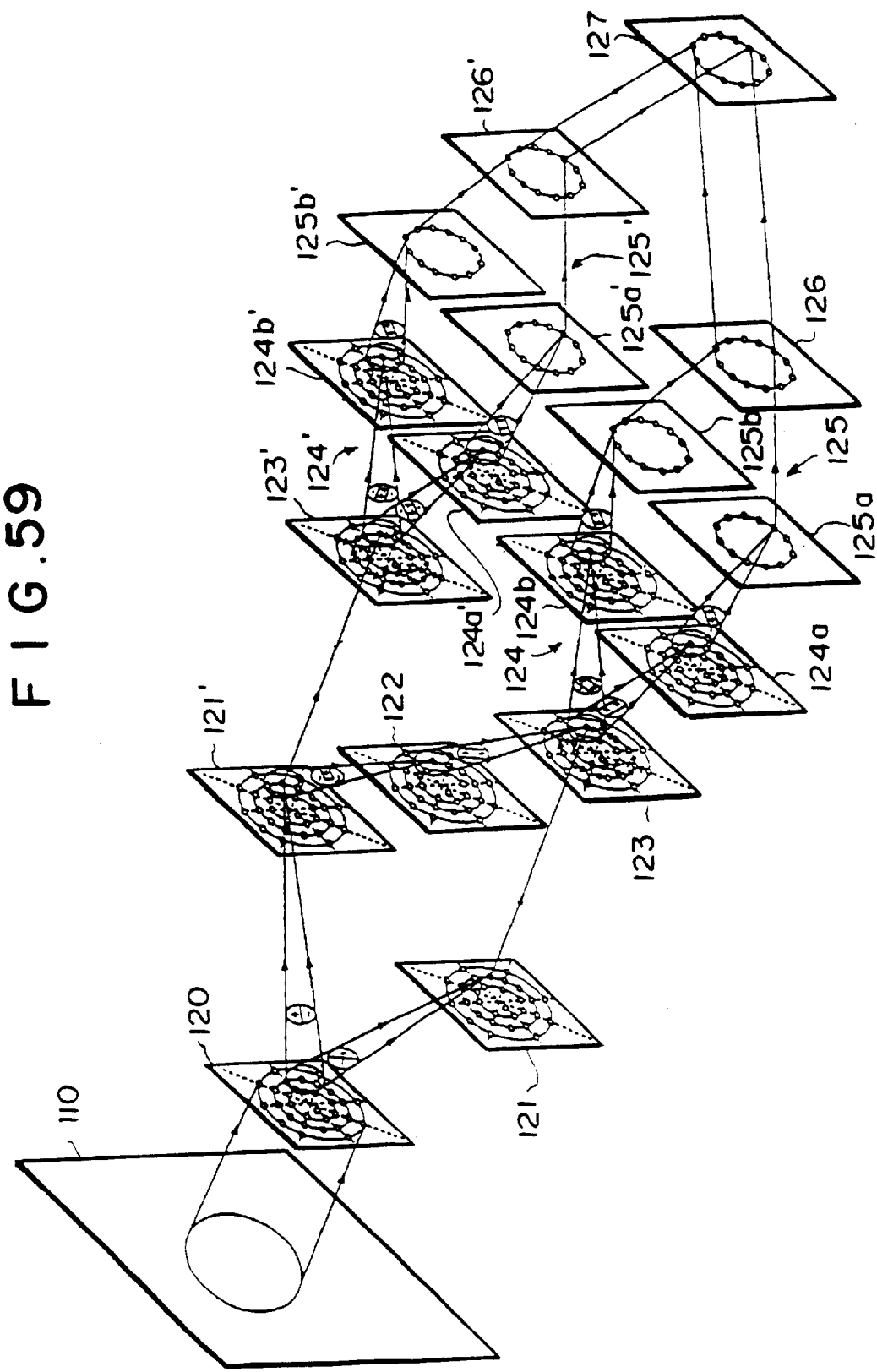

F I G. 70
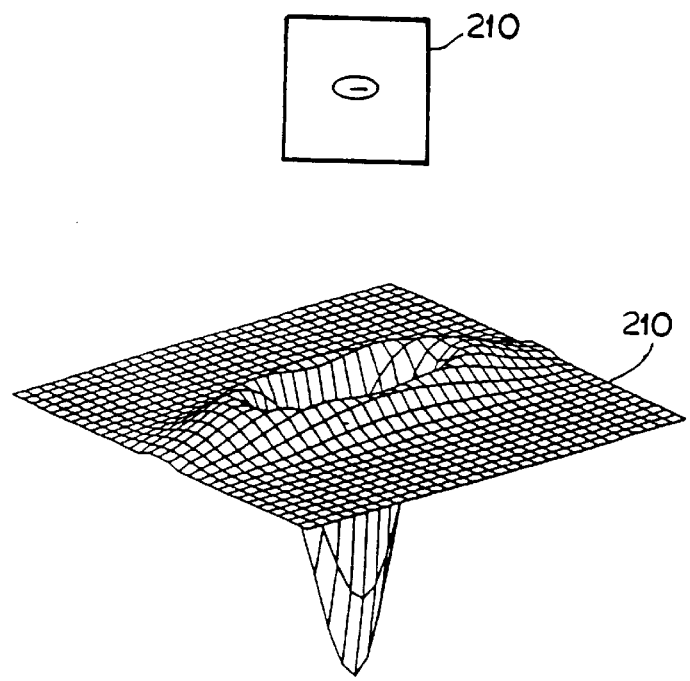
F I G. 72
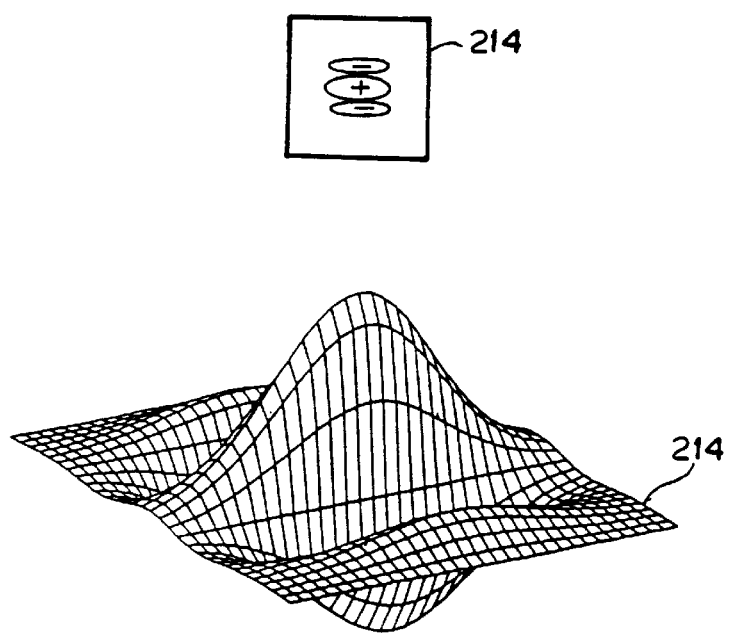

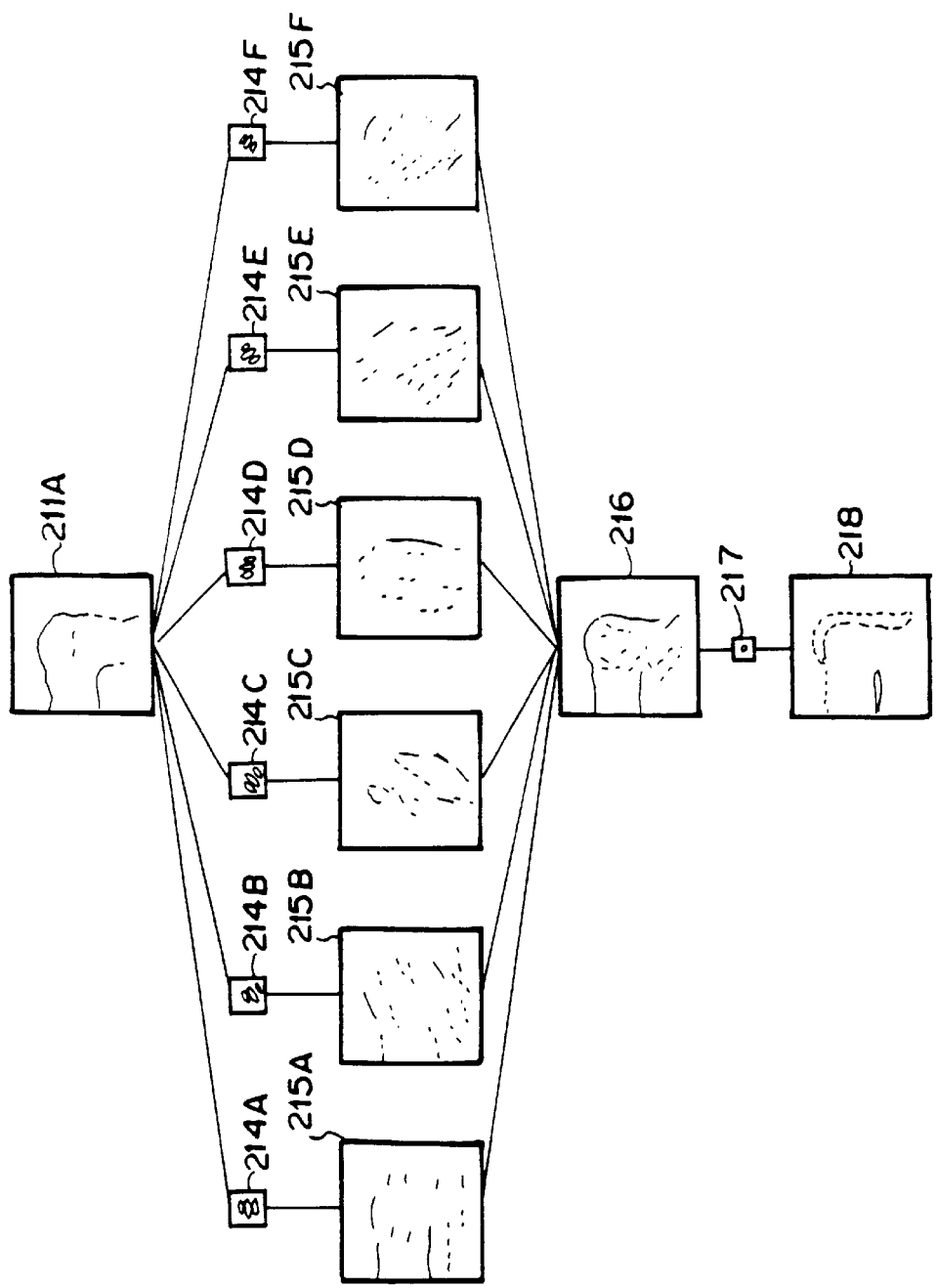

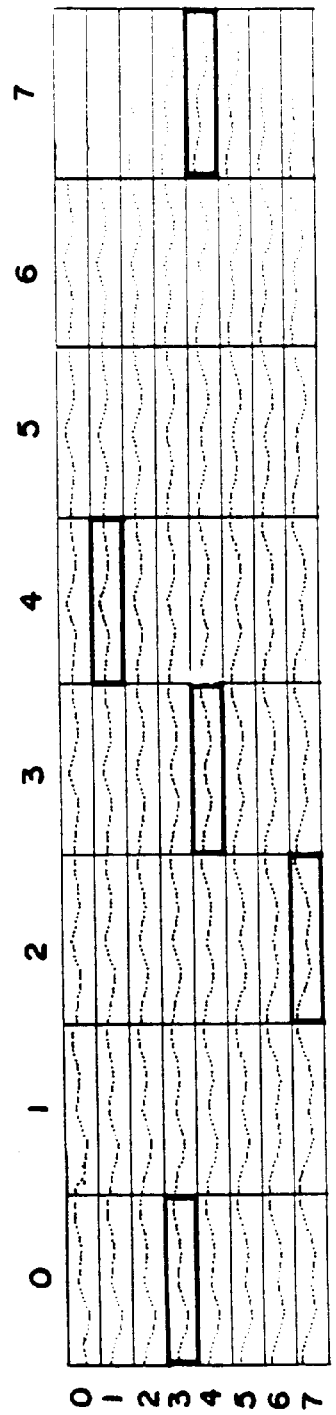
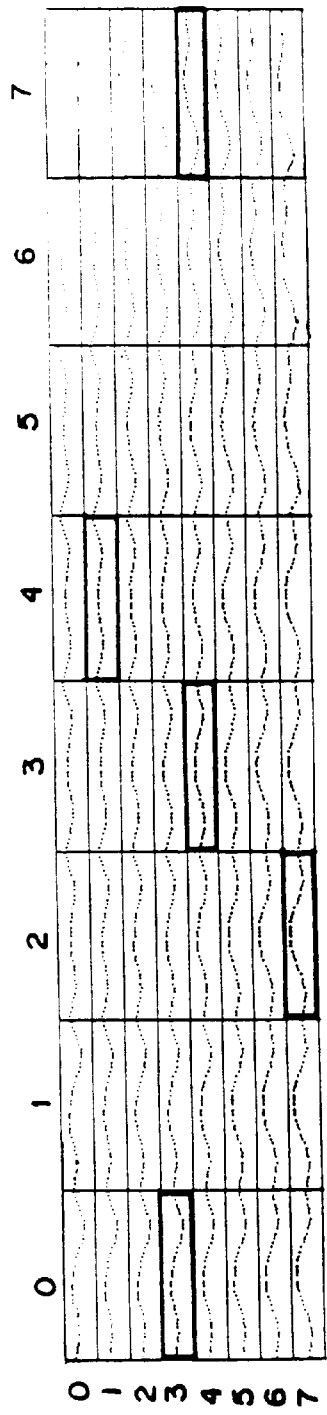

FIG. 83
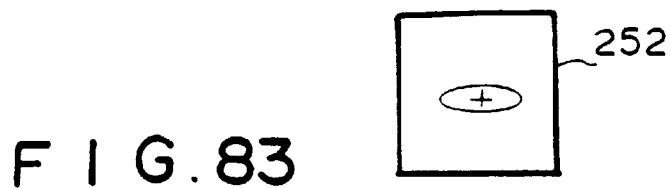
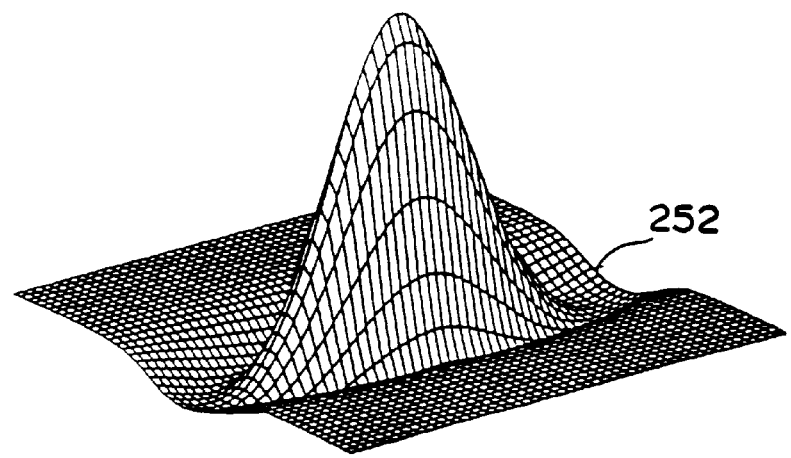
FIG. 84
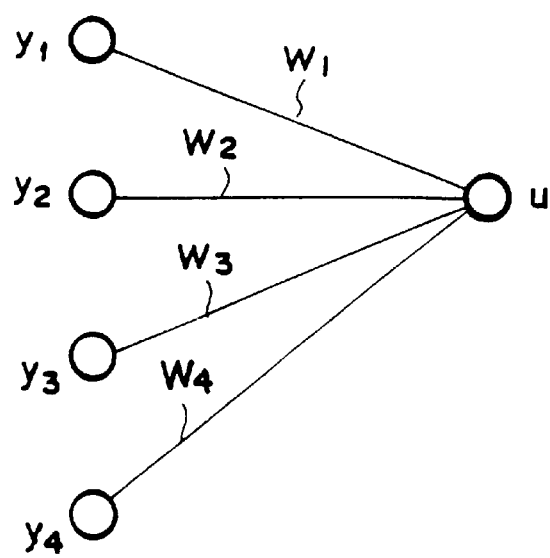

METHOD FOR RECOGNIZING OBJECT IMAGES AND LEARNING METHOD FOR NEURAL NETWORKS

This is a divisional application of application Ser. No. 08/947,633 filed Oct. 9, 1997 now abandoned which is a divisional application of Ser. No. 08/294,865, filed Aug. 29, 1994 (now U.S. Pat. No. 5,740,274), which is a continuation-in-part-application of application Ser. No. 07/944,768, filed Sep. 14, 1992 (now abandoned).

BACKGROUND OF THE INVENTION

1. Field of the Invention

This invention relates to a method for recognizing the presence or absence of a predetermined object image in an image. This invention particularly relates to a method for recognizing an object image wherein, during image information processing, a judgment is made as to whether a candidate for a predetermined object image, which candidate has been extracted from an image, is or is not the predetermined object image. This invention also relates to a learning method for a neural network, wherein a target object image, for which the learning operations are to be carried out, is extracted from an image, and the learning operations of a neural network for carrying out recognition of a predetermined object image are carried out with respect to the extracted target object image. This invention further relates to a method for discriminating an image wherein, during image information processing, a judgment as to whether a given image is or is not a predetermined image is made accurately without being adversely affected by a change in the angle of the image, rotation of the image and a background of the image.

2. Description of the Prior Art

A human being views an image and recognizes what the thing embedded in the image is. It is known that this action can be divided into two steps. A first step is to carry out "discovery and extraction" by moving the viewpoint, setting a target of recognition at the center point of the visual field, and at the same time finding the size of the object. A second step is to make a judgment from a memory and a knowledge of the human being as to what the object present at the viewpoint is. Ordinarily, human beings iterate the two steps and thereby acquire information about the outer world.

On the other hand, in conventional techniques for recognizing a pattern by carrying out image processing, typically in pattern matching techniques, importance is attached only to the second step. Therefore, various limitations are imposed on the first step for "discovery and extraction." For example, it is necessary for a human being to intervene in order to cut out a target and normalize the size of the target. Also, as in the cases of automatic reading machines for postal code numbers, it is necessary for a target object to be placed at a predetermined position. As pattern recognizing techniques unaffected by a change in size and position of a target, various techniques have been proposed wherein a judgment is made from an invariable quantity. For example, a method utilizing a central moment, a method utilizing a Fourier description element, and a method utilizing a mean square error have been proposed. With such methods, for the purposes of recognition, it is necessary to carry out complicated integrating operations or coordinate transformation. Therefore, extremely large amounts of calculations are necessary in cases where it is unknown where a target object is located or in cases where a large image is processed. Also, with these methods, in cases where a plurality of object images are embedded in an image, there is the risk that their coexistence causes a noise to occur and causes errors to occur in recognizing the object images. Thus these methods are not satisfactory in practice.

As a model, which is unaffected by the size of a target object or by a shift in position of a target object and which can accurately recognize the target object, a model utilizing a neocognitron, which is one of techniques for neural networks, has been proposed. The neocognitron is described by Fukushima in "Neocognitron: A Neural Network Model for a Mechanism of Pattern Recognition Unaffected by Shift in Position," Collected Papers of The Institute of Electronics and Communication Engineers of Japan, A, J62-A(10), pp. 658–665, October 1979. Neural networks constitute one of research techniques for neural information processing, which is referred to as the constructive method and which aims at clarifying the information processing principle of a brain by constructing an appropriate neural circuitry model with full consideration given to the facts known physiologically and results of research, investigating the actions and performance of the model, and comparing the actions and performance of the model with those of the actual human brain. Research has been conducted to develop various models, such as visual models, learning models, and associative memory models. In particular, the neocognitron model is tolerant of a shift in position of an object image embedded in an image. The neocognitron carries out pattern matching and self-organizing learning operations on a small part of a target object image, assimilates a shift in position at several stages with a layered architecture, and thereby tolerates the shift in position.

In the neocognitron, the operation for tolerating a shift in position of a feature little by little at several stages plays an important role in eliminating adverse effects of a shift in position of an input pattern and carrying out pattern recognition tolerant of a deformation of the input pattern. Specifically, adverse effects of shifts in position between local features of an input pattern, which shifts are due to various deformations, such as enlargement and reduction, of the input pattern, are assimilated little by little during the process for putting the features together. Ultimately, an output can be obtained which is free of adverse effects of comparatively large deformation of the input pattern.

As described above, the neocognitron is based on the principle that the pattern matching is carried out on a small part of a target object, and a shift in its position is assimilated at several stages through a layered architecture. However, with such a principle, a limitation is naturally imposed on achievement of both the accurate recognition and the assimilation of the shift in position. It has been reported, for example, by Nagano in "Neural Net for Extracting Size Invariant Features," Computrol, No. 29, pp. 26–31, that the neocognitron can ordinarily tolerate only approximately four times of fluctuation in size. As for the shift in position, the neocognitron can tolerate only approximately two or three times the size of a target object. The tolerance capacity remains the same also in a recently proposed neocognitron model which is provided with a selective attention mechanism.

How the visual function of a human being carries out the first step has not yet been clarified. On the other hand, how the viewpoint moves has been clarified to some extent as described, for example, by Okewatari in "Visual and Auditory Information Processing in Living Body System," Information Processing, Vol. 23, No. 5, pp. 451–459, 1982, or by Sotoyama in "Structure and Function of Visual System", Information Processing, Vol. 26, No. 2, pp. 108–116, 1985.

It is known that eyeball movements include a saccadic movement, a follow-up movement, and involuntary movement. Several models that simulate these eye movements have been proposed. For example, a model in which the viewpoint is moved to the side of a larger differential value of an image is proposed, for example, by Nakano in "Pattern Recognition Learning System," Image Information (I), 1987/1, pp. 31–37, or by Shiratori, et al. in "Simulation of Saccadic Movement by Pseudo-Retina Mask," ITEJ Tec. Rep. (Technical Report of The Institute of Television Engineers of Japan), Vol. 14, No. 36, pp. 25–30, ICS' 90-54, AIPS' 90-46, June 1990. Also, a model in which the viewpoint is moved to the side of a higher lightness is proposed, for example, by Hirahara, et al. in "Neural Net for Specifying a Viewpoint," ITEJ Tec. Rep., Vol. 14, No. 33, pp. 25–30, VAI' 90-28, June 1990. Additionally, a model in which the viewpoint is moved to a point of a contour having a large curvature is proposed, for example, by Inui, et al. in Japanese Unexamined Patent Publication No. 2(1990)-138677. However, these proposed models are rather simple and do not well simulate the human visual function.

Also, for the purposes of finding a target of recognition and extracting a region including the whole target, instead of adhering only to local features of the target object, it is necessary that the movement of the viewpoint becomes stable (stationary) at the center point of the whole target. However, with the aforesaid conventional models, such an operation for stabilizing the viewpoint cannot be carried out. For example, with the model proposed by Shiratori, et al. wherein the pseudo-retina mask is utilized, the viewpoint moves forward and backward around the contour line of an object and does not become stable. Also, with the model proposed by Inui, et al., the viewpoint can ultimately catch only a feature point at a certain limited part of an object. Additionally, most of the aforesaid conventional models requires, as a tacit precondition, that the background of an object is simple. Thus most of the aforesaid conventional models cannot be applied to natural images, such as ordinary photographic images.

As described above, various techniques have been proposed which enables satisfactory recognition of a target in cases where a human being intervenes in order to assimilate a shift in position of the target or a change in the size of the target or in cases where the position and the size of the target are normalized in advance. However, no excellent technique has yet been proposed, with which the whole target object image can be extracted from an image for the purposes of recognizing the object image.

Further, research to develop models for carrying out search and recognition of objects has heretofore been considered as one of important techniques for image information processing and has been carried out in various manners. In particular, attempts have heretofore been made extensively to recognize face patterns, which serves as patterns of objects and are embedded in images.

Typical models utilizing faces as target objects include the following methods:

(1) A method wherein an eigenface obtained by analyzing the main components of a sample of a face image is utilized. The method is described by Matthew, T., Alex, P. in "Eigenfaces for Recognition," Journal of Cognitive Neuroscience, Vol. 3, No. 1, 1991, 71–86.

(2) A method wherein a square region, which has been cut out of a face image, is mosaicked, and thereafter a learning operation on the face image is carried out with a BP method, which is one of neural network techniques, the face image being thereby recognized. This method is described by Shin Kosugi (NTT Human Interface Laboratory) in "A Study of Face Image Recognition Using A Neural Network," ITEJ Tec. Rep., Vol. 14, No. 50, 1990.9, 7–12.

(3) A method wherein color information and KL development are utilized. This method is described by Tsutomu Sasaki (NTT Human Interface Laboratory), Shigeru Akamatsu, et al., in "Study of An Automatic Recognition Method for A Frontal Face Image," Shingiho, IE91-50, 1–8.

Also, the methods described below have heretofore been proposed.

(4) A method wherein a multiple pyramid (from a coarsely mosaicked image to a finely mosaicked image) is utilized. This method is described by Shin Kosugi (NTT Human Interface Laboratory) in "Search and Recognition of A Face Image in A Scene," Computer Vision, 76–7, 1992.1.23, 49–56.

(5), (6) Methods capable of coping with a change in the angle of a face. Such methods are described by Kohonen, T., Lehtio, P., Oja, E., Kortekangas, A., & Makisara, K. in "Demonstration of Pattern Processing Properties of the Optimal Associative Mappings," Proceedings of the International Conference on Cybernetics and Society, Washington, D.C., Sep. 19–21, 1977, 581–585. (b); and by J. Buhmann, J. Lange, & C. von der Malsburg in "Distortion Invariant Object Recognition by Matching Hierarchically Labeled Graphs," IJCNN 1989, Vol. Jun. 1, 1989, 155–159.

As described above, human beings extract an appropriate size of a target of recognition from an image of the outer world and thereafter efficiently carry out recognition processing. On the other hand, with the conventional methods, an attempt is made to recognize a target in an image of the outer world only with a single processing system. Therefore, problems occur in that very complicated procedures and a very long time are required. Also, problems occur in that it is necessary for a human being to intervene in the extraction of the target, or it is necessary for the background of the image to be simple. Accordingly, the conventional methods are not satisfactory in practice. These problems occur because no efficient method has heretofore been available for extracting a target object, which is to be recognized, from an image of the outer world, and the structure of the recognition system is such that a heavy burden is imposed on a judgment means of the recognition system.

Also, in cases where the technique is used which is unaffected by a shift in position and which accurately recognizes an object image, appropriate self-organizing learning operations must be carried out on the neural network, such as the neocognitron, and a neural network suitable for the recognition of the object image must thereby be built up.

However, if substantially identical object images differ in size from one another or include an object image, for which the learning operations of the neural network need not be carried out, a disturbance will be caused in the classification into categories during the learning operations, i.e., during the creation of synaptic connections in the neural network. As a result, appropriate learning operations cannot be carried out. Therefore, when the learning operations of the neural network, such as the neocognitron, are carried out, it is necessary for a human being to intervene in order to extract a target object image, for which the learning operations are to be carried out, to normalize the extracted target object image into an appropriate size, and to feed only the necessary information to the neural network. Considerable time and labor are required to carry out such intervening operations.

Further, the aforesaid methods (1), (2), and (3) for carrying out search and recognition of an object were designed without the conditions of the rotation of a face, a change in the angle of the face, effects of a background, and the like, being contemplated in advance. Therefore, the aforesaid methods (1), (2), and (3) cannot sufficiently cope with such conditions. The aforesaid method (4) was designed by considering the effects of a background, which were not contemplated in the aforesaid methods (1), (2), and (3). However, only the front-directed face images are used in the aforesaid method (4). Therefore, the aforesaid method (4) cannot cope with rotation of a face and a change in the angle of a face. Further, the aforesaid method (4) cannot sufficiently cope with effects of a background. The aforesaid methods (5) and (6) can cope with a change in the angle of a face. However, the aforesaid methods (5) and (6) are designed on the assumption that no background is embedded in the image. Therefore, the aforesaid methods (5) and (6) cannot cope with effects of a background.

SUMMARY OF THE INVENTION

The primary object of the present invention is to provide a method for recognizing an object image wherein, during pattern recognition, a candidate for a predetermined object image is extracted appropriately, an appropriate judgment is made as to whether the extracted candidate for the predetermined object image is or is not the predetermined object image, and the time required for operations is kept short.

Another object of the present invention is to provide a method for recognizing an object image, wherein a predetermined object image is extracted appropriately and accurately from a given image.

A further object of the present invention is to provide a method for recognizing an object image, wherein an accurate judgment is made as to whether a given candidate for a predetermined object image is or is not the predetermined object image.

A still further object of the present invention is to provide a method for recognizing an object image wherein, even if the background of a candidate for a predetermined object image in an image is complicated, the candidate for the predetermined object image is extracted appropriately.

Another object of the present invention is to provide a method for recognizing an object image, wherein the judgment performance of a system, which makes a judgment as to whether a candidate for a predetermined object image is or is not the predetermined object image, is kept high.

A further object of the present invention is to provide a method for recognizing an object image, wherein judgments as to whether feature parts of a predetermined object image are or are not included in feature parts of a candidate for the predetermined object image are made appropriately regardless of a change in the angle of the object image and a difference among object images.

A still further object of the present invention is to provide a learning method for a neural network, wherein a target object image, for which the learning operations of a neural network are to be carried out, is automatically normalized and extracted, and the learning operations of the neural network are carried out efficiently.

Another object of the present invention is to provide a learning method for a neural network, wherein a target object image is extracted automatically from an image, the extracted target object image is classified in an arranged form, and learning operations are thereby carried out.

A further object of the present invention is to provide a method for recognizing an object image and a learning method for a neural network, which enable the operation scale to be kept small.

A still further object of the present invention is to provide a method for recognizing an object image and a learning method for a neural network, in which extraction and judgment processes are carried out simultaneously and which enables processing to be carried out very quickly with special hardware functions.

Another object of the present invention is to provide a method for recognizing an object image and a learning method for a neural network, wherein a view window of an input device is caused to travel to an object image, which shows a movement different from the movement of the background of the object image.

A further object of the present invention is to provide a method for discriminating an image, wherein image discrimination is carried out accurately without being adversely affected by rotation of a predetermined image, such as a face image, a change in the angle of the image, and a background of the image.

The present invention provides a method for recognizing an object image, which comprises the steps of:

i) extracting a candidate for a predetermined object image from an image, and ii) making a judgment as to whether the extracted candidate for the predetermined object image is or is not the predetermined object image.

In a first method for the aforesaid extraction, the extraction of the candidate for the predetermined object image is carried out by:

a) causing the center point of a view window, which has a predetermined size, to travel to the position of the candidate for the predetermined object image, and b) determining an extraction area in accordance with the size and/or the shape of the candidate for the predetermined object image, the center point of the view window being taken as a reference during the determination of the extraction area.

In a second method for the aforesaid extraction, the extraction of the candidate for the predetermined object image is carried out by:

a) cutting out an image, which falls in the region inside of a view window having a predetermined size, from the image, b) finding azimuths and intensities of components, such as a color and contour lines, of the candidate for the predetermined object image with respect to the center point of the view window, the azimuths and the intensities being found as azimuth vectors from a movement of the whole cut-out image or of an entire complex-log mapped image, which is obtained from transformation of the cut-out image with complex-log mapping, the color of the candidate for the predetermined object image included in the cut-out image, and/or tilts of the contour lines of the candidate for the predetermined object image included in the cut-out image, c) composing a vector from the azimuth vectors, a vector for the travel of the view window being thereby determined, d) causing the center point of the view window to travel in accordance with the vector for the travel of the view window, and e) determining an extraction area in accordance with the size and/or the shape of the candidate for the predetermined object image, the center point of the view window being taken as a reference during the determination of the extraction area.

In a third method for the aforesaid extraction, the extraction of the candidate for the predetermined object image is carried out by:

a) taking the vectors for the travel of the view window, which are determined with the aforesaid second method for the extraction, as gradient vectors of a potential field, recording the gradient vectors of the potential field on the whole image, and thereby creating a map of the potential field, and b) determining an extraction area in accordance with the size and/or the shape of the candidate for the predetermined object image, a minimum point of the potential in the map being taken as a reference during the determination of the extraction area.

What the term "potential field" as used herein means will be described hereinbelow. When a human being views an image, he will look around the image and will move his viewpoint to a predetermined object image embedded in the image (e.g., to a face image in cases where an image constituted of a human face image and a background representing the sky is viewed). Thereafter, he will recognize that the thing present at the viewpoint is the face image. When the viewpoint is currently located at a position spaced apart from the predetermined object image, it is necessary for the viewpoint to be moved a long distance towards the predetermined object image on the image. When the viewpoint is currently located at a position near the predetermined object image, the viewpoint need to travel only a short distance in order to reach the predetermined object image. At the position of the predetermined object image, the viewpoint becomes stable. Specifically, if the direction and the amount in which the viewpoint is to travel is expressed as a vector for the travel of the viewpoint, the vector for the travel of the viewpoint will represent the direction of the viewpoint stabilizing point and the amount of travel thereto, which are taken from the current position of the viewpoint. At the viewpoint stabilizing point, i.e., at the center point of the predetermined object image, the vector for the travel of the viewpoint is zero. If it is considered that the image has a "field" of stability of the viewpoint, the "field" is flat at the viewpoint stabilizing point and is gradient at a point, at which the viewpoint is unstable and from which the viewpoint is required to travel in order to become stable. As described above, it can be regarded that the vector for the travel of the viewpoint represents the gradient of the "field." Also, it can be regarded that the travel of the viewpoint is equivalent to the movement to the side of a lower potential in the "field." The "field" of stability of the viewpoint is herein referred to as the "potential field."

As described above, the map of the potential field over the whole image is created from gradient vectors of the potential field, which are calculated at respective positions of the whole image. Specifically, the vectors for the travel of the human viewpoint are taken as the gradient vectors of the potential field, and it is regarded that the potential field is inclined to the direction, to which each gradient vector of the potential field is directed. The gradients of the field are recorded on the whole image such that the gradient vector of the potential field may be zero, i.e., the potential field may be minimum, at the center point of the candidate for the predetermined object image. From the map created in this manner, it can be understood easily which path the viewpoint at a current position on the image will follow in order to fall into the minimum point of the potential field. The extraction area is determined in accordance with the size and/or the shape of the candidate for the predetermined object image by taking the minimum point of the potential as a reference.

When the vector for the travel of the view window is composed from the azimuth vectors, if necessary, phase shifts or weights may be applied to the azimuth vectors. Also, a neural network may be employed in order to determine the vector for the travel of the view window or the gradient vector of the potential field and to extract the candidate for the predetermined object image.

The judgment as to whether the extracted candidate for the predetermined object image is or is not the predetermined object image may be made by:

a) causing a learning means to learn a plurality of feature patterns with respect to each of a plurality of feature parts of the predetermined object image, b) making judgments as to whether feature parts of the candidate for the predetermined object image are or are not included in the plurality of the feature patterns with respect to each of the plurality of the feature parts of the predetermined object image, which feature patterns the learning means has learned, and c) making a judgment as to whether the relationship between the positions of the feature parts of the candidate for the predetermined object image coincides or does not coincide with the relationship between the positions of the feature parts of the predetermined object image, thereby judging whether the candidate for the predetermined object image is or is not the predetermined object image.

In the method for recognizing an object image in accordance with the present invention, the extraction of the candidate for the predetermined object image and the judgment as to whether the extracted candidate for the predetermined object image is or is not the predetermined object image may be embodied as defined in claims 2 through 35 and claim 65, and reference should herein be made thereto.

The present invention also provides a learning method for a neural network, which comprises the steps of:

i) extracting a target object image, for which learning operations are to be carried out, from an image, ii) feeding a signal, which represents the extracted target object image, into a neural network, and iii) carrying out the learning operations of the neural network in accordance with the input target object image.

In order to extract the target object image, the same methods as those for the extraction of the candidate for the predetermined object image in the method for recognizing an object image in accordance with the present invention may be employed.

As in the aforesaid method for recognizing an object image in accordance with the present invention, the extraction of the target object image in the learning method for a neural network in accordance with the present invention may be embodied as defined in claims 36 through 64, and reference should herein be made thereto.

The present invention further provides a first method for discriminating an image, wherein a judgment is made as to whether a given image is or is not a predetermined image, the method comprising the steps of:

i) extracting a reference point, which is unaffected by a change in the angle of the given image and/or by rotation of the given image, from the given image, ii) detecting an axis of symmetry and/or feature parts of the given image in accordance with the reference point, and iii) making a judgment as to whether the given image is or is not a predetermined image, the judgment being made in accordance with the axis of symmetry and/or the feature parts of the given image.

The present invention still further provides a second method for discriminating an image, wherein the first method for discriminating an image in accordance with the present invention is modified such that the detection of the axis of symmetry and/or the feature parts of the given image may be carried out by developing the given image in a coordinates space in accordance with the reference point.

The present invention also provides a third method for discriminating an image, wherein the second method for discriminating an image in accordance with the present invention is modified such that the coordinates space may be a polar coordinates space having its pole at the reference point.

The present invention further provides a fourth method for discriminating an image, wherein the first, second, or third method for discriminating an image in accordance with the present invention is modified such that the predetermined image is a face image, and a judgment is made as to whether the given image is or is not a face image.

The present invention still further provides a fifth method for discriminating an image, wherein the fourth method for discriminating an image in accordance with the present invention is modified such that the method may comprise the steps of:

1) extracting a center point between candidates for eye patterns as the reference point, which is unaffected by a change in the angle of the given image and/or by rotation of the given image, from the given image,
2) detecting an axis of symmetry, which passes through the center point between the candidates for eye patterns, in accordance with the extracted center point between the candidates for eye patterns,
3) detecting the feature parts of the given image in accordance with the axis of symmetry, and
4) making a judgment as to whether the given image is or is not a face image, the judgment being made in accordance with information about the center point between the candidates for eye patterns, the axis of symmetry, and/or the feature parts of the given image.

In cases where the predetermined image is a face image, the method for discriminating an image in accordance with the present invention may be embodied as defined in claims 71 through 160, and reference should herein be made thereto.

With the method for recognizing an object image in accordance with the present invention, the candidate for the predetermined object image is extracted from an image, and thereafter a judgment is made as to whether the extracted candidate for the predetermined object image is or is not the predetermined object image. Therefore, a judgment as to whether the extracted candidate for the predetermined object image is or is not the predetermined object image can be made accurately and easily without heavy burden being imposed on a judgment means of a system, in which the method for recognizing an object image in accordance with the present invention is carried out. Also, the extraction process and the judgment process can be carried out simultaneously with each other, and very quick operations can be achieved with special hardware functions for carrying out the recognition of the object image. Additionally, processing need be carried out only for a limited part of the image, in which the candidate for the predetermined object image is embedded, and therefore the operation time can be kept short.

The extraction of the candidate for the predetermined object image may be carried out by causing the center point of the view window, which has a predetermined size, to travel to the position of the candidate for the predetermined object image, and determining the extraction area in accordance with the size and/or the shape of the candidate for the predetermined object image. During the determination of the extraction area, the center point of the view window is taken as a reference.

Alternatively, the extraction of the candidate for the predetermined object image may be carried out by cutting out an image, which falls in the region inside of the view window having a predetermined size, from the image, and detecting a contour line of the candidate for the predetermined object image from the cut-out image. Thereafter, contour line components, which are tilted at a predetermined angle with respect to circumferential directions of concentric circles surrounding the center point of the view window, are extracted from the contour line of the candidate for the predetermined object image. Azimuth vectors are detected from these contour line components. A vector is then composed from the azimuth vectors, and a vector for the travel of the view window is thereby determined. In this manner, the direction, to which the center point of the view window should travel, is determined. The extraction area is then determined in accordance with the size and/or the shape of the candidate for the predetermined object image, the center point of the view window being taken as a reference during the determination of the extraction area. In cases where the cut-out image is transformed with the complex-log mapping, the candidate for the predetermined object image can be extracted in the same manner as that when the extraction of the candidate for the predetermined object image is carried out in the Cartesian plane.

As another alternative, the extraction of the candidate for the predetermined object image may be carried out by cutting out an image, which falls in the region inside of the view window having a predetermined size, from the image, and detecting a region, which approximately coincides in color with the candidate for the predetermined object image, from the cut-out image. A vector for the travel of the view window is then determined from the azimuth and the distance of the detected region. In this manner, the direction, to which the center point of the view window should travel, is determined. The extraction area is then determined in accordance with the size and/or the shape of the candidate for the predetermined object image, the center point of the view window being taken as a reference during the determination of the extraction area.

The term "approximately coinciding in color with a candidate for a predetermined object image" as used herein means that the distance on a chromaticity diagram shown in FIG. 67 between a chromaticity value of the candidate for the predetermined object image and a chromaticity value at an arbitrary point of the cut-out image, which falls in the region inside of the view window having a predetermined size, is smaller than a certain threshold value. Specifically, in cases where chromaticity values at certain points of the cut-out image are spaced a distance larger than the predetermined threshold value on the chromaticity diagram from the chromaticity value of the candidate for the predetermined object image, the region constituted of these points is not extracted. In cases where chromaticity values at certain points of the cut-out image are spaced a distance smaller than the predetermined threshold value on the chromaticity diagram from the chromaticity value of the candidate for the predetermined object image, the region constituted of these points is extracted.

With the aforesaid another alternative, in cases where the cut-out image is transformed with the complex-log mapping, the candidate for the predetermined object image can be extracted in the same manner as that when the extraction of the candidate for the predetermined object image is carried out in the Cartesian plane.

Also, in the aforesaid another alternative, after a plurality of the regions are extracted, of the extracted regions, regions, which exhibit a high degree of coincidence in color with the candidate for the predetermined object image and which are located at positions close to one another, should preferably be caused to cooperate with each other and thereby emphasized. Also, a region, which exhibits a high degree of coincidence in color with the candidate for the predetermined object image, and a region, which exhibits a low degree of coincidence in color with the candidate for the predetermined object image and which is located at a position spaced apart from the region exhibiting a high degree of coincidence in color with the candidate for the predetermined object image, should preferably be caused to compete with each other, whereby the region, which exhibits a low degree of coincidence in color with the candidate for the predetermined object image, is erased. Also, regions, which exhibit a high degree of coincidence in color with the candidate for the predetermined object image and which are located at positions spaced apart from each other, should preferably be caused to compete with each other. In this manner, a region exhibiting a high degree of coincidence in color with the candidate for the predetermined object image, which region has a size and a shape appropriate for the region to be selected, is kept unerased. Also, a region exhibiting a high degree of coincidence in color with the candidate for the predetermined object image, which region has a size and a shape inappropriate for the region to be selected, is erased. Thus a region, which is most appropriate in the region inside of the view window, is selected as a target object image region. The azimuth and the distance of the selected region in the complex-log mapped plane are detected as the vector for the travel of the view window. In such cases, the region, which exhibits a high degree of coincidence in color with the candidate for the predetermined object image, can be extracted easily.

When the candidate for the predetermined object image is extracted in the manner described above, it is possible to extract not only a candidate for a specific object image but also a candidate for a predetermined object image having any shape. Also, even if the background of the candidate for the predetermined object image in the image is complicated, the candidate for the predetermined object image can be extracted appropriately. Additionally, processing need be carried out only for a limited part of the image, in which the candidate for the predetermined object image is embedded, and therefore the operation time can be kept short.

As a further alternative, the extraction of the candidate for the predetermined object image may be carried out by cutting out a plurality of images, which fall in the region inside of the view window, at a plurality of times having a predetermined time difference therebetween, calculating the difference between contour lines of object images embedded in the plurality of the cut-out images, and detecting a movement of a background in a vertical or horizontal direction in the region inside of the view window, the movement being detected from the calculated difference. At the same time, the images, which fall in the region inside of the view window, are transformed with the complex-log mapping into complex-log mapped images. The difference between contour lines of object images, which lines extend in the radial direction, is calculated from the complex-log mapped images, and a movement of the background in an in-plane rotating direction is thereby detected. Also, the difference between contour lines of object images, which lines extend in the annular direction, is calculated from the complex-log mapped images, and a movement of the background in the radial direction is thereby detected. Thereafter, the movement of the background is compensated for in accordance with the detected movement of the background in the vertical or horizontal direction, in the in-plane rotating direction, and/or in the radial direction. A contour line of an object, which shows a movement different from the movement of the background, is detected from the image, in which the movement of the background has been compensated for. Azimuth vectors are then detected from components of the contour line, which are tilted at a predetermined angle with respect to the annular direction in the complex-log mapped plane. A vector is then composed from the azimuth vectors, and a vector for the travel of the view window is thereby determined. In this manner, the direction, to which the center point of the view window should travel, is determined. The extraction area for the extraction of the candidate for the predetermined object image is then determined in accordance with the size and/or the shape of the object, the center point of the view window being taken as a reference during the determination of the extraction area.

In the manner described above, only the candidate for the predetermined object image can be extracted in cases where the candidate for the predetermined object image is moving in the region inside of the view window and in cases where the whole image, i.e., the background, is moving. Also, it is possible to follow up a candidate for the predetermined object image, which moves every moment, to find the candidate for the predetermined object image at the center point of the view window, and thereby to extract the candidate for the predetermined object image. Additionally, even if the background of the candidate for the predetermined object image in the image is complicated, the candidate for the predetermined object image can be extracted appropriately. Further, processing need be carried out only for a limited part of the image, in which the candidate for the predetermined object image is embedded, and therefore the operation time can be kept short.

With the aforesaid further alternative, in cases where the cut-out image is transformed with the complex-log mapping, the candidate for the predetermined object image can be extracted in the same manner as that when the extraction of the candidate for the predetermined object image is carried out in the Cartesian plane.

Also, in cases where the extraction of the candidate for the predetermined object image in accordance with its contour lines and the extraction of the candidate for the predetermined object image in accordance with its color are carried out simultaneously in the manner described above, the candidate for the predetermined object image can be extracted more accurately.

The extraction of the candidate for the predetermined object image in accordance with its contour lines, the extraction of the candidate for the predetermined object image in accordance with its color, and the extraction of the candidate for the predetermined object image in accordance with the movement should preferably be carried out simultaneously. In such cases, the candidate for the predetermined object image can be extracted even more accurately.

Further, as described above, the extraction of the candidate for the predetermined object image may be carried out by creating a map of the potential field of the whole image, from which the candidate for the predetermined object image is to be extracted, and determining an extraction area in accordance with the size and/or the shape of the candidate for the predetermined object image, a minimum point of the potential in the map being taken as a reference during the determination of the extraction area. In such cases, it is possible to extract not only a candidate for a specific object image but also a candidate for a predetermined object image having any shape. Also, even if the background of the candidate for the predetermined object image in the image is complicated, the candidate for the predetermined object image can be extracted appropriately.

Specifically, the vectors for the travel of the view window, which are determined from the contour lines, the color, and/or the movement, are taken as gradient vectors of a potential field. A map of the potential field of the whole image is created from the gradient vectors of the potential field. The extraction area is then determined in accordance with the size and/or the shape of the candidate for the predetermined object image by taking a minimum point of the potential in the map as a reference. In this manner, the minimum point in the candidate for the predetermined object image, i.e., the center point of the candidate for the predetermined object image can be found from the gradients of the potential field. Therefore, the candidate for the predetermined object image can be extracted very accurately and efficiently.

Also, with this method for the extraction of the candidate for the predetermined object image, it is possible to extract not only a candidate for a specific object image but also a candidate for a predetermined object image having any shape. Also, even if the background of the candidate for the predetermined object image in the image is complicated, the candidate for the predetermined object image can be extracted appropriately.

Additionally, with this method for the extraction of the candidate for the predetermined object image, in cases where the cut-out image is transformed with the complex-log mapping, the map of the potential field can be created, and the candidate for the predetermined object image can be extracted in the same manner as that when the extraction of the candidate for the predetermined object image is carried out in the Cartesian plane.

Further, in cases where the judgment as to whether the candidate for the predetermined object image is or is not the predetermined object image is made from feature parts of the predetermined object image and the positions of the feature parts in the predetermined object image, an accurate judgment can be made as to whether the extracted candidate for the predetermined object image is or is not the predetermined object image. Therefore, the performance of the system, in which the method for recognizing an object image in accordance with the present invention is employed, can be kept high.

Specifically, with the method for recognizing an object image in accordance with the present invention, as described above, during the judgment as to whether the extracted candidate for the predetermined object image is or is not the predetermined object image, the learning means is caused to learn a plurality of feature patterns with respect to each of a plurality of feature parts of the predetermined object image. Judgments are then made as to whether feature parts of the candidate for the predetermined object image are or are not included in the plurality of the feature patterns with respect to each of the plurality of the feature parts of the predetermined object image, which feature patterns the learning means has learned. Thereafter, a judgment is made as to whether the relationship between the positions of the feature parts of the candidate for the predetermined object image coincides or does not coincide with the relationship between the positions of the feature parts of the predetermined object image. A judgment is thereby made as to whether the candidate for the predetermined object image is or is not the predetermined object image. In such cases, even if the feature parts of the candidate for the predetermined object image, on which a judgment is to be made, vary for different candidates for predetermined object images, the judgment as to whether the candidate for the predetermined object image is or is not the predetermined object image can be made accurately from the plurality of the feature patterns, which the learning means has learned.

In cases where the learning operations of the learning means are carried out with the learning method for a neural network in accordance with the present invention by utilizing a neural network, in particular, by utilizing the Kohonen's self-organization, self-organization of a plurality of feature patterns is effected with the topological mapping, and the learning means can efficiently learn the plurality of feature patterns. Therefore, judgments as to whether feature parts of the predetermined object image are or are not included in feature parts of the candidate for the predetermined object image can be made efficiently regardless of a change in the angle of the object image and a difference among object images.

Also, in cases where a neural network, in particular, the neocognitron, is utilized in order to make judgments as to whether feature parts of the candidate for the predetermined object image are or are not included in the plurality of the feature patterns, which the learning means has learned, and/or a judgment as to whether the relationship between the positions of the feature parts of the candidate for the predetermined object image coincides or does not coincide with the relationship between the positions of the feature parts of the predetermined object image. In such cases, the results of judgment are not affected by a shift in position of the candidate for the predetermined object image, and the performance of the system, in which the method for recognizing an object image in accordance with the present invention is employed, can be kept high.

Additionally, in cases where a face image is taken as the predetermined object image, and right eye, left eye, and mouth patterns are taken as the plurality of feature parts, on which the learning operations are to be carried out, a judgment as to whether a candidate for the face image is or is not the face image can be made regardless of a change in the facial expression, a shift in position of the candidate for the face image, or the like. Further, a candidate for the face image different from the face image, which has been utilized during the learning operations, can be judged as being the face image.

With the learning method for a neural network in accordance with the present invention, a target object image, for which learning operations are to be carried out, is extracted from an image, and a signal, which represents the extracted target object image, is fed into a neural network. The learning operations of the neural network are then carried out in accordance with the input target object image. Therefore, the target object image can be extracted automatically from an image, the extracted target object image can be classified in an arranged form, and the learning operations can thereby be carried out. Accordingly, a human being need not intervene in order to extract and normalize the target of the learning operations, and the learning operations can be carried out efficiently.

The target object image, on which the learning operations are to be carried out, may be extracted in the same manner as that in the extraction of the candidate for the predetermined object image in the aforesaid method for recognizing an object image in accordance with the present invention.

Also, the center point of the view window having a predetermined size may be caused to travel to the center point of the candidate for the predetermined object image, and the size and/or the shape of the candidate for the predetermined object image may be normalized by taking the center point of a view window and a contour line of the candidate for the predetermined object image as reference. Thereafter, the normalized candidate for the predetermined object image may be extracted. In such cases, object images having different sizes and/or shapes can be extracted as those having approximately identical sizes and/or shapes. Accordingly, burden to a step, such as the judgment step or the learning step, which is carried out after the extraction of the contour line of the object image, can be kept light. Also, the judgment and the learning operations can be carried out appropriately.

With the method for discriminating an image in accordance with the present invention, the reference point, which is unaffected by a change in the angle of the given image and/or by rotation of the given image, is extracted from the given image. The axis of symmetry and/or feature parts of the given image are detected in accordance with the reference point. Thereafter, a judgment as to whether the given image is or is not a predetermined image is made in accordance with the axis of symmetry and/or the feature parts of the given image. Therefore, an accurate judgment can be made regardless of a change in the angle of the given image and rotation of the given image.

Also, in cases where the axis of symmetry and/or the feature parts of the given image are detected in accordance with the reference point of the given image, the detection of the axis of symmetry and/or the feature parts of the given image can be carried out more easily by developing the given image in a coordinates space in accordance with the reference point. A polar coordinates space having its pole at the reference point is one of the most appropriate coordinates spaces.

The method for discriminating an image in accordance with the present invention is suitable for discriminating a face image which serves as the predetermined image.

In cases where a face image is discriminated, the discrimination can be carried out accurately by extracting the center point between candidates for eye patterns, which are embedded in the given image, as the reference point, which is unaffected by a change in the angle of the given image and/or by rotation of the given image, and detecting the axis of symmetry and/or the feature parts in a polar coordinates space having its pole at the center point between the candidates for eye patterns.

The feature parts of the given image should preferably include a candidate for a face contour and a candidate for a mouth pattern region.

Also, the judgment as to whether the given image is or is not a face image may be made in accordance with a candidate for the face contour, a candidate for the mouth pattern region, and other feature parts, such as ear patterns, a nose pattern, and hair patterns.

The predetermined image may be selected from various images, such as a face image and a signpost image. Also, an asymmetric image, such as a side-directed face image, can be discriminated accurately regardless of a change in the angle of the image and rotation of the image by, for example, carrying out the polar coordinates transformation with respect to an eye pattern taken as the reference point and detecting the feature parts. The method for discriminating an image in accordance with the present invention is suitable for operations wherein a candidate for a predetermined object image is extracted with a method proposed in U.S. patent appln. Ser. No. 07/944850, and a judgment is made as to whether the candidate for the predetermined object image is or is not a face image.

The method for discriminating an image in accordance with the present invention may be combined with the technique, which is proposed in, for example, U.S. patent application Ser. No. 07/944850 and which is capable of discovering and extracting an image considered as being a predetermined image from a natural image, normalizing the image size, and thereafter presenting the normalized image. In such cases, the method for discriminating an image in accordance with the present invention can cope with a change in the image size, a change in the angle of the image, and rotation of the image.

As described above, the method for discriminating an image in accordance with the present invention can cope with rotation of the given image and a change in the angle of the given image and can eliminate adverse effects of a background even if the background is complicated. Therefore, with the method for discriminating an image in accordance with the present invention, an accurate judgment can be made as to whether the given image is or is not the predetermined image.

BRIEF DESCRIPTION OF THE DRAWINGS

FIG. 1 is a block diagram showing the fundamental concept behind the method for recognizing an object image in accordance with the present invention, FIG. 2 is a flow chart showing the method for recognizing an object image in accordance with the present invention, FIG. 9 is a graph showing weights applied to outputs of neurons, FIG. 12 is an explanatory view showing how the direction of travel of a view window is determined in cases where the center point of the view window travels from the side inward from a candidate for a predetermined object image to a point of intersection of contour lines of the candidate for the predetermined object image, FIG. 13 is an explanatory view showing how the direction of travel of a view window is determined by applying a phase shift, FIG. 19 is a diagram showing the difference between the contour lines in the images at the time t and the time t+α, FIGS. 22A and 22B are diagrams showing images at the time t and the time t+α, FIG. 25 is a diagram showing the difference between the contour lines in the images, which have been obtained by transforming the images at the time t and the time t+α with complex-log mapping, FIGS. 28A and 28B are diagrams showing images at the time t and the time t+α, FIGS. 33A and 33B are diagrams showing images, in which the movement components of the contour lines in the rotating direction have been extracted, FIG. 36 is a diagram showing an image, in which the movement of the background has been canceled, FIG. 38 is an explanatory view showing an example of a neural network for determining a vector for the travel of the view window from a movement of a candidate for a predetermined object image, FIG. 40 is an explanatory view showing the results of transformation of various figures with the complex-log mapping, FIGS. 49A and 49B are explanatory views showing the results of transformation of large and small face images with the complex-log mapping, FIGS. 52A, 52B, 52C, and 52D are explanatory views showing how a candidate for a predetermined object image is extracted in an embodiment of the method for recognizing an object image in accordance with the present invention in cases where a view window stopped at a point of intersection of contour lines of the candidate for the predetermined object image, FIG. 54 is an explanatory view showing a closed eye pattern and an open eye pattern, FIG. 55 is an explanatory view showing the results of learning of a superposed eye pattern with the Kohonen's self-organization, FIG. 56 is an explanatory view showing the results of learning of a half-open eye pattern with the Kohonen's self-organization, FIG. 57 is an explanatory view showing a map of a potential field of an image, in which an elliptic image, a triangular image, and a square image are embedded, FIG. 59 is an explanatory view showing an example of a neural network for extracting a candidate for a predetermined object image by moving the center point of a view window to the center point of the candidate for the predetermined object image in a second embodiment of the first step in the method for recognizing an object image in accordance with the present invention, FIG. 70 is an explanatory view showing a synaptic weights pattern for detecting the blob components matching with eye shapes, FIG. 71 is an explanatory view showing how contour components are detected from a given image, FIG. 72 is an explanatory view showing a synaptic weights pattern for detecting the contour components at a specific angle, FIGS. 79A and 79B are explanatory views showing the results of the self-organizing learning operation, FIG. 83 is an explanatory view showing a synaptic weights pattern for detecting a blob component matching with a mouth shape, and FIG. 84 is an explanatory view showing how combination processing is carried out in order to make a judgment as to whether a given image is or is not a face image.

DESCRIPTION OF THE PREFERRED EMBODIMENTS

Figure 3A:
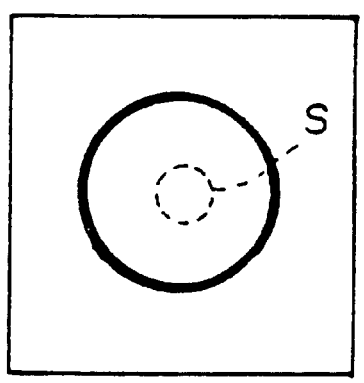
FIGS. 3A and 3B are explanatory views showing at what parts of a figure the human viewpoint stabilizes.

The present invention will hereinbelow be described in further detail with reference to the accompanying drawings.

First, embodiments of the method for recognizing an object image in accordance with the present invention will be described hereinbelow.

FIG. 1 is a block diagram showing a fundamental concept behind the method for recognizing an object image in accordance with the present invention. In a first step 1, a candidate for a predetermined object image is extracted from a given image. Thereafter, in a second step 2, a judgment is made as to whether the candidate for the predetermined object image is or is not the predetermined object image.

FIG. 2 is a block diagram showing a fundamental concept behind embodiments of the extraction of a candidate for a predetermined object image, which is carried out in the first step 1of the method for recognizing an object image in accordance with the present invention. In this embodiment, the extraction of the candidate for the predetermined object image is carried out by causing the center point of a view window, which has a predetermined size, to travel to the position of the candidate for the predetermined object image in accordance with a contour line, a color, and a movement of the candidate for the predetermined object image, and determining an extraction area in accordance with the size and/or the shape of the candidate for the predetermined object image, the center point of the view window being taken as a reference during the determination of the extraction area. A neural network is utilized for the extraction of the candidate for the predetermined object image.

As illustrated in FIG. 2, this embodiment comprises a neural network processing unit 3 for search and a processing unit 4 for judgment as to the stop state of the view window. The neural network processing unit 3 for search iterates the travel of the view window and searches a candidate for the predetermined object image by utilizing a neural network. The processing unit 4 for judgment as to the stop state of the view window investigates the state of the travel of the view window. When the view window stops, the processing unit 4 makes a judgment as to whether the stop of the view window is or is not caused by the discovery of a candidate for the predetermined object image. When necessary, the processing unit 4 extracts the candidate for the predetermined object image.

Specifically, in the neural network processing unit 3 for search, the position of the center point of the view window and the size of the view window are set in the image, and part of the image falling in the region inside of the view window is fetched from the image. Thereafter, vectors for the travel of the view window are calculated from the movement, the contour lines, and the color of the candidate for the predetermined object image. The vectors for the travel of the view window are combined with one another, and a composite vector for the travel of the view window is thereby determined. The view window is then caused to travel on the image in accordance with the composite vector for the travel of the view window. In the processing unit 4 for judgment as to the stop state of the view window, the amount of travel of the view window is investigated. In cases where it is found that the view window is traveling, a signal for instructing a further travel of the view window is fed into the neural network processing unit 3 for search. In cases where it is found that the view window has stopped, a judgment is made as to the stop state of the view window. Specifically, a judgment is made as to whether the stop of the view window on the image is or is not caused by the discovery of a candidate for the predetermined object image. In cases where the stop of the view window is not caused by the discovery of a candidate for the predetermined object image, it is not necessary for the view window to stay at the current stop position, and therefore a signal for setting a new position and a size of the view window is fed into the neural network processing unit 3 for search. Upon receiving this signal, the neural network processing unit 3 for search again causes the view window to travel. In cases where the stop of the view window is caused by the discovery of a candidate for the predetermined object image, the discovered candidate for the predetermined object image is cut out, i.e. is extracted, and a signal representing the extracted candidate for the predetermined object image is transferred to the second step 2 for the judgment shown in FIG. 1.

Figure 3B:
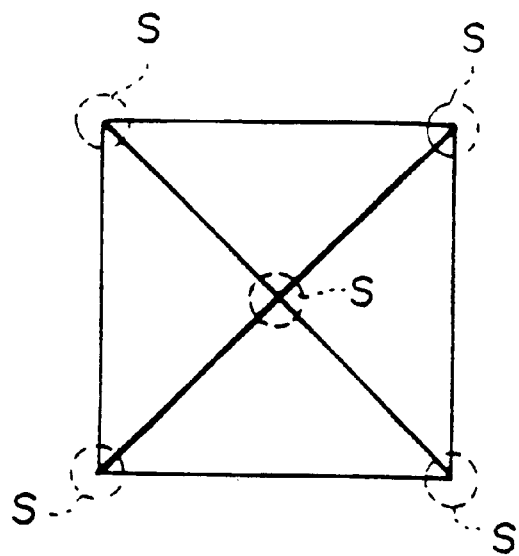

In the neural network processing unit 3 for search, the neural network is constructed such that the view window may travel in the same manner as that of the movement of the human viewpoint. It has been reported from past studies that, in cases where a human being watches a figure shown in FIG. 3A or 3B, his viewpoint stays for a long time at a contour or an end point of the object. In the case of FIG. 3B, the human viewpoint stays at parts S surrounded by the broken lines. Also, experience has shown that, at the instant at which a human being recognizes an object as a single mass, his viewpoint is not on the contour line of the object, but stays at the center part surrounded by the contour line. For example, when a human being watches the figure shown in FIG. 3A, his viewpoint stays at a part S surrounded by the broken line. Specifically, it can be said that the human viewpoint becomes stable at the center point of an object surrounded by a contour line, at the point of intersection of lines, or at a vertex of a polygon. Therefore, the neural network should be provided with functions such that, in cases where an object image is present only at a peripheral region of the view window, the view window may be moved to a position closer to the object image, and thereafter the center point of the view window may be moved to the center point, a vertex, or the like, of the object image, the view window being thereby rendered stable.

How the vector for the travel of the view window is calculated from the contour line of an object in the neural network processing unit 3 for search will be described hereinbelow.

Figure 4:
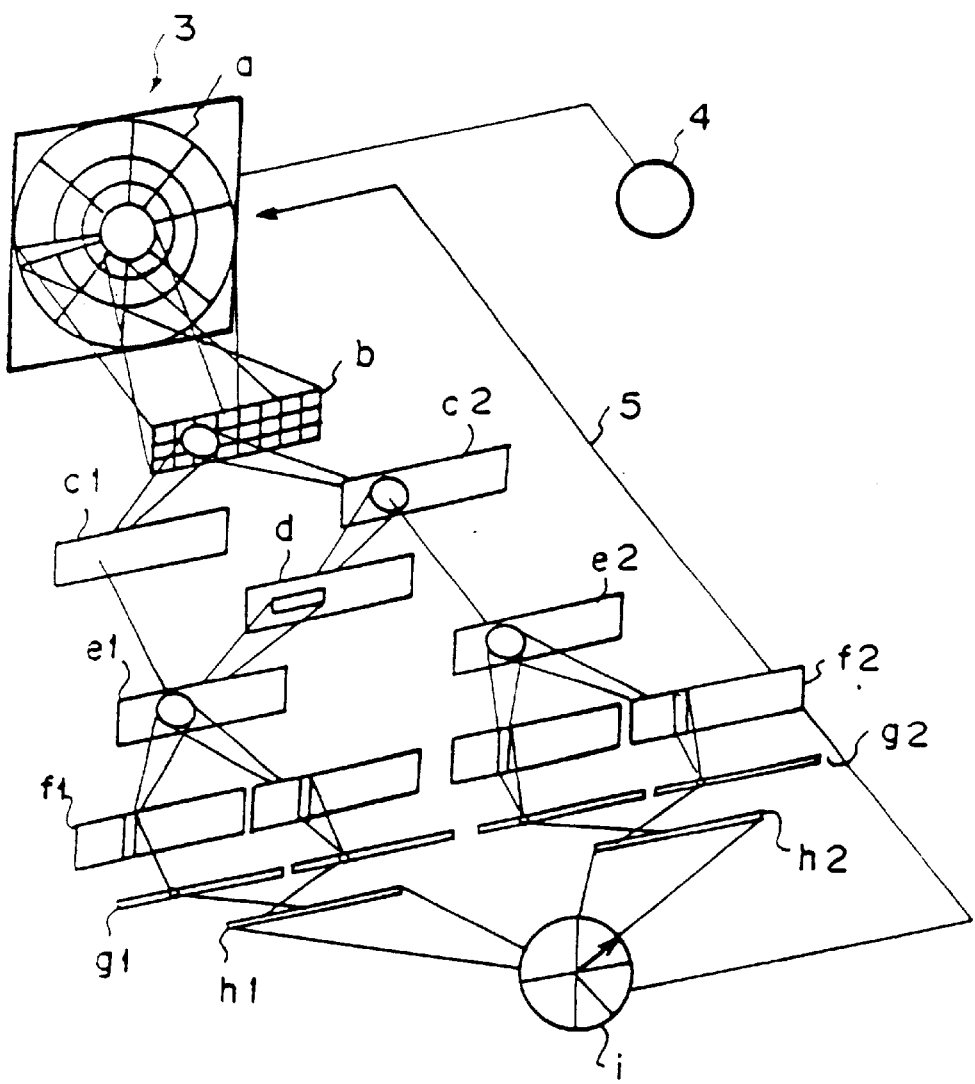
FIG. 4 is an explanatory view showing an example of a neural network for extracting a candidate for the predetermined object image in an embodiment of the method for recognizing an object image in accordance with the present invention, wherein a vector for the travel of a view window is calculated from a contour line of the candidate for the predetermined object image.

FIG. 4 is an explanatory view showing an example of a neural network for calculating the vector for the travel of the view window in accordance with the contour line of the candidate for the predetermined object image. A signal, which represents an image of the outer world fed through the view window at the time t, is fed into the neural network. Also, the output obtained from the neural network represents the amount and the direction in which the view window is to be moved. The output is considered as a two-dimensional vector and is hereinbelow referred to as the vector for the travel of the view window. The magnitude of the vector for the travel of the view window represents the level of instability at the center point of the view window. The direction of the vector for the travel of the view window represents the direction in which the view window should travel in order to become more stable.

The basic structure of the neural network employed in this embodiment is of the layered type. However, the neurons in each of e1- and e2-layers are connected with each other in an interactive manner. Therefore, the neural network may also be referred to as a complex type. Also, in a back propagation model, which is popular as the layered type, every neuron in each layer is connected to every neuron in the adjacent layer. In contrast to the back propagation model, the neural network employed in this embodiment is of a local area limited connection type, in which the connections are effected only between those neurons which are located at corresponding positions in adjacent layers or between the neurons located in the vicinity of these corresponding neurons. Therefore, the number of the synapses between the layers can be reduced markedly, and the operation time can be kept short. Additionally, connections between the neurons in each interactive connection layer are effected only between those neurons the positions of which are close to one another. Such a local area limited connection structure is similar to the structure of the nervous circuit ranging from the retina of the human eye to the primary visual area of the brain.

The layers of the neural network, which is employed in this embodiment, have the functions described below. This neural network is constituted of an a-layer for feeding a signal representing the image into the neural network, and a b-layer for transforming the input image with the complex-log mapping (logarithmic polar coordinates transformation). The neural network is also constituted of a c1-layer for detecting contour lines, which extend in the annular direction, and a c2-layer for detecting contour lines, which extend in the radial direction. The neural network is also constituted of a d-layer for detecting the end points of the contour lines extending in the radial direction, the e1-layer which is an interactive connection circuitry layer for selecting a contour line extending in the annular direction, and the e2-layer which is an interactive connection circuitry layer for selecting a contour line extending in the radial direction. The neural network is additionally constituted of an f1-layer for detecting the differences in position between components of the contour line of the candidate for the predetermined object image, which line extends in the annular direction, and the center point of the view window, and an f2-layer for detecting the differences in position between components of the contour line of the candidate for the predetermined object image, which line extends in the radial direction, and the center point of the view window. The neural network is further constituted of a g1-layer for detecting the azimuth vectors of the candidate for the predetermined object image with respect to the annular direction, and a g2-layer for detecting the azimuth vectors of the candidate for the predetermined object image with respect to the radial direction. The neural network is also constituted of an h1-layer for combining the detected azimuth vectors with respect to the annular direction, an h2-layer for combining the detected azimuth vectors with respect to the radial direction, and an i-layer for generating an output representing a vector for the travel of the view window. In the neural network employed in this embodiment, the synaptic connections between adjacent ones among the b-layer and those that follow are space invariant. Also, the synaptic connections in each interactive connection layer are space invariant. The space invariance is adopted in order to facilitate the model simulation and parallel processing, and the synaptic connections need not necessarily be space invariant. However, in cases where the synaptic connections are space invariant, the output of each neuron becomes equivalent to an output obtained when the result of an operation of convolution (i.e., matching with a synaptic weights pattern) of the synaptic connection matrix and the preceding neuron layer matrix is passed through a nonlinear function. Therefore, computational processing becomes markedly easy when simulation of the neural network is carried out with a computer.

First, the signal representing the image is fed into the neural network. In the b-layer, the input image is transformed with the complex-log mapping by taking the center point of the view window as the pole of mapping. Because the image is thus transformed with the complex-log mapping in the b-layer, the operations in the b-layer and the layers that follow in the neural network can be processed computationally as the convolution between the arrangement of the image information and a space invariant synaptic connection information arrangement.

Figures 5A, 5B, 5C:
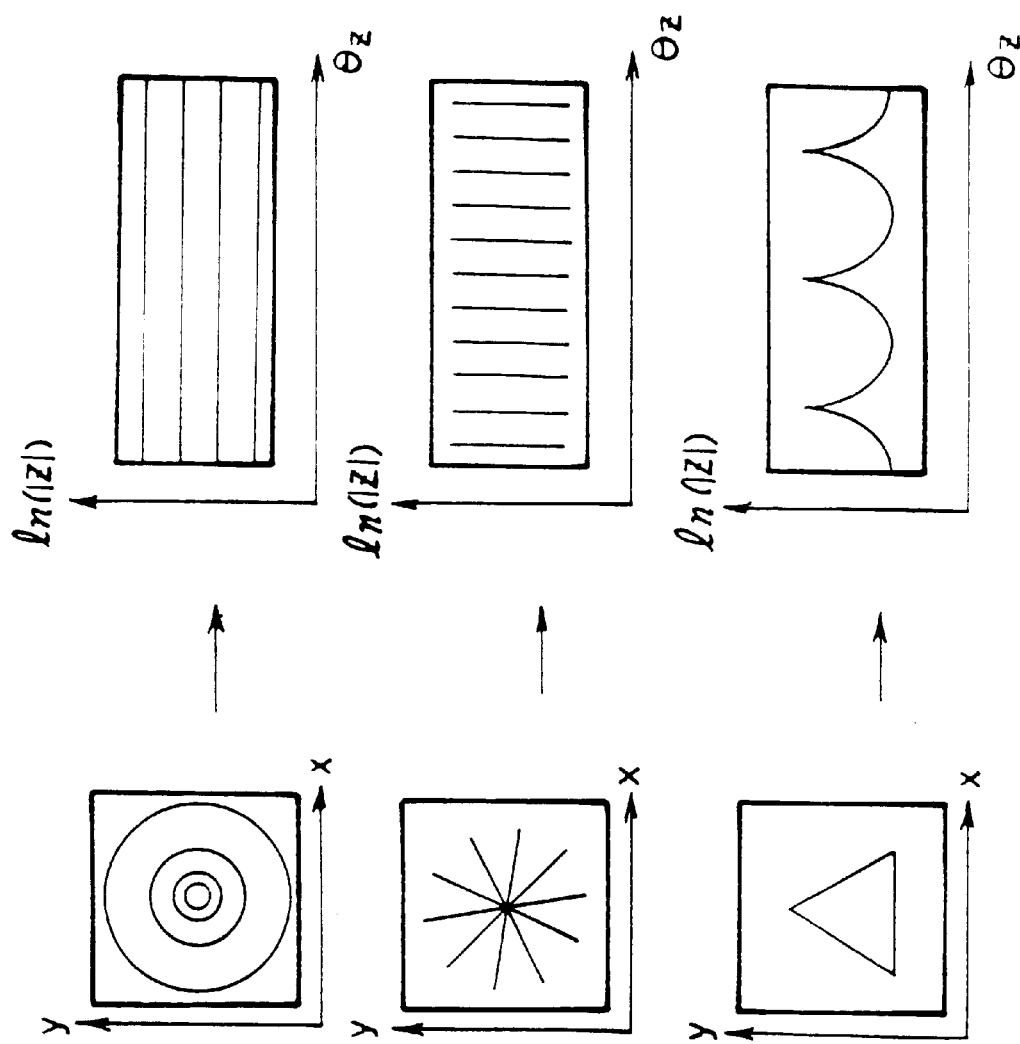
FIGS. 5A, 5B, and 5C are explanatory views showing the results of transformation of various figures with the complex-log mapping.

FIGS. 5A, 5B, and 5C show the results of transformation of various figures with the complex-log mapping. With the complex-log mapping, in cases where the pole of mapping, i.e., the center point of the view window, is present at the center point of a candidate for the predetermined object image, concentric circle-like curved lines shown in FIG. 5A are transformed into horizontal straight lines. Also, radial lines shown in FIG. 5B are transformed into vertical straight lines, and a triangle is transformed into the pattern shown in FIG. 5C.

When a point W(x,y) in the Cartesian plane before being transformed is mathematically expressed with a complex number as $$z=x+iy \quad (1)$$

a complex-log mapped point W' is represented by the formula $$W'=ln(z)=ln(|z|)+j\theta z \quad (2)$$

where $$z=(x^2+y^2)^{-1/2} \quad (3)$$

$$\theta z=\tan^{-1}(y/x) \quad (4)$$

Specifically, with the complex-log mapping, transformation is carried out such that the distance axis of the complex-log mapped plane may represent the logarithmic value of the distance from the center point of the view window, and the azimuth axis may represent the angle around the center point of the view window.

The information representing the complex-log mapped image is fed into the c1-layer and the c2-layer. In the c1-layer and the c2-layer, contour lines extending in the annular direction and in the radial direction are extracted respectively in the complex-log mapped plane.

The term "an annular direction in a complex-log mapped plane" as used herein means the direction along the azimuth axis of the complex-log mapped plane. Specifically, the azimuth axis of the complex-log mapped plane represents the angle made around the origin of the Cartesian plane (i.e., around the center point of the view window in the present invention). A circle having its center point at the origin in the Cartesian plane is expressed as a straight line, which is parallel to the azimuth axis, in the complex-log mapped plane. Therefore, the direction along the azimuth axis of the complex-log mapped plane is referred to as the annular direction. Also, the distance axis of the complex-log mapped plane represents the distance from the origin of the Cartesian plane. A radial straight line, which passes through the origin, in the Cartesian plane is expressed as a straight line, which is parallel to the distance axis, in the complex-log mapped plane. Therefore, the direction along the distance ax s of the complex-log mapped plane is referred to as the radial direction.

In cases where a candidate for the predetermined object image is blocked by a different body, which is located on the foreground side, end points of the contour lines extending in the radial direction occur at the boundary between the candidate for the predetermined object image and the different body located on the foreground side. In the d-layer, such end points of the contour lines extending in the radial direction are extracted from the pattern received from the c2-layer, in which the contour lines extending in the radial direction have been extracted. The e1-layer and the e2-layer are the interactive connection layers having the local area limited, interactive weighted connections such that a contour line extending in the annular direction and a contour line extending in the radial direction, respectively, may be selected. In the e1-layer, of the contour lines extending in the annular direction, which have been detected by the c1-layer, lines having a high level of continuity in the annular direction and lines having a high intensity are emphasized, whereas independent or weak lines are erased. In the e2-layer, of the contour lines extending in the radial direction, which have been detected by the c2-layer, lines having a high level of continuity in the radial direction and lines having a high intensity are emphasized, whereas independent or weak lines are erased.

Figure 6:
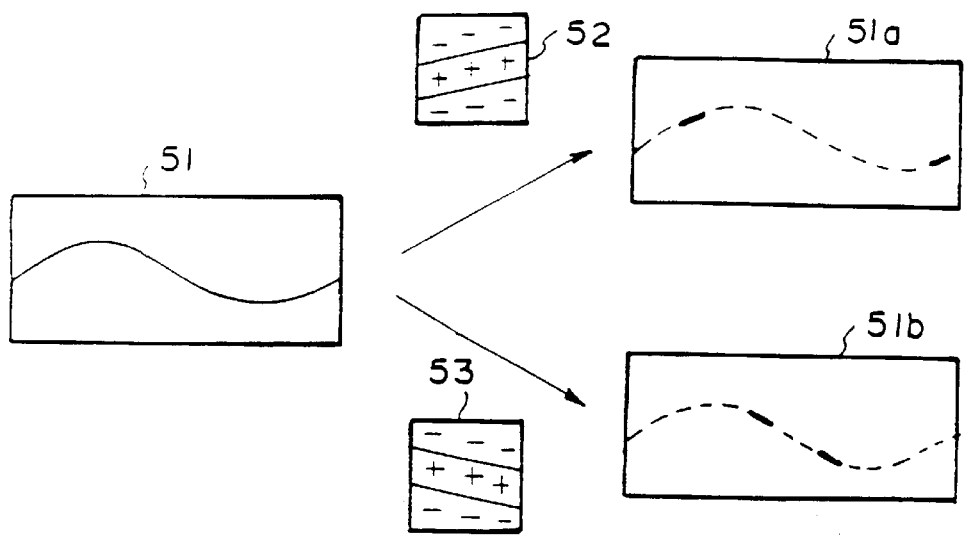
FIG. 6 is an explanatory view showing how components, which are tilted at predetermined angles with respect to an annular direction, are extracted from a contour line extending in the annular direction.

Thereafter, in the f1-layer, components, which are tilted at predetermined angles with respect to the annular direction, are extracted from the contour line extending in the annular direction, which has been selected by the e1-layer taking on the form of the interactive connection layer. Specifically, as illustrated in FIG. 6, a contour line 51 extending in the annular direction is transmitted as a signal weighted with a synaptic weights pattern 52 for extracting the components, which are tilted upwards to the right, and a synaptic weights pattern 53 for extracting the components, which are tilted upwards to the left. The synaptic weights patterns 52 and 53 for extracting the tilted components strengthen parts of the contour line extending in the direction, along which the "+" components are arrayed, and cancel parts of the contour line covering both the "+" and "−" components. Therefore, when the contour line 51 extending in the annular direction is transmitted as a signal weighted with the synaptic weights patterns 52 and 53, components 51a of the contour line 51, which are tilted upwards to the right, and components 51b of the contour line 51, which are tilted upwards to the left, are extracted. In this embodiment, the components of the contour line extending in the annular direction, which are tilted at angles ranging from 20 to 30 degrees with respect to the annular direction in the complex-log mapped plane, are extracted by the synaptic weights patterns 52 and 53 for extracting the tilted components.

Figure 7:
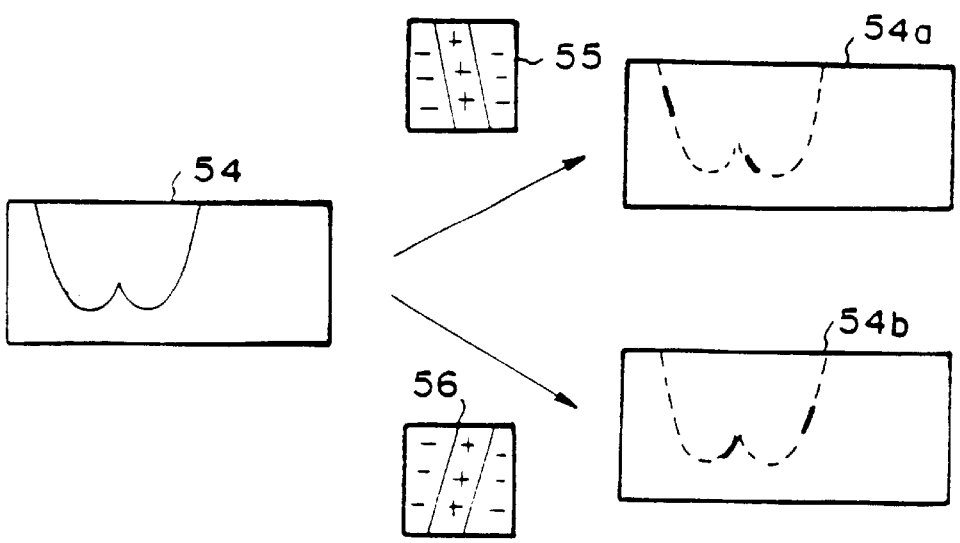
FIG. 7 is an explanatory view showing how components, which are tilted at predetermined angles with respect to the annular direction, are extracted from a contour line extending in the radial direction.

Also, in the f2-layer; components, which are tilted at predetermined angles with respect to the annular direction, are extracted from the contour line extending in the radial direction, which has been selected by the e2-layer taking on the form of the interactive connection layer. Specifically, as illustrated in FIG. 7, a contour line 54 extending in the radial direction is transmitted as a signal weighted with a synaptic weights pattern 55 for extracting the components, which are tilted upwards to the left, and a synaptic weights pattern 56 for extracting the components, which are tilted upwards to the right. Components 54a of the contour line 54, which are tilted upwards to the left, and components 54b of the contour line 54, which are tilted upwards to the right, are thereby extracted. In this embodiment, the components of the contour line extending in the radial direction, which are tilted at angles ranging from 60 to 70 degrees with respect to the annular direction in the complex-log mapped plane, are extracted by the synaptic weights patterns 55 and 56 for extracting the tilted components.

How the vector for the travel of the view window is determined from the components of the contour lines, which have been detected in the manner described above, will be described hereinbelow. As an aid in facilitating the explanation, how the vector for the travel of the view window is composed by operations in the e1-layer and those that follow will be described hereinbelow.

Figure 8:
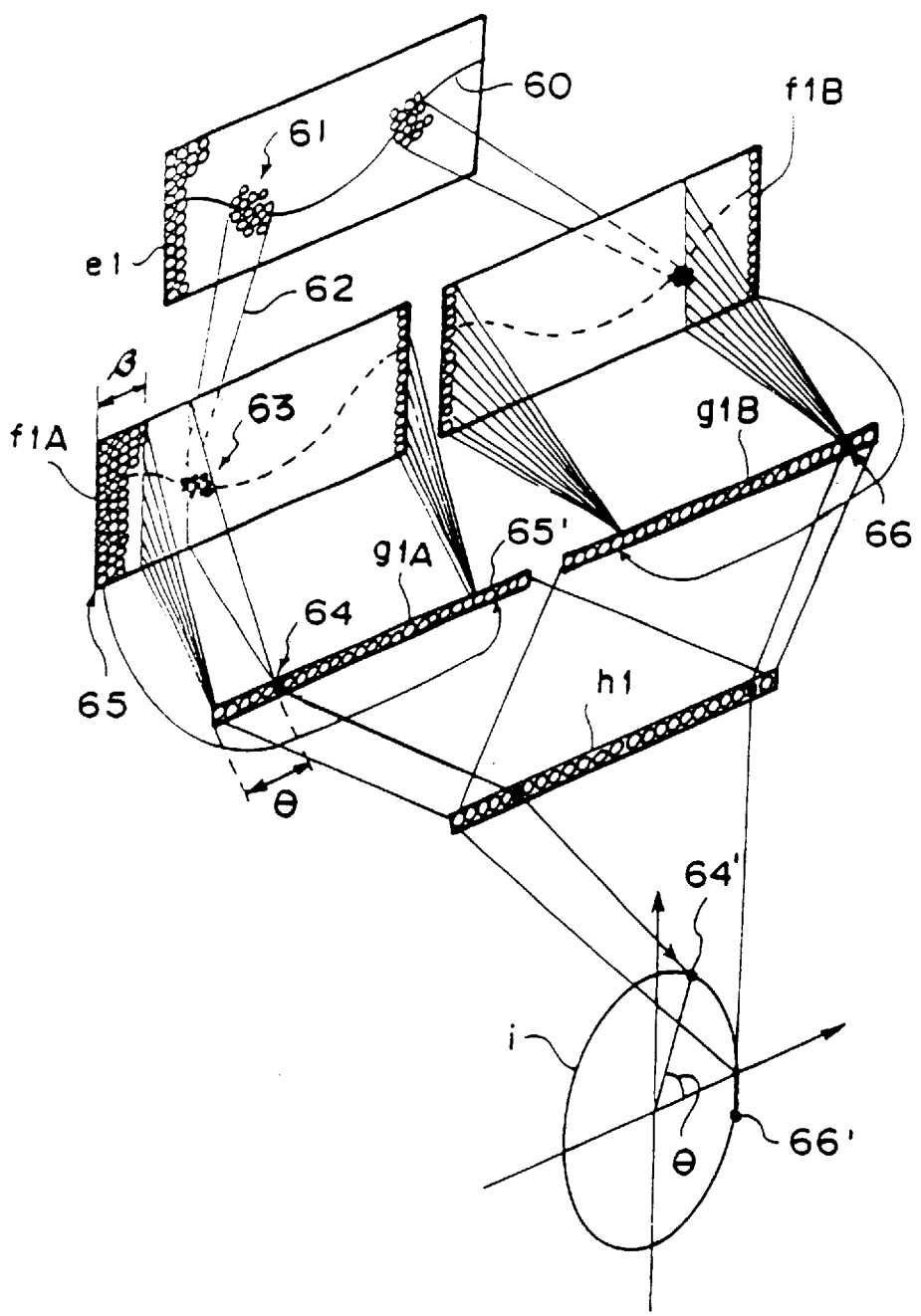
FIG. 8 is an explanatory view showing an e1-layer, an f1-layer, a g1-layer, an h1-layer, and an i-layer of the neural network shown in FIG. 4, which is employed in a first embodiment of the first step of the method for recognizing an object image in accordance with the present invention.

FIG. 8 is an explanatory view showing in more detail the e1-layer, the f1-layer (constituted of f1A- and f1B-layers), the g1-layer (constituted of g1A- and g1B-layers), the h1-layer, and the i-layer of the neural network shown in FIG. 4, which is employed in the first embodiment of the first step of the method for recognizing an object image in accordance with the present invention.

As illustrated in FIG. 8, the respective layers are connected to one another through synaptic connections. The e1-layer and the f1-layer have the neurons arrayed two-dimensionally. The distribution of excited neurons in the e1-layer correspond to the components of the contour line of the candidate for the predetermined object image, which line extends in the annular direction and which has been selected by the interactive synaptic connections in the e1-layer.

Weight factors of synaptic connections 62, through which the excitatory signals are transmitted from the e1-layer to the f1A-layer, are set such that, of the distribution of excitation in the e1-layer, only the components 61, which are tilted upwards to the left, may be transmitted easily. Therefore, in FIG. 8, in the f1A-layer, only a group of neurons 63, which correspond to the positions of the tilted components 61, are excited. Thereafter, in order for an azimuth vector to be detected, excitatory signals are transmitted from the f1A-layer to the g1A-layer. The g1A-layer is constituted of one-dimensionally arrayed neurons and is connected to the f1A-layer through synaptic connections so as to receive the signals from the group of neurons, which are present in the same azimuth in the f1A-layer. As a result, in the g1A-layer, a neuron 64, which corresponds to the azimuth of the group of the neurons 63, is excited. The azimuth of the neuron 64 and the intensity of its excitation represent an azimuth vector. The f1A-layer and the g1A-layer should preferably be connected to each other such that the azimuth of the group of the neurons 63 and the azimuth of the neuron 64 may shift at a predetermined angle β from each other, i.e., the phases of the group of the neurons 63 and the neuron 64 may shift from each other. Alternatively, as illustrated in FIG. 9, weights W may be applied to the connections between the f1A-layer and the g1A-layer such that the weights of the connections from the neurons of the f1A-layer, which neurons correspond to positions remote from the view window, may be larger than the weights of the connections from the neurons of the f1A-layer, which neurons correspond to position closer to the view window. Both the phase shift and the weights W should more preferably be employed together.

In the same manner as that described above, excitatory signals of the components 60 tilted upwards to the right are transmitted from the f1B-layer to the g1B-layer. In the g1B-layer, a neuron 66 representing an azimuth vector is excited. In this case, too, the phase shift β and/or the weights W should preferably be employed.

Thereafter, in the h1-layer, the azimuth vectors, which have been detected by the g1A-layer and the g1B-layer in the manner described above, are combined with each other. In the i-layer, the vector for the travel of the view window is determined. The composition of the vector for the travel of the view window may be carried out in the polar coordinates system or in the Cartesian plane. In FIG. 8, the vector for the travel of the view window is composed in the Cartesian plane. The excitatory signals coming from the neurons 64 and 66 are transformed inversely to the complex-log mapping and transmitted to the i-layer. In the i-layer, the center of gravity of each azimuth vector is found and is fed out as the vector for the travel of the view window. The inputs into the i-layer are described above with respect to the detection and composition of the azimuth vector directed to the center point of the major object image. However, actually, azimuth vectors directed to a point of concentration of the contour of the major object image are also entered into the i-layer and are combined appropriately as will be described later.

How the view window travels towards the candidate for the predetermined object image in accordance with the vector for the travel of the view window, which has been determined in accordance with the contour line of the candidate for the predetermined object image in the manner described above, will be described hereinbelow.

FIGS. 10A, 10B, 10C, and 10D are explanatory views showing complex-log mapped planes and corresponding Cartesian planes as an aid in explaining how the center point of a view window travels from the side outward from a candidate for a predetermined object image to the center point of the candidate for the predetermined object image. In this example, as an aid in facilitating the explanation, the candidate for the predetermined object image is circular, and the center point of the view window travels towards the circle.

Figure 10A:
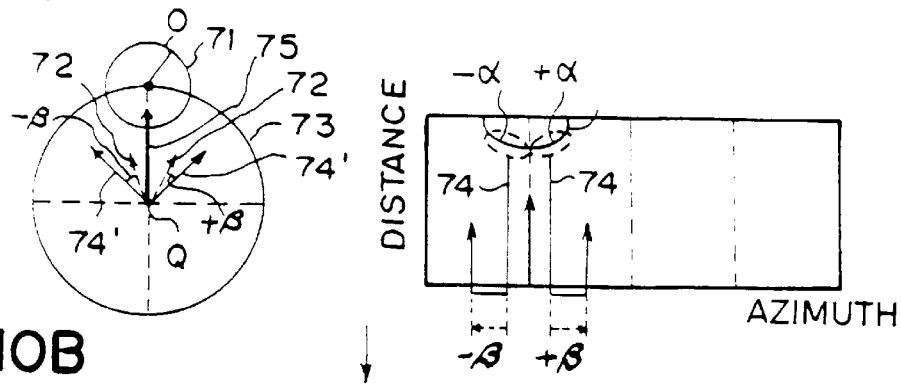
FIGS. 10A, 10B, 10C, and 10D are explanatory views showing complex-log mapped planes and corresponding Cartesian planes as an aid in explaining how a view window travels to the center point of a candidate for a predetermined object image.
Figure 10B:
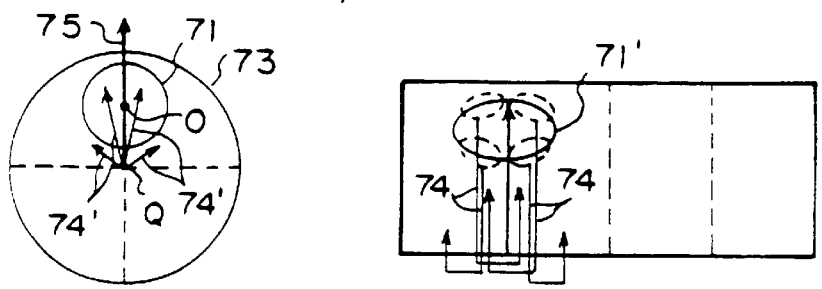

As illustrated in FIG. 10A, when part of a candidate 71 for the predetermined object image comes into a view window 73, components of a contour line of a complex-log mapped candidate 71' for the predetermined object image, which are tilted at predetermined angles $+\alpha$ and $-\alpha$ in the complex-log mapped plane shown in FIG. 10A, are detected by the f1-layer. The predetermined angles $+\alpha$ and $-\alpha$ are the angles of the tilted components of the contour line extending in the annular direction, which are extracted by the f1-layer, with respect to the annular direction. The angle of the tilt upward to the right with respect to the annular direction is taken as a positive angle, and the angle of the tilt upward to the left with respect to the annular direction is taken as a negative angle. The components tilted at the predetermined angles $+\alpha$ and $-\alpha$ are detected by the g1-layer as azimuth vectors 74, 74 (which correspond to azimuth vectors 72, 72 in the Cartesian plane). For the purposes of facilitating the travel of the center point Q of the view window 73 toward the center point o of the candidate 71 for the predetermined object image, a phase shift of $+\beta$ is applied to the azimuth vector, which corresponds to the component tilted at the predetermined angle $+\alpha$, and a phase shift of $-\beta$ is applied to the azimuth vector, which corresponds to the component tilted at the predetermined angle $-\alpha$. Also, weights in accordance with the distances between the center point of the view window and the components tilted at the predetermined angles $+\alpha$ and $-\alpha$ are applied to the azimuth vectors, which correspond to the components tilted at the predetermined angles $+\alpha$ and $-\alpha$. In this manner, azimuth vectors 74', 74' in the Cartesian plane are obtained. In the h1-layer, a composite vector is obtained from the azimuth vectors 74', 74'. The composite vector is determined as a vector 75 for the travel of the view window 73. When the vector 75 for the travel of the view window 73 is thus determined, the view window 73 travels in accordance with the vector 75 for the travel of the view window 73. FIG. 10B shows the state of the view window 73 which has thus traveled.

Figure 10C:
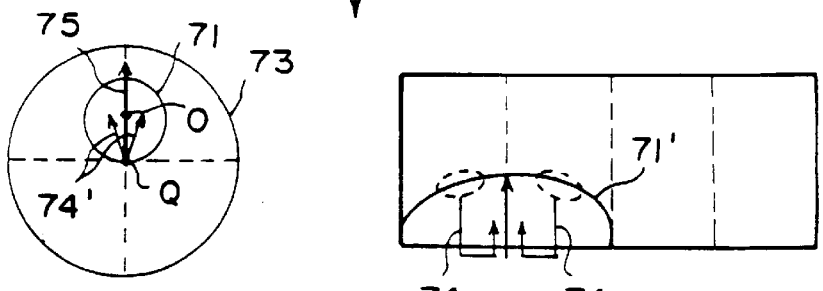

As illustrated in FIG. 10B, the center point Q of the view window 73 and the candidate 71 for the predetermined object image are brought to positions comparatively close to each other, and the whole candidate 71 for the predetermined object image comes into the region inside of the view window 73. In this state, two components tilted at the predetermined angle $+\alpha$ and two components tilted at the predetermined angle $-\alpha$ are detected. Therefore, four azimuth vectors 74, 74, 74, 74 are detected. In this case, as in the case shown in FIG. 10A, the phase shift of $+\beta$ or $-\beta$ and weights are applied to each azimuth vector, and a vector 75 for the travel of the view window 73 is thereby determined. The center point Q of the view window 73 travels in accordance with the vector 75 for the travel of the view window 73. FIG. 10C shows the state of the view window 73 which has thus traveled.

Figure 10D:
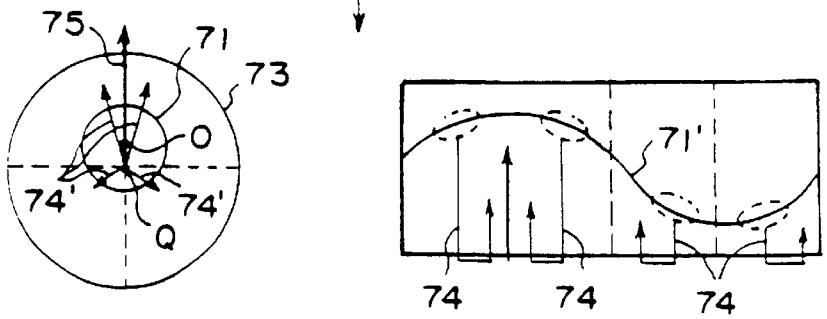

In the state shown in FIG. 10C, a vector 75 for the travel of the view window 73 is determined in the same manner as that described above, and the center point Q of the view window 73 travels in accordance with the vector 75 for the travel of the view window 73 into the state shown in FIG. 10D. Ultimately, the position of the center point Q of the view window 73 coincides with the position of the center point O of the candidate 71 for the predetermined object image, and the center point Q of the view window 73 stops.

The value of $\beta$ for the phase shift is set at a value, which falls within the range of 0 degree to less than $90-\alpha$ degrees, such that the vector 75 for the travel of the view window 73 may be directed to the candidate 71 for the predetermined object image. (If the value of $\beta$ for the phase shift is larger than $90-\alpha$ degrees, the vector 75 for the travel of the view window 73 will be directed to the side opposite to the candidate 71 for the predetermined object image.)

The weights applied to the azimuth vectors 74 and 72 are set in accordance with the distances between the center point Q of the view window 73 and the components of the contour line tilted at the predetermined angles $+\alpha$ and $-\alpha$. A larger weight is applied for a longer distance such that the vector 75 for the travel of the view window 73 may be directed to the center point O of the candidate 71 for the predetermined object image.

As for the value of a for the aforesaid predetermined angle, in cases where the center point Q of the view window 73 is located in the region outside of the candidate 71 for the predetermined object image, the a point will certainly be present if a falls within the range of 0 degree to 90 degrees. (when $\alpha$ is 90 degrees, the azimuth vector comes into contact with the candidate 71 for the predetermined object image, and only a single $\alpha$ point is found.) Conversely, in cases where the center point Q of the view window 73 is located within the region inside of the candidate 71 for the predetermined object image, no $\alpha$ point will be present, depending on the distance between the center point Q of the view window 73 and the center point O of the candidate 71 for the predetermined object image and on the value of $\alpha$. Experiments revealed that, in cases where the candidate 71 for the predetermined object image is circular as in this example, when $\alpha$ is 25 degrees, the $\alpha$ point becomes absent if the distance between the center point Q of the view window 73 and the center point O of the candidate 71 for the predetermined object image becomes equal to approximately 60% of the radius of the candidate 71 for the predetermined object image. When α is 45 degrees, the α point becomes absent if the distance between the center point Q of the view window 73 and the center point O of the candidate 71 for the predetermined object image becomes equal to approximately 80% of the radius of the candidate 71 for the predetermined object image. Therefore, when the value of α is small, the center point Q of the view window 73 can travel to the center point O of the candidate 71 for the predetermined object image. However, actually, the candidate for the predetermined object image is not a true circle but has one of various shapes. Accordingly, the value of α should preferably be set in accordance with the candidate for the predetermined object image which is to be extracted. Experience shows that, as for a natural image, the value of α should preferably fall within the range of approximately 20 to 30 degrees.

In cases where the center point Q of the view window 73 and the center point O of the circular candidate 71 for the predetermined object image coincide with each other, as illustrated in FIG. 5A, the contour line of the candidate 71 for the predetermined object image, which line is included in the center part of the view window, is expressed as a straight line parallel to the annular direction in the complex-log mapped plane. Specifically, moving the center point of the view window to the center point of the candidate for the predetermined object image is equivalent to operating such that the contour line extending in the annular direction, which line is selected by the e1-layer, may be constituted of as many components parallel to the annular direction as possible.

How the vector for the travel of the view window is determined by the f2-, g2-, and h2-layers and how the view window travels in accordance with the vector for the travel of the view window will be described hereinbelow.

FIGS. 11A, 11B, 11C, and 11D are explanatory views showing complex-log mapped planes and corresponding Cartesian planes as an aid in explaining how a view window travels to a point of intersection of contour lines of a candidate for a predetermined object image.

Figure 11A:
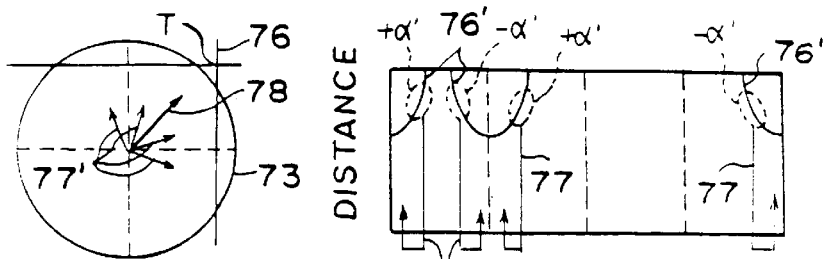
FIGS. 11A, 11B, 11C, and 11D are explanatory views showing complex-log mapped planes and corresponding Cartesian planes as an aid in explaining how a view window travels to a point of intersection of contour lines of a candidate for a predetermined object image.

As illustrated in FIG. 11A, when part of a candidate 76 for the predetermined object image comes into a view window 73, components of a contour line of a complex-log mapped candidate 76' for the predetermined object image, which are tilted at predetermined angles +α' and −α' in the complex-log mapped plane shown in FIG. 11A, are detected by the f2-layer. The predetermined angles +α' and −α' are the angles of the tilted components of the contour line extending in the radial direction, which are extracted by the f2-layer, with respect to the annular direction. The angle of the tilt upward to the right with respect to the annular direction is taken as a positive angle, and the angle of the tilt upward to the left with respect to the annular direction is taken as a negative angle. The components tilted at the predetermined angles +α' and −α' are detected by the g2-layer as azimuth vectors 77, 77, 77, 77. For the purposes of facilitating the travel of the center point Q of the view window 73 toward the point of intersection T of the contour lines of the candidate 76 for the predetermined object image, a phase shift of +β is applied to the azimuth vector, which corresponds to the component tilted at the predetermined angle +α', and a phase shift of −β' is applied to the azimuth vector, which corresponds to the component tilted at the predetermined angle −α'. Also, weights are applied to the azimuth vectors, which correspond to the components tilted at the predetermined angles +α' and −α'. In this manner, azimuth vectors 77', 77', 77', 77' in the Cartesian plane are obtained.

Figure 11B:
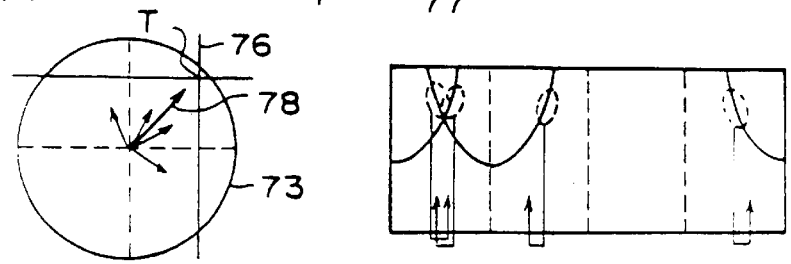

In the h2-layer, a composite vector is obtained from the azimuth vectors 77', 77', 77', 77'. The composite vector is determined as a vector 78 for the travel of the view window 73, and the information representing the composite vector is fed out from the i-layer. When the vector 78 for the travel of the view window 73 is thus determined, the view window 73 travels in accordance with the vector 78 for the travel of the view window 73. FIG. 11B shows the state of the view window 73 which has thus traveled.

Figure 11C:
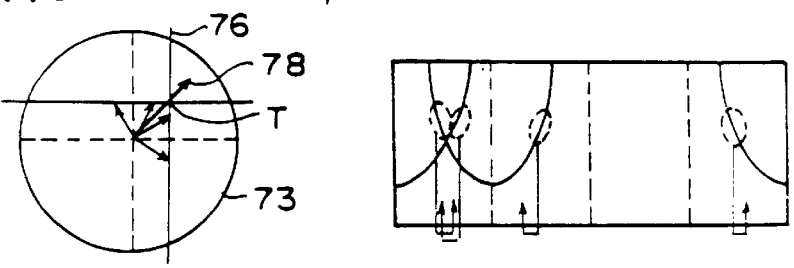
Figure 11D:
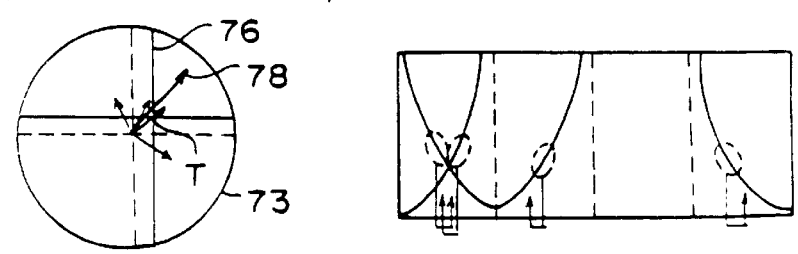

In the state shown in FIG. 11B, a vector 78 for the travel of the view window 73 is determined in the same manner as that described above, and the center point Q of the view window 73 travels in accordance with the vector 78 for the travel of the view window 73 into the state shown in FIG. 11C and the state shown in FIG. 11D. Ultimately, the position of the center point Q of the view window 73 coincides with the point of intersection T of the contour lines of the candidate 76 for the predetermined object image, and the center point Q of the view window 73 stops.

As for the value of α' for the predetermined angle, in cases where the angle of the vertex is small, and at the same time the value of α' is small, two +α' points and two −α' points are present. However, if the value of α' is larger than a certain value, only a single +α' point (and only a single −α' point) will be present. If the value of α' is less than 90 degrees, at least a single α' point will be present. Under such a condition that two α' points are present, a vector merely composed from the azimuth vectors directed from the center point of the view window 73 to the two α' points serves as the vector for the travel of the view window 73 towards the vertex. However, problems will occur if only a single α' point is present or if no such point is present. Experiments have shown that, if the value of α' for the predetermined angle is small, the α' point becomes absent as the vertex angle of the object image becomes larger. Therefore, in order to ensure that the view window 73 travels towards the vertex regardless of what value of angle the vertex may have, it is first necessary that the α' point is present. Accordingly, the value of α' for the predetermined angle should preferably be close to 90 degrees.

As illustrated in FIG. 12, in cases where the center point Q of the view window and the vertex lie on a single horizontal line, the vertex angle extends symmetrically upwards and downwards with respect to the horizontal line, and only a single α' point is present, the vector 78 for the travel of the view window, which vector is composed from the azimuth vectors 77, 77, is directed to the side opposite to the vertex. In order to eliminate such a problem, as illustrated in FIG. 13, phase shifts of +β and −β should be applied such that the vector 78 for the travel of the view window may be directed to the vertex. For this purpose, the phase shifts of +β and −β should be applied such that the azimuth vectors 77, 77 may be brought at least to the side rightward from a perpendicular 79, which passes through the center point Q of the view window. The value of β' is set so as to satisfy the conditions $\beta' > \alpha' - C/2$, and $0 < \beta' < 90°$ where C represents the value of the angle of the vertex to be detected and satisfies the condition of $0 < C < 360°$.

By the application of the appropriate phase shift and weighting, the center point Q of the view window 73 can be moved to the point of intersection of the contour lines of the candidate 76 for the predetermined object image regardless of at what angle the contour lines may intersect with each other.

In cases where the center point Q of the view window 73 and the vertex of the candidate 76 for the predetermined object image coincide with each other, as illustrated in FIG. 5B, the contour lines of the candidate 76 for the predetermined object image, which is cut out in accordance with the view window 73, are expressed as straight lines parallel to the radial direction in the complex-log mapped plane. Specifically, moving the center point of the view window to the vertex of the candidate for the predetermined object image is equivalent to operating such that the contour line extending in the radial direction, which line is selected by the e2-layer, may be constituted of as many components parallel to the radial direction as possible.

In the i-layer, the vector for the travel of the view window, which vector has been obtained in the h1-layer, and the vector for the travel of the view window, which vector has been obtained in the h2-layer, are combined appropriately. The information representing the composite vector for the travel of the view window is fed out of the i-layer. How the i-layer functions will be described hereinbelow.

It often occurs that the vector for the travel of the view window, which vector has been obtained in the h1-layer, and the vector for the travel of the view window, which vector has been obtained in the h2-layer, become different from each other, depending on the circumstances. For example, in cases where the center point of the view window is located in the region outside of the predetermined object image, the aforesaid two types of the vectors for the travel of the view window are directed to the same direction. In cases where the center point of the view window is located in the immediate vicinity of the predetermined object image or in the region inside of the predetermined object image, the aforesaid two types of the vectors for the travel of the view window become different from each other. Therefore, when the outputs of the neural network, which are determined by the h1- and h2-layers, are utilized in a well-balanced manner, the view window can be moved in accordance with a desired predetermined object image. For example, in cases where a characteristic shape of part of a predetermined object image is to be detected and utilized for learning operations, or the like, much importance may be attached in the i-layer to the output obtained from the h2-layer. In cases where the whole predetermined object image is to be found, much importance may be attached in the i-layer to the output obtained from the h1-layer.

At the same time as when the vector for the travel of the view window is calculated from the contour line of the candidate for the predetermined object image in the manner described above, a vector for the travel of the view window is also calculated from a movement of the candidate for the predetermined object image.

In the case of a moving image, there is a strong probability that a moving object with respect to the background will constitutes a candidate for the predetermined object image. Therefore, the candidate for the predetermined object image can be extracted accurately by canceling the background, extracting only the moving object, and causing the view window to travel.

How the vector for the travel of the view window is calculated from the movement of an object in the neural network processing unit 3 for search will be described hereinbelow.

Figure 14:
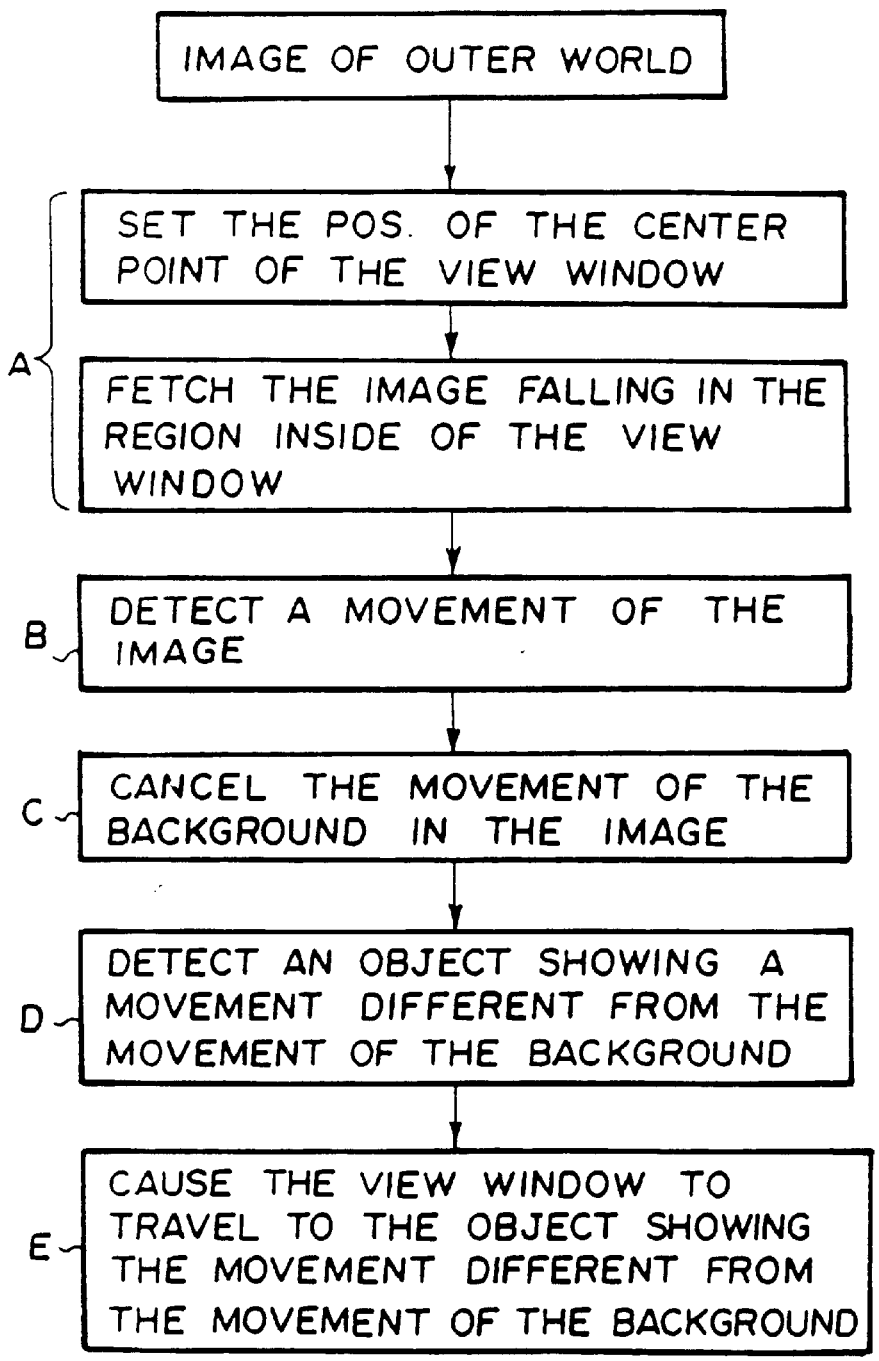
FIG. 14 is a block diagram showing the fundamental concept behind embodiments of a first step for extracting a candidate for a predetermined object image in accordance with a movement of the candidate for the predetermined object image in the method for recognizing an object image in accordance with the present invention.

FIG. 14 is a block diagram showing a fundamental concept behind the calculation of a vector for the travel of the view window from the movement of an object. In this embodiment, a neural network is utilized in order to extract a candidate for a yacht image, which serves as a candidate for the predetermined object image, from an image.

As illustrated in FIG. 14, in this embodiment, in a step A in the neural network, the position of the center point of the view window is set in the image, and part of the image falling in the region inside of the view window is fetched from the image. Thereafter, in a step B, a movement of the image, i.e., a movement of the image in an in-plane parallel direction, an in-plane rotating direction, and/or a radial direction, is detected. In a step C, the movement of the background is canceled (compensated for). Thereafter, in a step D, an object, which exhibits a movement different from the movement of the background, i.e., a candidate for the predetermined object image, is detected. In a step E, the view window is caused to travel to the object that exhibits the different movement.

Movements of an image correspond to the three types of movements described below.

(1) A movement, which is parallel to the image plane, in a plane, which is normal to the line of vision. (This movement corresponds to an eyeball movement or a movement of an image input device, such as a camera, in a direction which is normal to the line of vision.)

(2) A movement of enlargement or reduction around the viewpoint. (This movement corresponds to a movement of an image input device in a direction heading to or away from the outer world along the line of vision.)

(3) A clockwise or counter-clockwise rotation movement around the line of vision. (This movement corresponds to a rotation movement of an image input device around the line of vision.)

Any movement can be classified into one of these three movements.

Figure 15:
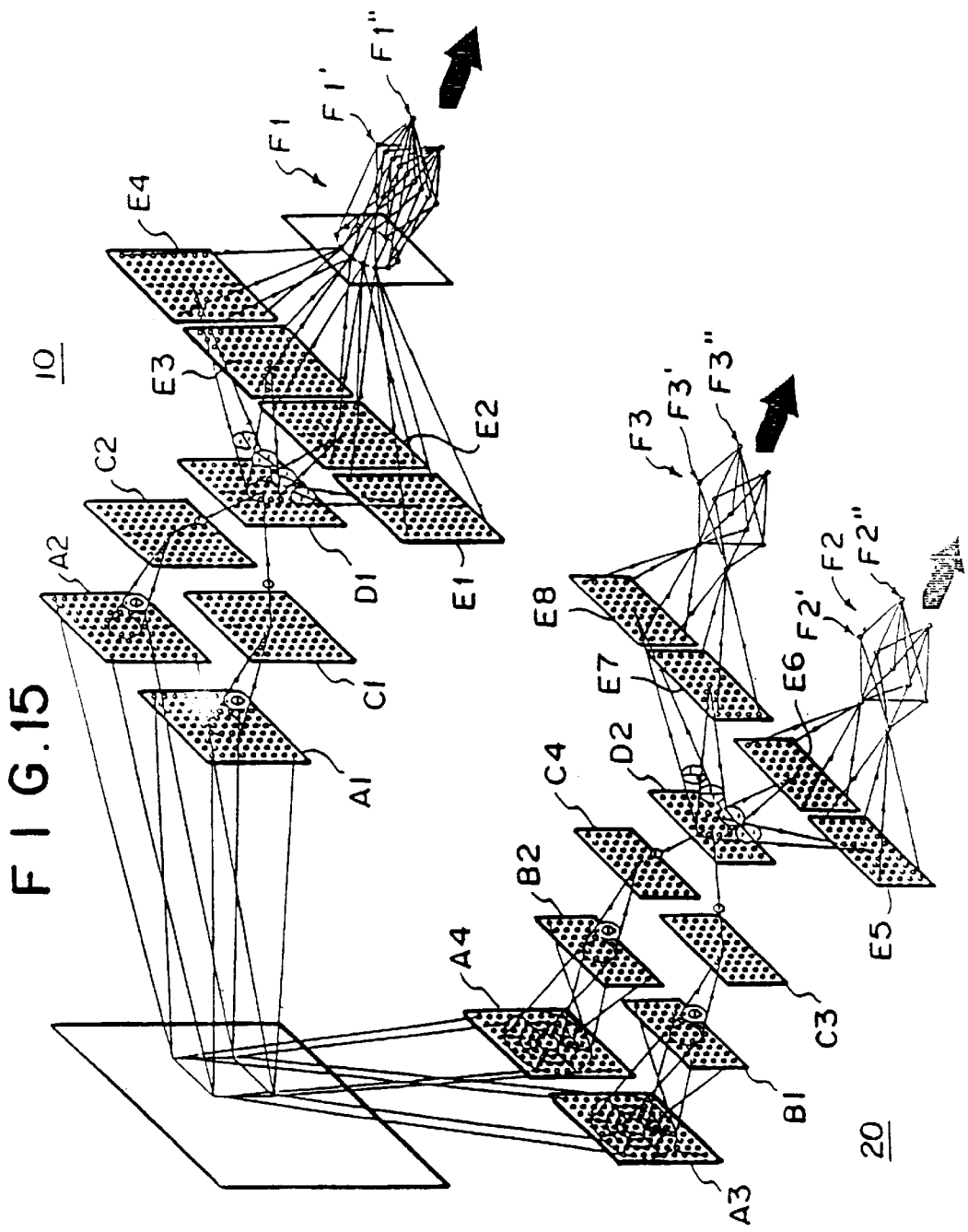
FIG. 15 is an explanatory view showing part of a neural network, which part detects a movement of a background in an image, the neural network being employed to extract a candidate for a predetermined object image in accordance with a movement of the candidate for the predetermined object image in the first step of the method for recognizing an object image in accordance with the present invention.

FIG. 15 is an explanatory view showing an example of a neural network for detecting the movement of the image.

A signal, which represents part of an image of the outer world and which is obtained through the view window having a predetermined size, is fed into the neural network. Also, a signal representing the direction, in which the background in the image moves, is fed out of the neural network. The aforesaid parallel movement is space invariant in the Cartesian plane. Therefore, the detection of the parallel movement should preferably be carried out in the Cartesian plane. On the other hand, the enlargement or reduction movement and the rotation movement are space variant in the Cartesian plane but can be processed as being space invariant after being transformed with the complex-log mapping. Therefore, the detection of the enlargement or reduction movement and the rotation movement should preferably be carried out in the complex-log mapped plane.

The layers of the neural network employed in this embodiment have the functions described below. This neural network is divided into a neural network 10, which detects a parallel movement of the background, and a neural network 20, which detects an enlargement or reduction movement and a rotation movement. The basic structure of the neural network, which is employed in this embodiment, is of the layered type. The neural network 10 for detecting a parallel movement of the background is constituted of an A1-layer provided with the view window having a predetermined size, in which layer the image is cut out with the size of the view window and fed into the neural network, and an A2-layer for imparting a time lag to the cut-out image. The neural network 10 is also constituted of a C1-layer for detecting the contour lines of an object image, which is embedded in the image having been cut out in the A1-layer, and a C2-layer for detecting the contour lines of the object image, which is embedded in the image having been imparted with the time lag in the A2-layer. The neural network 10 is additionally constituted of a B1-layer for finding the difference between the image, which has been obtained from the detection of the contour lines in the C1-layer, and the image, which has been obtained from the detection of the contour lines in the C2-layer. The neural network 10 is further constituted of E1-, E2-, E3-, and E4-layers for extracting only the components in predetermined directions from the difference, which has been found in the D1-layer. The neural network 10 is also constituted an F1-layer for generating an output, which represents the movement of the background as the azimuth of a parallel movement, from the components of the contour lines having been extracted in the E1-, E2-, E3-, and E4-layers.

On the other hand, the neural network 20 is constituted of an A3-layer provided with the view window having a predetermined size, in which layer the image is cut out with the size of the view window and is fed into the neural network, and an A4-layer for imparting a time lag to the cut-out image. The neural network 20 is also constituted of a B1-layer for transforming the image, which has been cut out in the A3-layer, with the complex-log mapping, and a B2-layer for transforming the image, which has been imparted with the time lag in the A4-layer, with the complex-log mapping. The neural network 20 is additionally constituted of a C3-layer for detecting the contour lines of an object image, which is embedded in the complex-log mapped image that is obtained in the B1-layer, and a C4-layer for detecting the contour lines of the object image, which is embedded in the complex-log mapped image obtained in the B2-layer. The neural network 20 is further constituted of a D2-layer for finding the difference between the image, which has been obtained from the detection of the contour lines in the C3-layer, and the image, which has been obtained from the detection of the contour lines in the C4-layer. The neural network 20 also has E5- and E6-layers for extracting only the components in the radial direction from the difference having been found in the D2-layer. The neural network 20 additionally has E7- and E8-layers for extracting only the components in the annular direction from the difference having been found in the D2-layer. The neural network 20 further has an F2-layer for generating an output, which represents the movement of the background as the enlargement or reduction movement, i.e., as the azimuth of a radial movement, from the components of the contour lines having been extracted in the E5- and E6-layers. The neural network 20 also has an F3-layer for generating an output, which represents the movement of the background as the azimuth of a rotation movement, from the components of the contour lines having been extracted in the E7- and E8-layers.

In the neural network employed in this embodiment, the synaptic connections between adjacent ones among the B-layer and those that follow are space invariant. Also, the synaptic connections in each of these layers are space invariant. The space invariance is adopted in order to facilitate the model simulation and parallel processing, and the synaptic connections need not necessarily be space invariant. However, in cases where the synaptic connections are space invariant, the output of each neuron becomes equivalent to an output obtained when the result of an operation of convolution (i.e., matching with a synaptic weights pattern) of the synaptic connection matrix and the preceding neuron layer matrix is passed through a nonlinear function. Therefore, computational processing becomes markedly easy when simulation of the neural network is carried out with a computer. In the neural network employed in this embodiment, positive neuron signals and positive and negative synaptic connections are used. Specifically, when a positive signal is transmitted through a positive connection, it is transmitted as a positive excitatory signal. When a positive signal is transmitted through a negative connection, it is transmitted as a negative excitatory signal. However, the neuron signals are not limited to positive signals, and a neuron model may be employed wherein neuron signals include positive and negative excitatory signals, synaptic connections include positive and negative connections and wherein, when a negative signal passes through a negative connection, it is transmitted as a positive excitatory signal.

Figure 16A:
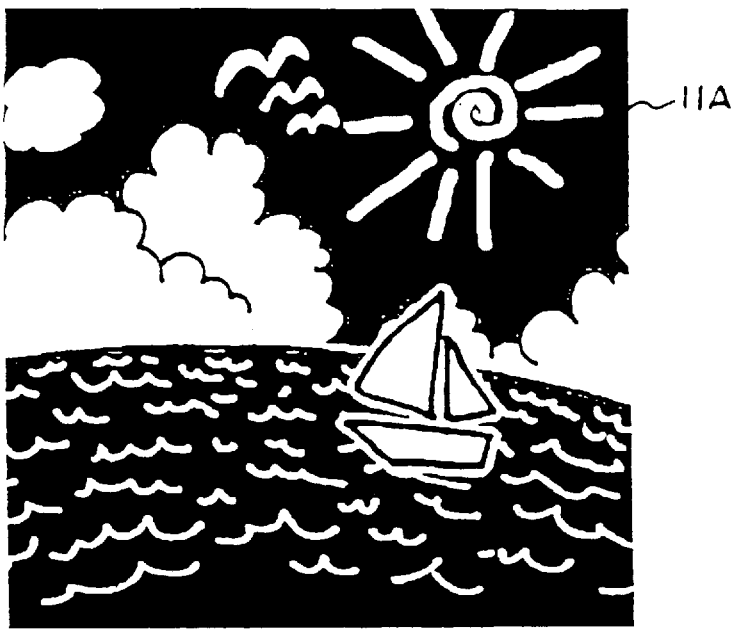
FIGS. 16A and 16B are diagrams showing images at the time t and the time t+α.
Figure 16B:
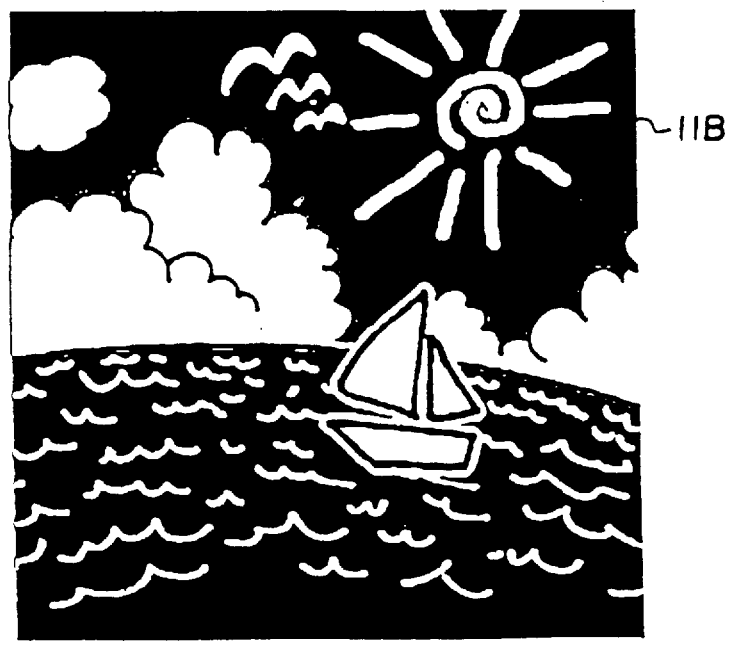
Figure 17:
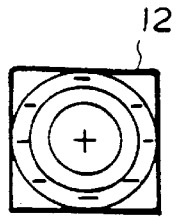
FIG. 17 is an explanatory view showing a synaptic weights pattern for extracting the contour lines.
Figure 18A:
FIGS. 18A and 18B are diagrams showing contour lines in the images at the time t and the time t+α.
Figure 18B:

The neural network 10 has the functions described below. First, in the A1-layer, an image 11A at the time t, which is shown in FIG. 16A and which falls in the region inside of the view window having a predetermined size, is cut out. Also, in the A2-layer, an image 11B at the time t+α, which is shown in FIG. 16B and which falls in the region inside of the view window having the predetermined size, is cut out. To the image 11B at the time t+α, a movement has been added which is parallel to the image plane and which is reverse to a movement of an image input device, such as a camera. As compared with the image 11A, the image 11B has moved upwardly (the image input device has moved downwardly). In FIGS. 16A and 16B, the white parts in each image represent that the signal intensity is high, and black parts in each image represent that the signal intensity is low. Thereafter, in the C1- and C2-layers, contour lines of object images, which are embedded in the images 11A and 11B having been cut out in the A1- and A2-layers, are detected. Specifically, the images 11A and 11B are transmitted as signals weighted with a synaptic weights pattern 12 for extracting the contour lines, which is shown in FIG. 17. In this manner, the contour lines in the images 11A and 11B are detected, which contour lines are indicated by images 13A and 13B shown in FIGS. 18A and 18B.

Figure 20:
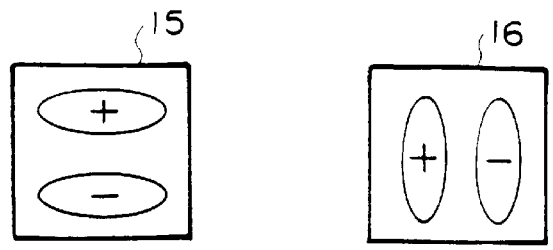
FIG. 20 is an explanatory view showing a synaptic weights pattern for extracting upward movement components and a synaptic weights pattern for extracting leftward movement components.
Figure 21A:
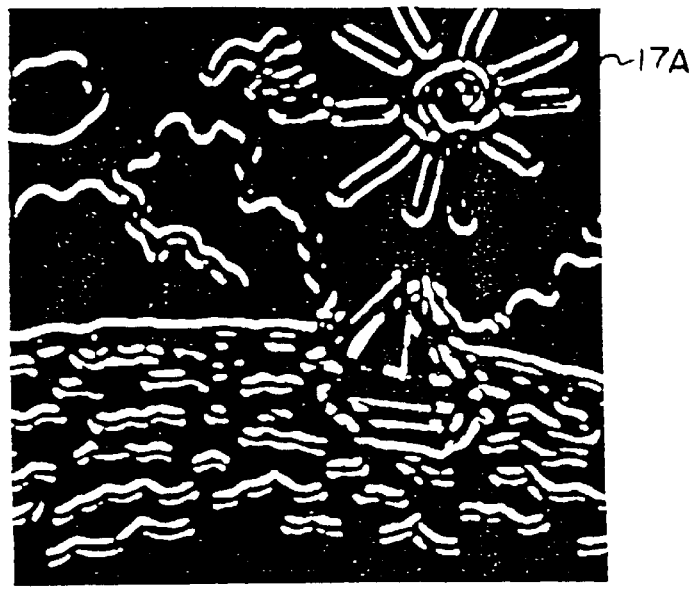
FIGS. 21A and 21B are diagrams showing images, in which the movement components of contour lines in a parallel direction have been extracted.
Figure 21B:

Thereafter, in the D1-layer, an operation is carried out in order to find the difference between the image 13A, which has been obtained from the detection of the contour lines in the C1-layer, and the image 13B, which has been obtained from the detection of the contour lines in the C2-layer. Specifically, the operation expressed as (image 13A–image 13B) is carried out. In this manner, an image 14 shown in FIG. 19 is obtained. Specifically, the D1-layer receives neuron signals with positive weights from the C1-layer and receives neuron signals with negative weights from the C2-layer. The hatched parts in FIG. 19 indicate that the signal value is zero. Thereafter, in the E1-, E2-, E3-, and E4-layers, the image 14 is transmitted as a signal weighted with synaptic weights patterns for detecting movements parallel to the image plane, and components representing the respective directions of the movements are extracted. As an aid in facilitating the explanation, in this example, only two types of components of movements, i.e., the components in the upward direction and the components in the leftward direction, are extracted by using a synaptic weights pattern 15 for extracting the upward components and a synaptic weights pattern 16 for extracting the leftward components, which patterns are shown in FIG. 20. An image 17A shown in FIG. 21A and an image 17B shown in FIG. 21B respectively indicate the results of the transmission of the image 14 as the signal weighted by the synaptic weights pattern 15 and the synaptic weights pattern 16. Information representing the components of the movements of the contour lines, which components have been extracted in the E1-, E2-, E3-, and E4-layers, is fed into the F1-layer. Thereafter, the portion of the neural network constituted of F1-, F1'-, and F"-layers detects which direction of movement components were extracted more, and an output is generated which represents the azimuth of the movement in the direction parallel to the image plane. Specifically, in this embodiment, as indicated by the image 17A shown in FIG. 21A, the upward components have the highest signal intensity. Therefore, a signal having a high intensity is fed out from a neuron which represents that the upward movement occurred, and no signal is fed out from a neuron which represents that the leftward movement occurred.

The neural network 20 has the functions described below.

First, how the neural network 20 works when an image input device, such as a camera, moves towards the image and cuts out the image will be described hereinbelow.

Figure 23A:
FIGS. 23A and 23B are diagrams showing images, which are obtained by transforming the images at the time t and the time t+α with complex-log mapping.
Figure 23B:

First, in the A3-layer, an image 21A at the time t, which is shown in FIG. 22A and which falls in the region inside of the view window having a predetermined size, is cut out. Also, in the A4-layer, an image 21B at the time t+α, which is shown in FIG. 22B and which falls in the region inside of the view window having the predetermined size, is cut out. To the image 21B at the time t+α, a movement causing the image to enlarge has been added by the movement of an image input device, such as a camera, towards the outer world. As compared with the image 21A, the image 21B has been enlarged. Thereafter, in the B1- and B2-layers, the images 21A and 21B having been cut out in the A3- and A4-layers are transformed with the complex-log mapping. In this manner, images 22A and 22B shown in FIGS. 23A and 23B are obtained.

Figure 24A:
FIGS. 24A and 24B are diagrams showing contour lines in the images, which have been obtained by transforming the images at the time t and the time t+α with complex-log mapping.
Figure 24B:

Thereafter, in the C3- and C4-layers, contour lines of object images, which are embedded in the images 22A and 22B obtained from the transformation with the complex-log mapping in the B1- and B2-layers, are detected. Specifically, the images 22A and 22B are transmitted as signals weighted by the synaptic weights pattern 12 for extracting the contour lines, which is shown in FIG. 17. In this manner, the contour lines in the images 22A and 22B are detected, which contour lines are indicated by images 23A and 23B shown in FIGS. 24A and 24B.

Figure 26:
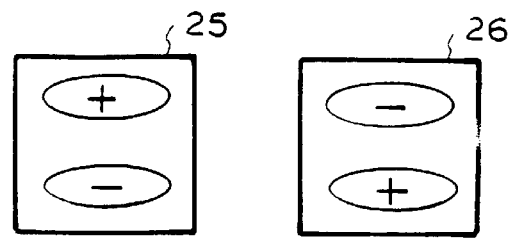
FIG. 26 is an explanatory view showing a synaptic weights pattern for extracting components in an enlarging direction and a synaptic weights pattern for extracting components in a reducing direction.
Figure 27A:
FIGS. 27A and 27B are diagrams showing images, in which the movement components of the contour lines in the radial direction have been extracted.
Figure 27B:
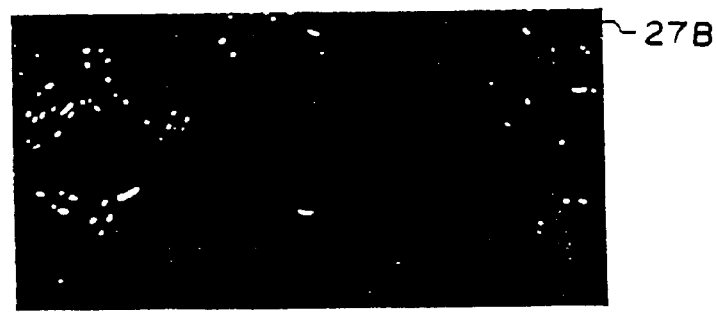

Thereafter, in the D2-layer, an operation is carried out in order to find the difference between the image 23A, which has been obtained from the detection of the contour lines in the C3-layer, and the image 23B, which has been obtained from the detection of the contour lines in the C4-layer. Specifically, the operation expressed as (image 23A–image 23B) is carried out. In this manner, an image 24 shown in FIG. 25 is obtained. Thereafter, in the E5-and E6-layers, the image 24 is transmitted as a signal weighted by synaptic weights patterns for detecting movements in the radial direction, and components representing the respective directions of the movements are extracted. Specifically, components of the movements of the image in the radial direction, which movements are due to the enlargement and reduction, are extracted by using a synaptic weights pattern 25 for extracting the components in the enlarging direction and a synaptic weights pattern 26 for extracting the components in the reducing direction, which patterns are shown in FIG. 26. An image 27A shown in FIG. 27A and an image 27B shown in FIG. 27B respectively indicate the results of the transmission of the image 24 as the signal weighted by the synaptic weights pattern 25 and the synaptic weights pattern 26. Information representing the components of the movements of the contour lines, which components have been extracted in the E5- and E6-layers, is fed into the F2-layer. Thereafter, the portion of the neural network constituted of F2-, F2'-, and F2"-layers detects which direction of movement components were extracted more, and an output is generated which represents the azimuth of the radial movement. Specifically, in this embodiment, as indicated by the image 27A shown in FIG. 27A and the image 27B shown in FIG. 27B, the intensities of the components in the enlarging direction are high, whereas the intensities of the components in the reducing direction are low. Therefore, a signal having a high intensity is fed out from a neuron which represents that the movement in the enlarging direction occurred, and no signal is fed out from a neuron which represents that the movement in the reducing direction occurred.

How the neural network 20 works when an image input device, such as a camera, rotates around the center point of its view window and fetches the image will be described hereinbelow.

Figure 29A:
FIGS. 29A and 29B are diagrams showing images, which are obtained by transforming the images at the time t and the time t+α with complex-log mapping.
Figure 29B:
Figure 30A:
FIGS. 30A and 30B are diagrams showing contour lines in the images, which have been obtained by transforming the images at the time t and the time t+α with complex-log mapping.
Figure 30B:

First, in the A3-layer, an image 31A at the time t, which is shown in FIG. 28A and which falls in the region inside of the view window having a predetermined size, is cut out. Also, in the A4-layer, an image 31B at the time t+α, which is shown in FIG. 28B and which falls in the region inside of the view window having the predetermined size, is cut out. To the image 31B at the time t+α, a rotation movement has been added by the rotation movement of an image input device, such as a camera. As compared with the image 31A, the image 31B has been rotated clockwise around the center point of the view window. Thereafter, in the B1- and B2-layers, the images 31A and 31B having been cut out in the A3- and A4-layers are transformed with the complex-log mapping. In this manner, images 32A and 32B shown in FIGS. 29A and 29B are obtained. Thereafter, in the C3- and C4-layers, contour lines of object images, which are embedded in the images 32A and 32B obtained from the transformation with the complex-log mapping in the B1- and B2-layers, are detected. Specifically, the images 32A and 32B are transmitted as signals weighted by the synaptic weights pattern 12 for extracting the contour lines, which is shown in FIG. 17. In this manner, the contour lines in the images 32A and 32B are detected, which contour lines are indicated by images 33A and 33B shown in FIGS. 30A and 30B.

Figure 31:
FIG. 31 is a diagram showing the difference between the contour lines in the images, which have been obtained by transforming the images at the time t and the time t+α with complex-log mapping.
Figure 32:
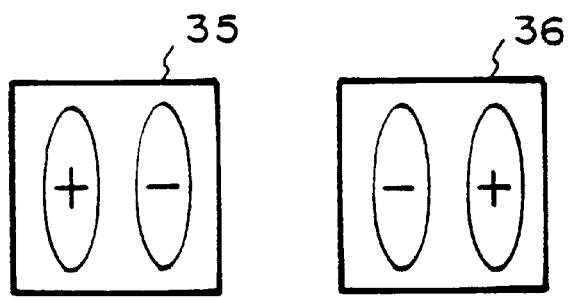
FIG. 32 is an explanatory view showing a synaptic weights pattern for extracting components in a clockwise rotating direction and a synaptic weights pattern for extracting components in a counter-clockwise rotating direction.
Figure 34:
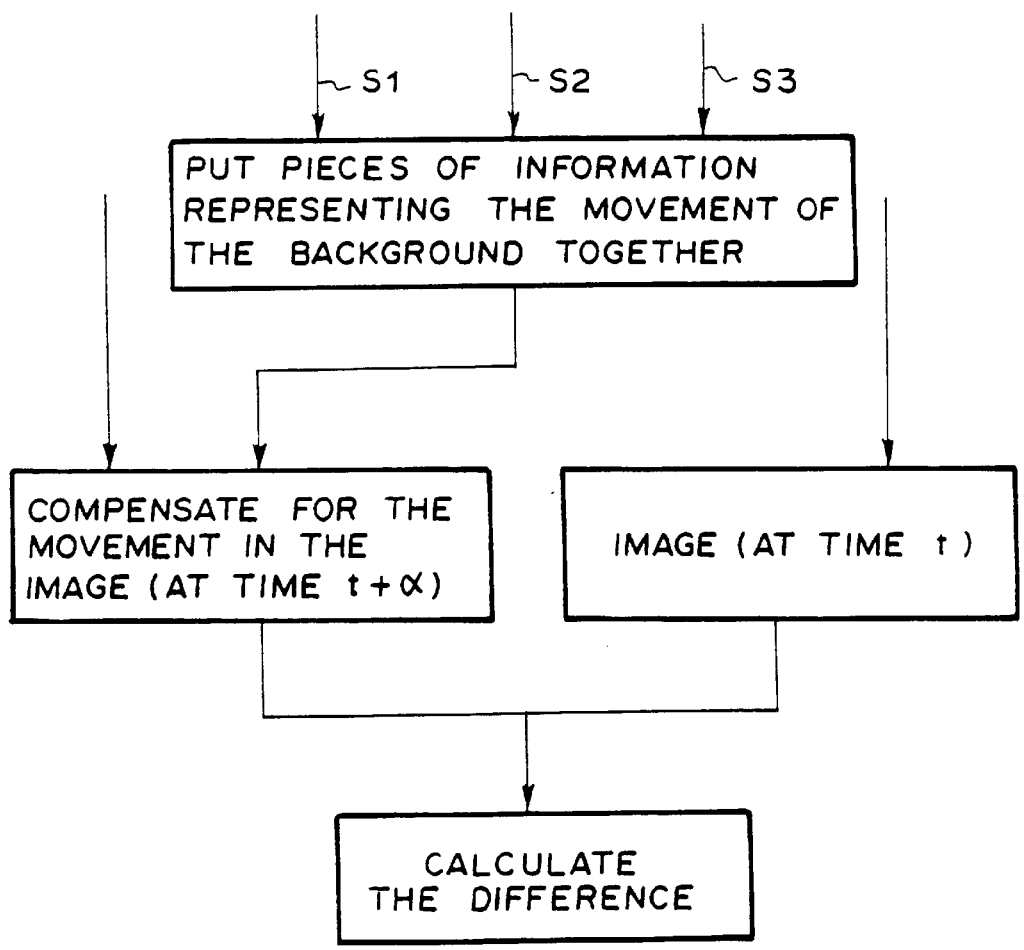
FIG. 34 is a flow chart showing a process for canceling the movement of the background in an image.

Thereafter, in the D2-layer, an operation is carried out in order to find the difference between the image 33A, which has been obtained from the detection of the contour lines in the C3-layer, and the image 33B,-which has been obtained from the detection of the contour lines in the C4-layer. Specifically, the operation expressed as (image 33A–image 33B) is carried out. In this manner, an image 34 shown in FIG. 31 is obtained. Thereafter, in the E7- and E8-layers, the image 34 is transmitted as a signal weighted by synaptic weights patterns for detecting movements in the rotating direction, and components representing the respective rotating directions are extracted. Specifically, components of the rotation movements of the image in the clockwise and counter-clockwise directions are extracted by using a synaptic weights pattern 35 for extracting the components in the clockwise rotating direction and a synaptic weights pattern 36 for extracting the components in the counter-clockwise rotating direction, which patterns are shown in FIG. 32. An image 37A shown in FIG. 33A and an image 37B shown in FIG. 33B respectively indicate the results of the transmission of the image 34 as the signal weighted by the synaptic weights pattern 35 and the synaptic weights pattern 36. Information representing the components of the movements of the contour lines, which components have been extracted in the E7- and E8-layers, is fed into the F3-layer. Thereafter, the portion of the neural network constituted of F3-, F3'-, and F3"-layers detects which rotating direction of movement components were extracted more, and an output is generated which represents the azimuth of the movement in the in-plane rotating direction. Specifically, in this embodiment, as indicated by the image 37A shown in FIG. 33A and the image 37B shown in FIG. 33B, the intensities of the components in the clockwise rotating direction are high, whereas the intensities of the components in the counter-clockwise rotating direction are low. Therefore, a signal having a high intensity is fed out from a neuron which represents that the clockwise rotation movement occurred, and no signal is fed out from a neuron which represents that the counter-clockwise rotation movement occurred.

The detection of the movement of the image from the components of the difference contour lines in the F1-, F1'-, F1''-layers, the F2-, F2'-, F2''-layers and the F3-, F3'-, F3''-layers, can be achieved by repeatedly feeding inputs into a perceptron type of neural network, giving instructor signals, which represent correct results of judgment, to the neural network, and thereby carrying out leaning operations of the neural network. The neural network can thus caused to grow such that it can detect movements of images. In this manner, outputs representing correct results of detection of movements of images can be obtained from difference contour lines of various images.

Figure 37:
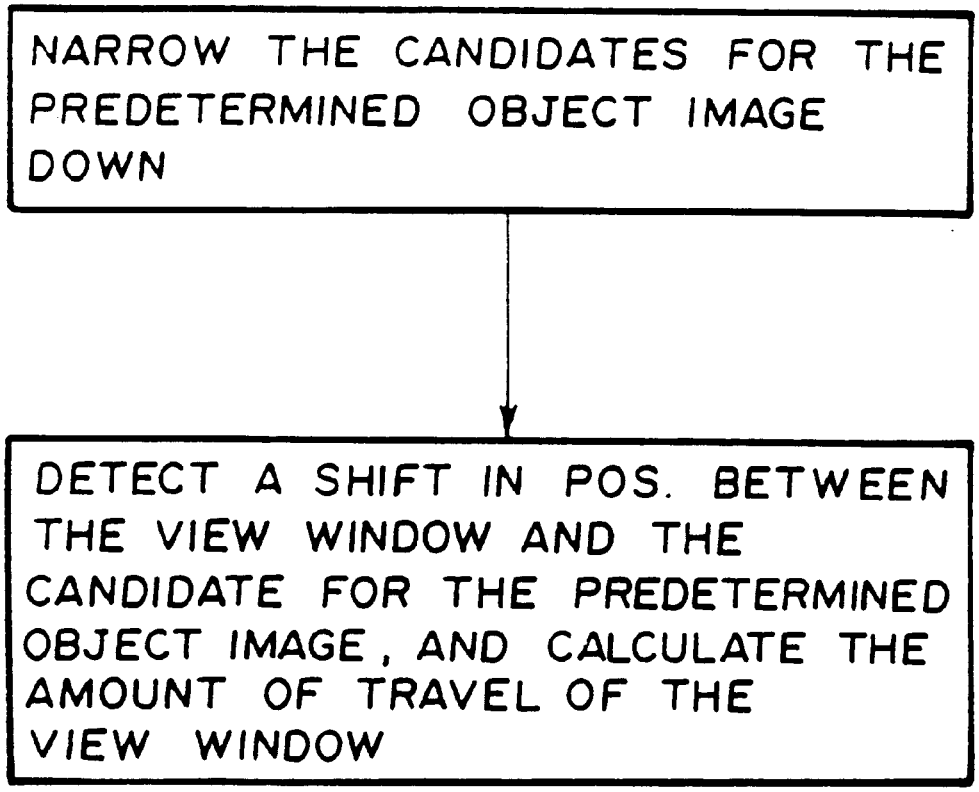
FIG. 37 is a block diagram showing the fundamental concept behind the extraction of a candidate for the predetermined object image.

Thereafter, in the step C, the difference components representing the movement of the whole image, i.e., the background, between the two images taken up with the time difference α can be canceled (compensated for) in accordance with the movement of the whole image, which has been detected in the manner described above. Specifically, a movement reverse to the detected movement may be added in accordance with the direction and the amount of the detected image movement. FIG. 37 is a flow chart showing the process for canceling the movement of the background. For example, the signal S1, S2 or S3, which represents the results of the detection of the movement, is added in a direction, which is reverse to the direction of the detected movement, to the signal representing the image 11B, 21B, or 31B shown in FIG. 16B, 22B, or 28B. In this manner, an image, wherein the movement of the whole image, i.e., the background, has been canceled, can be obtained from each image.

Figure 35A:
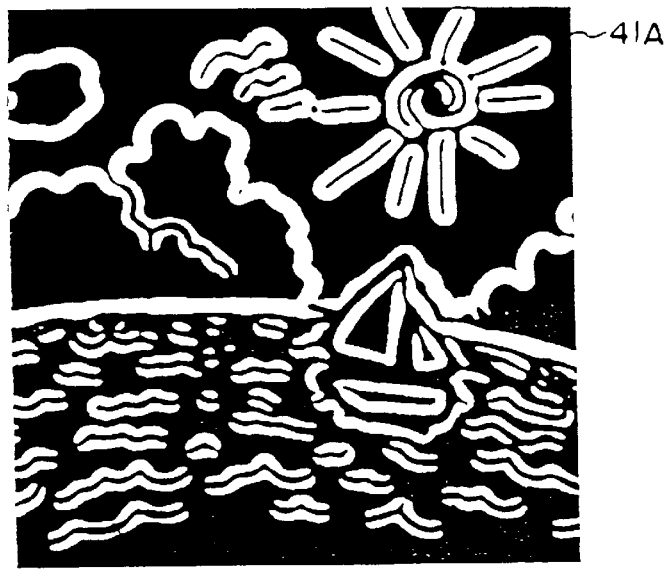
FIGS. 35A and 35B are diagrams showing images at the time t and the time t+α, in which the movement of the background has been canceled.
Figure 35B:
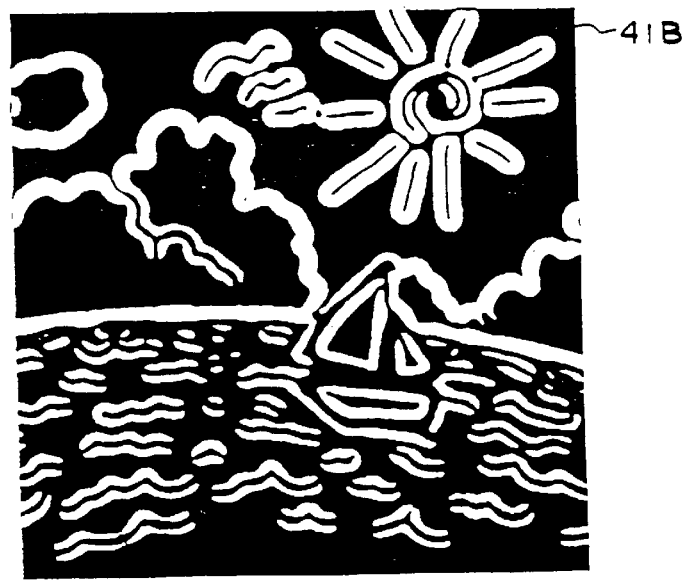

Thereafter, in the step D, an operation is carried out to find the difference between the image at the time t+α, from which the movement of the whole image, i.e., the background, has been canceled in the step C, and the image at the time t. In this manner, only the object, which shows a movement different from the movement of the background, is extracted. Specifically, as illustrated in FIG. 35A, an image 41A is obtained by extracting the contour line components from the image at the time t, in which the movement of the background has been canceled. Also, as illustrated in FIG. 35B, an image 41B is obtained by extracting the contour line components from the image at the time t+α, in which the movement of the background has been canceled. The difference between the images 41A and 41B is found, and an image 42 shown in FIG. 36 is thereby obtained. The object embedded in the image 42, i.e., the yacht in the image in this embodiment, is the object showing a movement different from the movement of the background. This object is taken as the candidate for the predetermined object image.

Thereafter, in the step E, the view window is caused to travel towards the candidate for the predetermined object image, which candidate shows the movement different from the movement of the background. FIG. 37 is a flow chart showing the process for carrying out the travel of the view window in the step E. In the step E, in cases where a plurality of objects different from the background, i.e., a plurality of candidates for the predetermined object image, have been detected in the step D, they are narrowed down, and a candidate for the predetermined object image, which is most likely to be the predetermined object image, is thereby selected. Thereafter, the view window is caused to travel towards the selected candidate for the predetermined object image.

FIG. 38 is an explanatory view showing an example of a neural network for calculating a vector for the travel of the view window from the contour line of the candidate for the predetermined object image. Elements constituting this neural network are equivalent to those constituting the neural network shown in FIG. 4, and are therefore numbered with corresponding primed reference numerals in FIG. 38. The signal, which represents the image 42 shown in FIG. 36, i.e., the image representing the contour lines of the object (the candidate for the predetermined object image) showing a movement different from the movement of the background, is fed into the neural network shown in FIG. 38. Also, the output obtained from the neural network represents the amount and the direction, in which the view window is to be moved, i.e., the vector for the travel of the view window.

At the same time as when the vectors for the travel of the view window are calculated from the contour line of the candidate for the predetermined object image and the movement of the candidate for the predetermined object image in the manner described above, a vector for the travel of the view window is also calculated from the color of the candidate for the predetermined object image.

Figure 39:
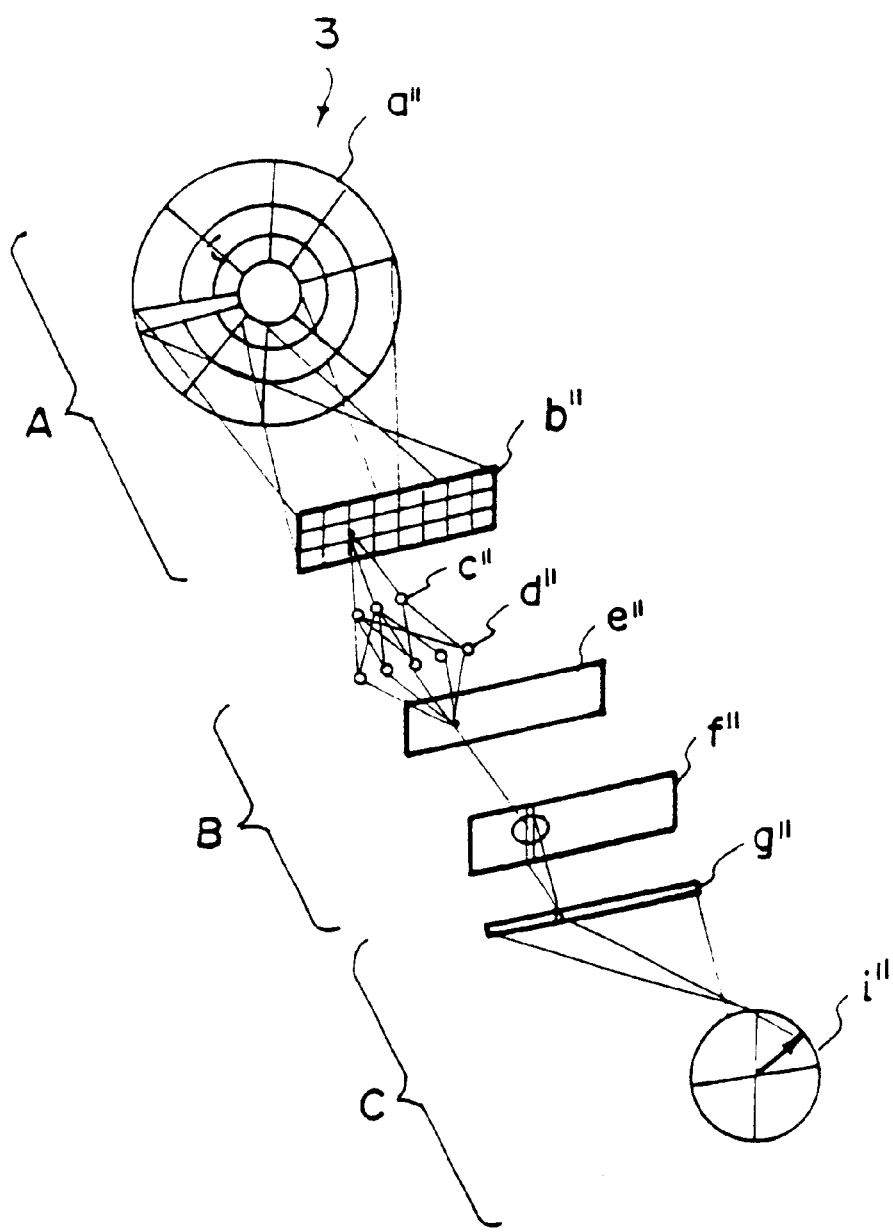
FIG. 39 is an explanatory view showing an example of a neural network for extracting a candidate for a predetermined object image in accordance with a color of the candidate for the predetermined object image in an embodiment of the method for recognizing an object image in accordance with the present invention.

FIG. 39 is an explanatory view showing an example of a neural network for determining a vector for the travel of a view window from the color of a candidate for a predetermined object image.

As in the embodiment of the method in accordance with the present invention wherein the vector for the travel of the view window is calculated from the contour line, a signal, which represents an image of the outer world at the time t and which is obtained through the view window having a predetermined size, is fed into the neural network. Also, the output obtained from the neural network represents the amount and the direction in which the view window is to be moved.

As in the neural network for calculating the vector for the travel of the view window from the movement of the candidate for the predetermined object image and the neural network for calculating the vector for the travel of the view window from the contour line of the candidate for the predetermined object image, the basic structure of the neural network in this embodiment is of the layered type. However, the neurons in an e''-layer are connected with each other in an interactive manner. Therefore, the neural network may also be referred to as a complex type. The layers of the neural network employed in this embodiment have the functions described below. As in the embodiment, wherein the vector for the travel of the view window is calculated from the movement of the candidate for the predetermined object image, and the embodiment, wherein the vector for the travel of the view window is calculated from the contour line of the candidate for the predetermined object image, this neural network is divided into the three steps.

The step for setting the position of the center point of the view window in the image and fetching part of the image falling in the region inside of the view window is constituted of an a''-layer provided with the view window having a predetermined size, in which layer the image is cut out with the size of the view window and fed into the neural network, and a b''-layer for transforming the input image with the complex-log mapping (logarithmic polar coordinates transformation).

The step for narrowing a candidate for the predetermined object image down from the input image is constituted of c"-, d"-, and e"-layers for detecting neurons, which fall within a region approximately coinciding in color with the candidate for the predetermined object image, and detecting the degree of coincidence in color between the region and the candidate for the predetermined object image. The step is also constituted of an f"-layer, which is an interactive connection circuitry layer for selecting a region that exhibits a high degree of coincidence in color with the candidate for the predetermined object image and that is closer in the shape and the size to the predetermined object image.

The step for detecting a shift in position between the candidate for the predetermined object image and the view window and calculating the amount of travel of the view window is constituted of a g"-layer for detecting the azimuth and the distance of the region of the group of the neurons, which fall within a region approximately coinciding in color with the candidate for the predetermined object image, and an i"-layer for generating an output representing a vector for the travel of the view window in accordance with the detected azimuth and the detected distance. As in the aforesaid embodiments, in the neural network employed in this embodiment, the synaptic connections between adjacent ones among the b"-layer and those that follow are space invariant. Also, the synaptic connections in the interactive connection layer are space invariant.

First, in the a"-layer, part of the image falling within the region of the view window having the predetermined size is cut out. In the a"-layer, the density of the neurons provided is higher at part closer to the center point of the view window. In the b"-layer, the image, which has been fetched in the a"-layer, is transformed with the complex-log mapping by taking the center point of the view window as the pole of mapping. Because the image is thus transformed with the complex-log mapping in the b"-layer, the processes in the b"-layer and the layers that follow can be achieved by the convolution with a space invariant synaptic weights pattern.

FIG. 40 shows the results of transformation of various figures with the complex-log mapping, which is carried out in the b"-layer of the neural network shown in FIG. 39. With the complex-log mapping, in cases where a candidate for the predetermined object image is located near the pole of mapping, i.e., the center point of the view window, the candidate for the predetermined object image is transformed into a comparatively large size. In cases where a candidate for the predetermined object image is located at a position remote from the pole of mapping, i.e., the center point of the view window, the candidate for the predetermined object image is transformed into a comparatively small size. The neurons of the b"-layer are excited in accordance with the intensity of the transformed image pattern.

The portion of the neural network constituted of the c"-, d"-, and e"-layers, which portion represents an excitation pattern of the neurons corresponding to the complex-log mapped image, extracts the region approximately coinciding in color with the candidate for the predetermined object image, and detects the degree of coincidence in color between the extracted region and the candidate for the predetermined object image. The neurons in the e"-layer are excited in accordance with the detected degree of coincidence in color. The synaptic connections for extracting the neurons falling within the region approximately coinciding in color with the candidate for the predetermined object image are determined through learning operations by a back propagation method, or the like.

In this embodiment, by way of example, a neural network having a three-layered structure may be employed as the portion of the aforesaid neural network for detecting the degree of coincidence in color with the candidate for the predetermined object image. Such an example will hereinbelow be described in detail.

Figure 41:
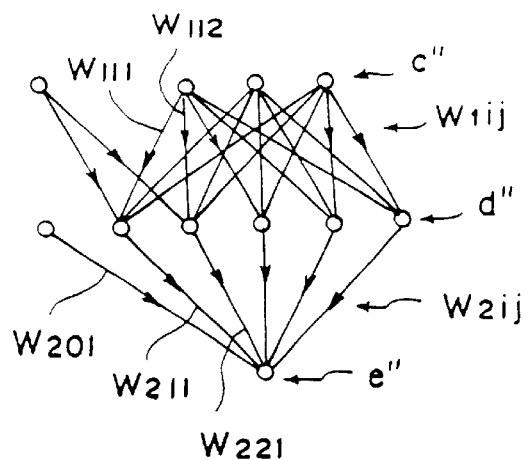
FIG. 41 is an explanatory view showing an example of a neural network for detecting the level of coincidence in color.

FIG. 41 is an explanatory view showing in more detail the c"-layer, the d"-layer, and the e"-layer of the neural network shown in FIG. 39, which is employed in the embodiment of the first step of the method for recognizing an object image in accordance with the present invention.

The portion constituted of the c"-layer, the d"-layer, and the e"-layer may be regarded as a three-layered neural network, wherein the c"-layer serves as an input layer, the d"-layer serves as an intermediate layer, and the e"-layer serves as an output layer.

The signal fed into the c"-layer is the color information received from each of the neurons of the preceding neuron layer. In the c"-layer, the color information received from the preceding neuron layer is separated into the three primary colors of light (red, green, and blue), and a single neuron receives each piece of the color information. Therefore, in the c"-layer, three neurons are allocated to a single picture element. The signal fed into the c"-layer is weighted by the synaptic connections and transmitted to the d"-layer. The weights of the synaptic connections from the c"-layer to the d"-layer are represented by W1ij, where i represents the neurons of the c"-layer and j represents the neurons of the d"-layer.

The d"-layer is the neuron layer referred to as the intermediate layer. In general, the number of elements is selected appropriately in accordance with the level of complexity of the process to be carried out. In this example, five neurons are allocated to a single picture element. Therefore, the signal transmission from thee neurons to five neurons per picture element is carried out by 15 synaptic connections.

Signal transmission from the d"-layer to the e"-layer is then carried out. The e"-layer corresponds to the output layer of the three-layered neural network. This neural network detects the degree of coincidence in color with the candidate for the predetermined object image, and the degree of coincidence in color between a certain picture element and the candidate for the predetermined object image can be represented as the level of excitation of a single neuron. Therefore, a single neuron is allocated to each picture element. Accordingly, the signal transmission from the d"-layer to the e"-layer is carried out by five synaptic connections per picture element. The weights of the synaptic connections from the d"-layer to the e"-layer are represented by W2ij, where i represents the neurons of the d"-layer and j represents the neurons of the e"-layer.

Actually, the neurons and the synaptic connections are provided in accordance with the number of picture elements. The signal transmission from the c"-layer to the e"-layer can be carried out simultaneously for the respective picture elements. In this neural network, the processes to be carried out are identical for the respective picture elements. Therefore, the characteristics of the neurons and the weights of the synaptic connections are identical for the respective picture elements.

The synaptic connections for carrying out the operations for detecting the degree of coincidence in color with the candidate for the predetermined object image can be obtained through learning operations of the neural network. By way of example, Table 1 shows the values of synaptic weights, which may be employed in cases where the flesh color of a human face is taken as the color of the candidate for the predetermined object image and it is defined that the frequency distribution of the flesh color extracted from a certain population is proportional to the degree of coincidence in color.

which exhibits a high degree of coincidence in color with the candidate for the predetermined object image and which has a shape and a size most appropriate for the candidate for the predetermined object image, may be selected. As indicated

TABLE 1

| $W_{1ij}$ | j = 1 | 2 | 3 | 4 | 5 |
|---|---|---|---|---|---|
| j = 0 | −5.974133e − 01 | −3.722984e + 00 | −3.099859e + 00 | −3.255182e + 00 | 5.682278e − 01 |
| 1 | −1.301941e + 01 | −3.950971e + 00 | −6.120815e + 01 | −7.632671e + 01 | −2.353819e + 01 |
| 2 | 2.101100e + 01 | −7.874559e + 01 | 1.327136e + 02 | 9.696937e + 01 | 2.372384e + 01 |
| 3 | −8.922419e + 00 | 8.247547e + 01 | −6.871834e + 01 | 6.977902e + 01 | 1.007091e + 01 |

| $W_{2ij}$ | j = 1 |
|---|---|
| j = 0 | 2.354928e + 01 |
| 1 | −3.542386e + 00 |
| 2 | −5.330564e + 00 |
| 3 | −3.500605e + 00 |
| 4 | −2.483954e + 01 |
| 5 | 5.161126e + 00 |

The learning operations can be carried out by using a back propagation method. First, signals representing three primary color values of various colors, including the flesh color, are employed as input signals. Also, signals representing the degrees of coincidence in color, which are determined from the frequency distribution of the flesh color, are employed as instructor signals. The input signals and the instructor signals are repeatedly given to the neural network. In accordance with differences between the instructor signals and actual outputs of the neural network, the weights of the synaptic connections are changed little by little such that the differences may become smaller. The learning operations are carried out in this manner until the neural network generates outputs identical with the instructor signals with respect to given inputs.

Figure 67:
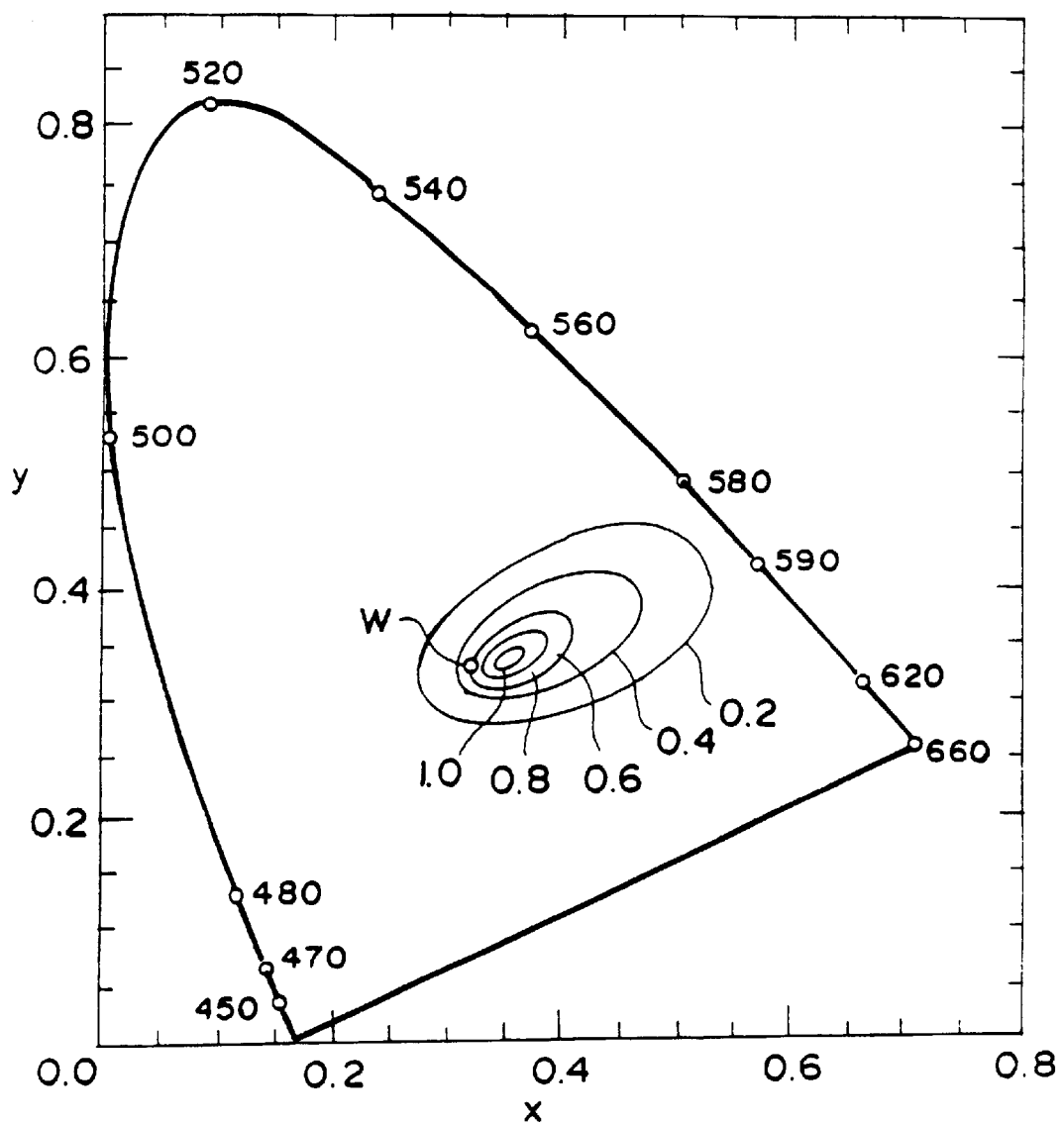
FIG. 67 is a graph showing a chromaticity diagram.

The degrees of coincidence with the flesh color, which were obtained in accordance with the outputs of this neural network, are indicated as color level lines in the chromaticity diagram illustrated in FIG. 67. The degree of coincidence in color is 1.0 for a color, which is closest to the flesh color. The degree of coincidence in color decreases as a color becomes different from the flesh color. Operations for expressing the information about the three primary color values of a color is represented as x and y coordinates on the chromaticity diagram are carried out with the formulas $$x = \frac{(1.1302 + 1.6387\, r/(r + g + b) + 0.6215\, g/(r + g + b)}{(6.7846 - 3.0157\, r/(r + g + b) - 0.3857\, g/(r + g + b)}$$
$$y = \frac{(0.0601 + 0.9399\, r/(r + g + b) + 4.5306\, g/(r + g + b)}{(6.7846 - 3.0157\, r/(r + g + b) - 0.3857\, g/(r + g + b)}$$

where r represents the red color value, g represents the green color value, and b represents the blue color value.

By use of the weights of the synaptic connections determined from the learning operations in the manner described above, the degree of coincidence in color between the extracted region and the candidate for the predetermined object image is detected by the portion of the neural network constituted of the c"-, d"-, and e"-layers. In this manner, the degree of coincidence in color can be detected as the level of excitation of the neuron of the e"-layer.

Figure 42:
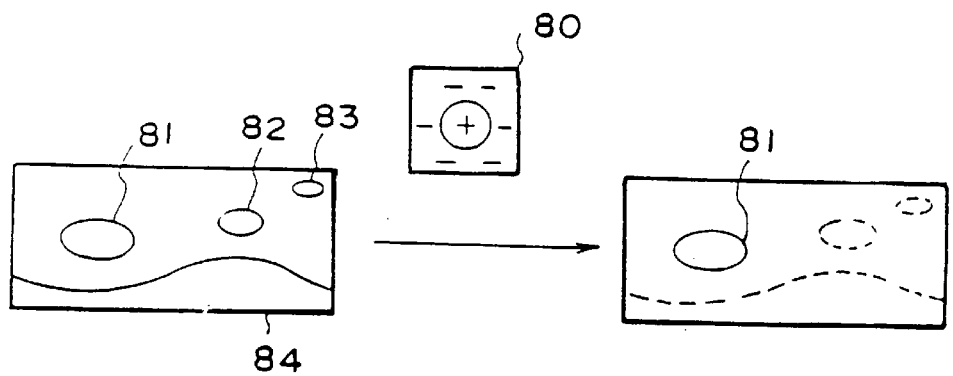
FIG. 42 is an explanatory view showing local area limited, interactive weighted connections for competition and cooperation, which are designed such that a region exhibiting a high degree of coincidence in color with a candidate for a predetermined object image may be selected.

The f"-layer is constituted of the interactive connection layer having local area limited, interactive weighted connections for competition and cooperation such that a region, by a synaptic weights pattern 80 shown in FIG. 42, each neuron in the f"-layer is synaptically connected with a positive weight to a nearby neuron and with a negative weight to a slightly remote neuron. Excitatory signals are transferred through such interactive connections in the f"-layer. As a result, in the f"-layer, of the neurons which have received signals from excited neurons in the e"-layer that represent high degrees of coincidence in color with the candidate for the predetermined object image, a region of a group of neurons having the predetermined shape and size and a high intensity of excitation, i.e., a high degree of coincidence in color, is selected and caused to fire, whereas neurons falling within an isolated region or a region exhibiting a low degree of coincidence in color with the candidate for the predetermined object image do not fire. By way of example, of regions 81, 82, and 83 extracted by the e"-layer, which are shown in FIG. 42, the degree of coincidence in color between the region 81 and the flesh color is assumed as being 1.0 in the aforesaid chromaticity diagram. Also, the degree of coincidence in color between the region 82 and the flesh color is assumed as being 0.9, and the degree of coincidence in color between the region 83 and the flesh color is assumed as being 0.2. In such cases, because the region 83 has a lower degree of coincidence in color with the flesh color than the regions 81 and 82, the region 83 is inhibited and erased when the region 83 and the regions 81, 82 are caused to compete with each other. Also, the region 82 has a lower degree of coincidence in color with the flesh color than the region 81, the region 82 is erased when the region 82 and the region 81 are caused to compete with each other. Additionally, because the region 81 has a high degree of coincidence in color with the flesh color, the neurons corresponding to the region 81 cooperate with one another, the level of excitation of these neurons becomes higher. Therefore, only the region 81 is selected as a result of the competition and cooperation carried out in the f"-layer.

In the f"-layer, in cases where the degrees of coincidence in color between the regions 81, 82, 83 and the flesh color are equal to one another, a region is selected which best conforms to the shape and the size of the synaptic weights pattern 80. For example, in cases where the shape and the size of the positive weight portion of the synaptic weights pattern 80 approximately coincide with the shape and the size of the region 81, the regions 82 and 83 are erased during the competition and the cooperation, and only the region 81 is selected.

Figure 43:
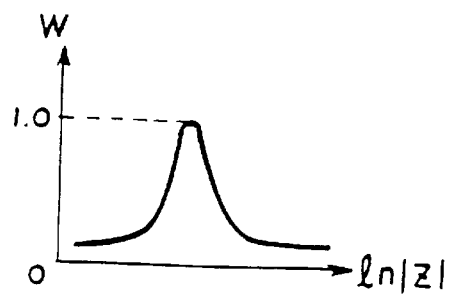
FIG. 43 is a graph showing an example of weighting of an output of a neuron.

Also, in the f"-layer, in cases where the degrees of coincidence in color between the regions 81, 82, 83 and the flesh color are equal to one another and the shapes and the sizes of these regions approximately coincide with one another, weights shown in FIG. 43 are given to the neurons of the f"-layer. Specifically, weights W are applied such that the weight of connection from a neuron, which falls in an area of approximately 30% to 40% of the radius of the view window, may be largest. By such application of the weights, of the regions 81, 82, and 83 located at the positions shown in FIG. 42, only the region 81 that is closest to the area of the largest weight is selected.

How a vector for the travel of the view window is determined from components of the firing region of the group of neurons exhibiting a high degree of coincidence in color with the candidate for the predetermined object image, which region has been selected in the manner described above, will be described hereinbelow.

Figure 44:
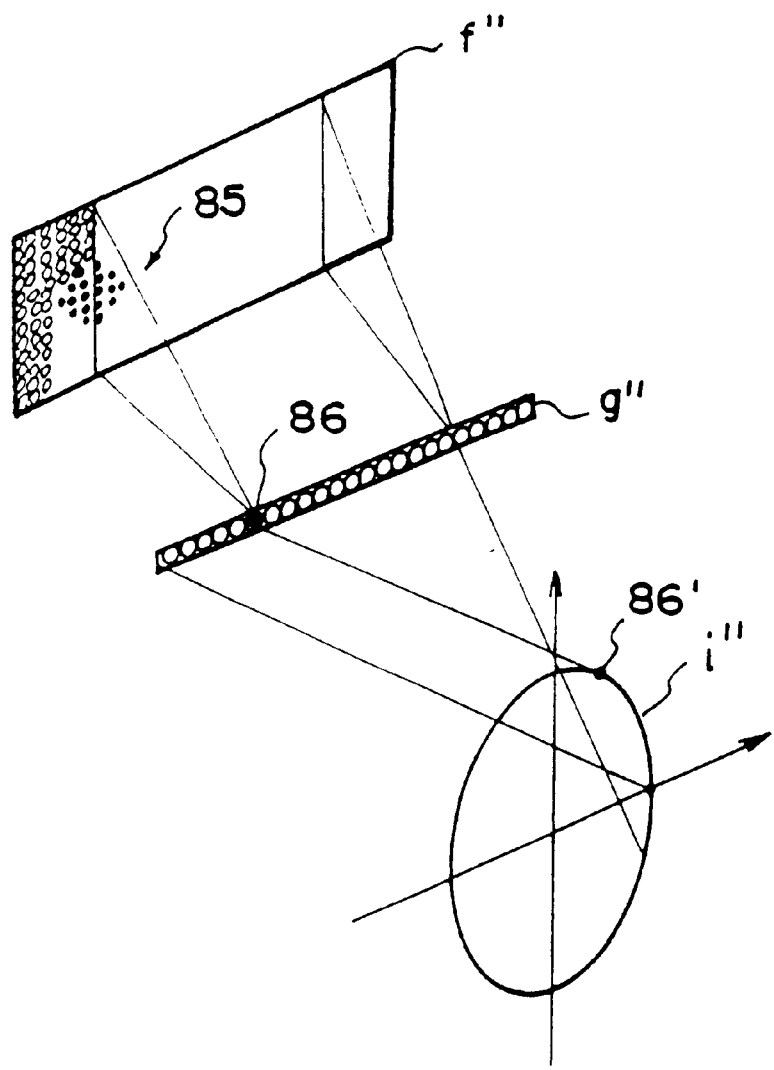
FIG. 44 is an explanatory view showing an e"-layer, a g"-layer, and an i"-layer of the neural network shown in FIG. 39, which is employed in the first embodiment of the first step of the method for recognizing an object image in accordance with the present invention.

FIG. 44 is an explanatory view showing in more detail the f"-layer, the g"-layer, and the i"-layer of the neural network shown in FIG. 39, which is employed in this embodiment.

As illustrated in FIG. 44, the respective layers are connected to one another through synaptic connections. The f"-layer has the neurons arrayed two-dimensionally. The distribution of excited neurons in the f"-layer corresponds to the components of the region, which has a high degree of coincidence in color and has the shape and the size most appropriate for the candidate for the predetermined object image. This region has been selected by the interactive synaptic connections in the f"-layer.

In order for an azimuth vector to be detected, excitatory signals are transmitted from the f"-layer to the g"-layer. The g"-layer is constituted of one-dimensionally arrayed neurons and is connected to the f"-layer through synaptic connections so as to receive the signals from the group of neurons, which are present in the same azimuth in the f"-layer. As a result, in the g"-layer, a neuron 86, which corresponds to the azimuth and the distance of the group of the neurons 85, is excited. The azimuth of the neuron 86 and the intensity of its excitation represent the azimuth and the distance.

Thereafter, in the i"-layer, a vector is composed from the azimuth and the distance, which have been detected by the g"-layer in the manner described above, and the vector for the travel of the view window is thereby determined. The composition of the vector for the travel of the view window may be carried out in the polar coordinates system or in the Cartesian plane. In FIG. 44, the vector for the travel of the view window is composed in the Cartesian plane. The excitatory signal coming from the neuron 86 is transformed inversely to the complex-log mapping and transmitted to the i"-layer. In the i"-layer, the center of gravity of each azimuth vector is found and is fed out as the vector for the travel of the view window.

In cases where the vector for the travel of the view window is to be determined with a neural network in which the aforesaid competition and the aforesaid cooperation are not carried out, it often occurs that a plurality of vectors are detected. In such cases, the weights shown in FIG. 43, i.e., the weights according to the distance from the center point of the view window, may be applied to the neurons of the f"-layer such that a single vector for the travel of the view window may be selected.

Also, in cases where the competition and the cooperation are carried out and a plurality of vectors are detected, the weights shown in FIG. 43 may be applied to the neurons of the f"-layer such that a single vector for the travel of the view window may be selected. In this manner, even if a plurality of vectors for the travel of the view window are detected, the vector for the travel of the view window towards the most appropriate candidate for the predetermined object image can be detected. In cases where only a single vector for the travel of the view window could be detected, if the distance between the view window and the candidate for the predetermined object image is large, the magnitude of the vector for the travel of the view window becomes small.

How the view window travels towards the candidate for the predetermined object image in accordance with the vector for the travel of the view window, which has been determined from the color of the candidate for the predetermined object image in the manner described above, will be described hereinbelow.

Figure 45:
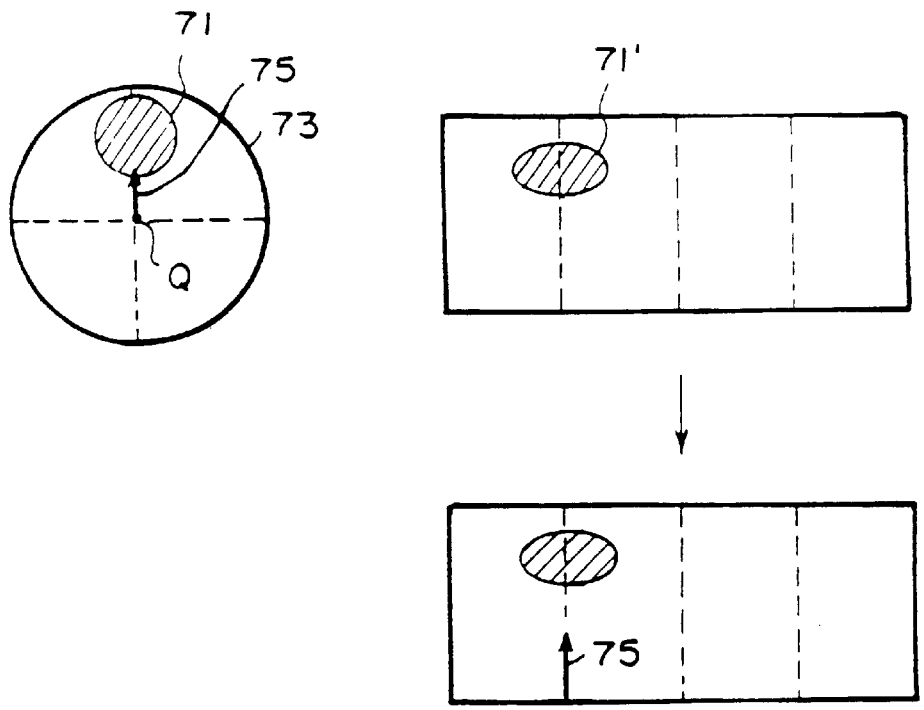
FIG. 45 is a first explanatory view showing complex-log mapped planes and a corresponding Cartesian plane as an aid in explaining how a view window travels to the center point of a candidate for a predetermined object image.
Figure 46:
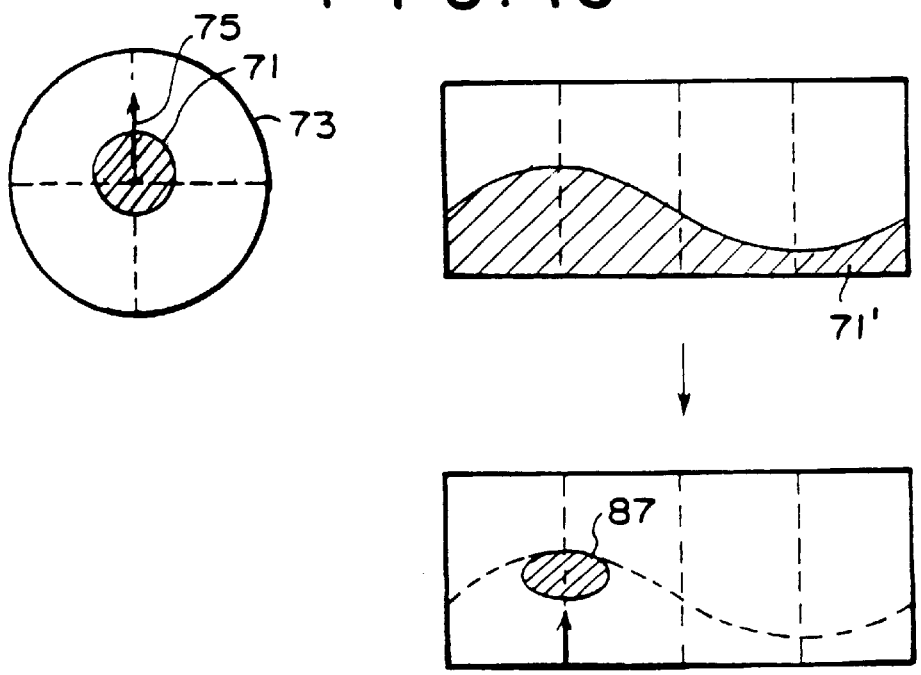
FIG. 46 is a second explanatory view showing complex-log mapped planes and a corresponding Cartesian plane as an aid in explaining how a view window travels to the center point of a candidate for a predetermined object image.
Figure 47:
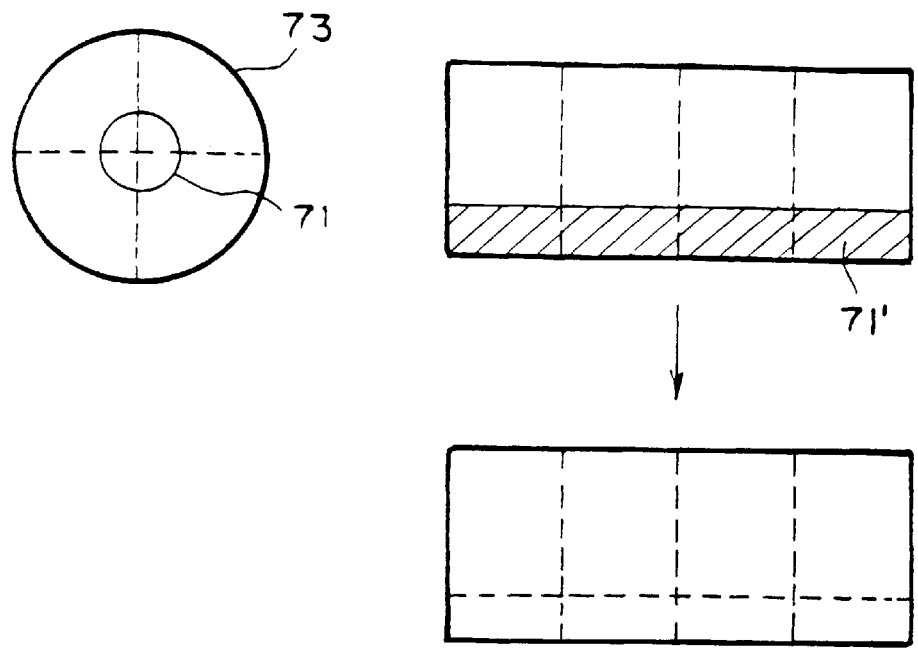
FIG. 47 is a third explanatory view showing complex-log mapped planes and a corresponding Cartesian plane as an aid in explaining how a view window travels to the center point of a candidate for a predetermined object image.

FIGS. 45, 46, and 47 are explanatory views showing complex-log mapped planes and corresponding Cartesian planes as an aid in explaining how the center point of a view window travels from the side outward from a candidate for a predetermined object image to the side inward from the candidate for the predetermined object image.

As illustrated in FIG. 45, in cases where a candidate 71 for the predetermined object image does not include the center point Q of a view window 73, the candidate 71 for the predetermined object image is transformed as a single mass with the complex-log mapping and is detected as a region, which has a high degree of coincidence in color with the candidate for the predetermined object image, in the complex-log mapped plane shown in FIG. 45. In the f"-layer, which is an interactive connection circuitry layer for competition and cooperation, an operation for narrowing a candidate 71' for the predetermined object image down is carried out. As a result, a single candidate region or a plurality of candidate regions, which exhibit a high degree of coincidence in color with the candidate for the predetermined object image and have an appropriate size, are selected. (In this embodiment, a single such candidate region is selected.) Thereafter, a vector is composed from the azimuth and the distance of the selected region , and a vector 75 for the travel of the view window 73 is thereby obtained. The vector 75 for the travel of the view window 73 is directed to the candidate 71 for the predetermined object image. Therefore, when the view window 73 is moved in accordance with the magnitude of the vector 75 for the travel of the view window 73, the center point Q of the view window 73 can approach the candidate 71 for the predetermined object image.

As illustrated in FIG. 46, the center point Q of the view window 73 and the candidate 71 for the predetermined object image are brought to positions which are comparatively close to each other, and the whole candidate 71 for the predetermined object image comes into the region inside of the view window 73. In such cases, the complex-log mapped candidate 71' for the predetermined object image is detected as a region, which extends in every azimuth and which has a high degree of coincidence in color with the candidate for the predetermined object image. In this state, the candidate 71' for the predetermined object image is narrowed down by the interactive connection circuitry for competition and cooperation. During the operation for narrowing the candidate 71' for the predetermined object image down, regions of the same candidate extending in all azimuths inhibit one another. As a result, only the group of neurons corresponding to the azimuths, in which the distance between the outer edge of the candidate 71' for the predetermined object image and the center point Q of the view window 73 is largest, can be excited. A region 87, which includes this group of neurons, is detected. Thereafter, the azimuth and the distance are detected from the azimuth and the intensity of excitation of the detected region 87. In this manner, a vector 75 for the travel of the view window 73 is obtained. The vector 75 for the travel of the view window 73 is directed to the center point of the candidate 71 for the predetermined object image. Therefore, when the view window 73 is moved in accordance with the magnitude of the vector 75 for the travel of the view window 73, the center point Q of the view window 73 can even further approach the candidate 71 for the predetermined object image.

Finally, as illustrated in FIG. 47, the center point Q of the view window 73 and the candidate 71 for the predetermined object image are brought to approximately the same position. In such cases, the complex-log mapped candidate 71' for the predetermined object image is detected as a region, which extends uniformly in every azimuth and which approximately coincides in color with the candidate for the predetermined object image. In this state, the candidate 71' for the predetermined object image is narrowed down by the interactive connection circuitry for competition and cooperation. During the operation for narrowing the candidate 71' for the predetermined object image down, regions of the same candidate extending uniformly in all azimuths compete with and inhibit one another. As a result, no region can be excited. Therefore, the magnitude and the distance detected next become zero. Also, the magnitude of the vector for the travel of the view window 73 becomes zero. In this case, during the operation for moving the view window 73 in accordance with the magnitude of the vector for the travel of the view window, the travel of the center point Q of the view window 73 stops at the center point of the candidate 71 for the predetermined object image.

The neural network employed in this embodiment iterates the operations described above and ultimately moves the center point of the view window to the center point of the candidate for the predetermined object image.

In the manner described above, the three types of the vectors for the travel of the view window are obtained from the neural network, wherein the vector for the travel of the view window is calculated from the movement of the candidate for the predetermined object image, the neural network, wherein the vector for the travel of the view window is calculated from the contour line of the candidate for the predetermined object image, and the neural network, wherein the vector for the travel of the view window is calculated from the color of the candidate for the predetermined object image. Thereafter, these three types of the vectors for the travel of the view window are combined with one another in a manner suitable for the candidate for the predetermined object image, which is to be found. In this manner, an ultimate vector for the travel of the view window is determined. The view window is caused to travel towards the candidate for the predetermined object image in accordance with the ultimately determined vector for the travel of the view window.

The neural network employed in this embodiment iterates the operations described above and ultimately moves the center point of the view window to the center point of the candidate for the predetermined object image. In the processing unit 4 for judgment as to the stop state of the view window, when the center point of the view window coincides with the center point of the candidate for the predetermined object image, the candidate for the predetermined object image is cut out (i.e., extracted). The information representing the candidate for the predetermined object image, which has thus been extracted, is fed into a judgment means.

In the method for recognizing an object image in accordance with the present invention, the candidate for the predetermined object image can be cut out regardless of the size of the candidate for the predetermined object image and the positions of feature parts included in the candidate for the predetermined object image. However, such a way of cutting out the candidate for the predetermined object image results in a heavy burden to the next judgment step. Therefore, when a candidate for the predetermined object image is to be cut out, it should preferably be normalized such that the size of every candidate for the predetermined object image may become approximately the same and positions of feature parts may be approximately the same among the candidates for the predetermined object image. In this manner, burden to the judgment means, which makes a judgment as to what the candidate for the predetermined object image is, can be reduced. Also, the time required for the operation can be kept short.

Also, in the embodiment described above, the size of the view window may be changed in accordance with the size of the object, i.e., the candidate for the predetermined object image. For example, the position of the contour line extending in the annular direction, which line has been detected in the aforesaid e1-layer, with respect to the radial direction in the complex-log mapped plane may be detected. In this manner, the distance between the center point of the view window and the contour line of the candidate for the predetermined object image may be detected. Thereafter, the size of the view window may be changed in accordance with the detected distance.

Figure 48:
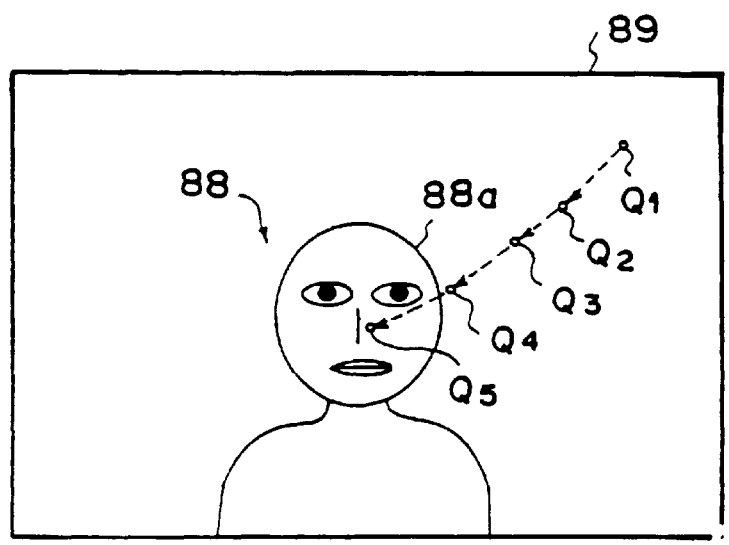
FIG. 48 is an explanatory view showing how the center point of a view window travels on an image, in which a human image is embedded.

By way of example, as illustrated in FIG. 48, in cases where a human body image 88 is to be extracted from an image 89, in which the human body image 88 is embedded, the center point of the view window is first located at a point Q1. Thereafter, the center point of the view window travels through points Q2, Q3, and Q4 towards the human body image 88. The center point of the view window then stops at a center point Q5 of a face pattern 88a of the human body image 88. The face pattern 88a is normalized and extracted by the processing unit 4 for judgment as to the stop state of the view window. The information representing the extracted face pattern 88a is fed into the judgment means. In such cases, the term "normalization of a face pattern 88a" means the process, with which the face patterns having various shapes (e.g., patterns of large faces, small faces, and long faces) are converted into circular face patterns having approximately the same size by compression or enlargement such that the positions of eye and mouth patterns serving as feature parts of the face patterns may become approximately the same among various face patterns.

How the candidate for the predetermined object image is normalized will be described hereinbelow.

In cases where importance is attached to the f1-layer of the neural network shown in FIG. 4, the candidate for the predetermined object image is normalized in the manner described below. In this case, the viewpoint travels to and stops at the center point of the candidate for the predetermined object image. In cases where the center point of the view window traveled to the center point of a human face image serving as the candidate for the predetermined object image, as indicated at the right parts of FIGS. 49A and 49B, with the complex-log mapping, the contour lines of a small face image 170 and the large face image 171 are transformed into straight lines 170' and 171', which are located respectively at distances R1 and R2 from the center point of the view window. Normalization is carried out by rendering the distances R1 and R2 approximately equal to each other. For these purposes, the process described below is carried out.

Figure 50:
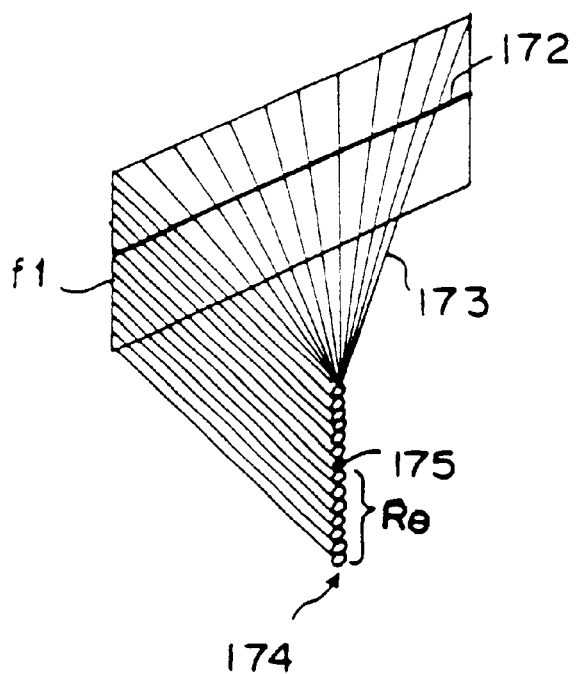
FIG. 50 is an explanatory view showing how a candidate for a predetermined object image is normalized in an embodiment of the method for recognizing an object image in accordance with the present invention.

FIG. 50 is an explanatory view showing how the normalization is carried out in this embodiment.

As illustrated in FIG. 50, in cases where the center point of the view window travels to the center point of the circular human face image, neurons 172 of the f1-layer of the neural network are excited which are located in the annular direction at approximately equal distances from the center point of the view window. Along each of the rows of the array of the neurons of the f1-layer, which rows regularly stand side by side in the radial direction, the outputs of the neurons arrayed in the annular direction are added to one another by synaptic connections 173. As a result, of the neurons 174 representing the sums of the additions, only the neuron 175, which is located at a distance Rθ from the center point of the view window generates an output. The distance Rθ represents the distance from the center point of the human face image to the contour line. The distance Rθ is transformed inversely to the complex-log mapping into a distance $ln^{-1}Rθ$. An expansion and contraction factor k (=L/Rθ) is then found, with which the distance $ln^{-1}Rθ$ having been obtained from the transformation inverse to the complex-log mapping can be normalized to a predetermined value L. When the human face image, which serves as the candidate for the predetermined object image, is extracted in the Cartesian plane, the extraction is carried out such that human face images having different sizes may become approximately the same size in accordance with the expansion and contraction factor k.

Figure 51:
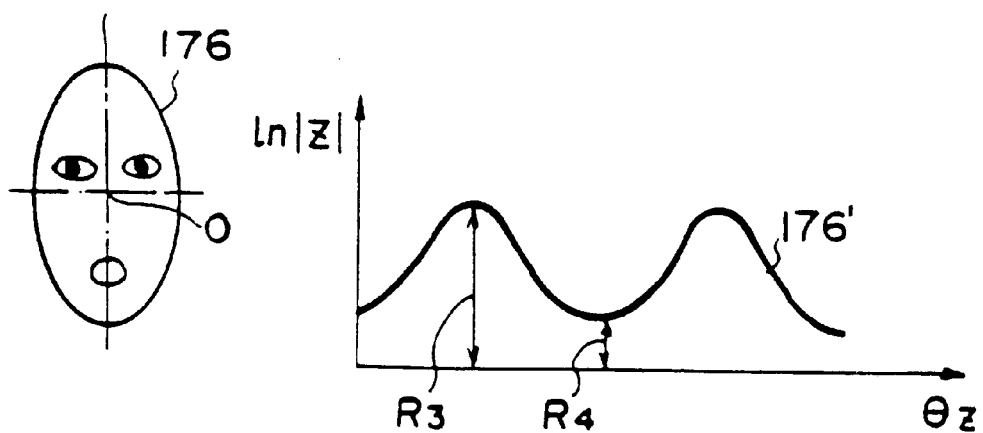
FIG. 51 is an explanatory view showing the results of transformation of a long face image with the complex-log mapping.

The shape of a human face varies for different persons. As illustrated in FIG. 51, when the center point O of the view window traveled to the center point of a long elliptic face image 176, the contour line of the long face image 176 is transformed with the complex-log mapping into a curve 176'. The distance between the center point of the view window and the curve 176' varies in accordance with the angle with respect to the annular direction (in this example, the maximum value is R3, and the minimum value is R4). In such cases, an expansion and contraction factor k (=L/Rθ), with which the distance $ln^{-1}Rθ$ having been obtained from the transformation inverse to the complex-log mapping can be normalized to the predetermined value L, is found for each angle with respect to the annular direction. When the long face image 176 is extracted in the Cartesian plane, the extraction is carried out such that human face images having different shapes and sizes may become approximately the same shape and approximately the same size in accordance with the expansion and contraction factor k for each angle.

How the normalization is carried out in cases where an importance is attached to the output of the f2-layer will be described hereinbelow. As illustrated in FIG. 52A, in this case, the center point O of a view window 178 travels to and stops at a point of intersection T of contour lines of a candidate 177 for a predetermined object image. The point of intersection T of the contour lines constitute a portion of the candidate 177 for the predetermined object image. In order to extract such a portion, information concerning the size of the entire candidate 177 for the predetermined object image is required. Therefore, in the processing unit 4 for judgment as to the stop state of the view window, the balance of the output composition is temporarily changed such that importance may be attached to the output of the f1-layer, and a vector for the travel of the view window towards the center point of the candidate for the predetermined object image 177 is determined. Also, searching of the center point of the candidate for the predetermined object image 177 is begun.

At this time, the center point O of the view window is already at a portion of the contour lines of the candidate 177 for the predetermined object image. Therefore, if the candidate 177 for the predetermined object image has a size such that it is completely accommodated in the view window 178, the center point of the candidate 177 for the predetermined object image can be found reliably with the searching.

However, as shown in FIG. 52A, if the size of the candidate 177 for the predetermined object image is larger than the size of the view window 178, a signal representing the vector for the travel of the view window towards the center point of the candidate for the predetermined object image 177 cannot be obtained. Whether the signal representing the vector for the travel of the view window is or is not accurately obtained can be known by investigating the states of excitation of the neurons of the e1-layer. Specifically, as illustrated in FIG. 52A, in cases where no neuron is excited above a predetermined threshold value in the e1-layer, it is judged that the entire candidate 177 for the predetermined object image is larger than the view window 178. In such cases, a signal for enlarging the region of the image of the outer world, which image is cut out by the a-layer, i.e., the view window 178, may be fed into the a-layer such that the entire candidate 177 for the predetermined object image can be found in the region inside of the view window 178. As illustrated in FIG. 52B, in cases where the entire candidate 177 for the predetermined object image comes into the region inside of an enlarged view window 178', the neurons of the e1-layer are excited, and a correct vector for the travel of the view window towards the center point of the whole candidate 177 for the predetermined object image is obtained. In this manner, as shown in FIG. 52C, the neural network can cause the center point O of the view window 178' to travel towards the center point of the candidate 177 for the predetermined object image.

Thereafter, in the same manner as that described above, the size R5 of the candidate 177 for the predetermined object image is calculated from the distance between the center point O of the view window 178' and the contour line extending in the annular direction. Thereafter, as illustrated in FIG. 52D, the center point O of the view window is returned to the point of intersection T of the contour lines, which point was found previously. A region, which has its center point at the point of intersection T of the contour lines and has a predetermined size ratio to the size of the entire candidate 177 for the predetermined object image, (in this example, the region having a radius of $k \cdot ln^{-1}R5$, where k represents the expansion and contraction factor) is extracted.

In the manner described above, the face image, which serves as the candidate for the predetermined object image, is normalized and extracted. The signal representing the candidate for the predetermined object image is fed into the judgment means for judging whether the candidate for the predetermined object image is or is not the predetermined object image.

How a judgment is made in the second step of the method for recognizing an object image in accordance with the present invention as to whether a candidate for the predetermined object image is or is not the predetermined object image will be described hereinbelow. In this embodiment, by way of example, a face image is taken as the predetermined object image, and a judgment is made as to whether a candidate for the predetermined object image, which has been extracted, is or is not the face image.

Figure 53:
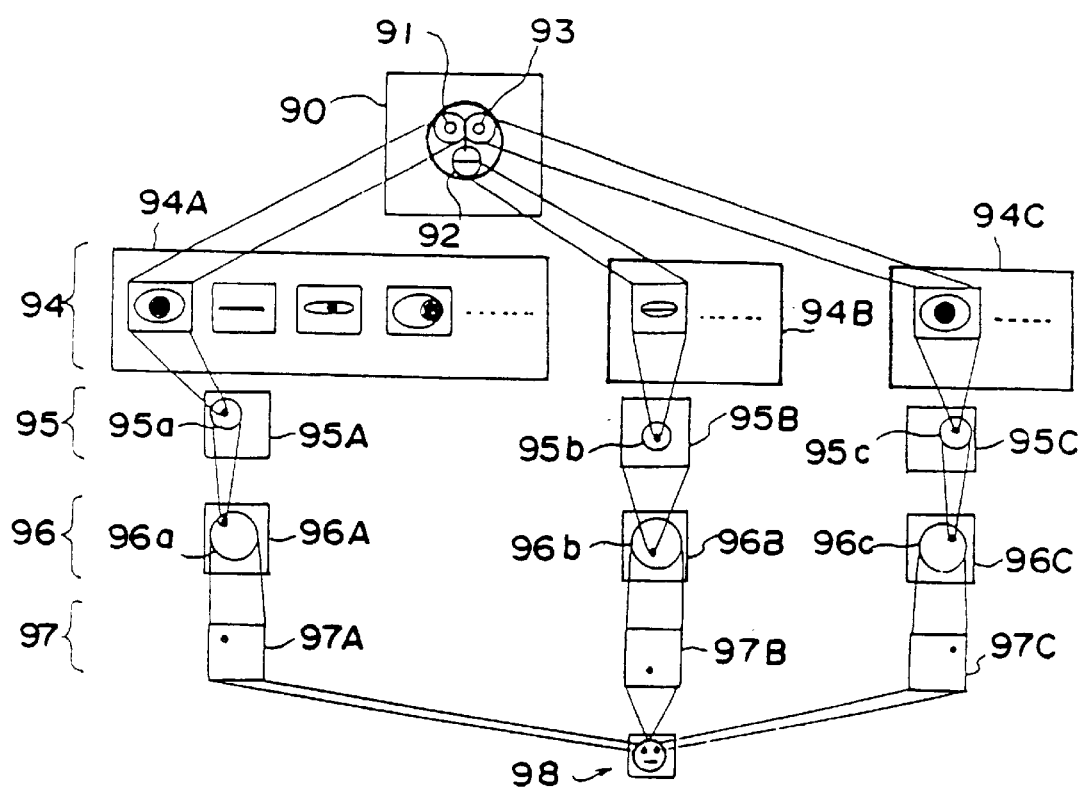
FIG. 53 is an explanatory view showing an example of a neural network for making a judgment in an embodiment of the second step of the method for recognizing an object image in accordance with the present invention as to whether a candidate for a predetermined object image is or is not the predetermined object image.

FIG. 53 is an explanatory view showing an example of a neural network for making a judgment in an embodiment of the second step of the method for recognizing an object image in accordance with the present invention as to whether a candidate for the predetermined object image is or is not the predetermined object image. In this embodiment, the neural network employs a neocognitron, which is unaffected by a shift in position, in order to make a judgment from feature parts of a candidate for the predetermined object image and the positions of the feature parts in the candidate for the predetermined object image as to whether the candidate for the predetermined object image is or is not the predetermined object image.

In this embodiment, an image of a human face is employed as the predetermined object image. Also, a right eye pattern, a left eye pattern, and a mouth pattern are employed as a plurality of feature parts of the predetermined object image. Learning operations for the right eye pattern, the left eye pattern, and the mouth pattern are carried out with Kohonen's self-organization. The neocognitron is employed as the structure of the whole system.

The neocognitron employed in this embodiment is constituted of three layers, i.e., a Us1-layer 95, a Uc1-layer 96, and a Us2-layer 98 which is the final output layer. An a1-mask 94 is located before the Us1-layer 95. In this embodiment, operations of the a1-mask 94 for learning a plurality of patterns have been carried out with the Kohonen's self-organization with respect to a right eye pattern 91, a mouth pattern 92, and a left eye pattern 93, which are the feature parts of the face image. Therefore, judgments can be made as to various face images. Also, an a2-mask 97 is located before the Us2-layer 98 in order to investigate the positions of the right eye pattern 91, the mouth pattern 92, and the left eye pattern 93, which constitute the feature parts of a candidate 90 for the given face image. A judgment is thereby made as to whether the candidate 90 for the predetermined object image is or is not the face image.

How the learning operations of the a1-mask 94 are carried out with the Kohonen's self-organization will be described hereinbelow. As an aid in facilitating the explanation, the learning operations are described below only for a closed eye pattern and an open eye pattern.

When a closed eye pattern 100 and an open eye pattern 101 as illustrated in FIG. 54 are given to the a1-mask 94 one after the other, elements (cells) which best match with the closed eye pattern 100 and the open eye pattern 101 are found from the elements (cells) constituting the a1-mask 94. Thereafter, the degrees of matching between the best-matching elements (cells) and their topological neighbors (cells) are increased. In this manner, the closed eye pattern 100 and the open eye pattern 101 are allocated to the cells in the topological relationship. However, as illustrated in FIG. 55, if the closed eye pattern 100 and the open eye pattern 101 are allocated to the cells in this manner, cells, which are located between the cells allocated with the closed eye pattern 100 and the cells allocated with the open eye pattern 101, will learn an eye pattern 102 which results from the superposition of the closed eye pattern 100 and the open eye pattern 101. In order for such a problem to be eliminated, as illustrated in FIG. 56, when the cells which best match with the closed eye pattern 100 and the open eye pattern 101 are found from the cells constituting the a1-mask 94, and the degrees of matching between the best-matching cells and their topological neighbors are then increased, a pattern, which is intermediate between the closed eye pattern 100 and the open eye pattern 101, i.e., a half-open eye pattern 103, is allocated to the cells which are learning the superposed eye pattern 102.

In the manner described above, by the application of the closed eye pattern 100 and the open eye pattern 101 as the inputs, the a1-mask 94 can learn the half-open eye pattern 103 while its topological relationship is being kept. Also, the learning operations can be carried out in the same manner as that described above also for the mouth and left eye patterns. Additionally, by suitable selection of image patterns given during the learning operations, the learning operations can be carried out appropriately in accordance with a change in the facial expression and a change in the orientation of a face image. For example, a change in the facial expression can be learned by presenting typical eye and mouth patterns. A change in the orientation of a face image can be learned by presenting frontal and lateral face images. Also, a face image of a different person can be learned by presenting a typical face image. (In such cases, how to select typical feature patterns should be studied.) By the carrying out of the self-organization, flexibility can be given at the stage of the learning operations to the feature patterns which are used for the judgment.

How the respective layers of the neocognitron neural network employed in this embodiment work will be described hereinbelow. First, a part 94A of the a1-mask 94, which has learned right eye patterns, carries out the convolution (i.e., matching with the patterns learned with the Kohonen's self-organization) for the right eye pattern 91 in order to investigate whether the right eye pattern 91 is or is not present in the candidate 90 for the face image, which is given as a candidate for the predetermined object image. The part 94A of the a1-mask 94 has learned various right eye patterns, such as a closed right eye pattern, an open right eye pattern, and a half-open right eye pattern. Also, a part 94B of the a1-mask 94 has learned various mouth patterns, and a part 94C of the a1-mask 94 has learned various left eye patterns, such that judgments can be made for various face images. When the convolution carried out on the candidate 90 for the face image by the a1-mask 94 reveals that the right eye pattern 91 is present in the candidate 90 for the face image, a part 95a corresponding to the right eye pattern in cells 95A, which correspond to the right eye pattern 91 and which are contained in the Us1-layer 95, makes a response. Also, when it is found that the mouth pattern 92 is present in the candidate 90 for the face image, a part 95b corresponding to the mouth pattern in cells 95B, which correspond to the mouth pattern 92 and which are contained in the Us1-layer 95, makes a response. Additionally, when it is found that the left eye pattern 93 is present in the candidate 90 for the face image, a part 95c corresponding to the left eye pattern in cells 95C, which correspond to the left eye pattern 93 and which are contained in the Us1-layer 95, makes a response. When the parts 95a, 95b, and 95c of the cells 95A, 95B, and 95C of the Us1-layer 95 make responses in the manner described above, response outputs, which represent that the right eye pattern, the mouth pattern, and the left eye pattern are present in the candidate 90 for the face image, are fed from the Us1-layer 95 into the Uc1-layer 96.

The Uc1-layer 96 has synaptic connections such that, if at least a single responding cell is present in the part 95a, 95b, or 95c of the cells 95A, 95B, or 95C of the Us1-layer 95, the cells 96A, 96B, or 96C, which correspond respectively to the right eye pattern 91, the mouth pattern 92, or the left eye pattern 93, may generate an output. Specifically, as for the right eye pattern, when the part 95a of the cells 95A of the Us1-layer 95, which serves as the input layer, makes a response to the right eye pattern, the cells 96A, which correspond to the right eye pattern and which are contained in the Uc1-layer 96, generates a response output. The response output is generated from a region 96a of the cells 96A, which region is larger than the region of the part 95*a* of the cells 95A of the Us1-layer 95. Also, as for the mouth pattern and the left eye pattern, response outputs are generated in the same manner as that for the right eye pattern. Therefore, the response outputs are not much affected by a shift in the position of the input pattern.

The response outputs of the Uc1-layer 96 are fed into the a2-mask 97 and then into the Us2-layer 98 which serves as the final output layer. The a2-mask 97 is constituted of a mask 97A for a right eye pattern, a mask 97B for a mouth pattern, and a mask 97C for a left eye pattern. The masks 97A, 97B, and 97C carry out the convolution on the outputs from the corresponding cells 96A, 96B, and 96C of the Uc1-layer 96 while the relationship among the positions of the right eye pattern, the mouth pattern, and the left eye pattern is being adjusted. The a2-mask 97 connects the Uc1-layer 96 and the Us2-layer 98 with each other through synaptic connections such that the Us2-layer 98 may respond only when the right eye pattern, the mouth pattern, and the left eye pattern are located at the same positions as those in a human face. Also, the a2-mask 97 not only investigates the condition that the right eye pattern, the mouth pattern, and the left eye pattern are detected by the Uc1-layer 96 but also confirms the condition that no other features are detected by the Uc1-layer 96. Therefore, the Us2-layer 98 responds only when the right eye pattern, the mouth pattern, and the left eye pattern are detected at the predetermined positions by the Uc1-layer 96. As a result of the response of the Us2-layer 98, it is judged that the candidate 90 for the face image is the human face image. Conversely, when the right eye pattern, the mouth pattern, and the left eye pattern are not detected by the Uc1-layer 96, or when the right eye pattern, the mouth pattern, and the left eye pattern are detected at positions different from the predetermined positions by the Uc1-layer 96, the Us2-layer 98 makes no response, and therefore it is judged that the candidate 90 for the face image is not the human face image.

In the embodiment described above, the judgment as to whether the candidate for the predetermined object image is or is not the predetermined object image is carried out with the neocognitron in accordance with feature parts of the candidate for the predetermined object image and the positions of the feature parts. The neural network for this purpose is not limited to the neocognitron, and may be constituted of a cognitron or a perceptron. Also, a neural network need not necessarily be employed for making a judgment, and any of other processes may be employed for this purpose.

Also, in the embodiment described above, the learning operations for feature patterns are carried out by utilizing the Kohonen's self-organization as the neural network. Alternatively, the learning operations for feature patterns may be carried out by utilizing any of other neural networks. As another alternative, any of learning means other than the neural network may be employed.

Additionally, in the embodiment described above, the method for recognizing an object image in accordance with the present invention is used to recognize a human face image. However, the method for recognizing an object image in accordance with the present invention is applicable also when any of other object images is recognized. In such cases, if a neural network is utilized to make a judgment, and the learning operations are carried out in a manner suitable for the object image to be recognized, a judgment as to whether a candidate for the predetermined object image is or is not the predetermined object image can be made efficiently as in recognition of a human face image.

Furthermore, in the aforesaid embodiment, the extraction of the candidate for the predetermined object image in the first step of the method for recognizing an object image in accordance with the present invention is carried out with the neural network by moving the center point of the view window having the predetermined size to the position of the candidate for the predetermined object image and determining the extraction area in accordance with the size and/or the shape of the candidate for the predetermined object image, the center point of the view window being taken as a reference during the determination of the extraction area. Alternatively, a candidate for the predetermined object image may be extracted by creating a map of a potential field of the whole image and determining the extraction area in accordance with the size and/or the shape of the candidate for the predetermined object image, a minimum point of the potential in the map being taken as a reference during the determination of the extraction area.

As described above, the potential field represents the field of a point, at which a viewpoint of human eyes is stable. When the potential field is considered with respect to the aforesaid neural network for extracting the candidate for the predetermined object image, the potential field can be regarded as the field of a point, at which the center point of the view window is stable. Specifically, the potential field can be regarded as being flat at the center point of the candidate for the predetermined object image, at which point the center point of the view window is stable. Also, the potential field can be regarded as being gradient at a point, at which the center point of the view window is unstable and from which the view window is required to travel. In such cases, the thing that expresses the gradient of the potential field is the direction of the vector for the travel of the view window, which vector is employed in the aforesaid neural network for the extraction. Therefore, the map of the potential field of the image can be created by scanning the whole area of the given image with the view window of the aforesaid neural network and recording the vectors for the travel of the view window, which vectors are found at respective points in the image, on the image as gradient vectors of the potential field.

FIG. 57 is an explanatory view showing a map of a potential field created by using the vectors for the travel of the view window, which have been found in the manner described above, as gradient vectors of the potential field and recording the gradient vectors of the potential field on the image.

With reference to FIG. 57, an elliptic image 105, a triangular image 106, and a square image 107 are embedded in an image 104. Gradient vectors of the potential field over the whole image 104 are calculated with the aforesaid neural network and are recorded at respective positions in the image 104, which correspond to the positions at which the gradient vectors of the potential field have been found. In this manner, a map of the potential field is obtained. In FIG. 57, the gradient vectors of the potential field are directed to center points P1, P2, and P3 of the elliptic image 105, the triangular image 106, and the square image 107. When the directions of the gradient vectors of the potential field are regarded as the gradients of the potential field, minimum points of the potential field can be found at the center points P1, P2, and P3 of the elliptic image 105, the triangular image 106, and the square image 107.

Figure 58:
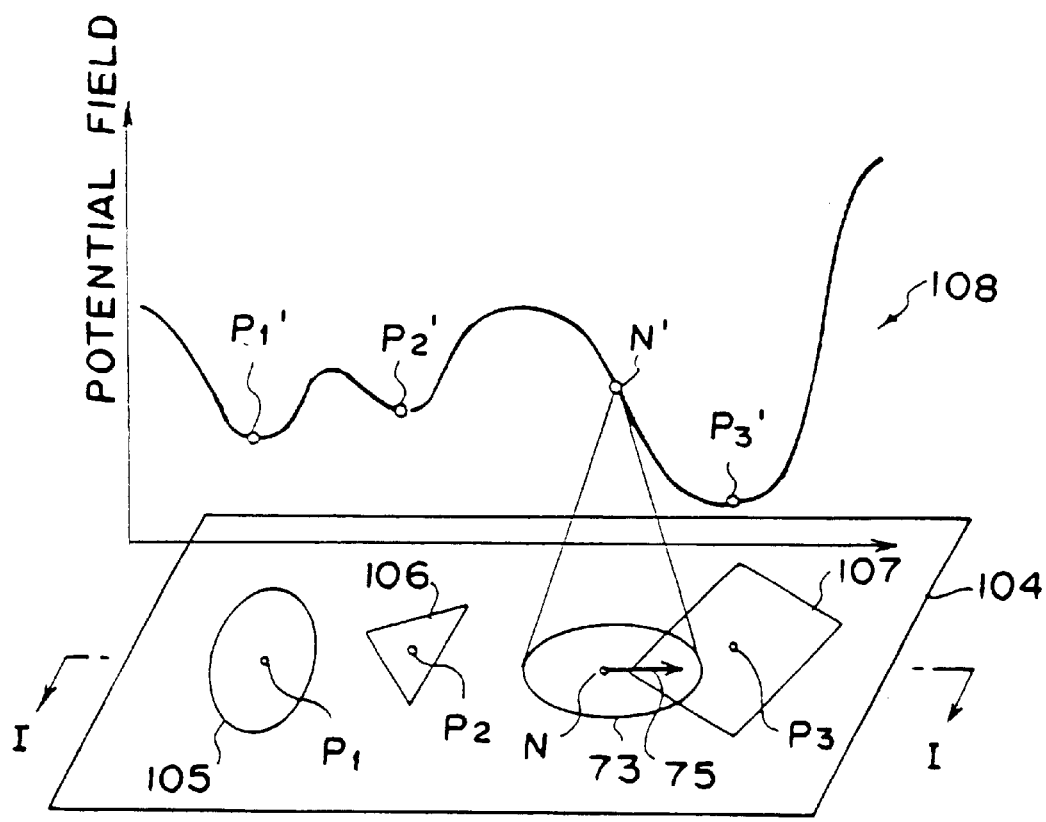
FIG. 58 is an explanatory view showing gradients of a potential field.

FIG. 58 is a graph showing the gradients of the potential field. In FIG. 58, the image 104 shown in FIG. 57 is scanned with a view window 73, and a gradient vector 75 of the potential field at a center point N of the view window 73 is being directed to the center point P3 of the square image 107.

A graph 108 at the upper part of FIG. 58 is a two-dimensional graph of the potential field obtained by finding the gradients of the potential field in the manner described above and taking a cross-section of the potential field along the line I—I of the image 104.

The graph 108 has three minimum points P1', P2', and P3', which correspond respectively to the center point P1 of the elliptic image 105, the center point P2 of the triangular image 106, and the center point P3 of the square image 107. Also, a point N' in the graph 108 corresponds to the center point N of the view window on the image 104. In this manner, the minimum points of the potential field can be found by calculating the gradients of the potential field of the whole image 104 and creating the map of the potential field. Candidates for the predetermined object images are then extracted in accordance with the sizes and/or the shapes of the candidates for the predetermined object images by taking the minimum points of the potential field as references. In this manner, the extraction of the candidates for the predetermined object images can be carried out very efficiently.

A second embodiment of the first step for extracting a candidate for a predetermined object image in the method for recognizing an object image in accordance with the present invention will be described hereinbelow.

With the second embodiment of the first step for extracting a candidate for a predetermined object image in the method for recognizing an object image in accordance with the present invention, in the embodiment wherein the vector for the travel of the view window is calculated from the movement of the candidate for the predetermined object image, the extracted contour lines of the candidate for the predetermined object image, which candidate shows a movement different from the movement of the background, are not subjected to transformation with the complex-log mapping, and a vector for the travel of the view window is determined by using a neural network having a Cartesian plane-like neuron arrangement. Also, in the embodiments wherein the vectors for the travel of the view window are calculated from the contour line of the candidate for the predetermined object image and from the color of the candidate for the predetermined object image, the image at the time t, which image has been cut out and which falls within the region inside of the view window having the predetermined size, is not subjected to transformation with the complex-log mapping, and a vector for the travel of the view window is determined by using a neural network having a Cartesian plane-like neuron arrangement.

FIG. 59 is an explanatory view showing an example of a neural network for extracting a candidate for a predetermined object image by moving the center point of a view window to the center point of the candidate for the predetermined object image in the second embodiment of the first step in the method for recognizing an object image in accordance with the present invention. First, a neural network will be described hereinbelow which fetches an image falling within the region inside of the view window in order to calculate a vector for the travel of the view window from the contour lines of the candidate for the predetermined object image, which shows a movement different from the movement of the background, the lines being found in the embodiment for calculating the vector for the travel of the view window from the movement of the candidate for the predetermined object image, or from the contour line of the candidate for the predetermined object image. The neural network employed in the second embodiment of the first step in the method for recognizing an object image in accordance with the present invention is constituted of a plurality of neuron layers. Specifically, the neural network is constituted of an input layer 120 for cutting out an image part, which falls within the region inside of a view window having a predetermined size, from a given image 110. (In cases where a vector for the travel of the view window is calculated from the movement of the candidate for the predetermined object image, the signal representing the image 42 shown in FIG. 36, which represents the contour lines of the candidate for the predetermined object image showing a movement different from the movement of the background, is fed into the input layer 120.) The neural network is also constituted of a contour line detecting layer 121 for detecting circular arc-like contour lines of a candidate for a predetermined object image from the image, which has been cut out (or which has been fed into the input layer 120), and a contour line detecting layer 121' for detecting radial contour lines of the candidate for the predetermined object image from the image, which has been cut out. The neural network is additionally constituted of an end point detecting layer 122 for detecting the end points of the radial contour lines, an interactive connection layer 123 for selecting a continuous circular arc-like contour line, and an interactive connection layer 123' for selecting a continuous-radial contour line. The neural network is further constituted of a tilted component extracting layer 124 for extracting all of contour line components, which are tilted at a predetermined angle with respect to circumferential directions of concentric circles surrounding the center point of the view window, from the circular arc-like contour line, which has been selected, and a tilted component extracting layer 124' for extracting all of contour line components, which are tilted at a predetermined angle with respect to circumferential directions of concentric circles surrounding the center point of the view window, from the radial contour line, which has been selected. The neural network is also constituted of an azimuth vector detecting layer 125 for detecting the azimuths and intensities, which represent azimuth vectors of the candidate for the predetermined object image with respect to the circumferential directions of the concentric circles surrounding the center point of the view window, from the tilted components of the circular arc-like contour line, which have been extracted, and an azimuth vector detecting layer 125' for detecting the azimuths and intensities, which represent azimuth vectors of the candidate for the predetermined object image with respect to the circumferential directions of the concentric circles surrounding the center point of the view window, from the tilted components of the radial contour line, which have been extracted. The neural network is additionally constituted of an azimuth vector composing layer 126 for composing an azimuth vector from the detected azimuths and intensities of the components of the circular arc-like contour line, and an azimuth vector composing layer 126' for composing an azimuth vector from the detected azimuths and intensities of the components of the radial contour line. The neural network further has a travel vector output layer 127 for determining a vector for the travel of the view window from the azimuth vectors which have been composed. Specifically, the input layer 120 corresponds to the a- or a'-layer of the neural network shown in FIG. 4 or FIG. 37 for determining the vector for the travel of the view window in the complex-log mapped plane. Also, the contour line detecting layers 121 and 121' correspond respectively to the c1- or c1'-layer and the c2- or c2'-layer of the neural network shown in FIG. 4 or FIG. 37. Additionally, the end point detecting layer 122 corresponds to the d- or d'-layer of the neural network shown in FIG. 4 or FIG. 37. Further, the interactive connection layers 123 and 123' correspond respectively to the e1- or e1'-layer and the e2- or e2'-layer of the neural network shown in FIG. 4 or FIG. 37. Also, the tilted component extracting layers 124 and 124' correspond respectively to the f1- or f1'-layer and the f2- or f2'-layer of the neural network shown in FIG. 4 or FIG. 37. Additionally, the azimuth vector detecting layers 125 and 125' correspond respectively to the g1- or g1'- layer and the g2- or g2'-layer of the neural network shown in FIG. 4 or FIG. 37. Further, the azimuth vector composing layers 126 and 126' correspond respectively to the h1- or h1'-layer and the h2-or h2'-layer of the neural network shown in FIG. 4 or FIG. 37, and the travel vector output layer 127 corresponds to the i- or i'-layer of the neural network shown in FIG. 4 or FIG. 37.

First, in the input layer 120, part of an image falling in the region inside of the view window having a predetermined size is cut out and fetched from the outer world. (Alternatively, the signal representing the image 42 shown in FIG. 36 is fed into the input layer 120.) Information representing the image fetched by the input layer 120 is fed into the contour line detecting layers 121 and 121', which detect circular arc-like contour lines and radial contour lines. In cases where a candidate for the predetermined object image is blocked by a different body located on the foreground side, end points of the radial contour lines occur at the boundary between the candidate for the predetermined object image and the different body located on the foreground side. In the end point detecting layer 122, such end points of the radial contour lines are extracted from the pattern received from the contour line detecting layer 121', in which the radial contour lines have been extracted. Thereafter, in the interactive connection layers 123 and 123', a continuous circular arc-like contour line and a continuous radial contour line are selected. In the tilted component extracting layers 124 and 124', all of the contour line components, which are tilted at a predetermined angle with respect to the circumferential directions of the concentric circles surrounding the center point of the view window, are extracted from the contour lines, which have been-selected.

Figures 60A, 60B:
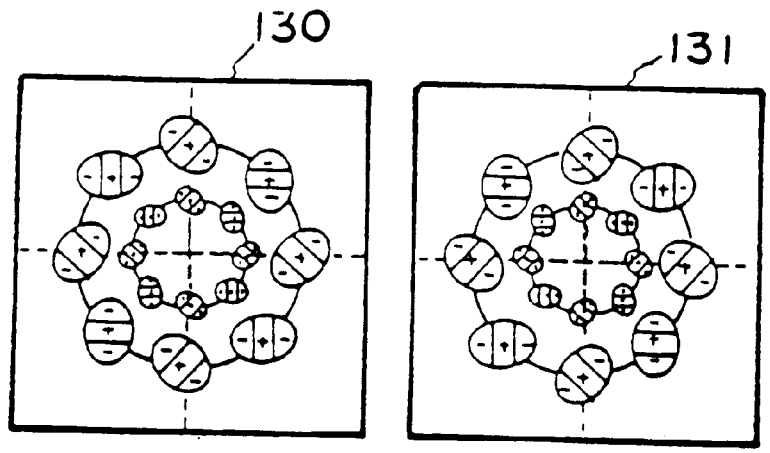
FIGS. 60A and 60B are explanatory views showing weights of synaptic connections between layers of the neural network, which is employed in the second embodiment of the first step in the method for recognizing an object image in accordance with the present invention.
Figures 61A, 61B:
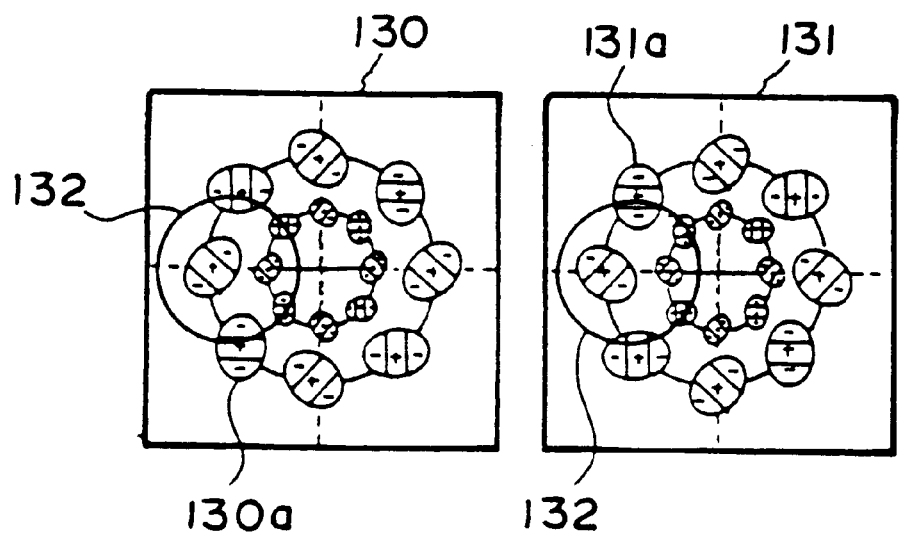
FIGS. 61A and 61B are explanatory views showing how a difference in position between the center point of a view window and a candidate for a predetermined object image is detected in the second embodiment of the first step in the method for recognizing an object image in accordance with the present invention.

The weights of the synaptic connections from the interactive connection layer 123 to the tilted component extracting layer 124 are designed such that the synaptic weights in tilted component extracting layers 124a and 124b may be distributed in the patterns shown in FIGS. 60A and 60B. A group of synaptic weights patterns 130 for detecting a contour line shown in FIG. 60A are tilted upwards to the right at predetermined angles +α and −α with respect to the circumferential directions of a group of concentric circles, which surround the center point of the view window. Also, a group of synaptic weights patterns 131 for detecting a contour line shown in FIG. 60B are tilted upwards to the left at predetermined angles +α and −α with respect to the circumferential directions of a group of concentric circles, which surround the center point of the view window. The group of the synaptic weights patterns 130 for detecting a contour line and the group of the synaptic weights patterns 131 for detecting a contour line have sizes such that the range of the connections may become narrower at a region closer to the center point of the view window. The group of the synaptic weights patterns 130 for detecting a contour line and the group of the synaptic weights patterns 131 for detecting a contour line detect the components of the circular arc-like contour line of the candidate for the predetermined object image, which are tilted at the predetermined angle with respect to the directions along the circumferences around the center point of the view window. For example, in cases where a circular candidate 132 for the predetermined object image is present at the position shown in FIG. 61A or FIG. 61B, of the components of the contour line of the candidate 132 for the predetermined object image, which line has been selected by the interactive connection layer 123, the component tilted upwards to the right is detected by a synaptic weights pattern 130a contained in the group of the synaptic weights patterns 130 for detecting a contour line. Also, the component tilted upwards to the left is detected by a synaptic weights pattern 131a contained in the group of the synaptic weights patterns 131 for detecting a contour line. From the azimuths and the intensities of the tilted components which have thus been detected, the azimuth and the intensity of the component tilted upwards to the right are detected in an azimuth vector detecting layer 125a. Also, the azimuth and the intensity of the components tilted upwards to the left are detected in an azimuth vector detecting layer 125b. Thereafter, in the azimuth vector composing layer 126, an azimuth vector is composed from the azimuths and the intensities, which have been detected by the azimuth vector detecting layers 125a and 125b. Information representing the azimuth vector, which has thus been composed, is transmitted to the travel vector output layer 127 and fed out as the information representing the vector for the travel of the view window.

Figures 62A, 62B:
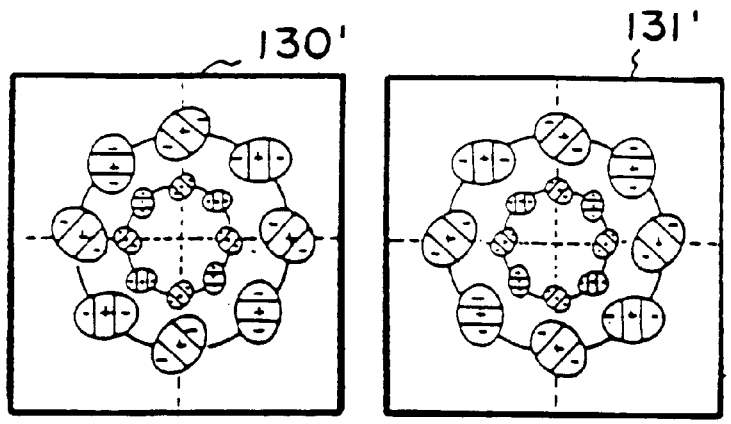
FIGS. 62A and 62B are explanatory views showing weights of synaptic connections between layers of the neural network, which is employed for causing the center point of a view window to travel towards a point of intersection of contour lines of a candidate for a predetermined object image in the second embodiment of the first step in the method for recognizing an object image in accordance with the present invention.
Figures 63A, 63B:
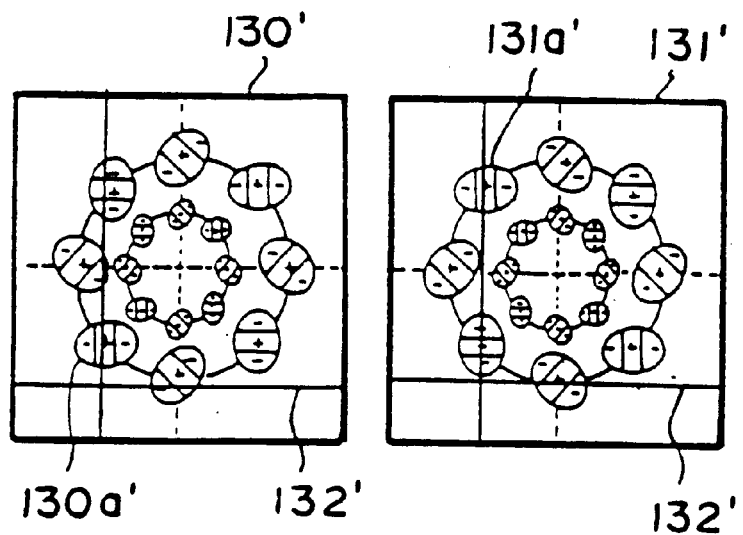
FIGS. 63A and 63B are explanatory views showing how a difference in position between the center point of a view window and a candidate for a predetermined object image is detected by causing the center point of the view window to travel towards a point of intersection of contour lines of the candidate for the predetermined object image in the second embodiment of the first step in the method for recognizing an object image in accordance with the present invention.

The weights of the synaptic connections from the interactive connection layer 123' to the tilted component extracting layer 124' are designed such that the synaptic weights in tilted component extracting layers 124a' and 124b' may be distributed in the patterns shown in FIGS. 62A and 62B. A group of synaptic weights patterns 130' for detecting a contour line shown in FIG. 62A are tilted upwards to the left at predetermined angles +α' and −α' with respect to the circumferential directions of a group of concentric circles, which surround the center point of the view window. Also, a group of synaptic weights patterns 131' for detecting a contour line shown in FIG. 62B are tilted upwards to the right at predetermined angles +α' and −α' with respect to the circumferential directions of a group of concentric circles, which surround the center point of the view window. The group of the synaptic weights patterns 130' for detecting a contour line and the group of the synaptic weights patterns 131' for detecting a contour line have sizes such that the range of the connections may become narrower at a region closer to the center point of the view window. The group of the synaptic weights patterns 130' for detecting a contour line and the group of the synaptic weights patterns 131' for detecting a contour line detect the components of the radial contour line of the candidate for the predetermined object image, which are tilted at the predetermined angle with respect to the directions along the circumferences around the center point of the view window. For example, in cases where a point of intersection of contour lines of a candidate 132' for the predetermined object image is present at the position shown in FIG. 63A or FIG. 63B, of the components of the contour lines of the candidate 132' for the predetermined object image, which lines have been selected by the interactive connection layer 123', the component tilted upwards to the left is detected by a synaptic weights pattern 130a' contained in the group of the synaptic weights patterns 130' for detecting a contour line. Also, the component tilted upwards to the right is detected by a synaptic weights pattern 131a' contained in the group of the synaptic weights patterns 131' for detecting a contour line. Of the azimuths and the intensities of the tilted components which have thus been detected, the azimuth and the intensity of the component tilted upwards to the left are detected in an azimuth vector detecting layer 125a'. Also, the azimuth and the intensity of the component tilted upwards to the right are detected in an azimuth vector detecting layer 125b'. Thereafter, in the azimuth vector composing layer 126', an azimuth vector is composed from the azimuths and the intensities, which have been detected by the azimuth vector detecting layers 125a' and 125b'. Information representing the azimuth vector, which has thus been composed, is transmitted to the travel vector output layer 127 and fed out as the information representing the vector for the travel of the view window.

The vectors for the travel of the view window, which have been composed in the azimuth vector composing layers 126 and 126', will be different from each other, depending on the circumstances under which the center point of the view window is placed. However, as in the aforesaid first embodiment of the first step of the method for recognizing an object image in accordance with the present invention, when the outputs representing the two types of the vectors for the travel of the view window are utilized in a well-balanced manner in the travel vector output layer 127, the view window can be moved to a predetermined position regardless of the circumstances under which the center point of the view window is placed.

At the same time as when the vector for the travel of the view window is calculated from the movement of the candidate for the predetermined object image and the vector for the travel of the view window is calculated from the contour line of the candidate for the predetermined object image, a vector for the travel of the view window is also calculated from the color of the candidate for the predetermined object image.

Figure 64:
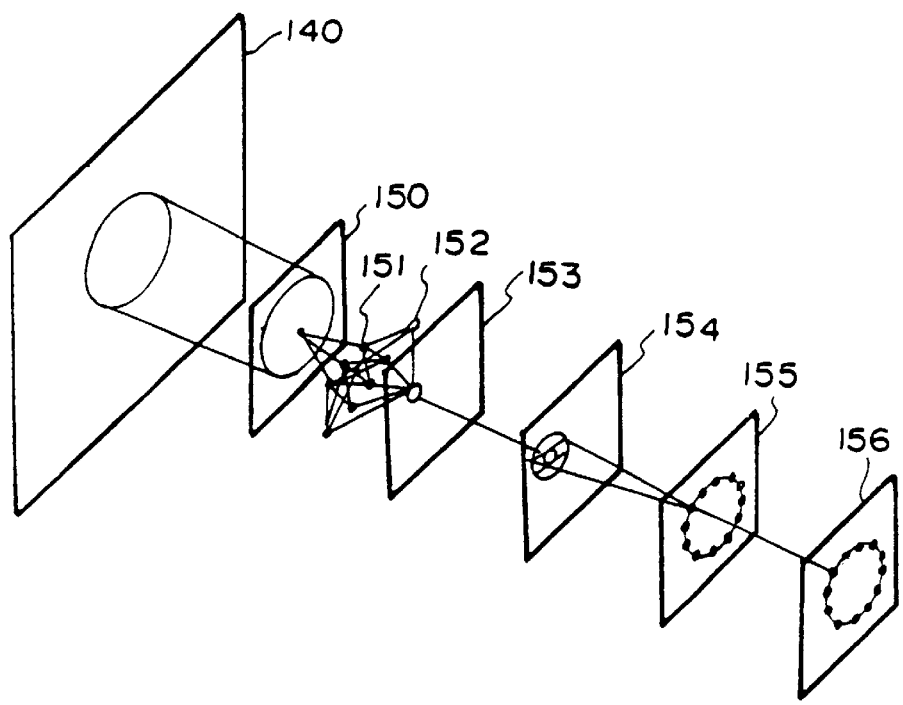
FIG. 64 is an explanatory view showing an example of a neural network for extracting a candidate for a predetermined object image by causing the center point of a view window to travel towards the center point of the candidate for the predetermined object image in the second embodiment of the first step in the method for recognizing an object image in accordance with the present invention.

FIG. 64 is an explanatory view showing an example of a neural network for extracting a candidate for a predetermined object image by moving the center point of a view window to the center point of the candidate for the predetermined object image in this embodiment of the first step in the method for recognizing an object image in accordance with the present invention. The neural network shown in FIG. 64 is constituted of a plurality of neuron layers. Specifically, the neural network is constituted of an input layer 150 for cutting out an image part, which falls within the region of a view window having a predetermined size, from a given image 140. The neural network is also constituted of layers 151, 152, and 153 for detecting regions approximately coinciding in color with the candidate for the predetermined object image in the cut-out image, and an interactive connection layer 154 for selecting a color region having a predetermined size and a predetermined intensity. The neural network is additionally constituted of an azimuth vector detecting layer 155 for detecting the azimuth and the distance of the selected color region, and a travel vector output layer 156 for composing a vector from the detected azimuth and the detected distance and generating an output representing a vector for the travel of the view window.

Specifically, the input layer 150 corresponds to the a"-layer of the neural network shown in FIG. 39 for determining the vector for the travel of the view window in the complex-log mapped plane. Also, the layers 151, 152, and 153 correspond to the c", d"-, and e"-layers of the neural network shown in FIG. 39. Additionally, the interactive connection layer 154 corresponds to the f"-layer of the neural network shown in FIG. 39. Further, the azimuth vector detecting layer 155 corresponds to the g"-layer of the neural network shown in FIG. 39. Also, the travel vector output layer 156 corresponds to the i"-layer of the neural network shown in FIG. 39.

First, in the input layer 150, part of an image falling in the region inside of the view window having a predetermined size is cut out and fetched from the outer world. Information representing the image fetched by the input layer 150 is fed into the layers 151, 152, and 153, which detect regions approximately coinciding in color with the candidate for the predetermined object image. By the layers 151, 152, and 153, the regions approximately coinciding in color with the candidate for the predetermined object image are detected, and the degrees of coincidence in color between the detected regions and the candidate for the predetermined object image are detected. Thereafter, in the interactive connection layer 154, groups of neurons falling within the regions having high degrees of coincidence in color with the candidate for the predetermined object image are selected. Thereafter, a group of the neurons falling within the region, which has the shape and the size most appropriate for the candidate for the predetermined object image, are extracted from the selected groups of the neurons falling within the regions having high degrees of coincidence in color with the candidate for the predetermined object image.

Figure 65:
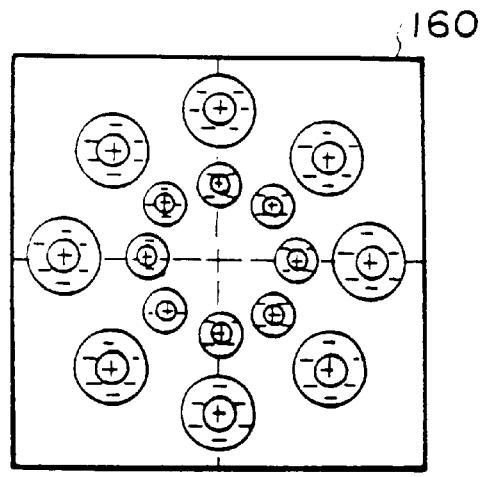
FIG. 65 is an explanatory view showing weights of synaptic connections in a layer of the neural network, which is employed for causing the center point of a view window to travel towards a region approximately coinciding in color with a candidate for a predetermined object image in the second embodiment of the first step in the method for recognizing an object image in accordance with the present invention.

In the interactive connection layer 154, the weights of the interactive synaptic connections for selecting the color region having a predetermined size and a predetermined intensity are set as shown in FIG. 65. As illustrated in FIG. 65, a group of synaptic weights patterns 160 for detecting a group of the neurons exhibiting a high degree of coincidence in color with the candidate for the predetermined object image are set such that the range of the connections may become narrower at a region closer to the center point of the view window. With the group of the synaptic weights patterns 160, a group of the neurons exhibiting a high degree of coincidence in color with the candidate for the predetermined object image are detected. Thereafter, information representing the azimuth and the distance, which have been detected by the azimuth vector detecting layer 155, is transmitted to the travel vector output layer 156 and fed out as the information representing the vector for the travel of the view window.

In the manner described above, the three types of the vectors for the travel of the view window are obtained from the neural network, wherein the vector for the travel of the view window is calculated from the contour-line of the candidate for the predetermined object image, the neural network, wherein the vector for the travel of the view window is calculated from the movement of the candidate for the predetermined object image, and the neural network, wherein the vector for the travel of the view window is calculated from the color of the candidate for the predetermined object image. Thereafter, these three types of the vectors for the travel of the view window are combined with one another in a manner suitable for the candidate for the predetermined object image, which is to be found. In this manner, an ultimate vector for the travel of the view window is determined. The view window is caused to travel towards the candidate for the predetermined object image in accordance with the ultimately determined vector for the travel of the view window.

The view window is caused to travel in the manner described above, and the center point of the view window reaches the center point of the candidate for the predetermined object image. Thereafter, as in the aforesaid embodiment of the first step of the method for recognizing an object image in accordance with the present invention, the candidate for the predetermined object image is normalized and cut out. Information representing the cut-out candidate for the predetermined object image is fed into the judgment means. The judgment means makes a judgment as to whether the candidate for the predetermined object image is or is not the predetermined object image.

The vectors for the travel of the view window, which have been determined in the embodiment of the first step in the method in accordance with the present invention, wherein the vector for the travel of the view window is determined in the Cartesian plane, may be expressed as gradient vectors of a potential field, and a map of the potential field of the image may thus be created. Extraction of the candidate for the predetermined object image may be carried out by utilizing the potential field map.

In the aforesaid embodiments of the method for recognizing an object image in accordance with the present invention, a candidate for the predetermined object image is extracted, and then a judgment is made as to whether the extracted candidate for the predetermined object image is or is not the predetermined object image. Alternatively, after a candidate for the predetermined object image has been extracted, the extracted candidate for the predetermined object image may be taken as a target object and utilized during the learning operations of the neural network.

Figure 66:
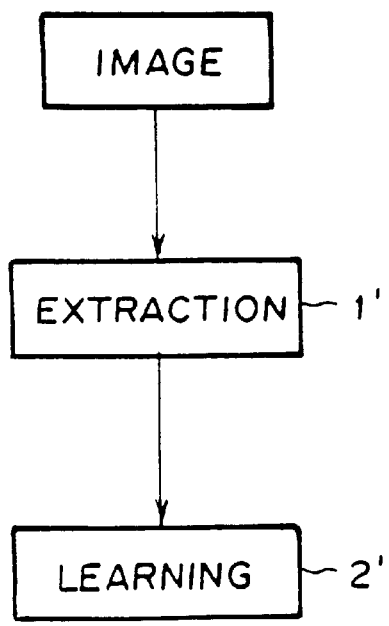
FIG. 66 is a block diagram showing the fundamental concept behind the learning method for a neural network in accordance with the present invention.

FIG. 66 is a block diagram showing the fundamental concept behind the learning method for a neural network in accordance with the present invention. First, in a first step 1', a target object image for learning operations is extracted from a given image. Thereafter, in a second step 2', learning operations of the neural network are carried out with respect to the target object image, which has been extracted in the first step 1'.

The aforesaid neural network, which is utilized in the judgment step in the method for recognizing an object image in accordance with the present invention, may be taken as an example of the neural network, the learning operations of which are carried out in the second step 2'. Specifically, as illustrated in FIG. 53, the neural network, the learning operations of which are carried out with the learning method for a neural network in accordance with the present invention, employs the aforesaid neocognitron, which is unaffected by a shift in position. The learning operations are carried out in accordance with feature parts of the object image and the positions of the feature parts in the object image. The neural network employed in this embodiment is constituted of three layers, i.e., the Us1-layer 95, the Uc1-layer 96, and the Us2-layer 98 which is the final output layer. The a1-mask 94 is located before the Us1-layer 95. In this embodiment, operations of parts 94A, 94B, and 94C of the a1-mask 94 are carried out for learning a plurality of patterns with respect to the right eye pattern 91, the mouth pattern 92, and the left eye pattern 93, by utilizing the feature parts of the face image, which have been extracted in the first step 1'. As a result, operations for leaning various face images can be carried out. Also, the a2-mask 97 is located before the Us2-layer 98. With the a2-mask 97, operations for learning the positions of the right eye pattern 91, the mouth pattern 92, and the left eye pattern 93, which constitute the feature parts of a given object image 90, are carried out.

The first step 1' of the learning method for a neural network in accordance with the present invention is the same as the step of the method for recognizing an object image in accordance with the present invention, in which step a candidate for the predetermined object image is extracted.

In the first step 1' of this embodiment, human face images as well as eye and mouth patterns, which constitute the feature parts of human face images, are extracted from images in which various human face images are embedded. The extracted eye and mouth patterns vary for different human face images. For example, the extracted eye patterns include closed eye patterns, open eye patterns, and half-open eye patterns. Also, the extracted mouth patterns include open mouth patterns and closed mouth patterns. With the a1-mask 94 of the neocognitron shown in FIG. 53, the learning operations can be carried by classifying these feature parts and effecting the self-organization. Specifically, the learning operations with the self-organization are carried out with the part 94A of the a1-mask 94 for the right eye patterns, with the part 94B for the mouth patterns, and with the part 94C for the left eye patterns. Also, with the a2-mask 97, the learning operations are carried out with respect to the relationship between the positions of the eye and mouth patterns in the whole face images. During the learning operations, in cases where the feature parts, which have been extracted in the first step 1' of this embodiment, are of the type-included in the classification, information about the new feature parts can be added to the already existing information with respect to the classification. In this manner, a better neural network can be built up. In cases where the feature parts, which have been extracted in the first step 1' of this embodiment, are not of the type included in the classification, new parts for the feature parts are created in the a1-mask 94. In this manner, an a1-mask 94 having more finely classified parts can be obtained. In this manner, the learning operations of the neural network can be carried out easily and efficiently, and the performance of the neural network can thereby be improved even further.

As explained above with reference to the method for recognizing an object image in accordance with the present invention, the neural network, the learning operations of which have been carried out in the manner described above, can be utilized to make a judgment as to whether a candidate for the predetermined object image is or is not the predetermined object image.

With the aforesaid embodiment of the learning method for a neural network in accordance with the present invention, the neural network carries out its learning operations by itself with respect to the feature parts of human face images by effecting the self-organization. Alternatively, the extraction of the feature parts may be carried out automatically, and the learning operations may be carried out by manually teaching what the feature parts are to the neural network.

In the aforesaid embodiments of the method for recognizing an object image and the learning method for a neural network in accordance with the present invention, neural networks are used to extract the candidate for the predetermined object image or the target object image (hereinafter referred to as the candidate for the predetermined object image, or the like). The neural networks need not necessarily be employed, and any of other techniques may be utilized for this purpose.

In the aforesaid embodiment, wherein the vector for the travel of the view window is calculated from the movement of the candidate for the predetermined object image, or the like, the vertical or horizontal movement of the image is detected in the Cartesian plane. Also, the movement in the radial or in-plane rotating direction is detected after the image is transformed with the complex-log mapping. However, transformation with the complex-log mapping need not necessarily be carried out during the detection of the image movement, and the image movement may be detected in the Cartesian plane. Also, the vertical or horizontal movement of the image may be detected after the image is transformed with the complex-log mapping. Additionally, in the aforesaid embodiment, wherein the vector for the travel of the view window is calculated from the movement of the candidate for the predetermined object image, or the like, the three types of image movements in the vertical or horizontal direction, in the radial direction, and in the in-plane rotating direction are detected. In cases where the image movement is constant (e.g., when the image moves only in the vertical or horizontal direction), only one type of movement (e.g., only the vertical or horizontal movement) may be detected.

Also, in the aforesaid embodiments of the method for recognizing an object image and the learning method for a neural network in accordance with the present invention, neural networks are utilized for all steps from the cutting out of the image part falling within the region inside of the view window to the travel of the view window. However, the neural networks need not necessarily be utilized for all steps, and a neural network may be used in at least one step during the extraction of the candidate for the predetermined object image, or the like. Also, the cutting out of the candidate for the predetermined object image, or the like, may be carried out by using a neural network.

Additionally, in the aforesaid embodiments of the method for recognizing an object image and the learning method for a neural network in accordance with the present invention, the neocognitron is utilized as the neural network, which carries out recognition in the method for recognizing an object image in accordance with the present invention, and as the neural network, the learning operations of which are carried out with the learning method for a neural network in accordance with the present invention. The neural network used for these purposes is not limited to the neocognitron, and the cognitron or the perceptron may be employed for these purposes.

Further, in the aforesaid embodiments of the method for recognizing an object image and the learning method for a neural network in accordance with the present invention, the human face image or the yacht image is extracted in the extraction step. The method for recognizing an object image and the learning method for a neural network in accordance with the present invention are also applicable when other types of predetermined object images are extracted. In such cases, any object image can be extracted efficiently in the same manner as that in the extraction of the human face image or the yacht image by using a neural network during the extraction and carrying out the learning operations of the neural network in a manner suitable for the object image to be extracted.

In the aforesaid embodiment of the learning method for a neural network in accordance with the present invention, the learning operations are carried out for the neural network for recognizing an object image by making a judgment as to whether the object image is or is not a human face image. The learning method for a neural network in accordance with the present invention is also applicable when other target object images are recognized. In such cases, the learning operations of the neural network can be carried out efficiently in the same manner as that in the case of the neural network, which recognizes the human face image, by using a neural network during the extraction of the target object image and carrying out the learning operations of the neural network in a manner suitable for the object image to be recognized.

Also, in the aforesaid embodiment of the learning method for a neural network in accordance with the present invention, the learning operations are carried out for the neural network for recognizing an object image by making a judgment as to whether the object image is or is not a human face image. However, the neural network, the learning operations of which are carried out, is not limited to the neural network for making a judgment, and may be, for example, a neural network for recognizing what a given object image is. In such cases, the learning operations can be carried out efficiently in the same manner as that in the neural network, which makes a judgment, by extracting an object image, which matches the object image to be recognized, from a given image, and carrying out the learning operations of the neural network with respect to the extracted object image.

Additionally, the extraction step in the method for recognizing an object image and the learning method for a neural network in accordance with the present invention is applicable not only when a candidate for the predetermined object image, or the like, is extracted from a still image, in which a human face image, or the like, is embedded, but also when a moving candidate for the predetermined object image, or the like, is followed up. In such cases, the view window may be caused to travel as in the aforesaid embodiment of the extraction of the candidate for the predetermined object image, or the like, and the moving candidate for the predetermined object image, or the like may thereby be followed up. Thereafter, the candidate for the predetermined object image, or the like, may be extracted, and a judgment may be made as to whether the moving candidate for the predetermined object image, or the like, is or is not the predetermined object image.

Further, in the aforesaid embodiments of the method for recognizing an object image and the learning method for a neural network in accordance with the present invention, the ultimate vector for the travel of the view window is determined by composing the three types of the vectors for the travel of the view window, which have been calculated from the three types of features, i.e., the movement, the contour line, and the color of the candidate for the predetermined object image, or the like. Alternatively, the vector for the travel of the view window may be determined from the contour line and the color of the candidate for the predetermined object image, or the like. As another alternative, the vector for the travel of the view window may be determined from the movement and the contour line of the candidate for the predetermined object image, or the like. As a further alternative, the vector for the travel of the view window may be determined from the movement and the color of the candidate for the predetermined object image, or the like. As a final alternative, the vector for the travel of the view window may be determined from only one of the movement, the contour line, and the color of the candidate for the predetermined object image, or the like.

An embodiment of the method for discriminating an image in accordance with the present invention will be described hereinbelow. In this embodiment, a face image is taken as the predetermined image.

Figure 68:
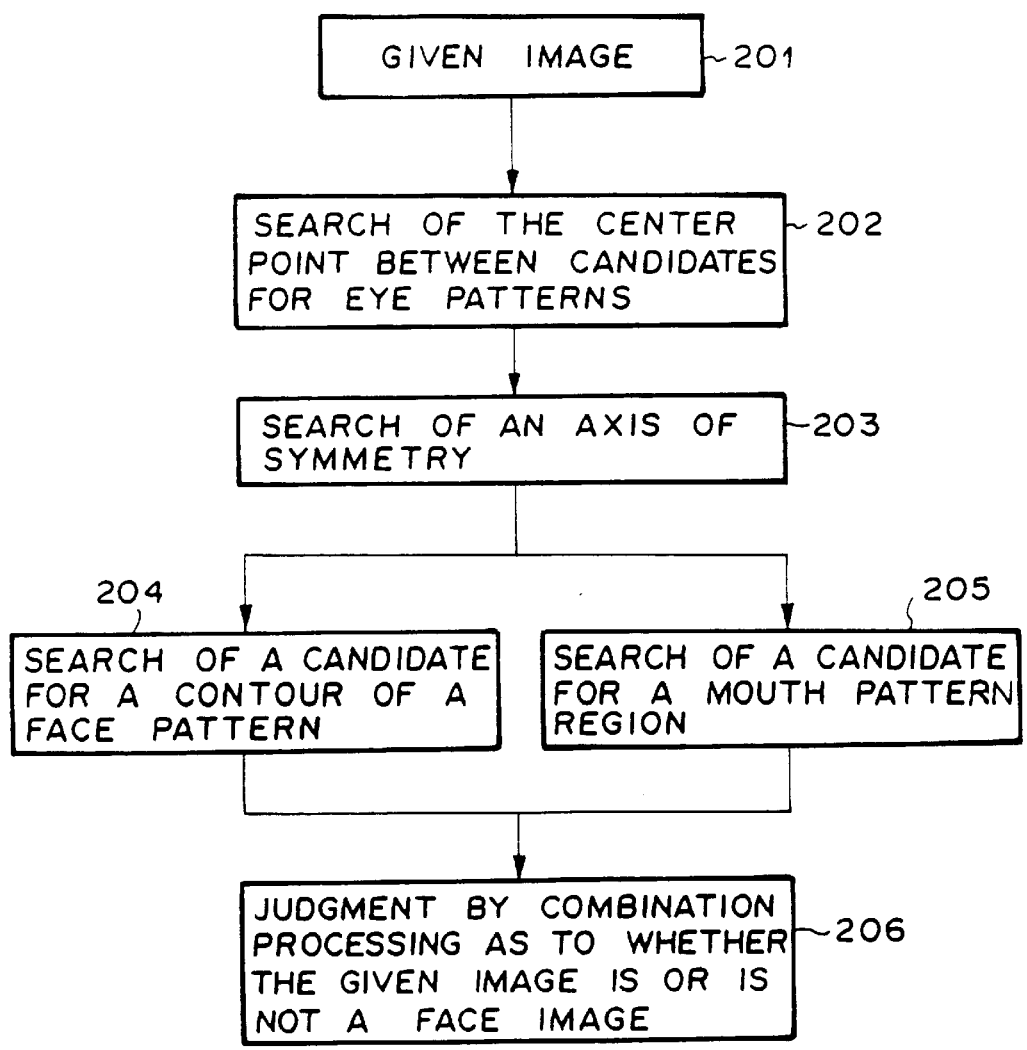
FIG. 68 is a block diagram showing the fundamental concept behind the method for discriminating an image in accordance with the present invention.

FIG. 68 shows the fundamental concept behind the method for discriminating an image in accordance with the present invention. As illustrated in FIG. 68, an image is given in a step 201. (The given image will also be referred to as the given image 201.) In a step 202, the center point between candidates for eye patterns is searched from the given image. Thereafter, in a step 203, an axis of symmetry, which passes through the center point between candidates for eye patterns, is searched. In a step 204, a candidate for the contour of a face pattern is then searched from the given image. Also, in a step 205, a candidate for a mouth pattern region is searched from the given image. Thereafter, in a step 206, from the information obtained from these searching operations, a judgment is made as to whether the given image is or is not a face image.

How the searching operations are carried out will be described hereinbelow. The searching operations are carried out by utilizing a visual neural network and knowledge of faces.

Figure 69:
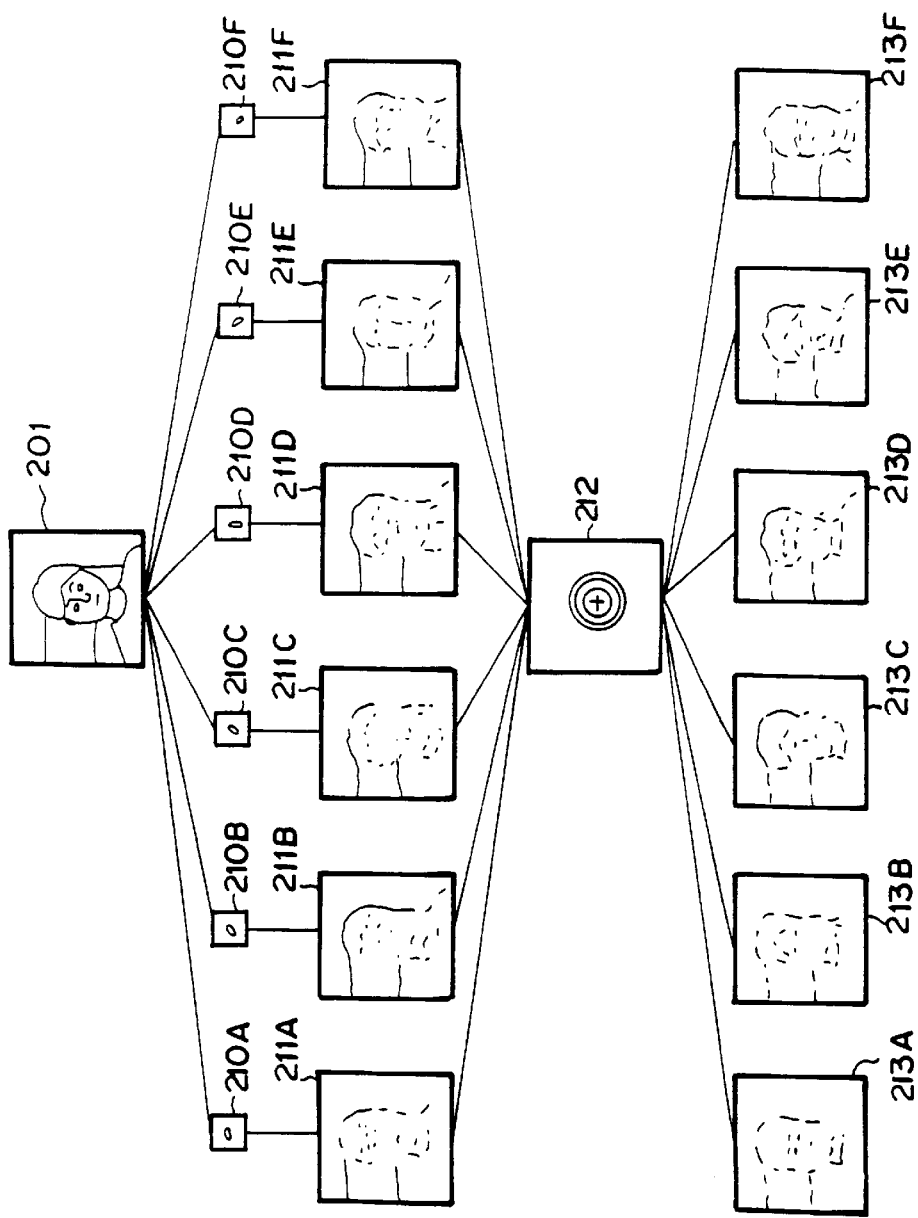
FIG. 69 is an explanatory view showing how blob components matching with eye shapes are detected from a given image.

First, blob components, which are considered as being eye patterns, are detected from the given image 201. FIG. 69 shows the first step for carrying out the extraction of the center point between candidates for eye patterns from the given image 201. First, components, which match with the shapes of eyes having a plurality of directional properties, are extracted for each of the plurality of the directions from the given image 201. The blob components can be obtained by carrying out the weighting and nonlinear processing of the given image 201 with a synaptic weights pattern 210 for detecting blob components, which pattern is shown in FIG. 70 and readily makes a response to blob components considered as being eye patterns. How the weighting and nonlinear processing of the given image 201 are carried out will be described hereinbelow.

In the synaptic weights pattern 210 for detecting blob components, which is shown in FIG. 70, the negative part has an elliptic shape matching with the shape of an eye such that the synaptic weights pattern 210 for detecting blob components can easily make a response to a change in the intensity of the eye shape. The angle of the longer axis direction of the ellipse in the state shown in FIG. 70 is taken as zero degree. Six synaptic weights patterns 210A through 210F for detecting blob components, which patterns are directed in six directions at angles of 0 degree, 30 degrees, 60 degrees, 90 degrees, 120 degrees, and 150 degrees, are utilized to weight the given image 201. The synaptic weights pattern 210 for detecting blob components corresponds to a retinal ganglion cell or a cell of the lateral geniculate body of the brain of a human body and is created with a DOG function. The DOG function is expressed by the following formula.

$$G(r, \theta) = A \cdot \left[ \exp\left(-\frac{r^2}{\sigma_e(\theta)^2}\right) - Q \cdot \exp\left(-\frac{r^2}{\sigma_i(\theta)^2}\right) \right] \quad (5)$$

where $\sigma_e$: excitatory receptive field
$\sigma_i$: inhibitory receptive field
A, Q: constant $$\sigma(\theta) = \sqrt{(a^2 + b^2)/(a^2 \sin^2\theta + b^2 \cos^2\theta)}$$

r: distance from the center
θ: angle with the longer axis direction of the ellipse taken as zero degree
s: distance in the longer axis direction of the ellipse
b: distance in the shorter axis direction of the ellipse.

The synaptic weights patterns 210A through 210F for detecting blob components, in which the longer axis direction of the ellipse is inclined respectively by the angles of 0, 30, 60, 90, 120, and 150 degrees, can be created by setting the initial value of θ in Formula (5) at each of 0, 30, 60, 90, 120, and 150 degrees. (As an aid in facilitating the explanation, the synaptic weights patterns 210A through 210F are referred to as the synaptic weights pattern in the 0 degree direction, the synaptic weights pattern in the 30 degree direction, . . . , and the synaptic weights pattern in the 150 degree direction.)

The weighting and nonlinear processing are carried out on the given image 201 with the synaptic weights patterns 210A through 210F for detecting blob components. In this manner, components 211A through 211F, which respectively match with the synaptic weights patterns 210A through 210F for detecting blob components, are detected from the given image 201.

In many cases, the blob components considered as being eye patterns are present at positions in the vicinity of the center point of the given image 201. Also, more importance is attached to the information corresponding to the positions in the vicinity of the center point of the given image 201. Therefore, the information corresponding to the positions in the vicinity of the center point of each of the components 211A through 211F is emphasized with a synaptic weights pattern 212. In this manner, components 213A through 213F, in which the information corresponding to the positions in the vicinity of the center point has been emphasized, are obtained. As the synaptic weights pattern 212 for emphasizing the information corresponding to the positions in the vicinity of the center point of each of the components 211A through 211F, the function shown below, which increases monotonously toward the center, may be employed.

$$g(x, y) = \exp\left[ decay \times \left(\frac{x^2 + y^2}{\sigma}\right)^{1/2} \right] \quad (6)$$

The components 213A through 213F, in which the information corresponding to the positions in the vicinity of the center point has been emphasized, contain the blob components, which are considered as being the eye patterns, and the contour components of the given image 201. Therefore, the contour components are removed from the components 213A through 213F. Removal of the contour components is carried out by extracting the contour components from the components 211A through 211F and removing the extracted contour components from the components 213A through 213F. How the contour components are detected from the components 211A will be described hereinbelow.

FIG. 71 shows how the contour components are detected in the embodiment of the method for discriminating an image in accordance with the present invention. First, straight contour lines at each of angles of the six directions are extracted from the components 211A, which are shown in FIG. 69 and in which the information corresponding to the positions in the vicinity of the center point has not yet been emphasized. The extracting operation can be carried out by the weighting and nonlinear processing of the components 211A with a synaptic weights pattern 214 for detecting straight lines at a specific angle, which pattern is shown in FIG. 72. How the weighting-and nonlinear processing of the components 211A are carried out with the synaptic weights pattern 214 for detecting straight lines at a specific angle will be described hereinbelow.

In the synaptic weights pattern 214 for detecting straight lines at a specific angle, which pattern is shown in FIG. 72, the positive part has an elongated elliptic shape matching with a straight line such that the synaptic weights pattern 214 for detecting straight lines at a specific angle can easily make a response to a straight line. Also, the negative parts of the synaptic weights pattern 214 are distributed on opposite sides of the positive part. The negative parts are essential such that the synaptic weights pattern 214 may have a sufficient azimuth selectivity. The angle of the longer axis direction of the elongated ellipse in the state shown in FIG. 72 is taken as zero degree. Six synaptic weights patterns 214A through 214F for detecting straight lines at a specific angle, which patterns are directed in six directions at angles of 0 degree, 30 degrees, 60 degrees, 90 degrees, 120 degrees, and 150 degrees, are utilized to weight the components 211A. The synaptic weights pattern 214 for detecting straight lines at a specific angle corresponds to a simple cell of the visual area of the cerebrum and is created with the Gabor function. The Gabor function is represented by the formula shown below.

$$\psi(x, y) = \exp\left[-\frac{\omega_o^2}{2\pi^2}(x^2 + y^2)\right] \cdot \exp[j(k_x \cdot x + k_y \cdot y)] \quad (7)$$

$$= \exp\left[-\frac{\omega_o^2}{2\pi^2}(x^2 + y^2)\right] \cdot [\cos(k_x \cdot x + k_y \cdot y) + i \cdot \sin(k_x \cdot x + k_y \cdot y)]$$

$$= \exp\left[-\frac{\omega_o^2}{2\pi^2}(x^2 + y^2)\right] \cdot [\cos(k_x \cdot x + k_y \cdot y) + i \cdot \exp\left[-\frac{\omega_o^2}{2\pi^2}(x^2 - y^2)\right] \cdot \sin(k_x \cdot x + k_y \cdot y)]$$

where $\omega_o$ represents the size, and $(k_x, k_y)$ represents the direction.

The synaptic weights pattern 214 for detecting straight lines at a specific angle is created by using the real part of Formula (7), i.e., $$\exp\left[-\frac{\omega_o^2}{2\pi^2}(x^2 + y^2)\right] \cdot [\cos(k_x \cdot x + k_y \cdot y)] \quad (8)$$

The synaptic weights patterns 214A through 214F for detecting straight lines at a specific angle, in which the longer axis direction of the elongated ellipse is inclined respectively by the angles of 0, 30, 60, 90, 120, and 150 degrees, can be created by appropriately setting the initial value of $k_x$ and $k_y$ in Formula (8).

The size of the receptive field of each of the synaptic weights patterns 214A through 214F for detecting straight lines at a specific angle is determined such that little response may be made to fine contour components other than the required contour components of the components 211A. Specifically, the synaptic weights patterns 214A through 214F make little response to the blob components, which are considered as being eye patterns, in the components 211A and readily make a response to the required contour components in the components 211A. In cases where the size of the receptive field of each of the synaptic weights patterns 214A through 214F is determined in this manner, it becomes possible to detect the blob components, which are considered as being eye patterns, accurately regardless of the presence of the background.

The components 211A are transmitted as a signal weighted with the synaptic weights patterns 214A through 214F for detecting straight lines at a specific angle. In this manner, contour components 215A through 215F at specific angles, which components respectively match with the synaptic weights patterns 214A through 214F, are extracted from the components 211A.

The weighting and nonlinear processing of the given image 201 with the synaptic weights patterns 210A through 210F for detecting blob components and the weighting and nonlinear processing of the components 211A through 211F with the synaptic weights patterns 214A through 214F for detecting straight lines at a specific angle are carried out with the formula shown below.

$$u(x, y) = \psi\left[\sum_{ij} c(i, j) \cdot I(x - i, y - j)\right] \quad (9)$$

where $\psi(x) = x$ $(x \geq 0)$
  $0$ $(x < 0)$
  $c(i,j)$: synaptic weights pattern
  $I(x,y)$: image Thereafter, directional competition is carried out such that the picture elements at corresponding positions in the contour components 215A through 215F at specific angles may compete with one another, and only a picture element having the largest value may remain as a winner. For example, an x-y coordinate system having its origin at the left lower corner of the contour components at each of the specific angles is considered. In such cases, as for picture elements (0,0), the picture element in the contour components, which has the largest value among the values of the picture elements (0,0) in the contour components 215A through 215F, is selected. When such directional competition is carried out on all of the picture elements in the contour components 215A through 215F, the contour components 216 remain as a winner.

However, the contour components 215A through 215F were respectively detected with respect to the six directions, and the contour in the contour components 216, which won the directional competition, is not continuous smoothly. Therefore, the contour components 216 are weighted with an unsharp synaptic weights pattern 217. In this manner, components 218, in which the contour has been smoothed, are created by making the contour components 216 unsharp.

Figure 73:
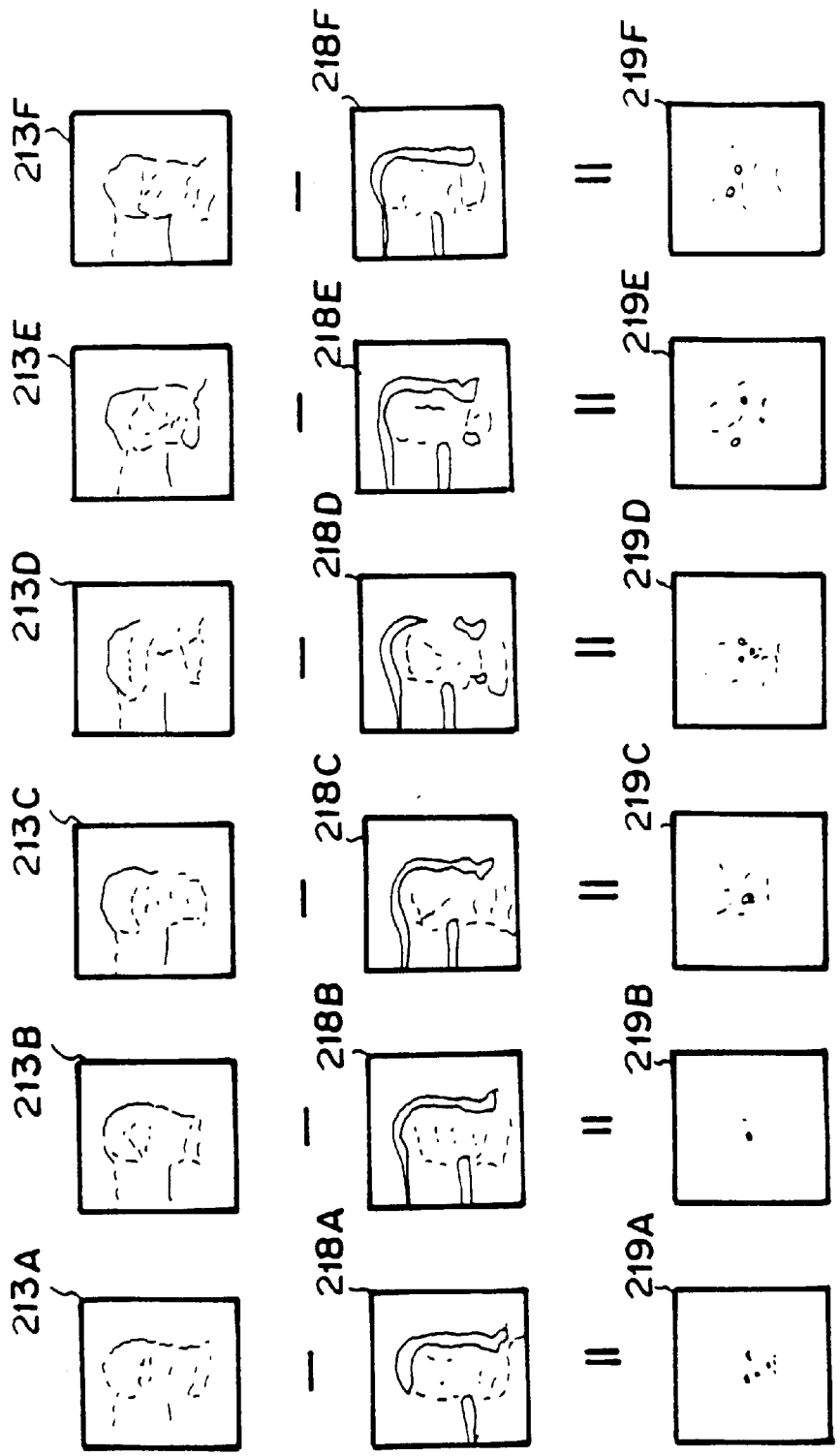
FIG. 73 is an explanatory view showing how contour components are removed from blob components matching with eye shapes in each direction.

In the manner described above, the contour components, which have been extracted respectively from the detected components 211A through 211F, are subjected to directional competition, and the contour components, which won the directional competition, are made unsharp. In this manner, components 218A through 218F are created. Thereafter, as illustrated in FIG. 73, the created components 218A through 218F are respectively subtracted from the corresponding components 213A through 213F. In this manner, the contour components are removed from the components 213A through 213F, and blob components 219A through 219F, which are considered as responding to the eye shapes, remain. When the components 218A through 218F are respectively subtracted from the corresponding components 213A through 213F, they are normalized such that the maximum values of the corresponding components may become equal to each other, and the subtraction is then carried out.

Figure 74:
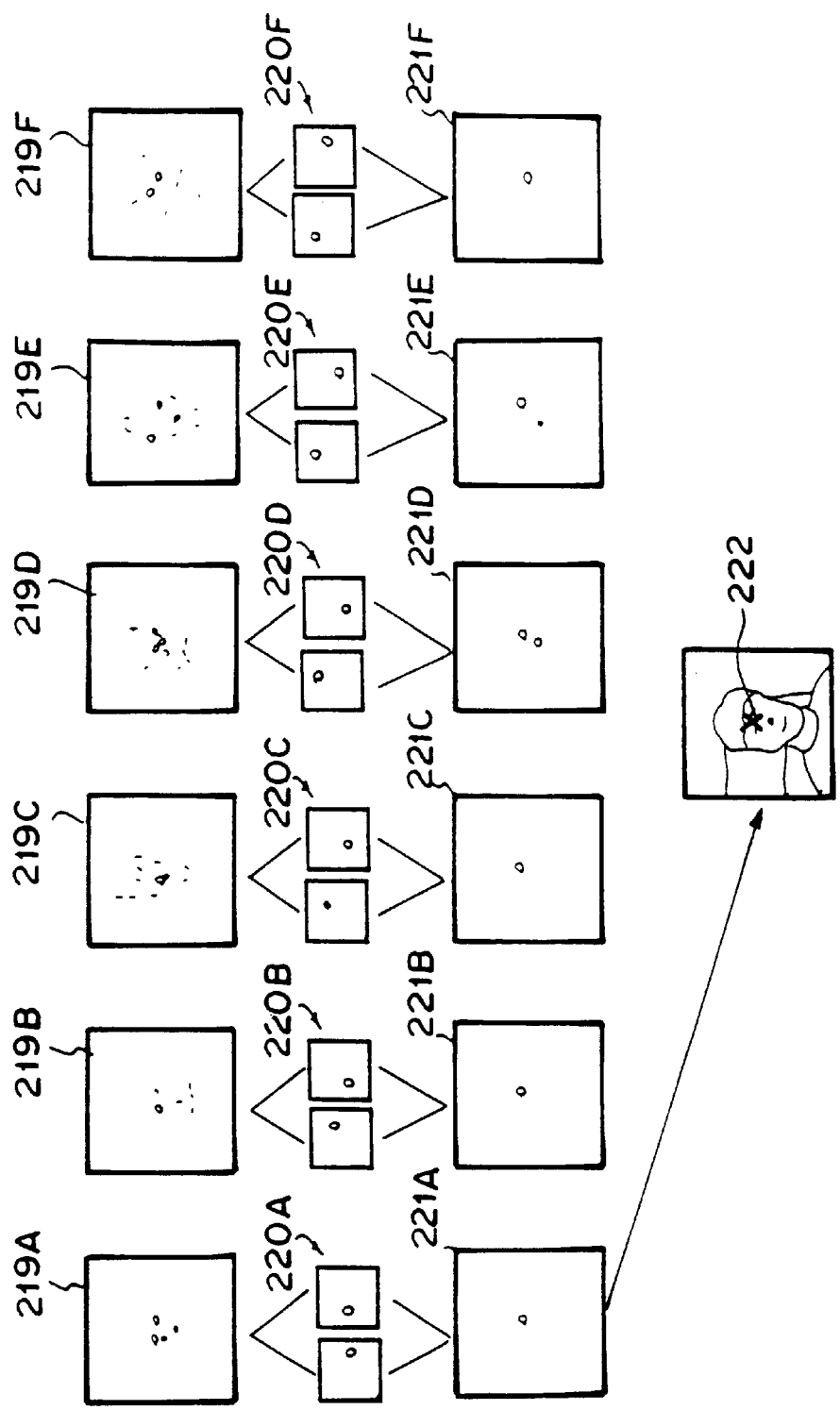
FIG. 74 is an explanatory view showing how the center point between eye patterns is detected.

Thereafter, a point, which is considered as being the center point between candidates for eye patterns, i.e. a candidate for the center point between candidates for eye patterns, is detected from the blob components 219A through 219F, which have been detected in the manner described above. FIG. 74 shows how a candidate for the center point between candidates for eye patterns is detected. As illustrated in FIG. 74, the blob components 219A through 219F are transmitted as signals weighted respectively with paired synaptic weights patterns 220A through 220F. In each of the paired synaptic weights patterns 220A through 220F, the part indicated by the white circle in FIG. 74 takes a positive value. When the two synaptic weights patterns in each pair are superposed one upon the other, the positive parts stand in a line at a spacing from each other, which is approximately equal to the spacing between the two eyes of a human body, and in the same direction as the direction of each of the synaptic weights patterns 210A through 210F for detecting blob components.

The blob components 219A through 219F are transmitted as signals weighted respectively with the paired synaptic weights patterns 220A through 220F, and the results of the weighting thus obtained with each pair of the synaptic weights patterns are multiplied. As a result, the position, which is considered as being the center point between the two blobs standing in a line in the same direction as the synaptic weights pattern for detecting blob components, makes a response. In this manner, as illustrated in FIG. 74, candidates 221A through 221F for the center point between candidates for eye patterns are obtained.

Thereafter, from the candidates 221A through 221F for the center point between candidates for eye patterns, a candidate for the center point between candidates for eye patterns, which candidate made the largest response, is detected as the center point between candidates for eye patterns. In this embodiment, the candidate 221A for the center point between candidates for eye patterns is detected as a center point 222 between eye patterns.

In cases where the center point between eye patterns is detected in the manner described above, even if the face pattern rotates in the given image, the center point between candidates for eye patterns can be detected. In this embodiment, it will often occur that a center point between parts considered as being eyebrow patterns is detected as the center point between candidates for eye patterns. However, in such cases, no problem will occur because eyes and eyebrows are located at approximately identical positions in ordinary persons.

Thereafter, an axis of symmetry in the given image 201 is searched in accordance with the detected center point between candidates for eye patterns.

Figure 75:
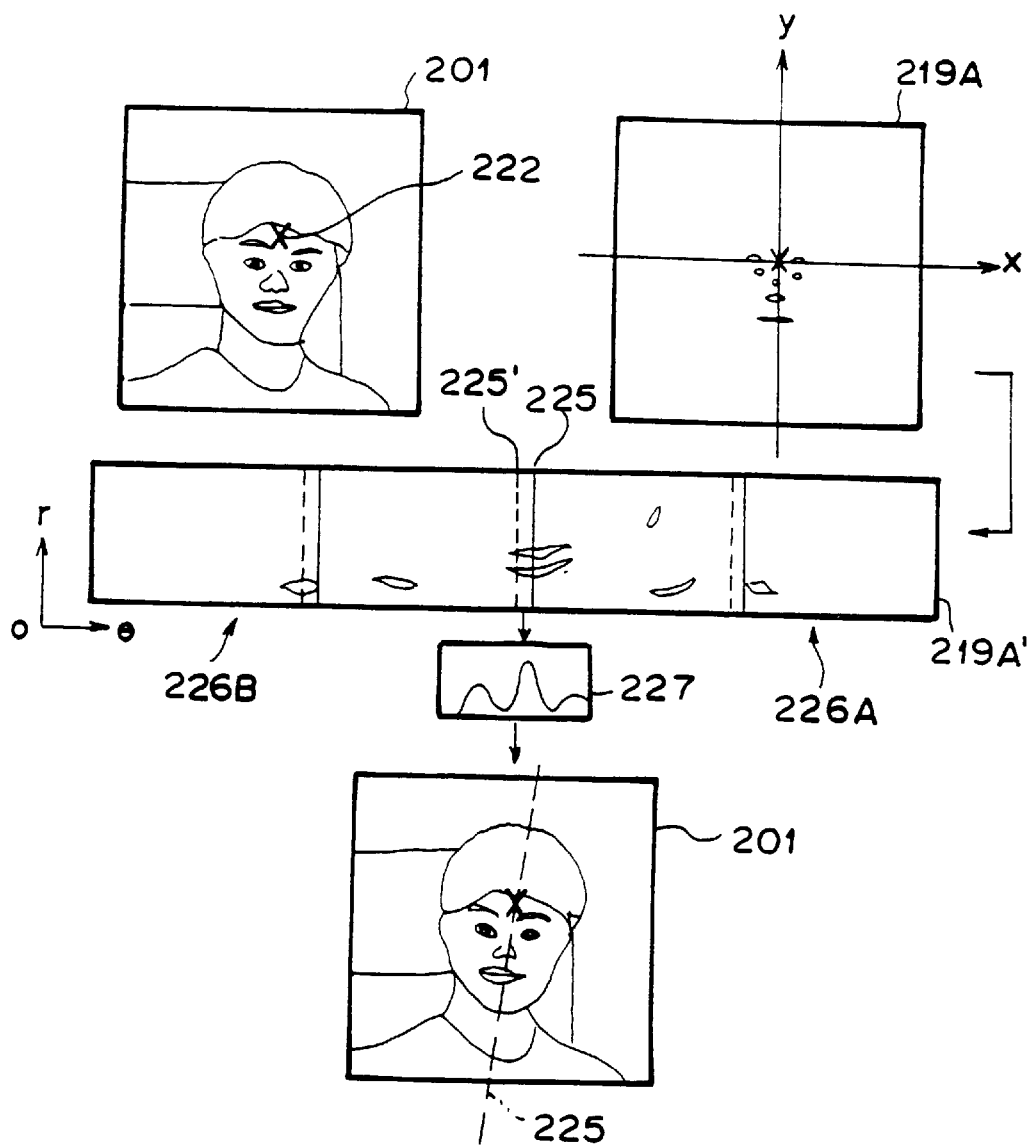
FIG. 75 is an explanatory view showing how an axis of symmetry is detected from a given image.

FIG. 75 shows how the axis of symmetry is detected. First, as illustrated in FIG. 75, the blob components 219A in the direction corresponding to the detected center point between candidates for eye patterns is transformed with the polar coordinates transformation into blob components 219A' by taking the center point 222 between eye patterns as a pole.

The blob components 219A were obtained from the given image 201 with the synaptic weights pattern 210A for detecting blob components, which pattern is in the 0 degree direction. Therefore, it is expected that the axis of symmetry will be located at a position in the range of approximately 180 degrees±30 degrees. Accordingly, a temporary axis of symmetry 225' is set at a position in the vicinity of 180 degrees in the blob components 219A' transformed with the polar coordinates transformation. The temporary axis of symmetry 225' is then shifted at 1 degree intervals within the range of ±30 degrees. In this manner, a calculation is made to find the degree of correlation between the density values of a region 226A, which is located on the right side with respect to the temporary axis of symmetry 225' on the polar coordinates, and the density values of a region 226B, which is located on the left side with respect to the temporary axis of symmetry 225' on the polar coordinates. The region, in which the blob components are capable of being present, is limited to a certain range in the right region 226A and the left region 226B. Therefore, the regions, in which the blob components are not present and which make no response, (in this embodiment, the right and left end parts of the blob components 219A' transformed with the polar coordinates transformation) are not subjected to the calculation for finding the degree of correlation. Thus only the region, in which the blob components are capable of being present, is used in the calculation for finding the degree of correlation. The calculation for finding the degree of correlation is carried out with the formula shown below.

$$d = \sum_{ij \in A} \frac{X_{ij} \cdot Y_{ij}}{\|X_{ij}\| \|Y_{ij}\|} \qquad (10)$$

where A represents the region, in which the blob components are capable of being present, $X_{ij}$ represents the image density value at the right half with respect to the axis of symmetry, and $Y_{ij}$ represents the image density value at the left half with respect to the axis of symmetry.

In the manner described above, the temporary axis of symmetry 225' is set at a position in the range of approximately 180 degrees±30 degrees, and the degree of correlation is calculated. As a result, as illustrated in FIG. 75, the results of calculation 227 are obtained. The temporary axis of symmetry 225', which is associated with the highest degree of correlation in the results of calculation 227, is detected as the axis of symmetry 225 of the face pattern. The axis of symmetry 225, which has thus been detected, is slightly tilted to the right with respect to 180 degrees.

Thereafter, contour components in the given image 201, which have the pole at the center point 222 between candidates for eye patterns and have a start point at a point lying on the axis of symmetry 225, are detected. The detected contour components are compared with contours of a plurality of face patterns, which are directed in different directions. The plurality of contours of face patterns have been learned as templates. A judgment is thus made as to whether components corresponding to the detected contour components are or are not included in the contours of face patterns, which have been learned as templates.

Figure 76:
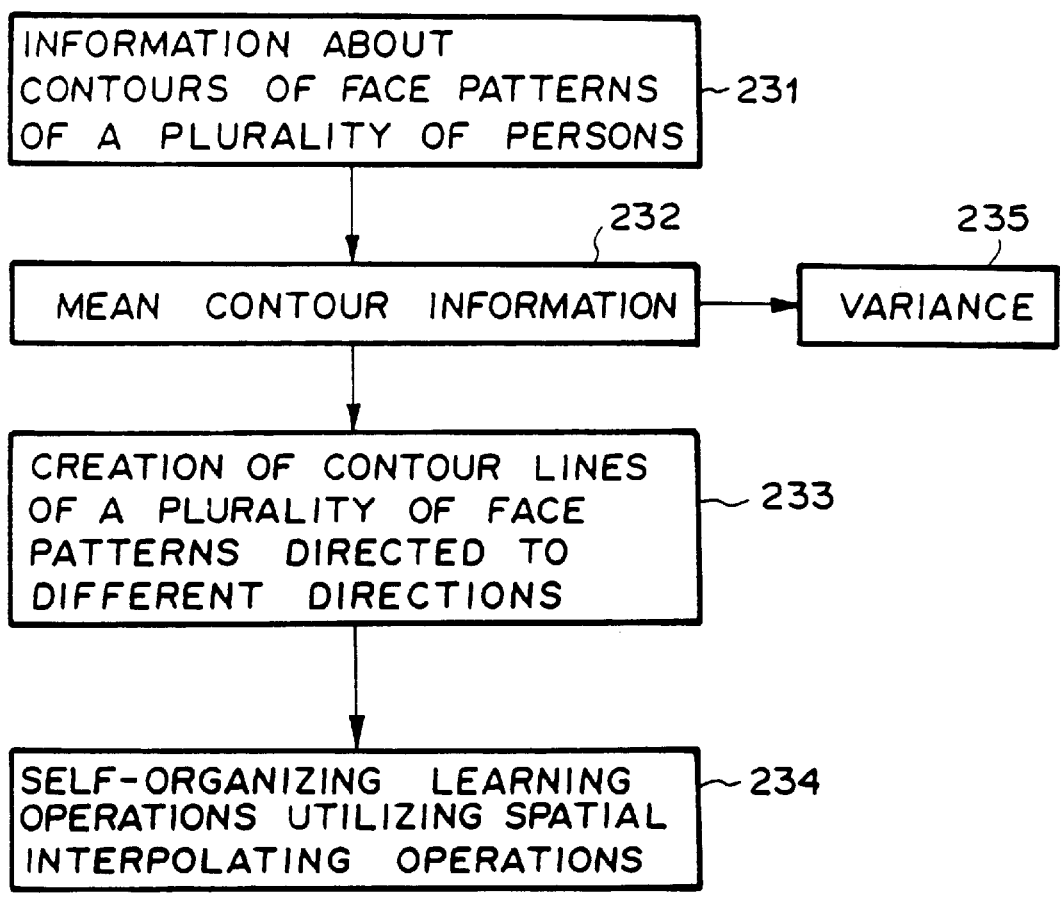
FIG. 76 is a block diagram showing the fundamental concept behind a self-organizing learning operation on information about a contour of a face pattern.

FIG. 76 shows how the contours of face patterns are learned. As illustrated in FIG. 76, in a step 231, pieces of information about contours of face patterns of a plurality of persons, which contours have been normalized by the distance from the center point between eye patterns to the eye patterns, are obtained. The pieces of information about contours of face patterns of a plurality of persons are obtained as a set of 36 points at intervals of 10 degrees around the eye patterns. (These points will hereinbelow be referred to as contour coordinates 241.)

Thereafter, in a step 232, the mean contour information is calculated from the pieces of information about contours of face patterns of a plurality of persons. Also, in a step 235, the value of variance with respect to each angle of the contour information obtained in the step 231 is calculated.

Figure 77:
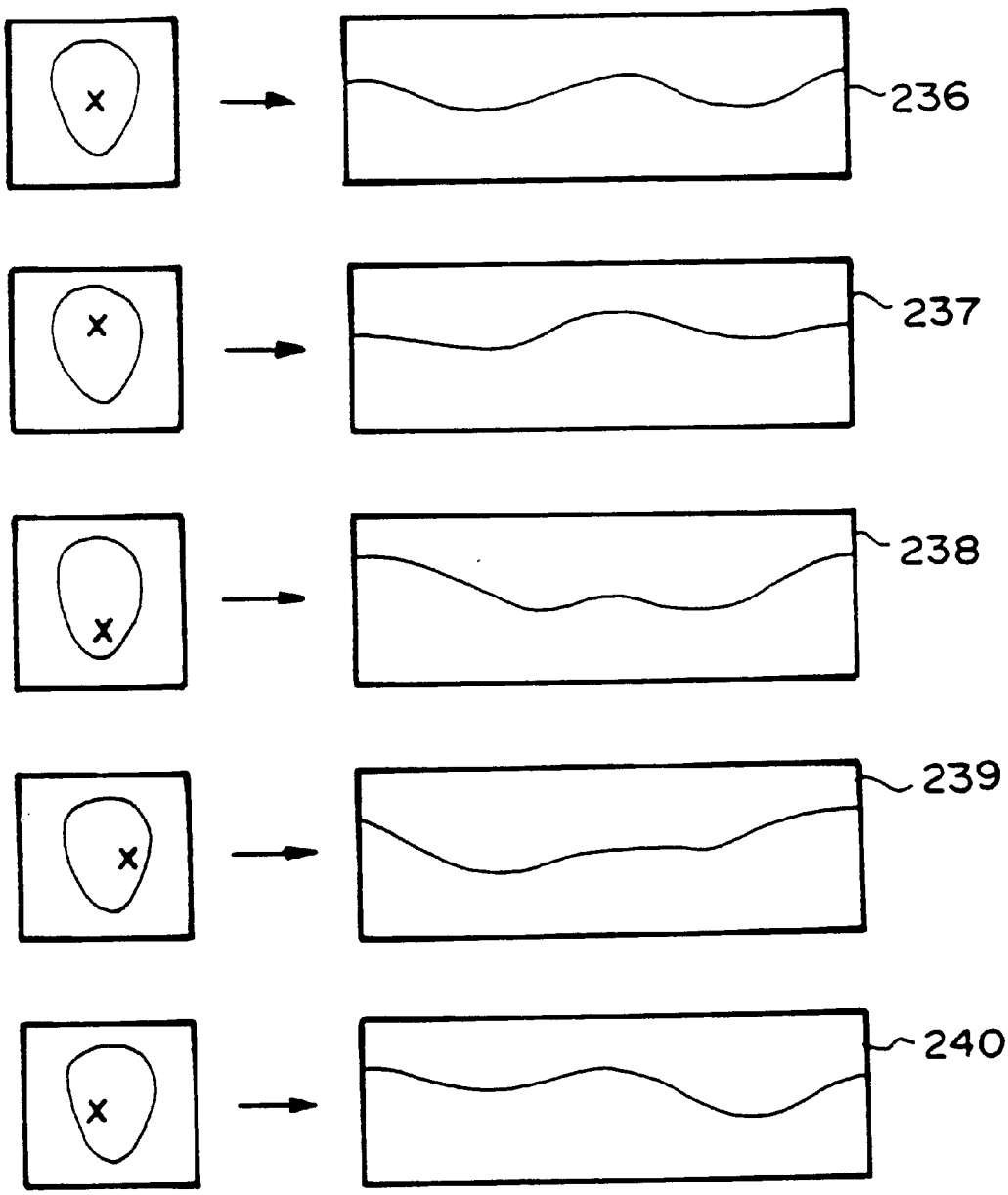
FIG. 77 is an explanatory view showing how the pieces of information about contours of front-, upward-, downward-, leftward-, and rightward-directed face patterns are transformed with the polar coordinates transformation.

Thereafter, the mean contour information having been obtained in the step 232 is transformed with the polar coordinates transformation by taking the center point between eye patterns as a pole. At this time, in a step 233, contour lines of a plurality of face patterns, which are directed in different directions, are created. Specifically, mean contour information about upward-, downward-, rightward-, and leftward-directed face patterns can be obtained by shifting the pole upwardly, downwardly, rightwardly, and leftwardly with respect to the mean contour information obtained in the step 232. As illustrated in FIG. 77, when the polar coordinates transformation is thus carried out by shifting the center point between eye patterns, front-directed face information 236, upward-directed face information 237, downward-directed face information 238, leftward-directed face information 239, and rightward-directed face information 240 are obtained.

Thereafter, as illustrated in FIG. 76, in a step 234, the five pieces of face information 236 through 240 are presented to a neural network, and self-organizing learning operations of the neural network utilizing spatial interpolating operations are carried out. The self-organizing learning operations of a neural network utilizing spatial interpolating operations are described in detail in Japanese Patent Application No. 4(1992)-347237.

Figure 78:
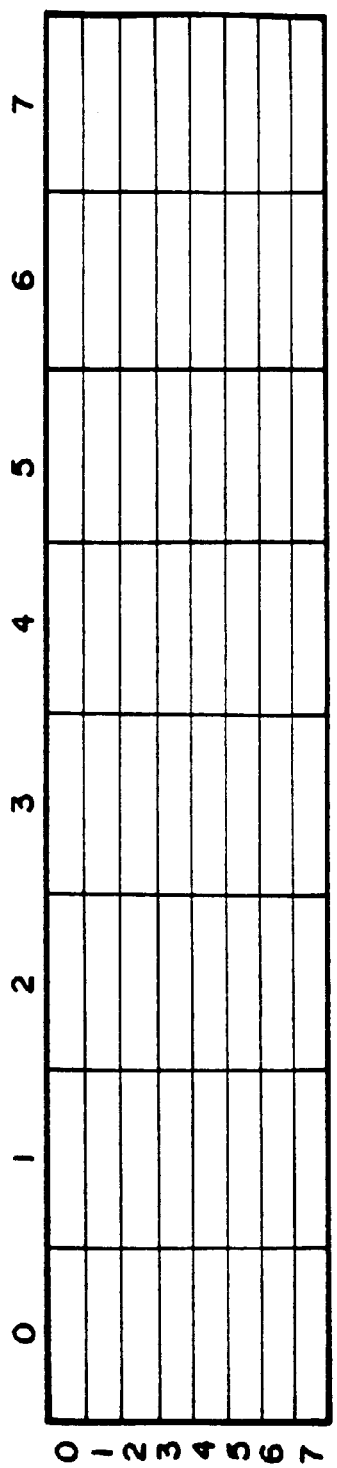
FIG. 78 is an explanatory view showing the cells of a neural network for carrying out the self-organizing learning operation.

How the self-organizing learning operations are carried out in the embodiment of the method for discriminating an image in accordance with the present invention will be described hereinbelow. In this embodiment, as illustrated in FIG. 78, the neural network has 64 cells, which are distributed in a quadrangular form. Also, the self-organizing learning operations utilizing spatial interpolating operations are carried out by presenting the basic patterns shown in FIG. 77, i.e. the front-directed face information 236, the upward-directed face information 237, the downward-directed face information 238, the leftward-directed face information 239, and the rightward-directed face information 240, in this order to each of the cells of the neural network. The operation, wherein these pieces of face information are respectively presented once, is taken as a single learning operation. The learning operation is iterated until the learning of the plurality of the cells is finished.

FIGS. 79A and 79B show the results of the self-organizing learning operations utilizing spatial interpolating operations. FIG. 79A shows the results of the learning of the front-directed face information 236, the upward-directed face information 237, the downward-directed face information 238, the leftward-directed face information 239, and the rightward-directed face information 240. FIG. 79B shows the results of the learning of the pieces of information, which are obtained by rotating the five pieces of the face information by an angle of 180 degrees. In FIGS. 79A and 79B, the front-directed face information 236 has been learned by a cell (3,4), and the upward-directed face information 237 has been learned by a cell (4,1). The downward-directed face information 238 has been learned by a cell (2,7), and the leftward-directed face information 239 has been learned by a cell (0,3). Also, the rightward-directed face information 240 has been learned by a cell (7,4). The other cells have learned the patterns, which are intermediate among these five patterns.

Thereafter, a judgment is made as to whether the contour components of the given image 201 are or are not included in the results of the self-organizing learning operations.

Figure 80:
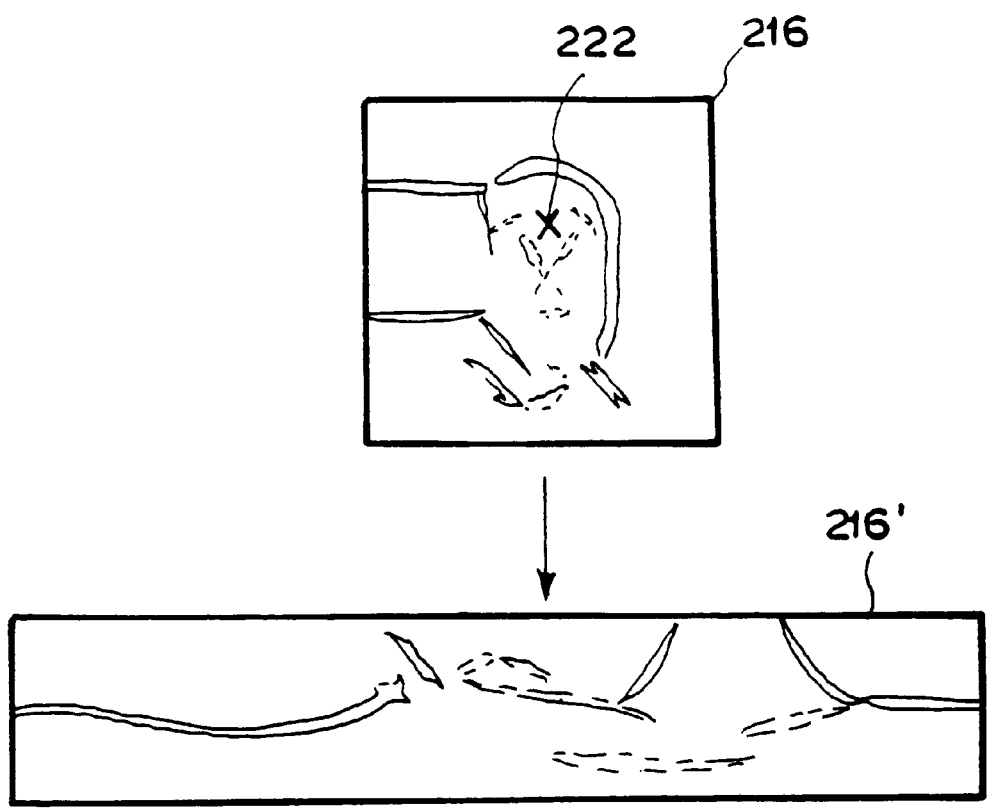
FIG. 80 is an explanatory view showing how the contour components of a given image are transformed with the polar coordinates transformation.

First, as illustrated in FIG. 80, the contour components are transformed with the polar coordinates transformation by taking the center point 222 between candidates for eye patterns in the contour components 216, which are shown in FIG. 71, as the pole and by taking the point, which lies on the aforesaid axis of symmetry 225, as the start point. In this manner, contour components 216' transformed with the polar coordinates transformation are obtained. The contour components 216' transformed with the polar coordinates transformation are then compared with the results of the self-organizing learning operations shown in FIGS. 79A and 79B. Specifically, the total sum of the density values of the picture elements at the positions of the contour coordinates, which each of the cells (0,0) through (7,7) have learned with the self-organizing learning operations, is calculated in the contour components 216'. The cell associated with the largest value of the total sum is taken as representing the contour of the given image 201.

In some cases, the contour components 216' may shift vertically. Therefore, as illustrated in FIG. 81, when the aforesaid comparison is carried out, all of the contour coordinates 241 in each cell are vertically moved in parallel as indicated by the double headed arrow A, and the position, at which the total sum of the density values is largest, is selected.

Figure 81:
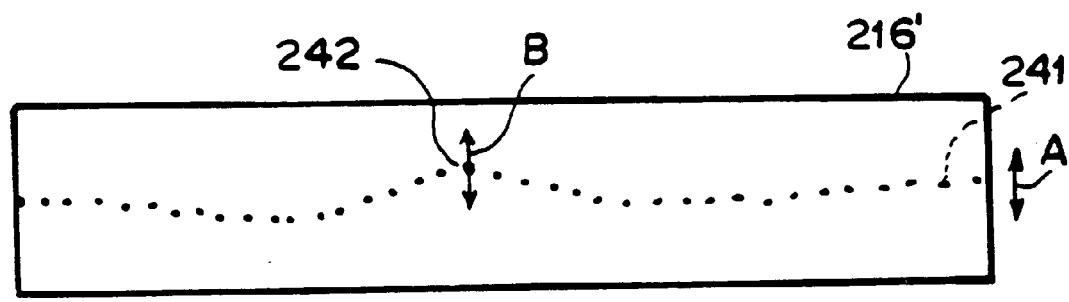
FIG. 81 is an explanatory view showing how the contour components of a face pattern are detected by vertically moving the contour coordinates.

In order to cope with parts varying for different persons, such as the jaw patterns of human faces, in addition to the vertical parallel movement of all of the contour coordinates 214 in each cell, each of the contour coordinates 241 may be moved by the value of the aforesaid variance in the directions indicated by the double headed arrow B in FIG. 81, and the largest density value within the range of the movement may be utilized when the total sum is calculated. In such cases, it becomes possible to cope flexibly with a hair part of a face, at which the value of the variance of the contour coordinates 241 is large.

The detection of the contour components can be represented by the formula shown below.

$$d = \sum_{i=1}^{N} \max_{A} [g(x_i, y_i)] \tag{11}$$

where N represents the number of the contour coordinates utilized as the knowledge, $(x_i, y_i)$ represents the contour coordinate, A represents the variance of the contour coordinates (within the movable range), and g represents the density value.

How a candidate for the mouth pattern region is detected will be described hereinbelow.

Figure 82:
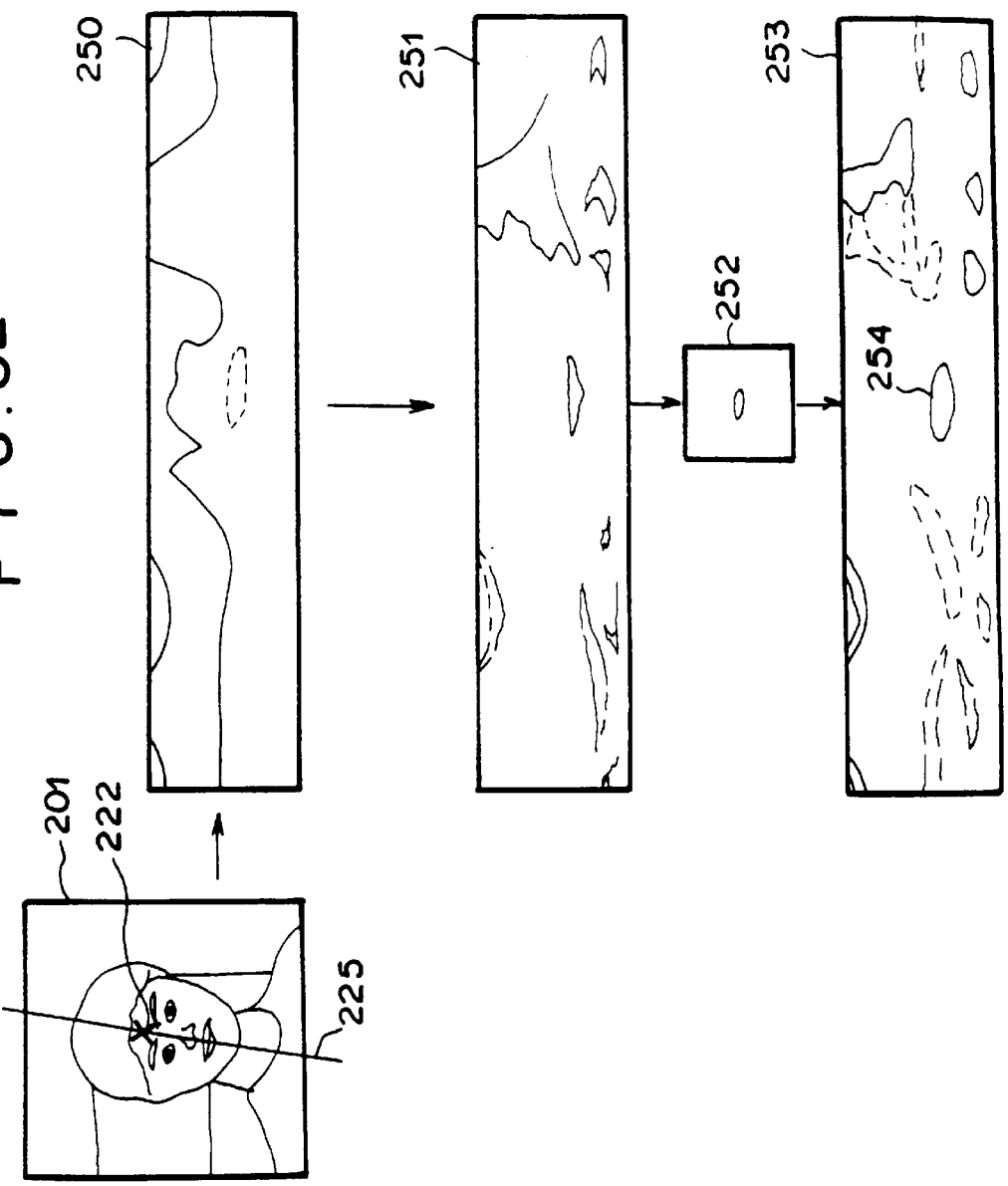
FIG. 82 is an explanatory view showing how a mouth pattern region is detected from a given image.

FIG. 82 shows how a candidate for the mouth pattern region is detected from the given image 201. As illustrated in FIG. 82, the given image 201 is transformed with the polar coordinates transformation by taking the center point 222 between candidates for eye patterns as the pole and by taking the point, which lies on the axis of symmetry 225, as the start point. In this manner, a transformed image 250 is obtained. Thereafter, the transformed image 250 is transformed to a YIQ base. The results of the transformation carried out with the formula $$\begin{pmatrix} I \\ Q \\ Y \end{pmatrix} = \begin{pmatrix} 0.60 & -0.28 & -0.32 \\ 0.21 & -0.52 & 0.31 \\ 0.30 & 0.59 & 0.11 \end{pmatrix} \begin{pmatrix} R \\ G \\ B \end{pmatrix} \tag{12}$$

on a R (red), G (green), B (blue) color image serve as the YIQ base. The YIQ base is ordinarily utilized when, for example, a television color signal and a luminance signal are separated from each other.

It is known that, in the YIQ base, the lip part of a face pattern makes a response most brightly in the Q component image. Such findings are described by Kobayashi, Nakamura, Morishima, and Harashima in "Method for Extracting A Lip Feature Point from A Face Image," SHIN-GAKU ZENDAISHUN, D-329, March 1990. Specifically, the Q component of the YIQ base most readily makes a response to a reddish purple part in the color space and makes little response to a green part. Therefore, the Q component of the YIQ base makes a response most brightly to a lip part in a face pattern. In this manner, the transformed image 250 is transformed to the YIQ base, and a Q component image 251 is thereby obtained.

In this embodiment, the given image 201 is transformed with the polar coordinates transformation, the image, which has been obtained from the polar coordinates transformation, is then transformed to the YIQ base, and the Q component image 251 is thereby obtained. Alternatively, the given image 201 may be transformed to the YIQ base and then transformed with the polar coordinates transformation, and the Q component image 251 may thereby be obtained.

A part, which best matches with the mouth shape, is then detected from the Q component image 251. For this purpose, as illustrated in FIG. 82, the Q component image 251 is transmitted as a signal weighted with a synaptic weights pattern 252, which readily makes a response to the mouth shape.

As illustrated in FIG. 83, in the synaptic weights pattern 252, the positive part has an elliptic shape matching with the mouth shape such that the synaptic weights pattern can easily respond to a intensity change of the mouth shape. Like the synaptic weights pattern 210 for detecting blob components considered as being eye patterns, the synaptic weights pattern 252 corresponds to a retinal ganglion cell or a cell of the lateral geniculate body of the brain of a human body and is created with a DOG function. The DOG function of the synaptic weights pattern 252 is expressed by the following formula.

$$G(r, \theta) = A\left[\exp\left(-\frac{r^2}{\sigma_e(\theta)^2}\right) - Q \cdot \exp\left(-\frac{r^2}{\sigma_i(\theta)^2}\right)\right] \quad (13)$$

where $\sigma_e$: excitatory receptive field
$\sigma_i$: inhibitory receptive field
A, Q: constant $$\sigma(\theta) = \sqrt{(a^2 + b^2)/(a^2 \sin^2\theta + b^2 \cos^2\theta)}$$

r: distance from the center
$\theta$: angle with the longer axis direction of the ellipse taken as zero degree
a: distance in the longer axis direction of the ellipse
b: distance in the shorter axis direction of the ellipse.

As for the synaptic weights pattern 252, the Q component image 251 has been transformed with the polar coordinates transformation, and therefore synaptic weights patterns having a plurality of different directional properties need not be used as in the case of the synaptic weights pattern 210 for detecting blob components as shown in FIG. 69. In cases where the transformation of the given image 201 with the polar coordinates transformation is not carried out, and only the transformation to the YIQ base is carried out, as in the case of the synaptic weights pattern 210 for detecting blob components, a plurality of synaptic weights patterns 252 directed to different directions should be used in order to weight the given image 201, which has been transformed to the YIQ base.

When the Q component image 251 is transmitted as a signal weighted with the synaptic weights pattern 252, instead of the weighting operation being carried out for the entire area of the image, the weighting operation may be carried out on only the range, in which the lip pattern is likely to be present, i.e. only the range on the polar coordinates, in which the angle is approximately 180 degrees. In such cases, the detection of the mouth pattern region can be carried out efficiently.

Weighting results 253 are obtained by transmitting the Q component image 251 as the signal weighted with the synaptic weights pattern 252. The part, which made the largest response among the results 253, i.e. the part 254 in this embodiment, is detected as the candidate for the mouth pattern region.

A judgment as to whether the given image 201 is or is not the face image is made from the information obtained from the search of the center point between candidates for eye patterns, the search of the axis of symmetry, the search of the candidate for the contour of a face pattern, and the search of the candidate for the mouth pattern region. How the judgment is made will be described hereinbelow.

From the aforesaid searching operations, the pieces of information are obtained as a response value $y_1$ of the center point between candidates for eye patterns, a correlation value $Y_2$ of the axis of symmetry, a total sum $y_3$ of the density values of the contour components at the contour coordinate positions, and a response value $y_4$ of the candidate for the mouth pattern region. Therefore, as illustrated in FIG. 84, weights of connections $w_1$, $w_2$, $w_3$, and $w_4$ are determined in accordance with the degrees of importance of the values $y_1$, $y_2$, $y_3$, and $y_4$. The weighted total sum of the response values $y_1$, $y_2$, $y_3$, and $y_4$ is calculated. The results of the calculation are subjected to the threshold value processing, and a judgment is thereby made as to whether the given image 201 is or is not a face image. The operation is represented by the formula $$u = \sum_{i=1}^{N}(y_1 \cdot w_i) - th \quad (14)$$

where th represents the threshold value.

In cases where the value of u obtained with Formula (14) is u>0, it is judged that the given image 201 is a face image. In cases where u<0, it is judged that the given image 201 is not a face image.

The search of the axis of symmetry in the face pattern depends on the search of the center point between eye patterns. Also, the search of the contour of a face pattern and the search of the mouth pattern region depend on the search of the center point between eye patterns and the search of the axis of symmetry in the face pattern. Therefore, the weight of connection $w_2$ may be set as a function of $w_1$. Also, the weights of connections $w_3$ and $w_4$ may be set as functions of $w_1$ and $w_2$.

The image, which has been judged as being the face image, is then utilized for image processing, or the like. In cases where the operation is combined with the processing for discovering and extracting the image considered as being a face image, the image, which has been judged as not being the face image, is subjected to a masking process such that the image may not again be extracted.

In the aforesaid embodiment of the method for discriminating an image in accordance with the present invention, when a judgment is made as to whether the given image is or is not a face image, the threshold value processing is carried out with the simple weighted total sum. Alternatively, the information representing the respective response values may be presented to the cells of the neural network. In such cases, the phases and the amplitudes of the oscillators of the cells corresponding to the respective response values are changed. In cases where a response not smaller than a certain threshold value is obtained due to the interference of the oscillators, the image is judged as being the face image. Further, values obtained from evaluation of the relationship among the positions of the coordinates of the center point between candidates for eye patterns, the coordinates of the contour, and the coordinates of the candidate for the mouth pattern region may be utilized in making a judgment as to whether the given image is or is not a face image.

Also, in the aforesaid embodiment of the method for discriminating an image in accordance with the present invention, a judgment as to whether the given image is or is not the face image is made from the information obtained from the search of the center point between candidates for eye patterns, the search of the axis of symmetry, the search of the candidate for the contour of a face pattern, and the search of the candidate for the mouth pattern region. Alternatively, other features of face patterns, such as a nose pattern, an ear pattern, and a hair pattern, may be searched. In accordance with the information representing the results of the search, a judgment may be made as to whether the give image is or is not a face image.

Further, in the aforesaid embodiment of the method for discriminating an image in accordance with the present invention, when the center point between candidates for eye patterns is searched and when the candidate for the mouth pattern region is searched, the given image is transmitted as signals weighted with the synaptic weights patterns, which have been created with the DOG function. However, the synaptic weights patterns are not limited to those created with the DOG function. Any of other synaptic weights patterns may be used which are created such that they may match with the eye and mouth shapes.

Furthermore, in the aforesaid embodiment of the method for discriminating an image in accordance with the present invention, as the patterns, which are used during the detection of the contour of the face pattern and which are learned in advance as the templates, the results of the self-organizing learning operations utilizing spatial interpolating operations are used. Alternatively, patterns, which are intermediate among the contour information of the upward-, downward-, leftward-, rightward-, and front-directed face patterns, may be created manually and presented directly to the cells of the neural network. As another alternative, templates created with the other techniques may be utilized.

Moreover, in the aforesaid embodiment of the method for discriminating an image in accordance with the present invention, the contours of the upward-, downward-, leftward-, and rightward-directed face patterns are created by vertically and horizontally moving the center point between candidates for eye patterns. Alternatively, mean contour information may be obtained from samples of the upward-, downward-, leftward-, and rightward-directed face patterns and utilized for the self-organizing learning operations.

Also, in the aforesaid embodiment of the method for discriminating an image in accordance with the present invention, the face image is selected as the predetermined image. However, the predetermined image is not limited to the face image, and may be any of other images, such as a signpost image.

Further, an asymmetric image, such as a side-directed face image, can be discriminated accurately regardless of a change in the angle of the image and rotation of the image by, for example, carrying out the transformation with the polar coordinates transformation with respect to an eye pattern taken as the reference point and detecting the feature parts.

The method for discriminating an image in accordance with the present invention may be combined with the technique, which is proposed in, for example, U.S. patent appln. Ser. No. 07/944850 and which is capable of discovering and extracting a predetermined image from a natural image, normalizing the image size, and thereafter presenting the normalized image. In such cases, the method for discriminating an image in accordance with the present invention can cope with a change in the image size, a change in the angle of the image, and rotation of the image.

What is claimed is:

1. A method for discriminating an image, wherein a judgment is made as to whether a given image is or is not a predetermined image, the method comprising the steps of:
   i) extracting a reference point, which is unaffected by a change in the angle of the given image and/or by rotation of the given image, from the given image,
   ii) detecting an axis of symmetry and/or feature parts of the given image in accordance with the reference point, and
   iii) making a judgment as to whether the given image is or is not a predetermined image, the judgment being made in accordance with the axis of symmetry and/or the feature parts of the given image.

2. A method for discriminating an image as defined in claim 1 wherein the detection of the axis of symmetry and/or the feature parts of the given image is carried out by developing the given image in a coordinates space in accordance with the reference point.

3. A method for discriminating an image as defined in claim 2 wherein the coordinates space is a polar coordinates space having its pole at the reference point.

4. A method for discriminating an image as defined in claim 1 wherein the predetermined image is a face image, and a judgment is made as to whether the given image is or is not a face image.

5. A method for discriminating an image as defined in claim 4, comprising the steps of:
   1) extracting a center point between candidates for eye patterns as the reference point, which is unaffected by a change in the angle of the given image and/or by rotation of the given image, from the given image,
   2) detecting an axis of symmetry, which passes through the center point between the candidates for eye patterns, in accordance with the extracted center point between the candidates for eye patterns,
   3) detecting the feature parts of the given image in accordance with the axis of symmetry, and
   4) making a judgment as to whether the given image is or is not a face image, the judgment being made in accordance with information about the center point between the candidates for eye patterns, the axis of symmetry, and/or the feature parts of the given image.

6. A method for discriminating an image as defined in claim 5 wherein the extraction of the center point between candidates for eye patterns is carried out by:
   a) detecting components, which easily match with shapes of eye patterns, from the given image,
   b) emphasizing the components, which are among the components easily matching with the shapes of eye patterns and which are located at positions in the vicinity of the center point of the given image,
   c) detecting straight line components of a contour, which are tilted in a plurality of directions, from the given image,
   d) combining the detected straight line components, contour components of the given image being thereby detected,
   e) removing the detected contour components from the components, which have been obtained by emphasizing the components located at positions in the vicinity of the center point of the given image, and
   f) extracting a center point between two components, which stand in a line along a predetermined direction, from the components, which have been obtained by removing the contour components.

7. A method for discriminating an image as defined in claim 6 wherein the detection of the components, which easily match with the shapes of eye patterns, is carried out by transmitting the given image as signals weighted with synaptic weights patterns for detecting eye patterns, which synaptic weights patterns have been calculated in accordance with a DOG function, and the detection of the straight line components of the contour, which are tilted in a plurality of directions, is carried out by transmitting the given image as signals weighted with synaptic weights patterns for detecting straight lines, which synaptic weights patterns have been calculated in accordance with a Gabor function.

8. A method for discriminating an image as defined in claim 7 wherein the sizes of receptive fields of the synaptic weights patterns for detecting straight lines are set such that the synaptic weights patterns may easily make a response to the straight line components of the contour and may make little response to the components, which easily match with the shapes of eye patterns.

9. A method for discriminating an image as defined in claim 8 wherein the feature parts of the given image include a candidate for a contour of a face pattern and/or a candidate for a mouth pattern region.

10. A method for discriminating an image as defined in claim 9 wherein the detection of the candidate for the contour of a face pattern is carried out by:

detecting the contour components, which are contained in the given image, from the given image by taking the axis of symmetry as reference, comparing the detected contour components with contours of a plurality of face patterns directed to different directions, the contours having been learned as templates in advance, and making a judgment as to whether components corresponding to the detected contour components are or are not included in the contours of face patterns, which have been learned as templates.

11. A method for discriminating an image as defined in claim 10 wherein the learning of the contours of face patterns is carried out by:

feeding the information about contours of upward-, downward-, leftward-, rightward-, and front-directed face patterns into a large number of cells of a neural network, causing a cell, which best matches with the contour information having been fed into the neural network, to learn said contour information, for neighboring cells that fall within a neighboring region having a predetermined range and neighboring with the cell, which best matches with the contour information having been fed into the neural network, carrying out spatial interpolating operations from the contour information, which has been fed into the neural network, and contour information, which is other than the contour information having been fed into the neural network and which has been learned by a cell that is among the large number of the cells of the neural network and that is other than the cell best matching with the contour information having been fed into the neural network, and thereby carrying out the self-organizing learning operations on information about contours of a large number of face patterns directed to different directions.

12. A method for discriminating an image as defined in claim 11 wherein the information about contours of upward-, downward-, leftward-, rightward-, and front-directed face patterns is obtained by averaging the information about contours of a plurality of face patterns.

13. A method for discriminating an image as defined in claim 12 wherein the self-organizing learning operations are carried out by feeding the information about the contour of the front-directed face pattern, which has been created by carrying out transformation with polar coordinates transformation, the center point between eye patterns in the information about the contour of the face pattern being taken as a pole, and the information about the contours of the upward-, downward-, leftward-, and rightward-directed face patterns, which has been created by carrying out the transformation with the polar coordinates transformation, the pole being moved upwardly, downwardly, leftwardly, and rightwardly, into the neural network, and the judgment as to whether components corresponding to the detected contour components of the given image are or are not included in the contours of face patterns, which have been learned as templates, is made by transforming the contour components of the given image with the polar coordinates transformation, in which the axis of symmetry is taken as reference and the center point between candidates for eye patterns is taken as the pole, and thereafter making a judgment as to whether the contour components of the given image transformed with the polar coordinates transformation are or are not contained in the results of the self-organizing learning operations.

14. A method for discriminating an image as defined in claim 13 wherein the judgment as to whether the given image is or is not a face image is made by:

carrying out a calculation represented by the formula $$u = \sum_{i=1}^{N} (y_i \cdot w_i) - th$$

where $y_i$ (i=1 to n, wherein n represents the number of pieces of information) represents the response value of the center point between candidates for eye patterns, the correlation value of the axis of symmetry, and the value of information concerning the feature parts, $w_i$ (i=1 to n, wherein n represents the number of pieces of information) represents the weight of connection determined in accordance with the degree of importance of each of said values of the information, and th represents the threshold value, when u>0, judging that the given image is a face image, and when u≦0, judging that the given image is not a face image.

15. A method for discriminating an image as defined in claim 12 wherein the judgment as to whether the given image is or is not a face image is made by:

carrying out a calculation represented by the formula $$u = \sum_{i=1}^{N} (y_i \cdot w_i) - th$$

where $y_i$ (i=1 to n, wherein n represents the number of pieces of information) represents the response value of the center point between candidates for eye patterns, the correlation value of the axis of symmetry, and the value of information concerning the feature parts, $w_i$ (i=1 to n, wherein n represents the number of pieces of information) represents the weight of connection determined in accordance with the degree of importance of each of said values of the information, and th represents the threshold value, when u>0, judging that the given image is a face image, and when u≦0, judging that the given image is not a face image.

16. A method for discriminating an image as defined in claim 11 wherein the self-organizing learning operations are carried out by feeding the information about the contour of the front-directed face pattern, which has been created by carrying out transformation with polar coordinates transformation, the center point between eye patterns in the information about the contour of the face pattern being taken as a pole, and the information about the contours of the upward-, downward-, leftward-, and rightward-directed face patterns, which has been created by carrying out the transformation with the polar coordinates transformation, the pole being moved upwardly, downwardly, leftwardly, and rightwardly, into the neural network, and the judgment as to whether components corresponding to the detected contour components of the given image are or are not included in the contours of face patterns, which have been learned as templates, is made by transforming the contour components of the given image with the polar coordinates transformation, in which the axis of symmetry is taken as reference and the center point between candidates for eye patterns is taken as the pole, and thereafter making a judgment as to whether the contour components of the given image transformed with the polar coordinates transformation are or are not contained in the results of the self-organizing learning operations.

17. A method for discriminating an image as defined in claim 16 wherein the judgment as to whether the given image is or is not a face image is made by:

carrying out a calculation represented by the formula $$u = \sum_{i=1}^{N} (y_i \cdot w_i) - th$$

where $y_i$ (i=1 to n, wherein n represents the number of pieces of information) represents the response value of the center point between candidates for eye patterns, the correlation value of the axis of symmetry, and the value of information concerning the feature parts, $w_i$ (i=1 to n, wherein n represents the number of pieces of information) represents the weight of connection determined in accordance with the degree of importance of each of said values of the information, and th represents the threshold value, when u>0, judging that the given image is a face image, and when u≦0, judging that the given image is not a face image.

18. A method for discriminating an image as defined in claim 11 wherein the judgment as to whether the given image is or is not a face image is made by:

carrying out a calculation represented by the formula $$u = \sum_{i=1}^{N} (y_i \cdot w_i) - th$$

where $y_i$ (i=1 to n, wherein n represents the number of pieces of information) represents the response value of the center point between candidates for eye patterns, the correlation value of the axis of symmetry, and the value of information concerning the feature parts, $w_i$ (i=1 to n, wherein n represents the number of pieces of information) represents the weight of connection determined in accordance with the degree of importance of each of said values of the information, and th represents the threshold value, when u>0, judging that the given image is a face image, and when u≦0, judging that the given image is not a face image.

19. A method for discriminating an image as defined in claim 10 wherein the judgment as to whether the given image is or is not a face image is made by:

carrying out a calculation represented by the formula $$u = \sum_{i=1}^{N} (y_i \cdot w_i) - th$$

where $y_i$ (i=1 to n, wherein n represents the number of pieces of information) represents the response value of the center point between candidates for eye patterns, the correlation value of the axis of symmetry, and the value of information concerning the feature parts, $w_i$ (i=1 to n, wherein n represents the number of pieces of information) represents the weight of connection determined in accordance with the degree of importance of each of said values of the information, and th represents the threshold value, when u>0, judging that the given image is a face image, and when u≦0, judging that the given image is not a face image.

20. A method for discriminating an image as defined in claim 9 wherein the detection of the candidate for the mouth pattern region is carried out by:

transforming the given image to a YIQ base, and detecting the components, which match with the shape of the mouth pattern most easily in a Q component image that is among the image having been transformed to the YIQ base, said components being detected within a predetermined range with reference to the axis of symmetry and/or the contour components of the given image.

21. A method for discriminating an image as defined in claim 20 wherein the detection of the candidate for the mouth pattern region is carried out by transmitting the Q component image, which has been transformed with the polar coordinates transformation by taking the center point between eye patterns as the pole, as a signal weighted with a synaptic weights pattern for detecting the mouth pattern region, which synaptic weights pattern has been calculated in accordance with a DOG function.

22. A method for discriminating an image as defined in claim 21 wherein the judgment as to whether the given image is or is not a face image is made by:

carrying out a calculation represented by the formula $$u = \sum_{i=1}^{N}(y_i \cdot w_i) - th$$

where $y_i$ (i=1 to n, wherein n represents the number of pieces of information) represents the response value of the center point between candidates for eye patterns, the correlation value of the axis of symmetry, and the value of information concerning the feature parts, $w_i$ (i=1 to n, wherein n represents the number of pieces of information) represents the weight of connection determined in accordance with the degree of importance of each of said values of the information, and th represents the threshold value, when u>0, judging that the given image is a face image, and when u≦0, judging that the given image is not a face image.

23. A method for discriminating an image as defined in claim 20 wherein the judgment as to whether the given image is or is not a face image is made by:

carrying out a calculation represented by the formula $$u = \sum_{i=1}^{N}(y_i \cdot w_i) - th$$

where $y_i$ (i=1 to n, wherein n represents the number of pieces of information) represents the response value of the center point between candidates for eye patterns, the correlation value of the axis of symmetry, and the value of information concerning the feature parts, $w_i$ (i=1 to n, wherein n represents the number of pieces of information) represents the weight of connection determined in accordance with the degree of importance of each of said values of the information, and th represents the threshold value, when u>0, judging that the given image is a face image, and when u≦0, judging that the given image is not a face image.

24. A method for discriminating an image as defined in claim 9 wherein the judgment as to whether the given image is or is not a face image is made by:

carrying out a calculation represented by the formula $$u = \sum_{i=1}^{N}(y_i \cdot w_i) - th$$

where $y_i$ (i=1 to n, wherein n represents the number of pieces of information) represents the response value of the center point between candidates for eye patterns, the correlation value of the axis of symmetry, and the value of information concerning the feature parts, $w_i$ (i=1 to n, wherein n represents the number of pieces of information) represents the weight of connection determined in accordance with the degree of importance of each of said values of the information, and th represents the threshold value, when u>0, judging that the given image is a face image, and when u≦0, judging that the given image is not a face image.

25. A method for discriminating an image as defined in claim 8 wherein the judgment as to whether the given image is or is not a face image is made by:

carrying out a calculation represented by the formula $$u = \sum_{i=1}^{N}(y_i \cdot w_i) - th$$

where $y_i$ (i=1 to n, wherein n represents the number of pieces of information) represents the response value of the center point between candidates for eye patterns, the correlation value of the axis of symmetry, and the value of information concerning the feature parts, $w_i$ (i=1 to n, wherein n represents the number of pieces of information) represents the weight of connection determined in accordance with the degree of importance of each of said values of the information, and th represents the threshold value, when u>0, judging that the given image is a face image, and when u≦0, judging that the given image is not a face image.

26. A method for discriminating an image as defined in claim 7 wherein the feature parts of the given image include a candidate for a contour of a face pattern and/or a candidate for a mouth pattern region.

27. A method for discriminating an image as defined in claim 26 wherein the detection of the candidate for the contour of a face pattern is carried out by:

detecting the contour components, which are contained in the given image, from the given image by taking the axis of symmetry as reference, comparing the detected contour components with contours of a plurality of face patterns directed to different directions, the contours having been learned as templates in advance, and making a judgment as to whether components corresponding to the detected contour components are or are not included in the contours of face patterns, which have been learned as templates.

28. A method for discriminating an image as defined in claim 27 wherein the learning of the contours of face patterns is carried out by:

feeding the information about contours of upward-, downward-, leftward-, rightward-, and front-directed face patterns into a large number of cells of a neural network, causing a cell, which best matches with the contour information having been fed into the neural network, to learn said contour information, for neighboring cells that fall within a neighboring region having a predetermined range and neighboring with the cell, which best matches with the contour information having been fed into the neural network, carrying out spatial interpolating operations from the contour information, which has been fed into the neural network, and contour information, which is other than the contour information having been fed into the neural network and which has been learned by a cell that is among the large number of the cells of the neural network and that is other than the cell best matching with the contour information having been fed into the neural network, and thereby carrying out the self-organizing learning operations on information about contours of a large number of face patterns directed to different directions.

29. A method for discriminating an image as defined in claim 28 wherein the information about contours of upward-, downward-, leftward-, rightward-, and front-directed face patterns is obtained by averaging the information about contours of a plurality of face patterns.

30. A method for discriminating an image as defined in claim 29 wherein the self-organizing learning operations are carried out by feeding the information about the contour of the front-directed face pattern, which has been created by carrying out transformation with polar coordinates transformation, the center point between eye patterns in the information about the contour of the face pattern being taken as a pole, and the information about the contours of the upward-, downward-, leftward-, and rightward-directed face patterns, which has been created by carrying out the transformation with the polar coordinates transformation, the pole being moved upwardly, downwardly, leftwardly, and rightwardly, into the neural network, and the judgment as to whether components corresponding to the detected contour components of the given image are or are not included in the contours of face patterns, which have been learned as templates, is made by transforming the contour components of the given image with the polar coordinates transformation, in which the axis of symmetry is taken as reference and the center point between candidates for eye patterns is taken as the pole, and thereafter making a judgment as to whether the contour components of the given image transformed with the polar coordinates transformation are or are not contained in the results of the self-organizing learning operations.

31. A method for discriminating an image as defined in claim 30 wherein the judgment as to whether the given image is or is not a face image is made by:

carrying out a calculation represented by the formula $$u = \sum_{i=1}^{N} (y_i \cdot w_i) - th$$

where $y_i$ (i=1 to n, wherein n represents the number of pieces of information) represents the response value of the center point between candidates for eye patterns, the correlation value of the axis of symmetry, and the value of information concerning the feature parts, $w_i$ (i=1 to n, wherein n represents the number of pieces of information) represents the weight of connection determined in accordance with the degree of importance of each of said values of the information, and th represents the threshold value, when u>0, judging that the given image is a face image, and when u≦0, judging that the given image is not a face image.

32. A method for discriminating an image as defined in claim 29 wherein the judgment as to whether the given image is or is not a face image is made by:

carrying out a calculation represented by the formula $$u = \sum_{i=1}^{N} (y_i \cdot w_i) - th$$

where $y_i$ (i=1 to n, wherein n represents the number of pieces of information) represents the response value of the center point between candidates for eye patterns, the correlation value of the axis of symmetry, and the value of information concerning the feature parts, $w_i$ (i=1 to n, wherein n represents the number of pieces of information) represents the weight of connection determined in accordance with the degree of importance of each of said values of the information, and th represents the threshold value, when u>0, judging that the given image is a face image, and when u≦0, judging that the given image is not a face image.

33. A method for discriminating an image as defined in claim 28 wherein the self-organizing learning operations are carried out by feeding the information about the contour of the front-directed face pattern, which has been created by carrying out transformation with polar coordinates transformation, the center point between eye patterns in the information about the contour of the face pattern being taken as a pole, and the information about the contours of the upward-, downward-, leftward-, and rightward-directed face patterns, which has been created by carrying out the transformation with the polar coordinates transformation, the pole being moved upwardly, downwardly, leftwardly, and rightwardly, into the neural network, and the judgment as to whether components corresponding to the detected contour components of the given image are or are not included in the contours of face patterns, which have been learned as templates, is made by transforming the contour components of the given image with the polar coordinates transformation, in which the axis of symmetry is taken as reference and the center point between candidates for eye patterns is taken as the pole, and thereafter making a judgment as to whether the contour components of the given image transformed with the polar coordinates transformation are or are not contained in the results of the self-organizing learning operations.

34. A method for discriminating an image as defined in claim 33 wherein the judgment as to whether the given image is or is not a face image is made by:

carrying out a calculation represented by the formula $$u = \sum_{i=1}^{N} (y_i \cdot w_i) - th$$

where $y_i$ (i=1 to n, wherein n represents the number of pieces of information) represents the response value of the center point between candidates for eye patterns, the correlation value of the axis of symmetry, and the value of information concerning the feature parts, $w_i$ (i=1 to n, wherein n represents the number of pieces of information) represents the weight of connection determined in accordance with the degree of importance of each of said values of the information, and th represents the threshold value, when u>0, judging that the given image is a face image, and when u≦0, judging that the given image is not a face image.

35. A method for discriminating an image as defined in claim 28 wherein the judgment as to whether the given image is or is not a face image is made by:

carrying out a calculation represented by the formula $$u = \sum_{i=1}^{N}(y_i \cdot w_i) - th$$

where $y_i$ (i=1 to n, wherein n represents the number of pieces of information) represents the response value of the center point between candidates for eye patterns, the correlation value of the axis of symmetry, and the value of information concerning the feature parts, $w_i$ (i=1 to n, wherein n represents the number of pieces of information) represents the weight of connection determined in accordance with the degree of importance of each of said values of the information, and th represents the threshold value, when u>0, judging that the given image is a face image, and when u≦0, judging that the given image is not a face image.

36. A method for discriminating an image as defined in claim 27 wherein the judgment as to whether the given image is or is not a face image is made by:

carrying out a calculation represented by the formula $$u = \sum_{i=1}^{N}(y_i \cdot w_i) - th$$

where $y_i$ (i=1 to n, wherein n represents the number of pieces of information) represents the response value of the center point between candidates for eye patterns, the correlation value of the axis of symmetry, and the value of information concerning the feature parts, $w_i$ (i=1 to n, wherein n represents the number of pieces of information) represents the weight of connection determined in accordance with the degree of importance of each of said values of the information, and th represents the threshold value, when u>0, judging that the given image is a face image, and when u≦0, judging that the given image is not a face image.

37. A method for discriminating an image as defined in claim 26 wherein the detection of the candidate for the mouth pattern region is carried out by:

transforming the given image to a YIQ base, and detecting the components, which match with the shape of the mouth pattern most easily in a Q component image that is among the image having been transformed to the YIQ base, said components being detected within a predetermined range with reference to the axis of symmetry and/or the contour components of the given image.

38. A method for discriminating an image as defined in claim 37 wherein the detection of the candidate for the mouth pattern region is carried out by transmitting the Q component image, which has been transformed with the polar coordinates transformation by taking the center point between eye patterns as the pole, as a signal weighted with a synaptic weights pattern for detecting the mouth pattern region, which synaptic weights pattern has been calculated in accordance with a DOG function.

39. A method for discriminating an image as defined in claim 38 wherein the judgment as to whether the given image is or is not a face image is made by:

carrying out a calculation represented by the formula $$u = \sum_{i=1}^{N}(y_i \cdot w_i) - th$$

where $y_i$ (i=1 to n, wherein n represents the number of pieces of information) represents the response value of the center point between candidates for eye patterns, the correlation value of the axis of symmetry, and the value of information concerning the feature parts, $w_i$ (i=1 to n, wherein n represents the number of pieces of information) represents the weight of connection determined in accordance with the degree of importance of each of said values of the information, and th represents the threshold value, when u>0, judging that the given image is a face image, and when u≦0, judging that the given image is not a face image.

40. A method for discriminating an image as defined in claim 37 wherein the judgment as to whether the given image is or is not a face image is made by:

carrying out a calculation represented by the formula $$u = \sum_{i=1}^{N}(y_i \cdot w_i) - th$$

where $y_i$ (i=1 to n, wherein n represents the number of pieces of information) represents the response value of the center point between candidates for eye patterns, the correlation value of the axis of symmetry, and the value of information concerning the feature parts, $w_i$ (i=1 to n, wherein n represents the number of pieces of information) represents the weight of connection determined in accordance with the degree of importance of each of said values of the information, and th represents the threshold value, when u>0, judging that the given image is a face image, and when u≦0, judging that the given image is not a face image.

41. A method for discriminating an image as defined in claim 26 wherein the judgment as to whether the given image is or is not a face image is made by:

carrying out a calculation represented by the formula $$u = \sum_{i=1}^{N}(y_i \cdot w_i) - th$$

where $y_i$ (i=1 to n, wherein n represents the number of pieces of information) represents the response value of the center point between candidates for eye patterns, the correlation value of the axis of symmetry, and the value of information concerning the feature parts, $w_i$ (i=1 to n, wherein n represents the number of pieces of information) represents the weight of connection determined in accordance with the degree of importance of each of said values of the information, and th represents the threshold value, when u>0, judging that the given image is a face image, and when u≦0, judging that the given image is not a face image.

42. A method for discriminating an image as defined in claim 7 wherein the judgment as to whether the given image is or is not a face image is made by:

carrying out a calculation represented by the formula $$u = \sum_{i=1}^{N} (y_i \cdot w_i) - th$$

where $y_i$ (i=1 to n, wherein n represents the number of pieces of information) represents the response value of the center point between candidates for eye patterns, the correlation value of the axis of symmetry, and the value of information concerning the feature parts, $w_i$ (i=1 to n, wherein n represents the number of pieces of information) represents the weight of connection determined in accordance with the degree of importance of each of said values of the information, and th represents the threshold value, when u>0, judging that the given image is a face image, and when u≦0, judging that the given image is not a face image.

43. A method for discriminating an image as defined in claim 6 wherein the feature parts of the given image include a candidate for a contour of a face pattern and/or a candidate for a mouth pattern region.

44. A method for discriminating an image as defined in claim 43 wherein the detection of the candidate for the contour of a face pattern is carried out by:

detecting the contour components, which are contained in the given image, from the given image by taking the axis of symmetry as reference, comparing the detected contour components with contours of a plurality of face patterns directed to different directions, the contours having been learned as templates in advance, and making a judgment as to whether components corresponding to the detected contour components are or are not included in the contours of face patterns, which have been learned as templates.

45. A method for discriminating an image as defined in claim 44 wherein the learning of the contours of face patterns is carried out by:

feeding the information about contours of upward-, downward-, leftward-, rightward-, and front-directed face patterns into a large number of cells of a neural network, causing a cell, which best matches with the contour information having been fed into the neural network, to learn said contour information, for neighboring cells that fall within a neighboring region having a predetermined range and neighboring with the cell, which best matches with the contour information having been fed into the neural network, carrying out spatial interpolating operations from the contour information, which has been fed into the neural network, and contour information, which is other than the contour information having been fed into the neural network and which has been learned by a cell that is among the large number of the cells of the neural network and that is other than the cell best matching with the contour information having been fed into the neural network, and thereby carrying out the self-organizing learning operations on information about contours of a large number of face patterns directed to different directions.

46. A method for discriminating an image as defined in claim 45 wherein the information about contours of upward-, downward-, leftward-, rightward-, and front-directed face patterns is obtained by averaging the information about contours of a plurality of face patterns.

47. A method for discriminating an image as defined in claim 46 wherein the self-organizing learning operations are carried out by feeding the information about the contour of the front-directed face pattern, which has been created by carrying out transformation with polar coordinates transformation, the center point between eye patterns in the information about the contour of the face pattern being taken as a pole, and the information about the contours of the upward-, downward-, leftward-, and rightward-directed face patterns, which has been created by carrying out the transformation with the polar coordinates transformation, the pole being moved upwardly, downwardly, leftwardly, and rightwardly, into the neural network, and the judgment as to whether components corresponding to the detected contour components of the given image are or are not included in the contours of face patterns, which have been learned as templates, is made by transforming the contour components of the given image with the polar coordinates transformation, in which the axis of symmetry is taken as reference and the center point between candidates for eye patterns is taken as the pole, and thereafter making a judgment as to whether the contour components of the given image transformed with the polar coordinates transformation are or are not contained in the results of the self-organizing learning operations.

48. A method for discriminating an image as defined in claim 47 wherein the judgment as to whether the given image is or is not a face image is made by:

carrying out a calculation represented by the formula $$u = \sum_{i=1}^{N} (y_i \cdot w_i) - th$$

where $y_i$ (i=1 to n, wherein n represents the number of pieces of information) represents the response value of the center point between candidates for eye patterns, the correlation value of the axis of symmetry, and the value of information concerning the feature parts, $w_i$ (i=1 to n, wherein n represents the number of pieces of information) represents the weight of connection determined in accordance with the degree of importance of each of said values of the information, and th represents the threshold value, when u>0, judging that the given image is a face image, and when u≦0, judging that the given image is not a face image.

49. A method for discriminating an image as defined in claim 46 wherein the judgment as to whether the given image is or is not a face image is made by:

carrying out a calculation represented by the formula $$u = \sum_{i=1}^{N} (y_i \cdot w_i) - th$$

where $y_i$ (i=1 to n, wherein n represents the number of pieces of information) represents the response value of the center point between candidates for eye patterns, the correlation value of the axis of symmetry, and the value of information concerning the feature parts, $w_i$ (i=1 to n, wherein n represents the number of pieces of information) represents the weight of connection determined in accordance with the degree of importance of each of said values of the information, and th represents the threshold value, when u>0, judging that the given image is a face image, and when u≦0, judging that the given image is not a face image.

50. A method for discriminating an image as defined in claim 45 wherein the self-organizing learning operations are carried out by feeding the information about the contour of the front-directed face pattern, which has been created by carrying out transformation with polar coordinates transformation, the center point between eye patterns in the information about the contour of the face pattern being taken as a pole, and the information about the contours of the upward-, downward-, leftward-, and rightward-directed face patterns, which has been created by carrying out the transformation with the polar coordinates transformation, the pole being moved upwardly, downwardly, leftwardly, and rightwardly, into the neural network, and the judgment as to whether components corresponding to the detected contour components of the given image are or are not included in the contours of face patterns, which have been learned as templates, is made by transforming the contour components of the given image with the polar coordinates transformation, in which the axis of symmetry is taken as reference and the center point between candidates for eye patterns is taken as the pole, and thereafter making a judgment as to whether the contour components of the given image transformed with the polar coordinates transformation are or are not contained in the results of the self-organizing learning operations.

51. A method for discriminating an image as defined in claim 50 wherein the judgment as to whether the given image is or is not a face image is made by:

carrying out a calculation represented by the formula $$u = \sum_{i=1}^{N}(y_i \cdot w_i) - th$$

where $y_i$ (i=1 to n, wherein n represents the number of pieces of information) represents the response value of the center point between candidates for eye patterns, the correlation value of the axis of symmetry, and the value of information concerning the feature parts, $w_i$ (i=1 to n, wherein n represents the number of pieces of information) represents the weight of connection determined in accordance with the degree of importance of each of said values of the information, and th represents the threshold value, when u>0, judging that the given image is a face image, and when u≦0, judging that the given image is not a face image.

52. A method for discriminating an image as defined in claim 45 wherein the judgment as to whether the given image is or is not a face image is made by:

carrying out a calculation represented by the formula $$u = \sum_{i=1}^{N}(y_i \cdot w_i) - th$$

where $y_i$ (i=1 to n, wherein n represents the number of pieces of information) represents the response value of the center point between candidates for eye patterns, the correlation value of the axis of symmetry, and the value of information concerning the feature parts, $w_i$ (i=1 to n, wherein n represents the number of pieces of information) represents the weight of connection determined in accordance with the degree of importance of each of said values of the information, and th represents the threshold value, when u>0, judging that the given image is a face image, and when u≦0, judging that the given image is not a face image.

53. A method for discriminating an image as defined in claim 44 wherein the judgment as to whether the given image is or is not a face image is made by:

carrying out a calculation represented by the formula $$u = \sum_{i=1}^{N}(y_i \cdot w_i) - th$$

where $y_i$ (i=1 to n, wherein n represents the number of pieces of information) represents the response value of the center point between candidates for eye patterns, the correlation value of the axis of symmetry, and the value of information concerning the feature parts, $w_i$ (i=1 to n, wherein n represents the number of pieces of information) represents the weight of connection determined in accordance with the degree of importance of each of said values of the information, and th represents the threshold value, when u>0, judging that the given image is a face image, and when u≦0, judging that the given image is not a face image.

54. A method for discriminating an image as defined in claim 43 wherein the detection of the candidate for the mouth pattern region is carried out by:

transforming the given image to a YIQ base, and detecting the components, which match with the shape of the mouth pattern most easily in a Q component image that is among the image having been transformed to the YIQ base, said components being detected within a predetermined range with reference to the axis of symmetry and/or the contour components of the given image.

55. A method for discriminating an image as defined in claim 54 wherein the detection of the candidate for the mouth pattern region is carried out by transmitting the Q component image, which has been transformed with the polar coordinates transformation by taking the center point between eye patterns as the pole, as a signal weighted with a synaptic weights pattern for detecting the mouth pattern region, which synaptic weights pattern has been calculated in accordance with a DOG function.

56. A method for discriminating an image as defined in claim 55 wherein the judgment as to whether the given image is or is not a face image is made by:

carrying out a calculation represented by the formula $$u = \sum_{i=1}^{N}(y_i \cdot w_i) - th$$

where $y_i$ (i=1 to n, wherein n represents the number of pieces of information) represents the response value of the center point between candidates for eye patterns, the correlation value of the axis of symmetry, and the value of information concerning the feature parts, $w_i$ (i=1 to n, wherein n represents the number of pieces of information) represents the weight of connection determined in accordance with the degree of importance of each of said values of the information, and th represents the threshold value, when u>0, judging that the given image is a face image, and when u≦0, judging that the given image is not a face image.

57. A method for discriminating an image as defined in claim 54 wherein the judgment as to whether the given image is or is not a face image is made by:

carrying out a calculation represented by the formula $$u = \sum_{i=1}^{N}(y_i \cdot w_i) - th$$

where $y_i$ (i=1 to n, wherein n represents the number of pieces of information) represents the response value of the center point between candidates for eye patterns, the correlation value of the axis of symmetry, and the value of information concerning the feature parts, $w_i$ (i=1 to n, wherein n represents the number of pieces of information) represents the weight of connection determined in accordance with the degree of importance of each of said values of the information, and th represents the threshold value, when u>0, judging that the given image is a face image, and when u≦0, judging that the given image is not a face image.

58. A method for discriminating an image as defined in claim 43 wherein the judgment as to whether the given image is or is not a face image is made by:

carrying out a calculation represented by the formula $$u = \sum_{i=1}^{N}(y_i \cdot w_i) - th$$

where $y_i$ (i=1 to n, wherein n represents the number of pieces of information) represents the response value of the center point between candidates for eye patterns, the correlation value of the axis of symmetry, and the value of information concerning the feature parts, $w_i$ (i=1 to n, wherein n represents the number of pieces of information) represents the weight of connection determined in accordance with the degree of importance of each of said values of the information, and th represents the threshold value, when u>0, judging that the given image is a face image, and when u≦0, judging that the given image is not a face image.

59. A method for discriminating an image as defined in claim 6 wherein the judgment as to whether the given image is or is not a face image is made by:

carrying out a calculation represented by the formula $$u = \sum_{i=1}^{N}(y_i \cdot w_i) - th$$

where $y_i$ (i=1 to n, wherein n represents the number of pieces of information) represents the response value of the center point between candidates for eye patterns, the correlation value of the axis of symmetry, and the value of information concerning the feature parts, $w_i$ (i=1 to n, wherein n represents the number of pieces of information) represents the weight of connection determined in accordance with the degree of importance of each of said values of the information, and th represents the threshold value, when u>0, judging that the given image is a face image, and when u≦0, judging that the given image is not a face image.

60. A method for discriminating an image as defined in claim 5 wherein the detection of the axis of symmetry is carried out by:

a) transforming the given image with the polar coordinates transformation by taking the center point between candidates for eye patterns as a pole, b) setting a temporary axis of symmetry in the given image, which has been transformed with the polar coordinates transformation, c) moving the temporary axis of symmetry by an angle within a predetermined range in the given image, which has been transformed with the polar coordinates transformation, the degree of correlation between two regions in the given image, which are divided by the moved temporary axis of symmetry, being thereby calculated, and d) taking the temporary axis of symmetry, which is associated with the highest degree of correlation, as the axis of symmetry.

61. A method for discriminating an image as defined in claim 60 wherein the feature parts of the given image include a candidate for a contour of a face pattern and/or a candidate for a mouth pattern region.

62. A method for discriminating an image as defined in claim 61 wherein the detection of the candidate for the counter of a face pattern is carried out by:

detecting the contour components, which are contained in the given image, from the given image by taking the axis of symmetry as reference, comparing the detected contour components with contours of a plurality of face patterns directed to different directions, the contours having been learned as templates in advance, and making a judgment as to whether components corresponding to the detected contour components are or are not included in the contours of face patterns, which have been learned as templates.

63. A method for discriminating an image as defined in claim 62 wherein the learning of the contours of face patterns is carried out by:

feeding the information about contours of upward-, downward-, leftward-, rightward-, and front-directed face patterns into a large number of cells of a neural network, causing a cell, which best matches with the contour information having been fed into the neural network, to learn said contour information, for neighboring cells that fall within a neighboring region having a predetermined range and neighboring with the cell, which best matches with the contour information having been fed into the neural network, carrying out spatial interpolating operations from the contour information, which has been fed into the neural network, and contour information, which is other than the contour information having been fed into the neural network and which has been learned by a cell that is among the large number of the cells of the neural network and that is other than the cell best matching with the contour information having been fed into the neural network, and thereby carrying out the self-organizing learning operations on information about contours of a large number of face patterns directed to different directions.

64. A method for discriminating an image as defined in claim 63 wherein the information about contours of upward-, downward-, leftward-, rightward-, and front-directed face patterns is obtained by averaging the information about contours of a plurality of face patterns.

65. A method for discriminating an image as defined in claim 64 wherein the self-organizing learning operations are carried out by feeding the information about the contour of the front-directed face pattern, which has been created by carrying out transformation with polar coordinates transformation, the center point between eye patterns in the information about the contour of the face pattern being taken as a pole, and the information about the contours of the upward-, downward-, leftward-, and rightward-directed face patterns, which has been created by carrying out the transformation with the polar coordinates transformation, the pole being moved upwardly, downwardly, leftwardly, and rightwardly, into the neural network, and the judgment as to whether components corresponding to the detected contour components of the given image are or are not included in the contours of face patterns, which have been learned as templates, is made by transforming the contour components of the given image with the polar coordinates transformation, in which the axis of symmetry is taken as reference and the center point between candidates for eye patterns is taken as the pole, and thereafter making a judgment as to whether the contour components of the given image transformed with the polar coordinates transformation are or are not contained in the results of the self-organizing learning operations.

66. A method for discriminating an image as defined in claim 65 wherein the judgment as to whether the given image is or is not a face image is made by:

carrying out a calculation represented by the formula $$u = \sum_{i=1}^{N}(y_i \cdot w_i) - th$$

where $y_i$ (i=1 to n, wherein n represents the number of pieces of information) represents the response value of the center point between candidates for eye patterns, the correlation value of the axis of symmetry, and the value of information concerning the feature parts, $w_i$ (i=1 to n, wherein n represents the number of pieces of information) represents the weight of connection determined in accordance with the degree of importance of each of said values of the information, and th represents the threshold value, when u>0, judging that the given image is a face image, and when u≦0, judging that the given image is not a face image.

67. A method for discriminating an image as defined in claim 64 wherein the judgment as to whether the given image is or is not a face image is made by:

carrying out a calculation represented by the formula $$u = \sum_{i=1}^{N}(y_i \cdot w_i) - th$$

where $y_i$ (i=1 to n, wherein n represents the number of pieces of information) represents the response value of the center point between candidates for eye patterns, the correlation value of the axis of symmetry, and the value of information concerning the feature parts, $w_i$ (i=1 to n, wherein n represents the number of pieces of information) represents the weight of connection determined in accordance with the degree of importance of each of said values of the information, and th represents the threshold value, when u>0, judging that the given image is a face image, and when u≦0, judging that the given image is not a face image.

68. A method for discriminating an image as defined in claim 63 wherein the self-organizing learning operations are carried out by feeding the information about the contour of the front-directed face pattern, which has been created by carrying out transformation with polar coordinates transformation, the center point between eye patterns in the information about the contour of the face pattern being taken as a pole, and the information about the contours of the upward-, downward-, leftward-, and rightward-directed face patterns, which has been created by carrying out the transformation with the polar coordinates transformation, the pole being moved upwardly, downwardly, leftwardly, and rightwardly, into the neural network, and the judgment as to whether components corresponding to the detected contour components of the given image are or are not included in the contours of face patterns, which have been learned as templates, is made by transforming the contour components of the given image with the polar coordinates transformation, in which the axis of symmetry is taken as reference and the center point between candidates for eye patterns is taken as the pole, and thereafter making a judgment as to whether the contour components of the given image transformed with the polar coordinates transformation are or are not contained in the results of the self-organizing learning operations.

69. A method for discriminating an image as defined in claim 68 wherein the judgment as to whether the given image is or is not a face image is made by:

carrying out a calculation represented by the formula $$u = \sum_{i=1}^{N}(y_i \cdot w_i) - th$$

where $y_i$ (i=1 to n, wherein n represents the number of pieces of information) represents the response value of the center point between candidates for eye patterns, the correlation value of the axis of symmetry, and the value of information concerning the feature parts, $w_i$ (i=1 to n, wherein n represents the number of pieces of information) represents the weight of connection determined in accordance with the degree of importance of each of said values of the information, and th represents the threshold value, when u>0, judging that the given image is a face image, and when u≦0, judging that the given image is not a face image.

70. A method for discriminating an image as defined in claim 63 wherein the judgment as to whether the given image is or is not a face image is made by:

carrying out a calculation represented by the formula $$u = \sum_{i=1}^{N}(y_i \cdot w_i) - th$$

where $y_i$ (i=1 to n, wherein n represents the number of pieces of information) represents the response value of the center point between candidates for eye patterns, the correlation value of the axis of symmetry, and the value of information concerning the feature parts, $w_i$ (i=1 to n, wherein n represents the number of pieces of information) represents the weight of connection determined in accordance with the degree of importance of each of said values of the information, and th represents the threshold value, when u>0, judging that the given image is a face image, and when u≦0, judging that the given image is not a face image.

71. A method for discriminating an image as defined in claim 62 wherein the judgment as to whether the given image is or is not a face image is made by:

carrying out a calculation represented by the formula $$u = \sum_{i=1}^{N}(y_i \cdot w_i) - th$$

where $y_i$ (i=1 to n, wherein n represents the number of pieces of information) represents the response value of the center point between candidates for eye patterns, the correlation value of the axis of symmetry, and the value of information concerning the feature parts, $w_i$ (i=1 to n, wherein n represents the number of pieces of information) represents the weight of connection determined in accordance with the degree of importance of each of said values of the information, and th represents the threshold value, when u>0, judging that the given image is a face image, and when u≦0, judging that the given image is not a face image.

72. A method for discriminating an image as defined in claim 61 wherein the detection of the candidate for the mouth pattern region is carried out by:

transforming the given image to a YIQ base, and detecting the components, which match with the shape of the mouth pattern most easily in a Q component image that is among the image having been transformed to the YIQ base, said components being detected within a predetermined range with reference to the axis of symmetry and/or the contour components of the given image.

73. A method for discriminating an image as defined in claim 72 wherein the detection of the candidate for the mouth pattern region is carried out by transmitting the Q component image, which has been transformed with the polar coordinates transformation by taking the center point between eye patterns as the pole, as a signal weighted with a synaptic weights pattern for detecting the mouth pattern region, which synaptic weights pattern has been calculated in accordance with a DOG function.

74. A method for discriminating an image as defined in claim 73 wherein the judgment as to whether the given image is or is not a face image is made by:

carrying out a calculation represented by the formula $$u = \sum_{i=1}^{N}(y_i \cdot w_i) - th$$

where $y_i$ (i=1 to n, wherein n represents the number of pieces of information) represents the response value of the center point between candidates for eye patterns, the correlation value of the axis of symmetry, and the value of information concerning the feature parts, $w_i$ (i=1 to n, wherein n represents the number of pieces of information) represents the weight of connection determined in accordance with the degree of importance of each of said values of the information, and th represents the threshold value, when u>0, judging that the given image is a face image, and when u≦0, judging that the given image is not a face image.

75. A method for discriminating an image as defined in claim 72 wherein the judgment as to whether the given image is or is not a face image is made by:

carrying out a calculation represented by the formula $$u = \sum_{i=1}^{N}(y_i \cdot w_i) - th$$

where $y_i$ (i=1 to n, wherein n represents the number of pieces of information) represents the response value of the center point between candidates for eye patterns, the correlation value of the axis of symmetry, and the value of information concerning the feature parts, $w_i$ (i=1 to n, wherein n represents the number of pieces of information) represents the weight of connection determined in accordance with the degree of importance of each of said values of the information, and th represents the threshold value, when u>0, judging that the given image is a face image, and when u≦0, judging that the given image is not a face image.

76. A method for discriminating an image as defined in claim 61 wherein the judgment as to whether the given image is or is not a face image is made by:

carrying out a calculation represented by the formula $$u = \sum_{i=1}^{N}(y_i \cdot w_i) - th$$

where $y_i$ (i=1 to n, wherein n represents the number of pieces of information) represents the response value of the center point between candidates for eye patterns, the correlation value of the axis of symmetry, and the value of information concerning the feature parts, $w_i$ (i=1 to n, wherein n represents the number of pieces of information) represents the weight of connection determined in accordance with the degree of importance of each of said values of the information, and th represents the threshold value, when u>0, judging that the given image is a face image, and when u≦0, judging that the given image is not a face image.

77. A method for discriminating an image as defined in claim 60 wherein the judgment as to whether the given image is or is not a face image is made by:

carrying out a calculation represented by the formula $$u = \sum_{i=1}^{N}(y_i \cdot w_i) - th$$

where $y_i$ (i=1 to n, wherein n represents the number of pieces of information) represents the response value of the center point between candidates for eye patterns, the correlation value of the axis of symmetry, and the value of information concerning the feature parts, $w_i$ (i=1 to n, wherein n represents the number of pieces of information) represents the weight of connection determined in accordance with the degree of importance of each of said values of the information, and th represents the threshold value, when u>0, judging that the given image is a face image, and when u≦0, judging that the given image is not a face image.

78. A method for discriminating an image as defined in claim 5 wherein the feature parts of the given image include a candidate for a contour of a face pattern and/or a candidate for a mouth pattern region.

79. A method for discriminating an image as defined in claim 78 wherein the detection of the candidate for the contour of a face pattern is carried out by:

detecting the contour components, which are contained in the given image, from the given image by taking the axis of symmetry as reference, comparing the detected contour components with contours of a plurality of face patterns directed to different directions, the contours having been learned as templates in advance, and making a judgment as to whether components corresponding to the detected contour components are or are not included in the contours of face patterns, which have been learned as templates.

80. A method for discriminating an image as defined in claim 79 wherein the learning of the contours of face patterns is carried out by:

feeding the information about contours of upward-, downward-, leftward-, rightward-, and front-directed face patterns into a large number of cells of a neural network, causing a cell, which best matches with the contour information having been fed into the neural network, to learn said contour information, for neighboring cells that fall within a neighboring region having a predetermined range and neighboring with the cell, which best matches with the contour information having been fed into the neural network, carrying out spatial interpolating operations from the contour information, which has been fed into the neural network, and contour information, which is other than the contour information having been fed into the neural network and which has been learned by a cell that is among the large number of the cells of the neural network and that is other than the cell best matching with the contour information having been fed into the neural network, and thereby carrying out the self-organizing learning operations on information about contours of a large number of face patterns directed to different directions.

81. A method for discriminating an image as defined in claim 80 wherein the information about contours of upward-, downward-, leftward-, rightward-, and front-directed face patterns is obtained by averaging the information about contours of a plurality of face patterns.

82. A method for discriminating an image as defined in claim 81 wherein the self-organizing learning operations are carried out by feeding the information about the contour of the front-directed face pattern, which has been created by carrying out transformation with polar coordinates transformation, the center point between eye patterns in the information about the contour of the face pattern being taken as a pole, and the information about the contours of the upward-, downward-, leftward-, and rightward-directed face patterns, which has been created by carrying out the transformation with the polar coordinates transformation, the pole being moved upwardly, downwardly, leftwardly, and rightwardly, into the neural network, and the judgment as to whether components corresponding to the detected contour components of the given image are or are not included in the contours of face patterns, which have been learned as templates, is made by transforming the contour components of the given image with the polar coordinates transformation, in which the axis of symmetry is taken as reference and the center point between candidates for eye patterns is taken as the pole, and thereafter making a judgment as to whether the contour components of the given image transformed with the polar coordinates transformation are or are not contained in the results of the self-organizing learning operations.

83. A method for discriminating an image as defined in claim 82 wherein the judgment as to whether the given image is or is not a face image is made by:

carrying out a calculation represented by the formula $$u = \sum_{i=1}^{N}(y_i \cdot w_i) - th$$

where $y_i$ (i=1 to n, wherein n represents the number of pieces of information) represents the response value of the center point between candidates for eye patterns, the correlation value of the axis of symmetry, and the value of information concerning the feature parts, $w_i$ (i=1 to n, wherein n represents the number of pieces of information) represents the weight of connection determined in accordance with the degree of importance of each of said values of the information, and th represents the threshold value, when u>0, judging that the given image is a face image, and when u≦0, judging that the given image is not a face image.

84. A method for discriminating an image as defined in claim 81 wherein the judgment as to whether the given image is or is not a face image is made by:

carrying out a calculation represented by the formula $$u = \sum_{i=1}^{N}(y_i \cdot w_i) - th$$

where $y_i$ (i=1 to n, wherein n represents the number of pieces of information) represents the response value of the center point between candidates for eye patterns, the correlation value of the axis of symmetry, and the value of information concerning the feature parts, $w_i$ (i=1 to n, wherein n represents the number of pieces of information) represents the weight of connection determined in accordance with the degree of importance of each of said values of the information, and th represents the threshold value, when u>0, judging that the given image is a face image, and when u≦0, judging that the given image is not a face image.

85. A method for discriminating an image as defined in claim 80 wherein the self-organizing learning operations are carried out by feeding the information about the contour of the front-directed face pattern, which has been created by carrying out transformation with polar coordinates transformation, the center point between eye patterns in the information about the contour of the face pattern being taken as a pole, and the information about the contours of the upward-, downward-, leftward-, and rightward-directed face patterns, which has been created by carrying out the transformation with the polar coordinates transformation, the pole being moved upwardly, downwardly, leftwardly, and rightwardly, into the neural network, and the judgment as to whether components corresponding to the detected contour components of the given image are or are not included in the contours of face patterns, which have been learned as templates, is made by transforming the contour components of the given image with the polar coordinates transformation, in which the axis of symmetry is taken as reference and the center point between candidates for eye patterns is taken as the pole, and thereafter making a judgment as to whether the contour components of the given image transformed with the polar coordinates transformation are or are not contained in the results of the self-organizing learning operations.

86. A method for discriminating an image as defined in claim 85 wherein the judgment as to whether the given image is or is not a face image is made by:

carrying out a calculation represented by the formula $$u = \sum_{i=1}^{N}(y_i \cdot w_i) - th$$

where $y_i$ (i=1 to n, wherein n represents the number of pieces of information) represents the response value of the center point between candidates for eye patterns, the correlation value of the axis of symmetry, and the value of information concerning the feature parts, $w_i$ (i=1 to n, wherein n represents the number of pieces of information) represents the weight of connection determined in accordance with the degree of importance of each of said values of the information, and th represents the threshold value, when u>0, judging that the given image is a face image, and when u≦0, judging that the given image is not a face image.

87. A method for discriminating an image as defined in claim 80 wherein the judgment as to whether the given image is or is not a face image is made by:

carrying out a calculation represented by the formula $$u = \sum_{i=1}^{N}(y_i \cdot w_i) - th$$

where $y_i$ (i=1 to n, wherein n represents the number of pieces of information) represents the response value of the center point between candidates for eye patterns, the correlation value of the axis of symmetry, and the value of information concerning the feature parts, $w_i$ (i=1 to n, wherein n represents the number of pieces of information) represents the weight of connection determined in accordance with the degree of importance of each of said values of the information, and th represents the threshold value, when u>0, judging that the given image is a face image, and when u≦0, judging that the given image is not a face image.

88. A method for discriminating an image as defined in claim 79 wherein the judgment as to whether the given image is or is not a face image is made by:

carrying out a calculation represented by the formula $$u = \sum_{i=1}^{N}(y_i \cdot w_i) - th$$

where $y_i$ (i=1 to n, wherein n represents the number of pieces of information) represents the response value of the center point between candidates for eye patterns, the correlation value of the axis of symmetry, and the value of information concerning the feature parts, $w_i$ (i=1 to n, wherein n represents the number of pieces of information) represents the weight of connection determined in accordance with the degree of importance of each of said values of the information, and th represents the threshold value, when u>0, judging that the given image is a face image, and when u≦0, judging that the given image is not a face image.

89. A method for discriminating an image as defined in claim 78 wherein the detection of the candidate for the mouth pattern region is carried out by:

transforming the given image to a YIQ base, and detecting the components, which match with the shape of the mouth pattern most easily in a Q component image that is among the image having been transformed to the YIQ base, said components being detected within a predetermined range with reference to the axis of symmetry and/or the contour components of the given image.

90. A method for discriminating an image as defined in claim 89 wherein the detection of the candidate for the mouth pattern region is carried out by transmitting the Q component image, which has been transformed with the polar coordinates transformation by taking the center point between eye patterns as the pole, as a signal weighted with a synaptic weights pattern for detecting the mouth pattern region, which synaptic weights pattern has been calculated in accordance with a DOG function.

91. A method for discriminating an image as defined in claim 90 wherein the judgment as to whether the given image is or is not a face image is made by:

carrying out a calculation represented by the formula $$u = \sum_{i=1}^{N}(y_i \cdot w_i) - th$$

where $y_i$ (i=1 to n, wherein n represents the number of pieces of information) represents the response value of the center point between candidates for eye patterns, the correlation value of the axis of symmetry, and the value of information concerning the feature parts, $w_i$ (i=1 to n, wherein n represents the number of pieces of information) represents the weight of connection determined in accordance with the degree of importance of each of said values of the information, and th represents the threshold value, when u>0, judging that the given image is a face image, and when u≦0, judging that the given image is not a face image.

92. A method for discriminating an image as defined in claim 89 wherein the judgment as to whether the given image is or is not a face image is made by:

carrying out a calculation represented by the formula $$u = \sum_{i=1}^{N}(y_i \cdot w_i) - th$$

where $y_i$ (i=1 to n, wherein n represents the number of pieces of information) represents the response value of the center point between candidates for eye patterns, the correlation value of the axis of symmetry, and the value of information concerning the feature parts, $w_i$ (i=1 to n, wherein n represents the number of pieces of information) represents the weight of connection determined in accordance with the degree of importance of each of said values of the information, and th represents the threshold value, when u>0, judging that the given image is a face image, and when u≦0, judging that the given image is not a face image.

93. A method for discriminating an image as defined in claim 78 wherein the judgment as to whether the given image is or is not a face image is made by:

carrying out a calculation represented by the formula $$u = \sum_{i=1}^{N}(y_i \cdot w_i) - th$$

where $y_i$ (i=1 to n, wherein n represents the number of pieces of information) represents the response value of the center point between candidates for eye patterns, the correlation value of the axis of symmetry, and the value of information concerning the feature parts, $w_i$ (i=1 to n, wherein n represents the number of pieces of information) represents the weight of connection determined in accordance with the degree of importance of each of said values of the information, and th represents the threshold value, when u>0, judging that the given image is a face image, and when u≦0, judging that the given image is not a face image.

94. A method for discriminating an image as defined in claim 5 wherein the judgment as to whether the given image is or is not a face image is made by:

carrying out a calculation represented by the formula $$u = \sum_{i=1}^{N}(y_i \cdot w_i) - th$$

where $y_i$ (i=1 to n, wherein n represents the number of pieces of information) represents the response value of the center point between candidates for eye patterns, the correlation value of the axis of symmetry, and the value of information concerning the feature parts, $w_i$ (i=1 to n, wherein n represents the number of pieces of information) represents the weight of connection determined in accordance with the degree of importance of each of said values of the information, and th represents the threshold value, when u>0, judging that the given image is a face image, and when u<0, judging that the given image is not a face image.

95. A method for discriminating an image as defined in claim 4 wherein the judgment as to whether the given image is or is not a face image is made by:

carrying out a calculation represented by the formula $$u = \sum_{i=1}^{N}(y_i \cdot w_i) - th$$

where $y_i$ (i=1 to n, wherein n represents the number of pieces of information) represents the response value of the center point between candidates for eye patterns, the correlation value of the axis of symmetry, and the value of information concerning the feature parts, $w_i$ (i=1 to n, wherein n represents the number of pieces of information) represents the weight of connection determined in accordance with the degree of importance of each of said values of the information, and th represents the threshold value, when u>0, judging that the given image is a face image, and when u≦0, judging that the given image is not a face image.

\* \* \* \* \*